United States Patent
Ishikura

(10) Patent No.: US 6,823,301 B1
(45) Date of Patent: Nov. 23, 2004

(54) LANGUAGE ANALYSIS USING A READING POINT

(76) Inventor: Hiroshi Ishikura, 6-10-9, Hashiramoto Takatsuki, Osaka (JP)

(*) Notice: Subject to any disclaimer, the term of this patent is extended or adjusted under 35 U.S.C. 154(b) by 0 days.

(21) Appl. No.: 09/380,469

(22) PCT Filed: Mar. 4, 1998

(86) PCT No.: PCT/JP98/00900
§ 371 (c)(1), (2), (4) Date: Feb. 14, 2000

(87) PCT Pub. No.: WO98/39711
PCT Pub. Date: Sep. 11, 1998

(30) Foreign Application Priority Data
Mar. 4, 1997 (JP) ............................................. 9-48673

(51) Int. Cl.[7] ............................................. G06F 17/27
(52) U.S. Cl. ........................................................ 704/9
(58) Field of Search .................. 704/1, 9, 10; 707/530, 707/531

(56) References Cited

U.S. PATENT DOCUMENTS

| 4,868,750 A | * | 9/1989 | Kucera et al. ................. 704/9 |
| 4,887,212 A | * | 12/1989 | Zamora et al. ................. 704/9 |
| 5,146,405 A | * | 9/1992 | Church ........................... 704/9 |
| 5,251,129 A | * | 10/1993 | Jacobs et al. .................. 704/9 |
| 5,323,316 A | * | 6/1994 | Kadashevich et al. ......... 704/9 |
| 5,331,556 A | * | 7/1994 | Black, Jr. et al. ............... 704/9 |
| 5,794,177 A | * | 8/1998 | Carus et al. .................... 704/9 |

FOREIGN PATENT DOCUMENTS

| JP | 63-156284 | 6/1988 |
| JP | 9231217 | 9/1997 |

* cited by examiner

Primary Examiner—Patrick N. Edouard
(74) Attorney, Agent, or Firm—Fish & Richardson P.C.

(57) ABSTRACT

It provides the system which analyzes a language correctly. It divides a given sentence into the token and it fixes a part of speech. As for the token which can not be fixed as one part of speech, it decides by the part of speech of back and forth the token. As for the predicate, it analyzes an attribute using suffix and so on. Next, it corresponds in the role and the part of speech. Then, it does the analysis of the local structure and the decision of the role. After that, it analyzes the whole structure by the extraction of the subordinate sentence and the sentence pattern analysis and so on. By the analysis of the whole structure, it corrects if it is necessary to correct local structure.

20 Claims, 107 Drawing Sheets

The basic concept of the language analysis by this invention

The basic concept of the language analysis by this invention

FIG.2
A
$C_1C_2C_3C_4C_5C_6C_7$ ---------------- $C_n$
B
$C_1C_2C_3C_4$  $C_5C_6C_7$ ---------------- $C_n$
↓↓↓↓  ↓↓↓
$T_1$   $T_2$  ---------------- $T_n$
C
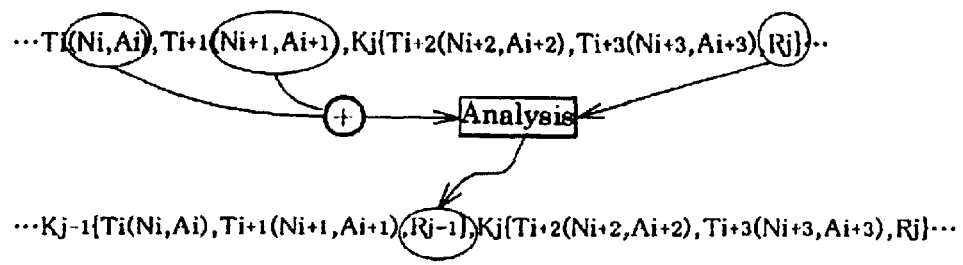
D
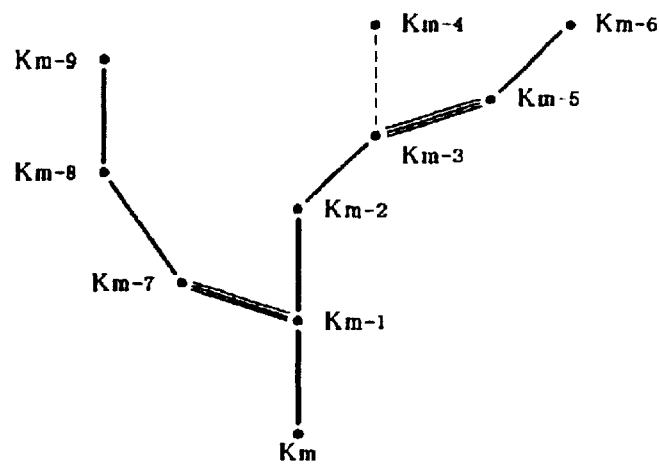

FIG.3
A
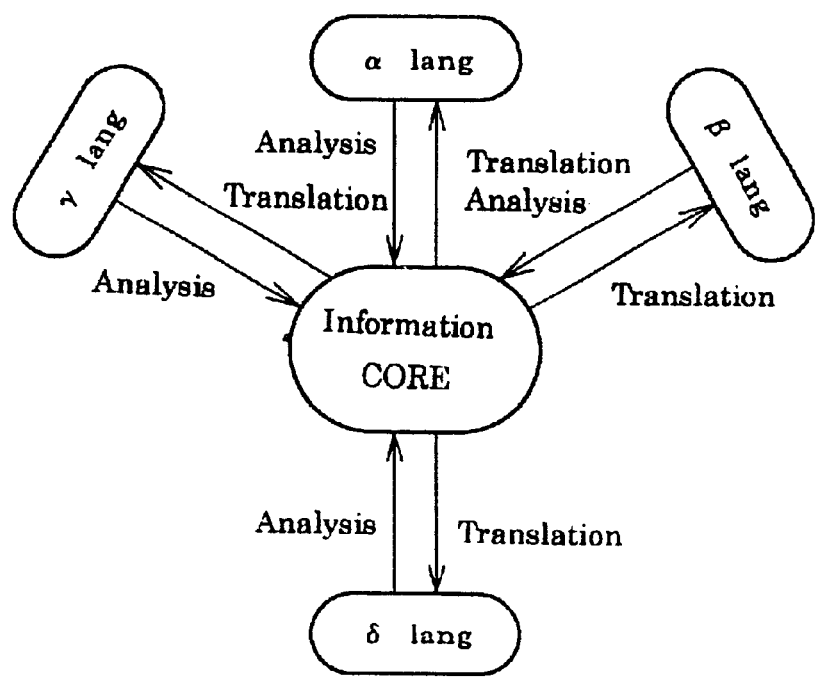
B
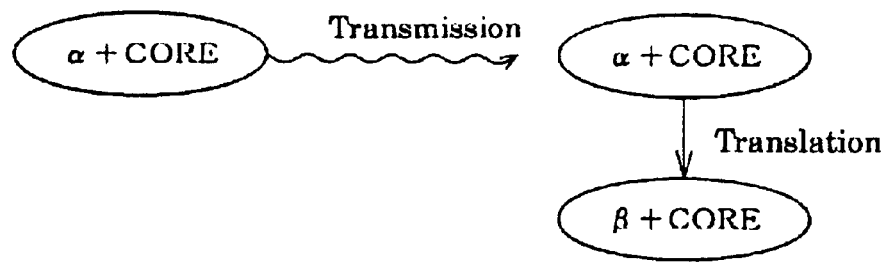

FIG. 4 The whole composition of the language analysis system by this invention

FIG.8

Part of speech dictionary

| token | part of speech | |
|---|---|---|
| ⋮ | | |
| boku | general noun | |
| bokutati | general noun | |
| ⋮ | | |
| wa | B(45) | |
| ni | B(43) | |
| ga | B(44) | |
| e | E-particle | |
| ⋮ | | |
| gakkou | general noun | |
| i | verb root | k |
| ⋮ | | |
| ko | verb root | C(1) C(2) C(6) S(V) |
| kuru | verb root | C(3) |
| koi | verb root | C(4) |
| koyo | verb root | C(5) |
| ⋮ | | |
| ｡ | period | |

FIG.9A

Contents of analysis file

| token | part of speech | weight |
|---|---|---|
| boku | general noun | |
| wa | B(45) | |
| gakkou | general noun | |
| e | E-particle | |
| i | verb root | |
| ki | verb suffix | |
| masu | verb suffix | |
| o | period | |

FIG.9B

| token | part of speech | weight |
|---|---|---|
| boku | general noun | |
| wa | WA-particle | 1 |
| gakkou | general noun | |
| e | E-particle | |
| i | verb root | |
| ki | verb suffix | |
| masu | verb suffix | |
| o | period | |

FIG.11

Table B(45)  "WA": 1) WA-PARTICLE; 2) UNDERLYING PARTICLE

| Rule Number | Terms | | Decision | Weight |
|---|---|---|---|---|
| | Left Context | Right Context | | |
| 1 | Case particle or postposition or adverb | | Underlying particle | 1 |
| 2 | Verb$_{n-accom}$ (KA-particle) | | WA-particle | 1 |
| 3 | Name | | WA-particle | 1 |

FIG.12A

| token | part of speech | weight |
|---|---|---|
| fumoto | general noun | |
| ni | B(43) | |
| chika | adjective predicative root | |
| i | adjective predicative suffix | |
| kono | non-adjective predicative | |
| mura | general noun | |
| wa | B(45) | |
| kesiki | general noun | |
| ga | B(44) | |
| utukusi | adjective predicative root | |
| kattuta | adjective predicative suffix | |
| o | period | |

FIG.12B

| token | part of speech | weight |
|---|---|---|
| fumoto | general noun | |
| ni | NI-particle | 2 |
| chika | adjective predicative root | |
| i | adjective predicative suffix | |
| kono | non-adjective predicative | |
| mura | general noun | |
| wa | WA-particle | 1 |
| kesiki | general noun | |
| ga | GA-particle | 1 |
| utukusi | adjective predicative root | |
| kattuta | adjective predicative suffix | |
| o | period | |

FIG.13

Table B(43)    "NI(WA)":   1) NI-PARTICLE & UNDERLYING PARTICLE WA;
                            2) SUBORDINATE CONJUNCTION

| Rule Number | Terms | | Decision | Weight |
|---|---|---|---|---|
| | Left Context | Right Context | | |
| 1 | Verb$_{n\text{-accom}}$ | | Subordinate conjunction | 1 |
| 2 | In other cases | | NI(WA)- particle | 2 |

FIG.14

Table B(44)     "GA": 1) GA-PARTICLE; 2)SUBORDINATE CONJUNCTION

| Rule Number | Terms | | Decision | Weight |
|---|---|---|---|---|
| | Left Context | Right Context | | |
| 1 | Verb$_{n-accom}$ or predicative adjective$_{n-accom}$ | | Subordinate conjunction | 1 |
| 2 | Name | | GA-particle | 1 |

FIG.15

Table B(1)    NOUN (KANGO) - VERB WITH SYNTHETIC ROOT

| Rule Number | Terms. | | Decision | Weight |
|---|---|---|---|---|
| | Left Context | Right Context | | |
| 1 | | Verb suffix | Verb | 1 |
| 2 | The verb's syntactic possibility has been realized. | Postposition or subordinate conjunction | Verb$_{accom}$ | 3 |
| 3 | The verb's syntactic possibility has been realized. | Comma (coordinate conjunction) or verb | Verb$_{accom}$ | 3 |
| 4 | | (MATAWA) verb | Verb$_{accom}$ | 3 |
| 5 | | Full-stop | Verb$_{n\text{-}accom}$ | 3 |
| 6 | Noun (particle) | | Noun | 2 |
| 7 | | Postposition or particle | Noun | 2 |
| 8 | | One or more kanjis | Noun | 2 |
| 9 | | Comma (coordinate conjunction) | Verb$_{accom}$ | 2 |

FIG.16

Table B(2) NOUN - VERB WITH THE MARKER "SAME TIME" (Vst)

| Rule Number | Terms | | Decision | Weight |
|---|---|---|---|---|
| | Left Context | Right Context | | |
| 1 | The verb's syntactic possibility has been realized | | Verb$_{st}$ | 2 |
| 2 | | Postposition or particle | Noun | 1 |
| 3 | | Copula | Noun | 1 |

FIG.17A

| token | part of speech | weight |
|---|---|---|
| kuruma | general noun | |
| wa | B(45) | |
| tuneni | adverb | |
| jinsoku | B(6) | |
| . | middle point | |
| kakujitu | B(6) | |
| katu | conjunction | |
| anzenni | adverb | |
| unten siyo | verb root | |
| u | verb suffix | |
| o | period | |

FIG.17B

| token | part of speech | weight |
|---|---|---|
| kuruma | general noun | |
| wa | WA-particle | 1 |
| tuneni | adverb | |
| jinsoku | adverb | 2 |
| . | middle point | |
| kakujitu | adverb | 2 |
| katu | conjunction | |
| anzenni | adverb | |
| unten siyo | verb root | |
| u | verb suffix | |
| o | T-interval | |

FIG. 20

TABLE D

TYPES OF VERB ROOTS

| r | t | m | b | n | k | k' | g | s | w | Grammatical peculiarities | Next address | Finitness-non-finitnes |
|---|---|---|---|---|---|---|---|---|---|---|---|---|
| ra | ta | ma | ba | na | ka | ka | ga | sa | wa | | C(1) | NF |
| ri | chi | mi | bi | ni | ki | ki | gi | shi | i | st | S(V) C(2) | |
| ru | tsu | mu | bu | nu | ku | ku | gu | su | u | def n-proc | C(3) | |
| re | te | me | be | ne | ke | ke | ge | se | e | def order | C(4) C(1) C(3) | |
| ro | to | mo | bo | no | ko | ko | go | so | o | | C(5) | NF |
| tsu | tsu | n | n | n | tsu | i | i | shi | tsu | | C(6) | NF |

FIG.21

Table C (2)     VERB SUFFIXES AND GRAMMATICAL MARKERS

| Suffix I.D. | Suffix Lexeme(s) | Table Address | Independent Suffix Segment? | Finite/ Non-Finite Suffix | Modality | Accompaniment | Other G. Markers |
|---|---|---|---|---|---|---|---|
| 1 | 2 | 3 | 4 | 5 | 6 | 7 | 8 |
| 15 | takuna | Gr | Yes | NF | T-NARU | | |
| 16 | takuna | C | | NF | | | neg |
| 17 | taku(sa,se) | C | Yes | NF | T-SURU | | |
| 18 | kakusi | C | Yes | | T-SURU | | |
| 19 | takusu*(ru) | C | Yes | | T-SURU | st | n-proc |
| 20 | i | A, C | Yes | NF | good | | |
| 21 | saesinakereba | | | F | | if th | neg |
| 22 | masu | C | | | | def | n-proc pol |
| 23 | masita | C | | | | def | proc pol |
| 24 | masen | | | | | def | n-proc neg pol |
| 25 | masendesita | C | | | | def | neg proc pol |
| 26 | masendesyou | | | | | mdef | neg n-proc pol |

FIG.22

Table C (3)

VERB SUFFIXES AND GRAMMATICAL MARKERS

| Suffix I.D. | Suffix Lexeme(s) | Table Address | Independent Suffix Segment? | Finite/Non-Finite Suffix | Modality | Accompaniment | Other G. Markers |
|---|---|---|---|---|---|---|---|
| 1 | 2 | 3 | 4 | 5 | 6 | 7 | 8 |
| 29 | *(toiukotomo)deki | C | Yes |  | also possib | st |  |
| 30 | *(toiukoto)(wa,ga)fukanoude |  |  | F | n-possib | st |  |
| 31 | *(toiukotomo)fukanoude |  |  | F | also n-possib | st |  |
| 32 | nara*(ba) |  |  | F | dif | if |  |
| 33 | *(toiukotomo)(wa,ga)konnandea | Gr | Yes | NF | dif |  |  |
| 34 | *(toiukotomo) konnandea | Gr | Yes | NF | also dif |  |  |
| 35 | *(toiukotomo)muzukasi | C, A | Yes | NF | also dif |  |  |
| 36 | *(toiukoto) (wa,ga) muzukasi | C, A | Yes | NF | dif |  |  |

FIG.23

Table S(V)  COMPOUND VERB

| Suffix I.D. | Suffix Lexeme(s) | Table Address | Independent Suffix Segment? | Finite/Non-Finite Suffix | Modality | Accompaniment | Other G. Markers |
|---|---|---|---|---|---|---|---|
| 1 | 2 | 3 | 4 | 5 | 6 | 7 | 8 |
| 1 | hajime, some, kake | C | Yes | | | st | |
| 2 | hajima, kaka | Dr | Yes | NF | | | |
| 3 | da | Ds | Yes | NF | | | |
| 4 | oko | Ds | Yes | NF | | | |
| 5 | oe | C | Yes | | | st | |

FIG.24

Table F      PREDICTIVE ADJECTIVE SUFFIXES AND GRAMMATICAL ATTRIBUTES

| Suffix I.D. | Suffix Lexeme(s) | Table Address | Independent Suffix Segment? | Finite/ Non-Finite Suffix | Modality | Accompaniment | Other G. Markers |
|---|---|---|---|---|---|---|---|
| 1 | 2 | 3 | 4 | 5 | 6 | 7 | 8 |
| 1 | kattuta | C | | | | def | proc |
| 2 | i | C | | | | def | n-proc |
| 3 | ki | | | | | def | n-proc |
| 4 | ku | F, C | | | | st | |
| 5 | kute*( wa ) | | | F | | proc | |
| 6 | inagara* (mo), ku(tomo,nattute, temo) | | | F | | th | |
| 7 | kusaeareba | | | F | | ei | |
| 8 | kusaenakereba | | | F | | ci | neg |
| 9 | (kere,nara)ba, kattutara | | | F | | if | |
| 10 | kumona | F | Yes | NF | | | neg |
| 10a | kunakattuta | C | | | | def | proc |
| 11 | kuna | Dr | Yes | | NARU | | |
| 12 | kukarazaru | | | | | def | n-proc |
| 13 | kukarazu | | | | | def | n-proc |

FIG.25

Table B(6)

NOUN - ADVERB

| Rule Number | Terms | | Decision | Weight |
|---|---|---|---|---|
| | Left Context | Right Context | | |
| 1 | | Copula | Noun | 1 |
| 2 | | Case particle or MO-particle | Noun | 2 |
| 3 | In other cases | | Adverb | 0 |
| 4 | | Coordinate conjunction or adverb | Adverb | 2 |

FIG.27A

Attribute buffer

| CAUS | |
| --- | --- |
| PAS | |
| PROC | − |
| RES | |
| DIR | |
| INT | |
| CON | |
| PER | |
| NEG | |
| ACCOM | − |
| ADDM | |
| MOD | |
| POL | + |
| definite | |
| | |
| | |

FIG.27B

Attribute of " masu "

| CAUS | − |
| --- | --- |
| PAS | − |
| PROC | − |
| RES | − |
| DIR | − |
| INT | − |
| CON | − |
| PER | − |
| NEG | − |
| ACCOM | − |
| ADDM | − |
| MOD | − |
| POL | + |
| definite | |
| | |
| | |

FIG.28A

Attribute of " i "

| PROC | − |
|---|---|
| ACCOM | − |
| VERB | − |
| NEG | − |
| POL | − |
| definite | |
| | |
| | |

FIG.28B

Attribute of " katta "

| PROC | + |
|---|---|
| ACCOM | − |
| VERB | − |
| NEG | − |
| POL | − |
| definite | |
| | |
| | |

FIG.29A

Attribute of "kuna"

| PROC | − |
|---|---|
| ACCOM | + |
| VERB | − |
| NEG | − |
| POL | − |
| NARU | |
| | |
| | |

FIG.29B

Attribute of "masu"

| CAUS | − |
|---|---|
| PAS | − |
| PROC | − |
| RES | − |
| DIR | − |
| INT | − |
| CON | − |
| PER | − |
| NEG | − |
| ACCOM | − |
| ADDM | − |
| MOD | − |
| POL | + |
| definite | |
| | |
| | |

FIG.30A  SGA ... DP

SGA(WA) means syukakuga(wa).

DP means definite predicate.

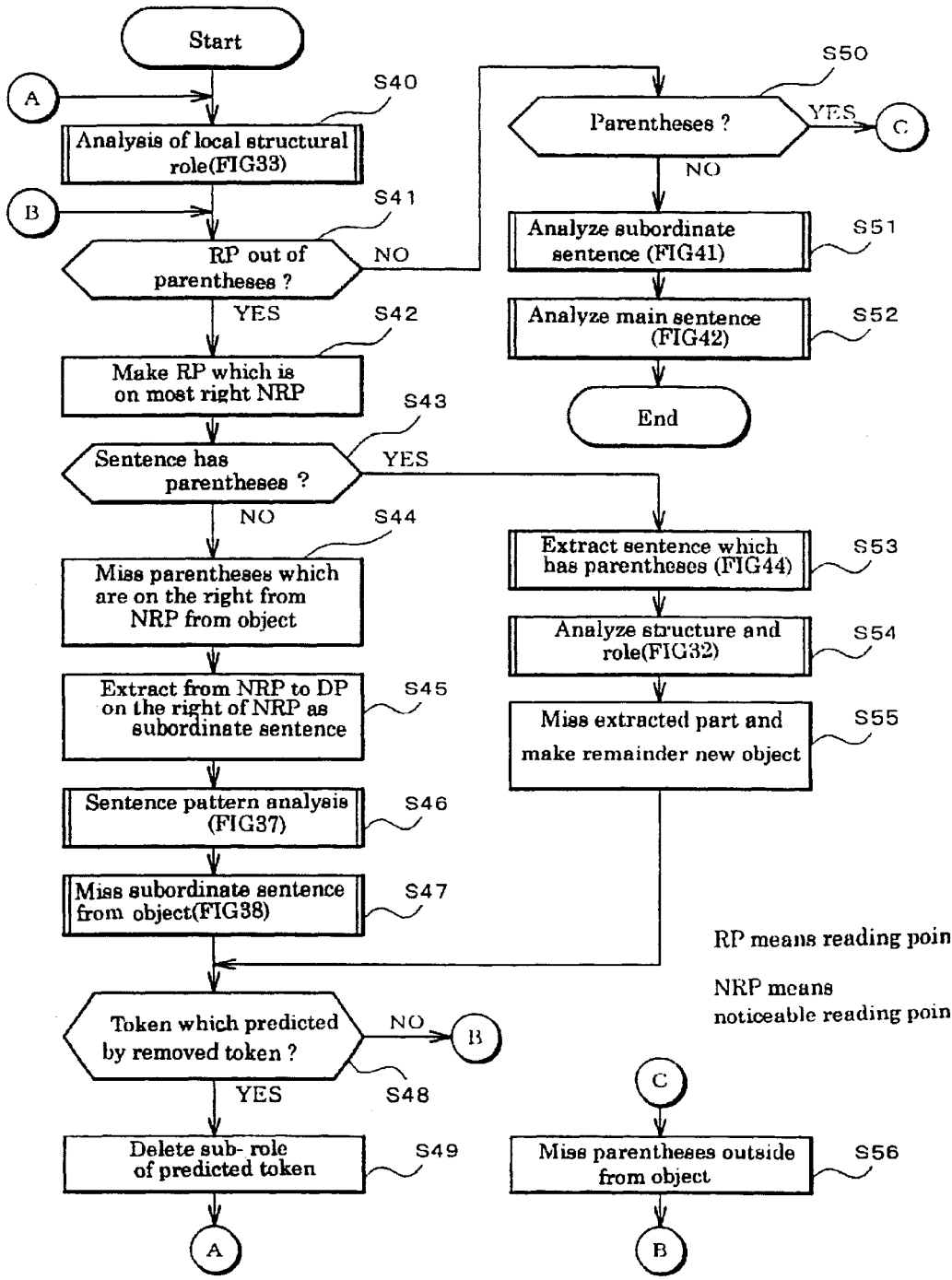
FIG.32 Analysis of structure and role

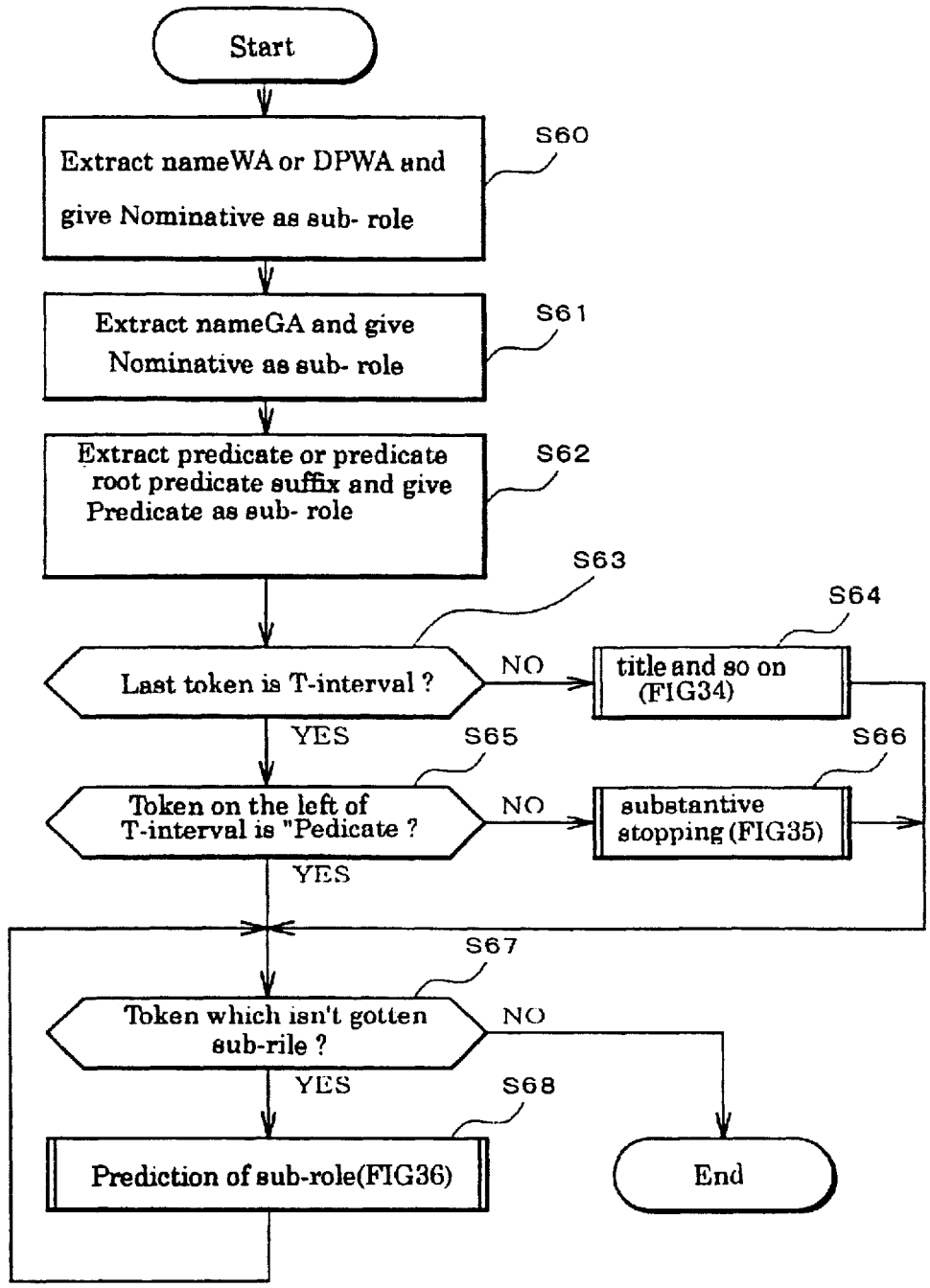
FIG.33  Analysis of local structural role

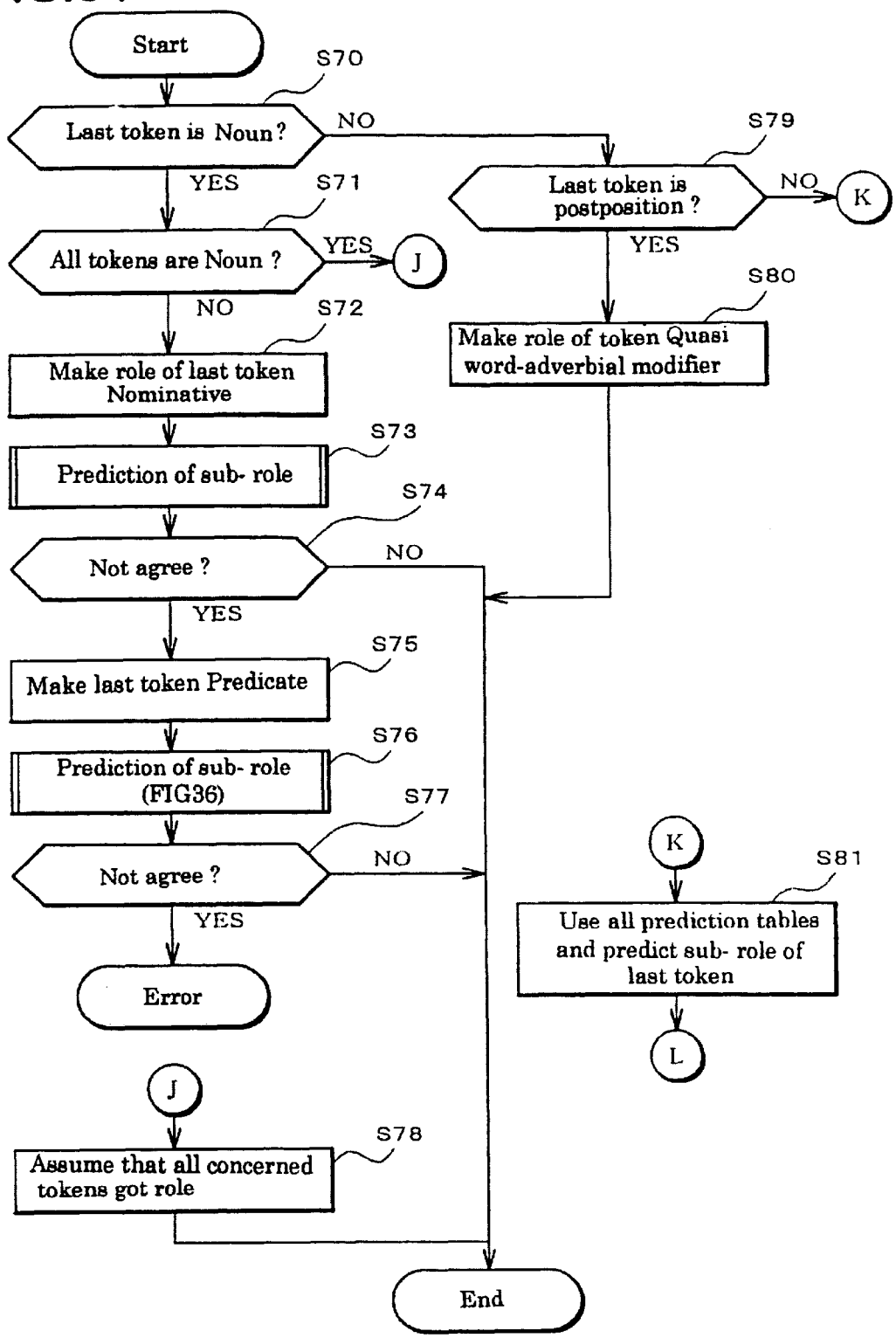

Special processing of substantive stopping

Prediction of sub-role

Sentence pattern analysis

FIG.39 Processing to make object outside when there are equal to or more than two reading points LRP means RP which is on the left of NRP.
NDP means noticeable definite predicate.
RDP means right definite predicate.

FIG.40 Processing to make the object outside when there is one reading point

RDP means right definite predicate.

Processing of subordinate sentence

Pre-processing of sentence pattern analysis such as title

Processing to extract parentheses

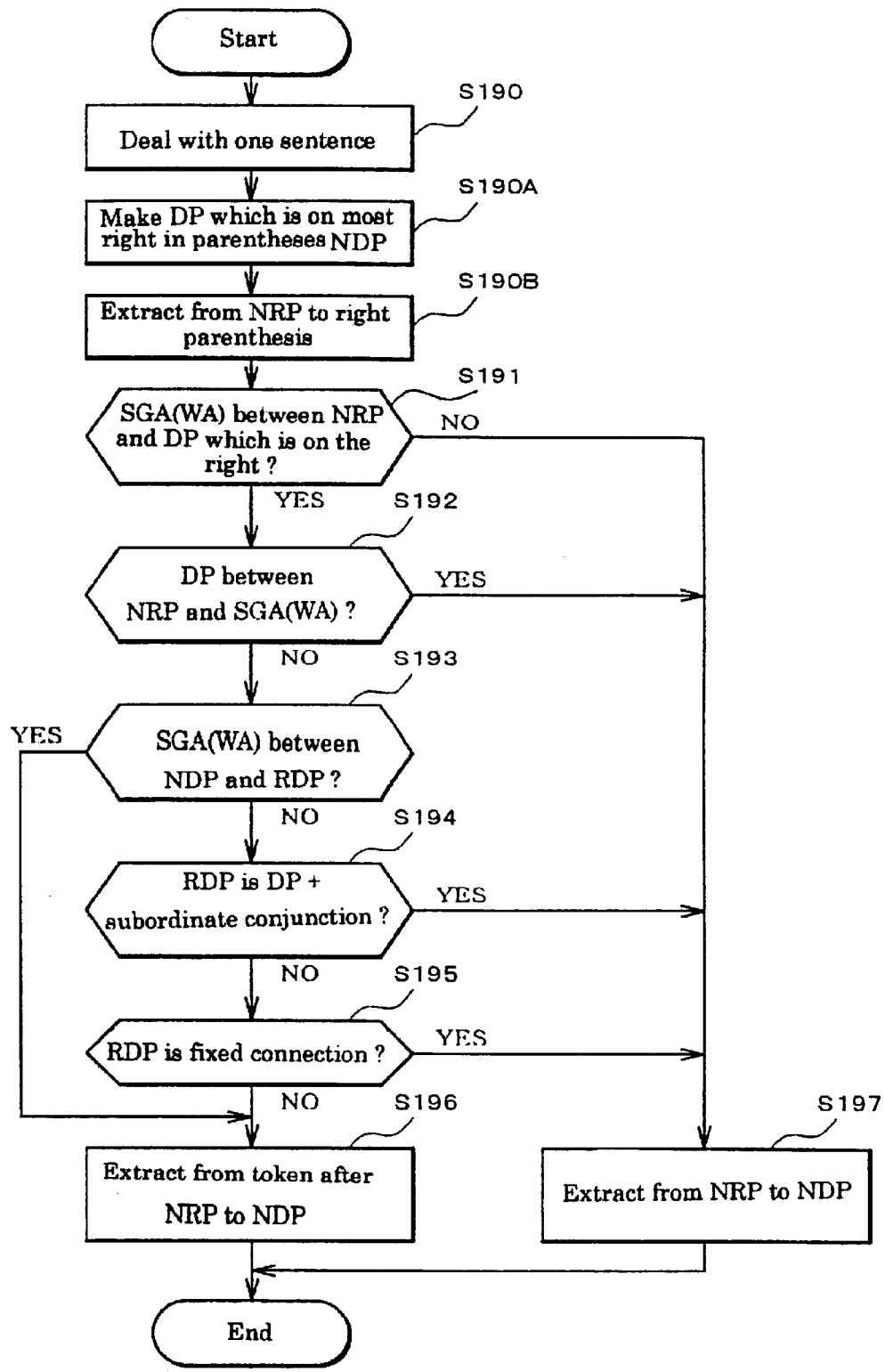
FIG.45 Extraction processing of case which has equal to or more than two reading points

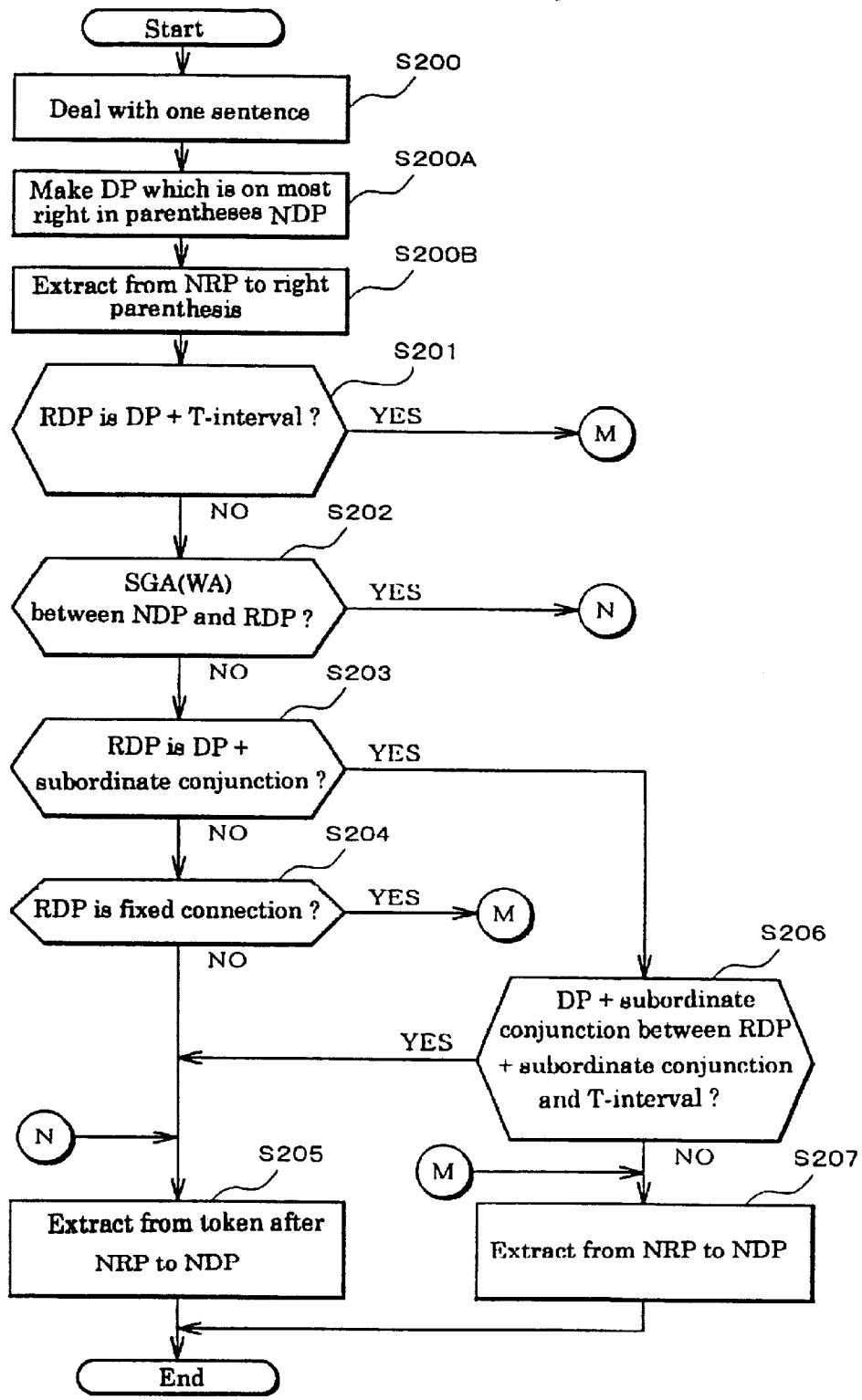
FIG.46 Extraction processing of case which has one reading point

FIG.49

TABLE I(0)
SUBTABLE ADDRESS: PRED T-INT
TABLE DESCRIPTION: PREDICTIONS OF T-INTERVAL

| NO. | PREDICTED SYNTACTIC ROLE | MORPHOLOGICAL FEATURE SEQUENCE | INTERVAL | NEXT TABLE ADDRESS |
|---|---|---|---|---|
| 1 | Top Predicate – Type I<br>a) Type I – 1<br>b) Type I – 2 | Copula$_{n-accom}$ (KA-PART)<br>VAUX$_{n-accom}$ (KA-PART) | 0 | I(1)<br>I(3) |
| 2 | Top Predicate – Type II | VG$_{n-accom}$ (KA-PART) | 0 | I(3) |
| 3 | Top Predicate – Type III | PA$_{n-accom}$ (KA-PART) | 0 | I(3)<br>I(10) |

FIG.50

TABLE I(2)
SUBTABLE ADDRESS: PRED NOM
TABLE DESCRIPTION: PREDICTIONS OF SUBJECT, TOPIC, OBJECT AND PRE-COPULA

| NO. | PREDICTED SYNTACTIC ROLE | MORPHOLOGICAL FEATURE SEQUENCE | INTERVAL | NEXT TABLE ADDRESS |
|---|---|---|---|---|
| 1 | Attribute 1 | $PA_{n-accom}$ | 0 | I (9)<br>I (10) |
| 2 | Attribute 2 | NON-PRED ADJ | 0 | I (9)<br>I (10) |
| 3 | Attribute 4 | NOUN-NUM (NO-PART)<br>NOUN-NUM & COUN (NO-PART)<br>NOUN-FIG & COUN (NO-PART)<br>Preforum & NOUN-NUM + NO-PART<br>Preforum & NOUN FIG + NO-PART<br>NOUN-NUM & sufnum & NO-PART<br>noun-q sufnum & NO-PART | 0 | I (2) |
| 4 | Attribute 5 | ADVC | 0 | I (2) |
| 5 | Kwasi-attribute 1 | CONS & NO-PART | >= 0 | I (0) |
| 6 | Kwasi-attribute 2 | POSTV | >= 0 | I (11) |
| 7 | Kwasi-attribute 3 | Def | >= 0 | I (11) |

FIG.51

TABLE I(2)
SUBTABLE ADDRESS: PRED NOM
TABLE DESCRIPTION: PREDICTIONS OF SUBJECT, TOPIC, OBJECT AND PRE-COPULA (CONT'D)

| NO. | PREDICTED SYNTACTIC ROLE | MORPHOLOGICAL FEATURE SEQUENCE | INTERVAL | NEXT TABLE ADDRESS |
|---|---|---|---|---|
| 8 | General indirect object | NAMEA & NO-PART | $> = 0$ | I(2) |
| 9 | Prosubstantive indirect object | SUB & NO-PART | $> = 0$ | I(2) |
| 10 | Complex indirect object | NOUN-NUM & COUN (NO-PART) NOUN-FIG (NO-PART) | 0, 72 | I(2) |
| 11 | Complicated indirect object | NOUN & NOUN-NTS (NO-PART) | $> = 0$ | I(2) |
| 12 | Complex-complicated indirect object | NOUN & NOUN-NUM (NO -PART) NAMEA & NOUN-Q NOUN & NOUN-NTS (NO-PART) | $> = 0$ | I(2) |
| 13 | Top predicate of subordinate attribute clause | Copula$_{n-accom}$ VAUX$_{n-accom}$ | 0 | I(1) I(3) |
| 14 | Top predicate II type subordinate attribute clause | VG n-accom (KA-PART) | 0 | I(3) |
| 15 | Top predicate III type | PA n-accom | 0 | I(3) I(10) |
| 16 | Homogeneous (syntactic role will be specified in the process of the analysis) | NAMEA (PARTCASE) (Comma) CONAP NAMEB (PARTCASE) (Comma) CONAP | $> = 0$ | I(2) |

FIG.52

TABLE I(13)
SUBTABLE ADDRESS: PRED KADUM
TABLE DESCRIPTION: PREDICTIONS OF KWASI-ADVERBIAL MODIFIER

| NO. | PREDICTED SYNTACTIC ROLE | MORPHOLOGICAL FEATURE SEQUENCE | INTERVAL | NEXT TABLE ADDRESS |
|---|---|---|---|---|
| 1 | General indirect object | NAMEA | 0 | I(2) |
| 2 | Prosubstantive indirect object | SUB | 0 | I(2) |
| 3 | Complex indirect object | NOUN & NOUNS-NTS | 0 | I(2) |
| 4 | Complicated indirect object | NOUN-NUM & COUN<br>NOUN-FIG & COUN | 0 | I(2) |
| 5 | Complex-complicated indirect object | NOUN & NOUN-NUM & COUN<br>NOUN & NOUN-NTS & COUN<br>NAMEA & NOUN-Q | 0 | I(2) |

FIG.53

TABLE I(3)
SUBTABLE ADDRESS: PRED PR
TABLE DESCRIPTION: PREDICTIONS OF PREDICATE

| NO. | PREDICTED SYNTACTIC ROLE | MORPHOLOGICAL FEATURE SEQUENCE | INTERVAL | NEXT TABLE ADDRESS |
|---|---|---|---|---|
| 1 | Middle Predicate I type | Copula$_{accom}$ (CONC) (Comma)<br>VAUX$_{accom}$ (CONC) (Comma)<br>Copula$_{n-accom}$ & Comma<br>VALEX$_{n-accom}$ & Comma<br>Copula$_{n-accom}$ (KA-PART) & CONC<br>VAUX$_{n-accom}$ (KA-PART) & CONC | $>=0$ | I(1)<br>I(3) |
| 2 | Middle Predicate II type | VG$_{accom}$ (CONC) (Comma)<br>VG$_{n-accom}$ & KA-PART + Comma (CONC)<br>VG$_{n-accom}$ & CONC | $>=0$ | I(3) |
| 3 | Middle Predicate III type | PA$_{accom}$ (Comma) | $>=0$ | I(10) |
| 4 | General direct object | NAMEA & O-PART | $>=0$ | I(2) |
| 5 | Prosubstantive direct object | SUB & O-PART | $>=0$ | I(2) |
| 6 | Complicated direct object | NOUN FIG & COUN & O-PART<br>NOUN-NUM & COUN & O-PART | $>=0$ | I(2) |
| 7 | Complex direct object | NOUN & FORM + O-PART | $>=0$ | I(2) |
| 8 | Complex-complicated direct object | NAMEA & NOUN-NUM & COUN & O-PART<br>NAMEA & NOUN-NTS & COUN & O-PART<br>NAMEA & NOUN-Q & O-PART | $>=0$ | I(2) |
| 9 | General direct object | NAMEA & TO-PART & O-PART | $>=0$ | I(2) |
| 10 | Prosubstantive direct object I | SUB & TO-PART & O-PART | $>=0$ | I(2) |

FIG.54

Sentence pattern table

No. 1 (a) NOMWA → Pr
         Subject  Predicate (b) NOMWA → Pr
          Topic    Predicate No. 2 (a) NOMGA → Pr
         Subject  Predicate (b) NOMGA → Pr
          Topic    Predicate No. 3 (a) NOMWA → NOMWA → Pr
         Topic    Subject  Predicate (b) NOMWA → NOMWA → Pr
          Subject 1  Subject 2  Predicate (c) NOMWA → NOMWA → Pr
          Topic 1  Topic 2  Predicate (d) NOMWA → NOMWA → Pr
          Subject  Topic    Predicate

(a) NOMWA → NOMGA — Pr
    Topic    Subject   Predicate (b) NOMWA → NOMGA — Pr
    Subject   Topic   Predicate

No. 5

(a) NOMGA → NOMWA — Pr
    Topic    Subject   Predicate (b) NOMGA → NOMWA — Pr
    Subject   Topic   Predicate

No. 6

(a) NOMGA → NOMGA — Pr
    Topic    Subject   Predicate (b) NOMGA → NOMGA — Pr
    Subject 1  Subject 2  Predicate (c) NOMGA → NOMGA — Pr
    Topic 1  Topic 2  Predicate

* Top predicate of subordinate attribute clause

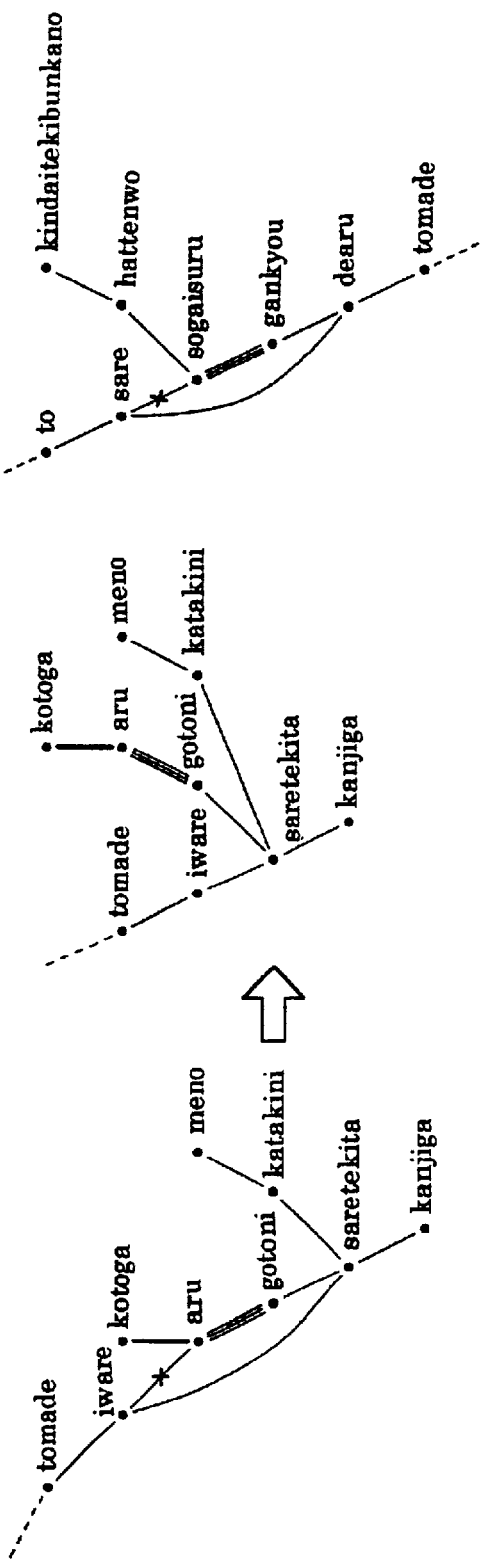

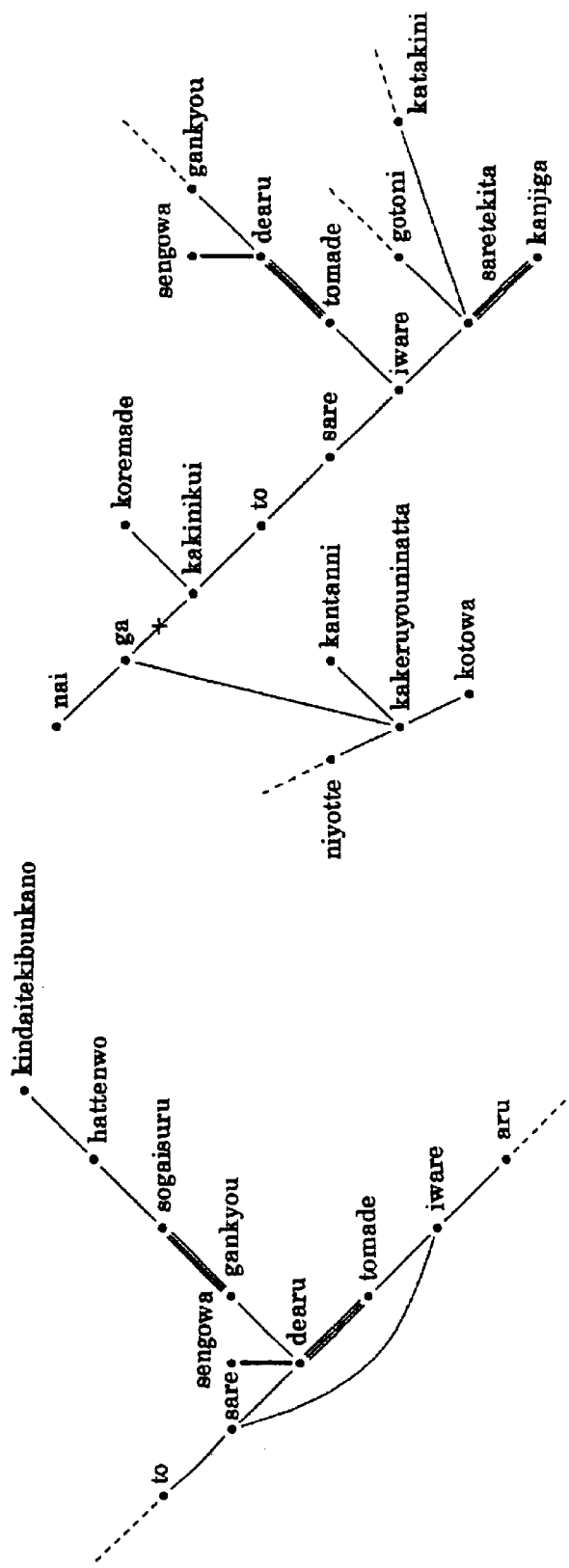

FIG.65

| Token | Part of speech | Role |
|---|---|---|
| Wa-puro | Noun | Indirect object |
| no | Particle-NO | |
| kouzai | Noun | Direct object |
| wo | Particle-O | |
| ronjiru | Verb n-a | Top predicate of SAC |
| tumori | Noun | Nominative |
| wa | Particle-WA | |
| nai | Verb n-a | Top predicate of SAC |
| ga | Subordinate conjunction | Modifier of the right end |
| 、 | Reading point | Reading point |
| kore | Noun | Indirect object |
| made | Particle-MADE | |
| kakinikui | Verb n-a | Top predicate of SAC |
| to | Subordinate conjunction | Modifier of the right end |
| sare | Verb accom | Middle predicate |
| 、 | Reading point | Reading point |
| sengo | Noun | Nominative |
| wa | Particle-WA | |
| 、 | Reading point | Reading point |
| kindaiteki | Noun | Indirect object |
| bunka | Noun | |
| no | Particle-NO | |
| hatten | Noun | Direct object |
| wo | Particle-O | |
| sogaisuru | Verb n-a | Top predicate of SAC |

SAC means Subordinate attribute clause

FIG.66

| | | |
|---|---|---|
| gankyou | Noun | Pre-copula |
| dearu | Copula n-a | Top predicate of SAC |
| to | Subordinate conjunction | Modifier of the right end |
| made | Particle-MADE | |
| iware | Verb accom | Middle predicate |
| 、 | Reading point | Reading point |
| koto | Noun | Nominative |
| ga | Particle-GA | |
| aru | Verb n-a | Top predicate of SAC |
| goto | Noun | Indirect object |
| ni | Particle-NI | |
| me | Noun | Indirect object |
| no | Particle-NO | |
| kataki | Noun | Indirect object |
| ni | Particle-NI | |
| saretekita | Verb n-a | Top predicate of SAC |
| kanji | Noun | Nominative |
| ga | Particle-GA | |
| kono | Non-Predicative adjective | Attribute |
| kikai | Noun | Indirect object |
| no | Particle-NO | |
| hatumei | Noun | Indirect object |
| niyotte | Postposition | Quasi-advervial modifier |
| kantanni | Adverb | Advervial modifier |
| kakeruyouninatta | Verb n-a | Top predicate of SAC |
| koto | Noun | Nominative |
| wa | Particle-WA | |
| hiteidekinai | Verb n-a | Top predicate |
| 。 | Period | T-interval |

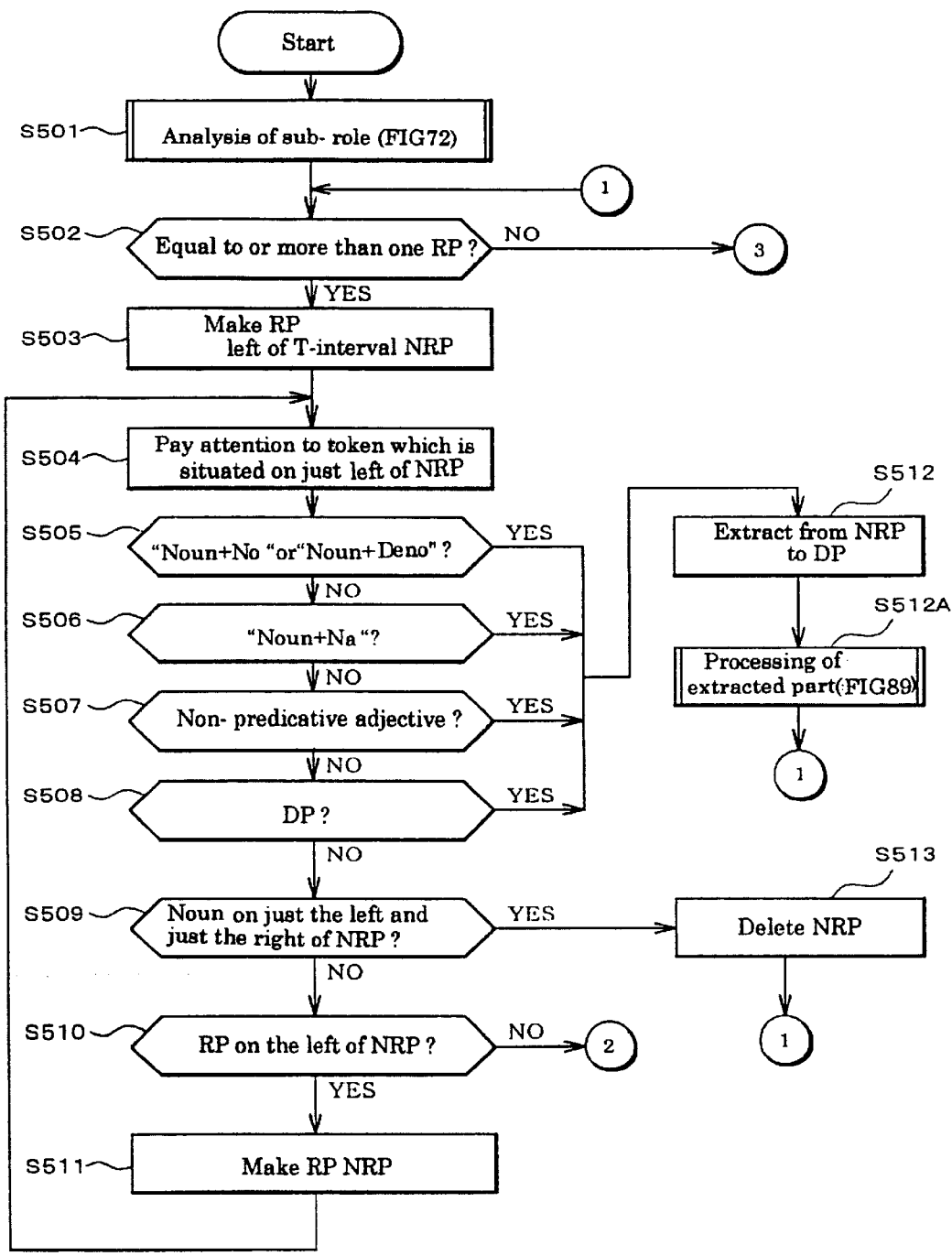
FIG.67  Analysis of structure and role(1)

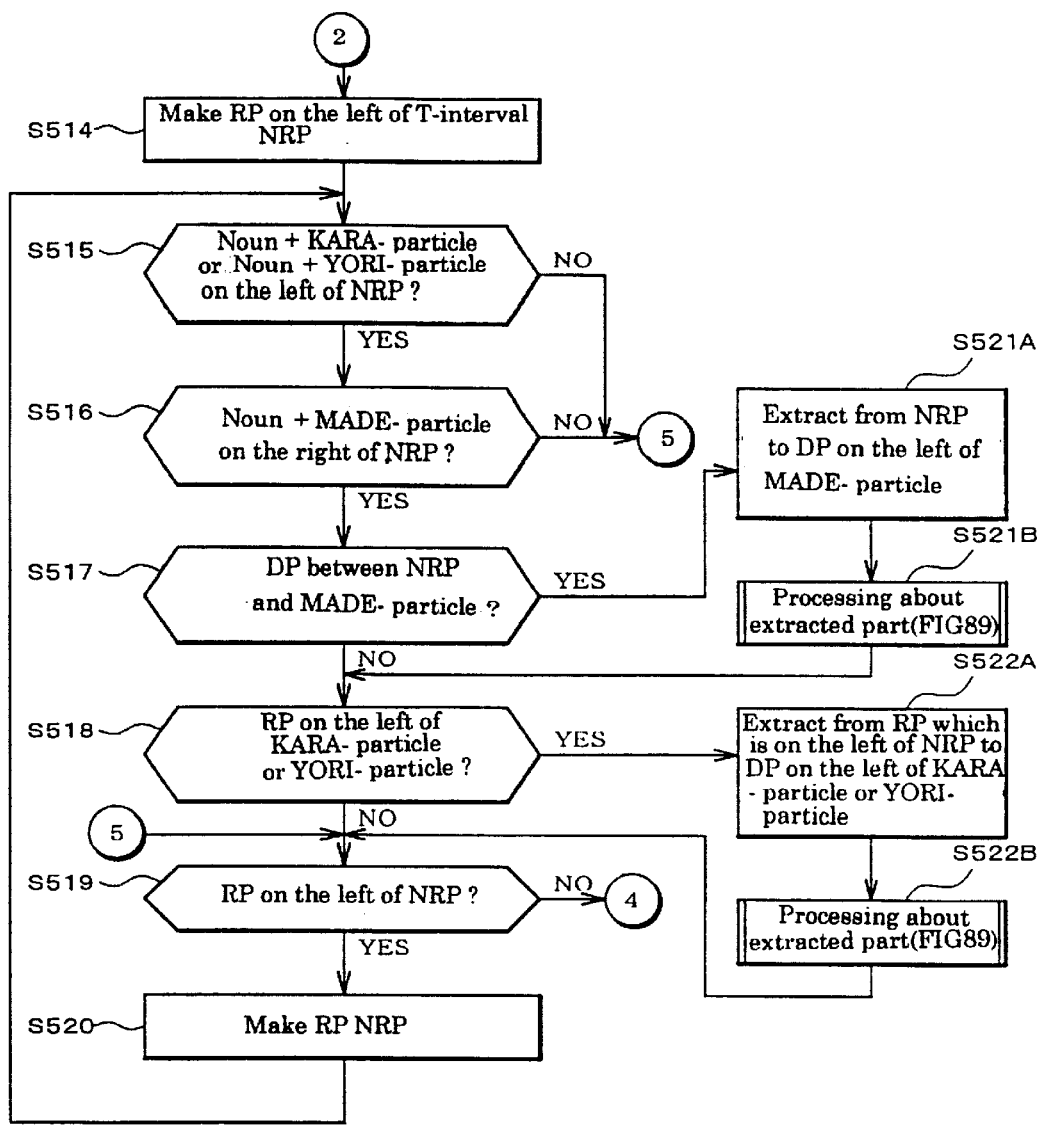
FIG.68  Analysis of structure and role(2)

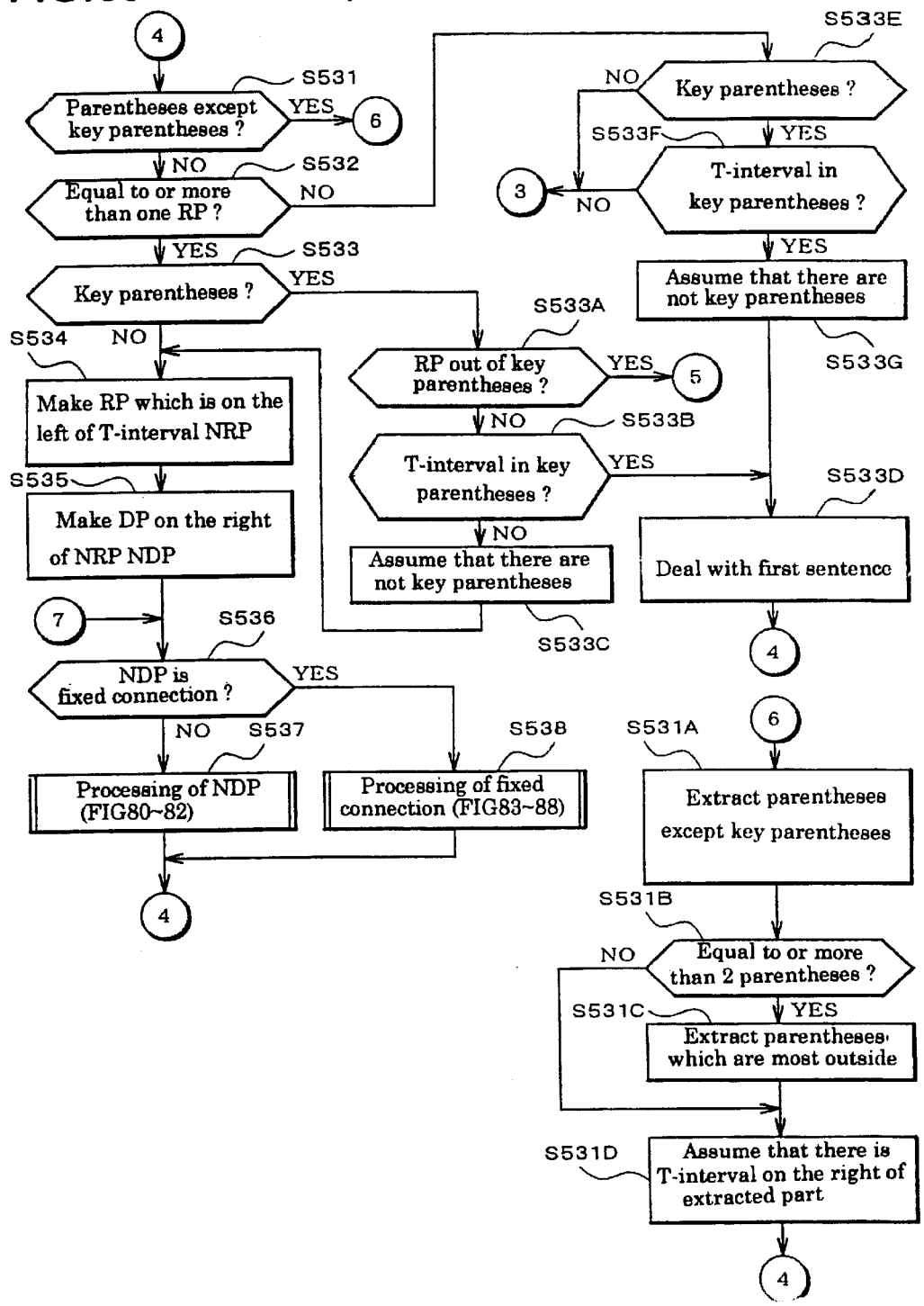
FIG.69  Analysis of sstructure and role(3)

Analysis of structure and role(4)

FIG. 72  Analysis of local sturactural role

FIG.73 Special processing of title and so on

Special processing of a substantive stopping

FIG.75  Prediction of sub-role

Pre-processing of sentence pattern analysis such as title

FIG.80 Processing of noticeable definite predicate(1)

FIG.81 Processing of noticeable definite predicate(2)

FIG.83 Processing of fixed connection(1)

FIG. 90

| Token | Part of speech | Role |
|---|---|---|
| obuza-ba-si | Noun | Indirect object |
| ni | Particle-NI | |
| yoru | Verb n-a | Top predicate of SAC |
| to | Subordinate conjunction | Modifier of the right end |
| supein | Noun | Indirect object |
| no | Particle-NO | |
| kyoudo | Noun | Nominative |
| sika | Noun | |
| ga | Particle-GA | |
| kiroku | Noun | Direct object |
| wo | Particle-O | |
| sirabe | Verb accom | Middle predicate |
| ` | Reading point | Reading point |
| sensisita | Verb n-a | Top predicate of SAC |
| heisi | Noun | Indirect object |
| no | Particle-NO | |
| sinzoku | Noun | Indirect object |
| ni | Particle-NI | |
| mo | Particle-MO | |
| syasin | Noun | Direct object |
| wo | Particle-O | |
| misete | Verb accom | Middle predicate |
| kakuninsita | Verb n-a | Top predicate |
| to | Subordinate conjunction | |
| iu | Verb n-a | |
| 。 | Period | T-interval |

SAC means Subordinate attribute clause

FIG.96
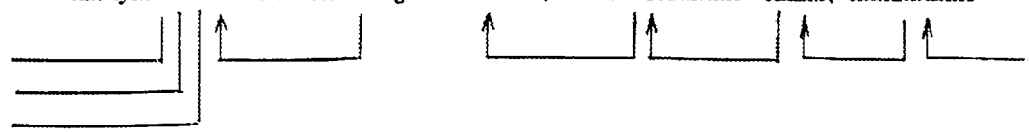
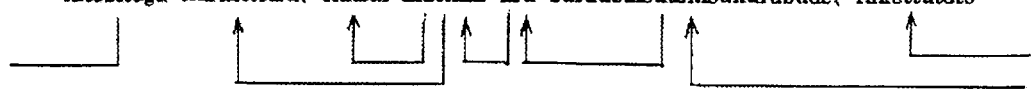
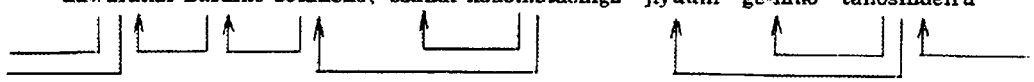
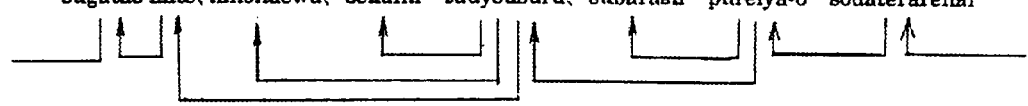
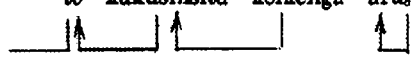

Flow chart of case which does LSA after sentence structure analysis(1)

Flow chart of case which does LSA after sentence structure analysis(2)

FIG.106

Sentence pattern table

| No. 1. | << NOMWA       PR >> |
|---|---|
| (a) | NOMWA     PR<br>Subject       Predicate |
| (b) | NOMWA     PR<br>Topic         Predicate |
| No. 2. | << NOMGA       PR >> |
| (a) | NOMGA     PR<br>Subject       Predicate |
| (b) | NOMGA     PR<br>Topic         Predicate |
| No. 3. | << NOMWA     NOMWA     PR >> |
| (a) | NOMWA     NOMWA     PR<br>Topic1       Topic2       Predicate |
| (b) | NOMWA     NOMWA     PR<br>Topic        Subject      Predicate |
| (c) | NOMWA     NOMWA     PR<br>Subject1     Subject2     Predicate |
| No. 4. | << NOMWA     NOMGA     PR >><br>Topic        Subject      Predicate |
| No. 5. | << NOMGA     NOMWA     PR >> |
| (a) | NOMGA     NOMWA     PR<br>Topic        Subject      Predicate |
| (b) | NOMGA     NOMWA     PR<br>Subject      Topic        Predicate |

FIG.107

| No. 6. | << NOMWA　　　PRNOMGA　　　PR >><br>NOMWA　　　PRNOMGA　　　PR<br>Topic　　　　Pr$_{subd}$ Subject　Predicate |
|---|---|
| No. 7. | << NOMGA　　　PRNOMGA　　　PR >><br>Sub$_{subd}$　　　Pr$_{subd}$ Subject　Predicate |
| No. 8. (a) | << NOMGA　　　PRNOMWA　　　PR >><br>NOMGA　　　PRNOMWA　　　PR<br>Sub$_{subd}$　　　Pr$_{subd}$ Subject　Predicate |
| (b) | NOMGA　　　PRNOMWA　　　PR<br>Sub$_{subd}$　　　Pr$_{subd}$ Subject　Predicate |
| No. 9. | << NOMGA　　　PRNOMWA　　　NOMGA　　　PR >><br>NOMGA　　　PRNOMWA　　　NOMGA　　　PR<br>Sub$_{subd}$　　Pr$_{subd}$ Topic　　Subject　　Predicate |
| No. 10. | << NOMWA　　　( NOMGA )$^n$　　　PR　　　(n ≥ 2)<br>NOMWA　　　NOMGA　　　NOMGA　　　PR<br>Topic1　　　Topic2　　　Subject　　Predicate |
| No. 11. (a) | << NOMWA　　　PRNOMWA　　　PR >><br>NOMWA　　　　　　PRNOMWA　　　PR<br>Topic　　　　　　Subject　　　Predicate |
| (b) | NOMWA　　　　　　PRNOMWA　　　PR<br>Topic1　　　　　　Topic2　　　Predicate |

LANGUAGE ANALYSIS USING A READING POINT

BACKGROUND

This invention is related to a language analysis system and a method of machine assisted language.

The machine translation that computer translates a natural language from the past is studied. Then, a part is made practical use. In the machine translation, it earlier analyzes the original language to translate. After that, it translates an original language into the other language. Therefore, the language analysis is the important step of the machine translation. The correctness of this language analysis fixes the correctness of the translation. Also, it doesn't use a language analysis only for the machine translation. It is widely used for other language processing in general.

In the conventional language analysis, when one word has equal to or more than 2 parts of speech, it is difficult to specify this correctly. For example, it is the way of the Japanese patent TOKU KAI HEI 4-305769 number bulletin. At this case, the work person chooses a part of speech. Of course, it is necessary that the person operates a judgement. Computer can not specify a part of speech. Also, it is the way of the Japanese patent TOKU KAI HEI 5-290081 number bulletin. It is the way of memorizing the use frequency of the part of speech beforehand every object field of the document and improving the specific correct degree of the part of speech. Correctness's improvement of some degree is realized when using this way. However, the management of the dictionary is difficult. The problem to be difficult occurs. Moreover, there is a limit in correctness's improvement, too.

The big problem of machine translation is in the others, too. Because if the word of the original language and the equivalent do not correspond one-to-one, the correct translation becomes difficult. Therefore, the way of mentioning the combination of the word to the equivalent dictionary is adopted. However, too, many examples about the natural language occur. As the fact, it wasn't possible to make a dictionary. Also, even if such a dictionary is supposed to have been able to be realized, the dictionary capacity is too big and the reference processing becomes too late. As the result, the practical use can not be secured.

By the way, in case of language analysis, it doesn't only analyze the part of speech and the attribute that each token has peculiarly. To analyze the structure and the role of the sentences is important. In the past, the system that analyzes relation between the token and the other token is proposed. However, there was not a system that analyzes the role of the token in the relation of sentence structure.

As for the analysis of sentence structure, there is a way of the Japanese patent TOKU KAI SHOU 62-262177 number bulletin. Here, the analysis technique to extract an insertion phrase from the sentence is elucidated. However, in this technique, the example of the insertion phrase must be memorized in detail. All examples must be memorized in making practical use. Therefore, the realization is difficult.

Next, it is the way of the Japanese patent TOKU KAI SHOU 64-17152 number bulletin. It elucidates the way of analyzing the relation of the sentences using the meaning category number (the common meaning concept which the word has). In this way, the special meaning category number must be used and the system was complicated. Also, the relation can not be fixed as one.

It is demanded that a translation system among the different languages is realized. For example, the system which used an artificial international word is elucidated to the U.S. Pat. No. 5,426,583 number. However, this system doesn't have the concrete. Under present condition, the realization is difficult. Of course, there is not a proposition that solved each above-mentioned problem point.

SUMMARY OF THE INVENTION

This invention provides a language analysis system that solves each above-mentioned problems. Also, it provides the system that solved each problem point respectively.

Hereinafter, the concept of the terminology that explains this invention is explained.

"Language": It is the concept to mean natural languages such as the writing word and the talking word of the document and the text and so on. It may be the forms of which such as the letter code form, the image form and the sound form.

"Program which computer executes": The case to execute after once changed (the thawing of compression and so on). The case to execute in the combination of the other module. It contains two cases.

A language analysis system and a way of analyzing a language in case of this invention are described below.

It divides a given language into a token. At the same time, it acquires a part of speech about each token from a dictionary.

The case that one token has equal to or more than 2 parts of speech. It refers to the part of speech of 1 or more than one token that is situated on before, later or both. Then, it chooses one part of speech from equal to or more than 2 parts of speech that were given to the concerned token.

The case which the part of speech of the token is the root of the predicate. Based on the suffix of the predicate, it fixes the grammatical attribute of the concerned predicate.

The concerned role of equal to or more than 1 token which has a role and the part of speech of the token which is equal to or more than 1 which a role isn't given to. It fixes the role of the token which is equal to or more than 1 which a concerned role isn't given to by these two. At the same time, it makes both be related.

It extracts each one subordinate sentence and one main sentence. Then, it makes relate to the other part. It makes the "subject" "predicate" be related to the main sentence and each one subordinate sentence (the whole analysis). This is executed in the appearance position and the number of times of the "subject" "predicate". The subordinate relation of the subordinate sentence becomes clear with the analysis. If there is a mistake in the earlier going analysis, it corrects the analysis.

In above-mentioned way, it fixes the part of speech of each token correctly. Then, it combines these tokens in quasi word which has one role. In this way, it analyzes a part of speech by the token. Then, it analyzes the role of token or quasi word by this part of speech.

Also, it makes the analysis of token or quasi word and the part of speech of the un-fixed token correspond. Then, it analyzes the role and the structure of un-fixed token (the local analysis). By the result of the whole analysis, it corrects a local analysis. Therefore, the structure and the role of the sentence can be more correctly analyzed.

In this language analysis system and the way of analyzing a language, it extracts each one subordinate sentence and one main sentence. Then, it analyzes a sentence pattern about each. Therefore, to make a sentence pattern a type is easy and the correct analysis becomes possible.

It is separating the local analysis and the whole analysis in the language analysis system and the method of this invention of analyzing a language. Therefore, processing is simple-ized and a correct analysis is realized.

The language analysis system of this invention does the whole analysis after doing local analysis. After that, it corrects a local analysis according to the necessity. Therefore, even if it is a complicated sentence, it is possible to analyze correctly.

BRIEF DESCRIPTION OF THE DRAWINGS

FIG. 2A–FIG. 2D show the condition to have analyzed a language by this invention.

FIG. 3A and FIG. 3B are the concept figure which use the language analysis of this invention in case of translation and net work communication.

FIG. 8 is the figure which shows the example of a part of speech dictionary.

FIG. 9A and FIG. 9B are the figure which show the contents of the analysis file.

FIG. 11 is the figure which shows rule table B(45).

FIG. 12A and FIG. 12B are the figure which shows the contents of the analysis file.

FIG. 13 is the figure which shows rule table B(43).

FIG. 14 is the figure which shows rule table B(44).

FIG. 15 is the figure which shows rule table B(1).

FIG. 16 is the figure which shows rule table B(2).

FIG. 17A and FIG. 17B are the figure which shows the contents of the analysis file.

FIG. 20 is the figure which shows the table of suffix which continues behind the verb root (table D).

FIG. 21 is the figure which shows the table of verb suffix.

FIG. 22 is the figure which shows the table which handled the idiomatic word of verb as a suffix.

FIG. 23 is the figure which shows the table of compound verb.

FIG. 24 is the figure which shows the table of a predicative adjective suffix.

FIG. 25 is the figure which shows rule table B(6).

FIG. 27A is the figure which shows the maintenance content example of an attribute buffer. FIG. 27B is the figure which shows the attribute of "masu" of the analysis file.

FIG. 28A and FIG. 28B are the figure which shows the attribute of "i" "kattuta" which was memorized in the analysis file.

FIG. 29A and FIG. 29B are the figure which shows the attribute of "kuna" "masu" which was memorized in the analysis file.

FIG. 30A–FIG. 30F are the figure which explains the processing of a subordinate sentence.

FIG. 32 is the flow chart which shows the processing of the analysis of the structure and the role of the sentence.

FIG. 33 is the flow chart which shows the processing of the analysis of the local structural role.

FIG. 34 is a flow chart of the special processing of a title and so on.

FIG. 45 is the flow chart which shows the extraction processing of the case which has equal to or more than two reading points.

FIG. 46 is the flow chart which shows the extraction processing of the case which has one reading point.

FIG. 49 is the figure which shows the prediction table of T-interval.

FIG. 50 is the figure which shows the prediction table of Nominative.

FIG. 51 is the figure which shows the prediction table of Nominative.

FIG. 52 is the figure which shows the prediction table of Quasi-adervial modifier.

FIG. 53 is the figure which shows the prediction table of Predicate.

FIG. 54 is the figure which shows a sentence pattern table.

FIG. 55 is the figure which shows a sentence pattern table.

FIG. 61A–FIG. 61C are the figure which shows a progress situation by the tree structure about the analysis of the sentence structure of the above illustrative sentence.

FIG. 62A and FIG. 62B are the figure which shows a progress situation by the tree structure about the analysis of the sentence structure of the above illustrative sentence.

FIG. 65 is the figure which shows an analysis result (omitting an attribute) except the structure of the sentence.

FIG. 66 is the figure which shows an analysis result (omitting an attribute) except the structure of the sentence.

FIG. 67 is the figure which shows the flow chart of the other implementation form about the analysis of the sentence structure and the analysis of the role.

FIG. 68 is the figure which shows the flow chart of the other implementation form about the analysis of the sentence structure and the analysis of the role.

FIG. 69 is the figure which shows the flow chart of the other implementation form about the analysis of the sentence structure and the analysis of the role.

FIG. 73 is a flow chart of the special processing of a title and so on.

FIG. 90 is the result which analyzed a part of speech and a role about the illustrative sentence 3.

FIG. 96 is the figure which shows the analysis result of the role and the relation about the illustrative sentence 4.

FIG. 106 is the figure which shows the sentence pattern table to use about the other implementation form.

FIG. 107 is the figure which shows the sentence pattern table to use about the other implementation form.

DETAILED DESCRIPTION

Table of Contents

Figure 1:
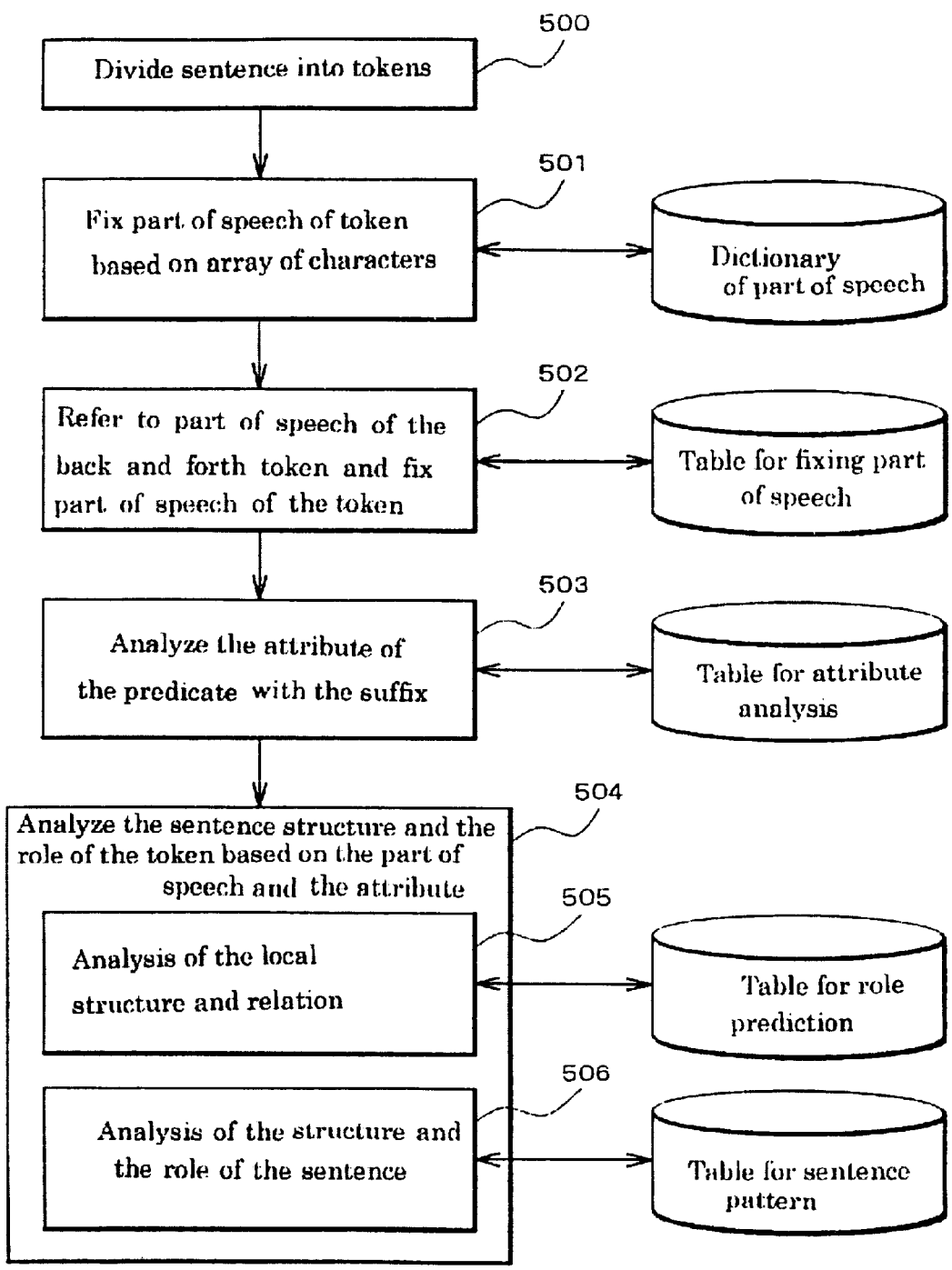
FIG. 1 is the figure which shows the basic concept of language analysis by this invention.

1 The basic concept of the language analysis by this invention
2 The use of the language analysis by this invention
  2.1 The use in case of translation
  2.2 The use in case of net work communication
3 The whole composition of the language analysis system by this invention
4 The hard wear composition of the language analysis system by this invention
5 The decision of the part of speech and the analysis of the attribute 5.1 The classification of the part of speech 5.2 The decision of the part of speech 5.3 The analysis of the attribute 5.4 The decision of the part of speech which uses the token which is situated before and behind 5.5 The analysis example of the part of speech and the attribute by the other illustrative sentence 5.6 The others 6 The analysis of the structure and the role of the sentence 6.1 The explanation of the terminology 6.2 The analysis of the structure and the role of the sentence (The point of view)

6.3 The analysis of the structure and the role of the sentence (The processing contents)

6.4 The extraction of the correct subordinate sentence 6.5 The analysis of the local structural role (the sub-role)

6.5.1 The special processing of a title and so on 6.5.2 The special processing of substantive stopping 6.6 The sentence pattern analysis processing 6.7 The processing to extract a subordinate sentence from the object 6.8 The processing of a subordinate sentence 6.9 The processing of a main sentence 6.10 The processing to extract a parenthesis part 6.11 The example which analyzes the structure and the role about the illustrative sentence 1

6,12 The example which analyzes the structure and the role about the illustrative sentence 2

7 The processing example which analyzes the structure and the role of the sentence in the other implementation form 7.1 The explanation of the processing contents 7.2 About the processing to extract the subordinate sentence which is related with a reading point in the concrete 7.3 The example which analyzes the structure and the role of the sentence about the illustrative sentence 3

7.4 The example which analyzes the structure and the role of the sentence about the illustrative sentence 4

7.5 Reference

8. The other implementation form 8.1 The method of using the analysis of the role for the decision of the part of speech 8.2 The method of extracting LSA after analyzing the sentence structure.

9 The application to the translation

1.The Basic Concept of the Language Analysis by this Invention

When the basic concept of the language analysis by this invention is shown, it becomes like FIG. 1. First, it divides the sentence which was given as letter line C1–Cn into the minimum unit (token) which has a meaning (500 of FIG. 1). In other words, it divides the letter line C1–Cn which is shown in FIG. 2A into token T1–Tm as shown in FIG. 2B.

There is space between the token and the other token in English, German, French and so on. In such a language, a token is already divided by the concerned space. However, there is not space between the token and the other token in Japanese, Chinese and so on. In the case of such a language, it divides a token, referring to the dictionary which stored the letter line of the token.

Next, it fixes the part of speech based on the letter line of the token (501 of FIG. 1). For this decision, it refers to the part of speech dictionary that the letter line of the token corresponds to the part of speech. Incidentally, this invention makes the classification of the part of speech a system as it is useful to analyze an attribute, sentence structure and a role. Therefore, the classification of the part of speech of this invention doesn't agree with the classification which is generally used by the linguistics.

By the way, in a lot of languages, one token is equal to more than 2 parts of speech. In this case, the part of speech of the concerned token can not be fixed even if it refers to the part of speech dictionary. To fix this, it refers to the part of speech of back and forth the token and it fixes the part of speech of the concerned token (502 of FIG. 1).

Each part of speech N1–Nm is given to each token T1–Tm.

$$T1(N1), T2(N2), T3(N3) \ldots Tm(Nm)$$

Next, it analyzes a predicate. It refers to the part of speech dictionary and it finds the token which has a part of speech with the predicate root. The predicate root maintains the table number of the suffix which continues to this. Then, with the suffix, it analyzes the attribute of the concerned predicate (503 of FIG. 1). As for a lot of languages, the suffix changes the attribute of the concerned predicate. The attribute means the nature in negative, present and past and so on. Accompanied by the predicate, too, is one of the attributes. The analysis of this attribute is extremely important when analyzing a language.

The predicate root is the part of the predicate which the letter line doesn't change into. For example, in "ikimasu", "i" is the predicate root and "kimasu" is the suffix. Moreover, in this invention, it divides the suffix into the minimum unit. In other words, it divides "kimasu" into "ki" and "masu".

In "ikimasu", "i" doesn't change. However, "kimasu" changes into "kimasita" "ku" "ttuta" "ki" and so on. In such a language, the attribute of the predicate is gotten by the analysis of the suffix. In the language of either, there is a basic rule in the change of the suffix. For this invention, too, the table which analyzes an attribute based on the rule of the suffix is prepared. Moreover, the suffix is classified based on the predicate root. It gets the analysis of the high precision and correct composition by this.

There is a language which the suffix changes into. On the other hand, there is a language which the concerned predicate and back and forth the token change into. If preparing beforehand the table which corresponds to these languages, the translation which used an analysis result is realized.

Here, each token T1–Tm gets attribute A. Incidentally, more than one attribute is given to one token.

$$T1(N1,A11 \ldots A1k1), T2(N2,A21 \ldots A2k2), T3(N3,A31 \ldots A3k3) \ldots Tm(Nm,Am1 \ldots Amkm)$$

It analyzes about the sentence structure and the role of the token based on the part of speech and the attribute which was gotten by above-mentioned analysis (504 of FIG. 1). In this invention, it does an analysis, dividing it into two mainly.

The 1st is the analysis of the local structure (The analysis of the local structural role) (505 of FIG. 1). In this analysis, it has priority over the relation of the neighbor token. Then, it fixes relation and a role. It uses an already fixed role, a part of speech and an attribute for this. In this invention, it refers to the token which a role isn't given to from the token which a role was given to. Then, it fixes the role of the token which a role isn't given to. At the same time, it sets both in the relation. Also, at this time, it makes these tokens one quasi word.

This is explained with FIG. 2C. Tokens Ti+2 and Ti+3 are given a role. Then, they become one quasi word Kj and it is given role Rj. Token Ti and Ti+1 are not given a role. Then, they are situated in front of the quasi word Kj. It makes this both correspond. Then, it judges whether or not it is possible to fix the role of token Ti and Ti+1. When it is possible to decide, it makes token Ti, Ti+1 one quasi word Kj-1 and it gives role The 2nd is the analysis of the whole structure (506 of FIG. 1). In other words, it is the analysis of the communication structure and the role of the sentence. This analysis is based on the appearance position and the appearance number of times of the "syukakuga" "syukakuwa" "predicate". In other words, using the table with the sentence pattern which is based on the "syukakuga" "syukakuwa" "predicate", it analyzes communicating sentences structure and a role. In the sentence pattern, it makes "syukakuga" "syukakuwa" "predicate" a type.

A correct type and a correct analysis are gotten by these two ways.

Also, in Japanese and so on, "a reading point" is used. To get the subordinate communication relation of the sentence, it refers to "a reading point". The token which corresponds to "a reading point" of Japanese is in each language. For example, in English, the comma corresponds.

By above-mentioned two analyses, it gives each token and quasi word a role. At the same time, it makes each token or quasi word have relation. This structure is shown in FIG. 2D. A big effect is gotten even if it uses each processing independently. However, the analysis processing which includes all can get the more desirable analysis result. Each above-mentioned processing is composed to the system which each relates to.

2. The Use of the Language Analysis by this Invention 2.1 The Use in Case of Translation A language analysis by this invention is used for computer translation. The concept figure is shown in FIG. 3A. There are two kinds of translation methods. One s the transfer method which translates one language into the other one language. In his method, if the number of the languages increases, the realization is very difficult. Because, the making of each translation software takes huge time. Also, it is too difficult to translate correctly. The other one is the pivot method which translates a lot of languages by the same method. This invention belongs to this method. In other words, in this invention, it is analyzing all languages in the identical thought. Therefore, the analysis result of all languages becomes identical. In other words, the part of speech, the attribute and the role and so on are common about any language.

Temporarily, it supposes the case which translates α language into β language. First, it analyzes a language by the language analysis of this invention. This analysis result becomes the core information which is common to the other language. Next, using this core information, it analyzes β language. As this result, the correct translation among two languages can be realized. In the method of this invention, it analyzes all languages by the identical core information. A lot of language translation software is made a standard by this. The case which translates β language into α language, too, is same.

2.2 The Use in Case of Net Work Communication

Also, it is possible to use the case which transmits information through the networks such as the internet. This is shown in FIG. 3B. In this case, in addition to transmitting contents, it transmits the core information CORE which was gotten by the analysis, too. If being beforehand in this method, when translating into the other language on the received side it is possible to translate correctly. Also, it is the same in the case to be translated into the other language. If core information CORE is added, in the translation, as for the repeat, too, the original information isn't lost.

3. The Whole Composition of the Language Analysis System by this Invention

Figure 4:
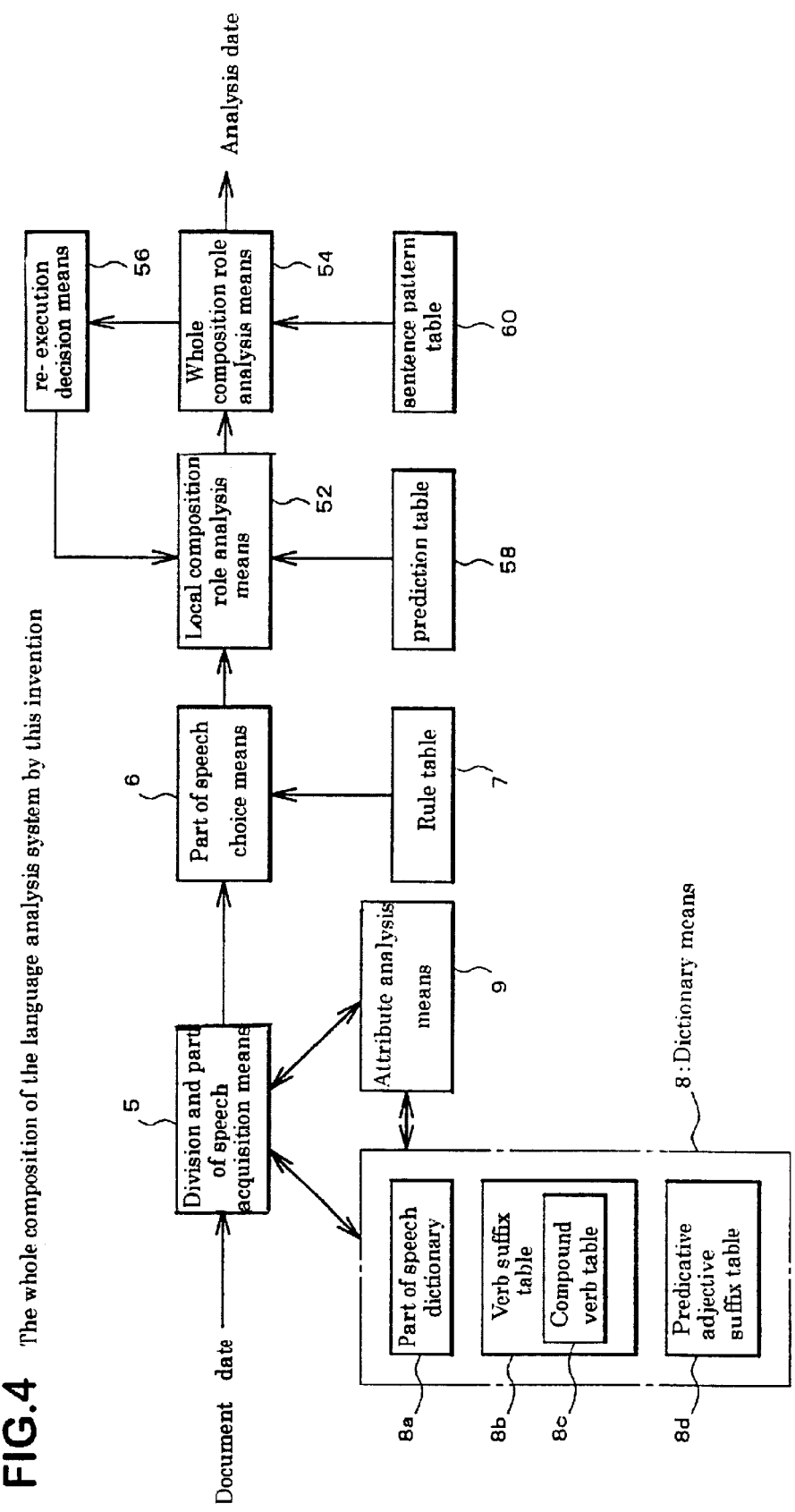
FIG. 4 is the implementation example which shows the whole composition of the language analysis system of this invention.

One implementation form of the language analysis system by this invention is shown in FIG. 4 as the whole composition.

In the following implementation form, the system which analyzes Japanese is explained as the example. Of course, this system can be applied to other languages, too, without changing the essence. First, it resolves the documentary data which was given into the token by the division and part of speech acquisition means 5, the attribute analysis means 9, and the part of speech choice means 6. Then, it fixes the part of speech of each token and it analyzes an attribute. After that, it analyzes the composition of the sentence and the role by the local composition role analysis means 52, the whole composition role analysis means 54, and the re-execution decision means 56.

Beforehand, the dictionary means 8 stores a lot of tokens. The division and part of speech acquisition means 5 refers to the dictionary means 8. Then, it divides inputted sentences data into the token and it acquires a part of speech. In this implementation form, as for the part of speech except the suffix of the verb and the suffix of the predicative adjective, it executes division and part of speech acquisition using the part of speech dictionaries 8*a*. Then, it executes division and part of speech acquisition using tables 8*b* for the suffix of the verb and tables 8*d* for the suffix of the predicative adjective. Attribute analysis means 9 is connected with the processing of the division and part of speech acquisition means 5 and fixes the attribute of the verb and the attribute of the predicative adjective. At this time, attribute analysis means 9 uses table 8*b* and table 8*d*.

When dealing with Japanese, the attribute can be analyzed only with the suffix. However, in the language where suffix isn't rich, the attribute can not be sufficiently analyzed in suffix. In such a language, it analyzes an attribute by the token in the place around the concerned predicate. If being in case of English, "will" which shows the future and "not" which shows negation and so on correspond to this.

The Part of speech choice means 6 refers to rule table 7. When the part of speech of the token is equal to or more than two, based on the part of speech of the token of previous, after (or both), it fixes the part of speech of the concerned token as one. Incidentally, if the part of speech can not be fixed as one, it is good to limit only, too.

Also, it maintains the candidacy of equal to or more than two parts of speech beforehand and it may fix a part of speech later.

In the above, by the part of speech of the token of previous, after (or both), it fixes the part of speech of the token that the part of speech can not be fixed. Also, it may decide by the attribute of the token of previous, after (or both).

In the implementation example of FIG. 4, the division and part of speech acquisition means 5 is dividing a sentence by dictionary means 8. However, it may divide in the sentence without referring to dictionary means 8.

A part of speech and an attribute are sent to the local composition role analysis means 52 with the documentary data. The local composition role analysis means 52 refers to the un-fixed token from the concerned sentence. Next, it fixes the role of the un-fixed token. For this decision, it uses the part of speech of the un-fixed token and the role of after fixed quasi word. If corresponding, a role is given to the un-fixed token. It uses the prediction table 58 for this decision. When one role is given to equal to or more than two un-fixed tokens, these tokens become one quasi word. At the same time, it puts both in the relation.

The whole composition role analysis means 54 extracts a subordinate sentence and a main sentence respectively by "the parentheses", "the reading point", the part of speech and the role. Next, it fixes the whole composition and the role about the subordinate sentence and the main sentence. It does this decision in the appearance position and the number of times of the "syukakuga" "syukakuhwa" "predicate". It uses sentence pattern table 60 for this analysis.

Incidentally, re-execution decision means 56 judges whether or not it is necessary to correct the local composition role analysis by the extraction of the subordinate sentence. If necessary, it analyzes again by the local composition role analysis means 52.

A role was fixed about all tokens and quasi words. This result is output as the analysis data with the part of speech and the attribute of the token.

4. The Hardware Composition of the Language Analysis System by this Invention

Figure 5:
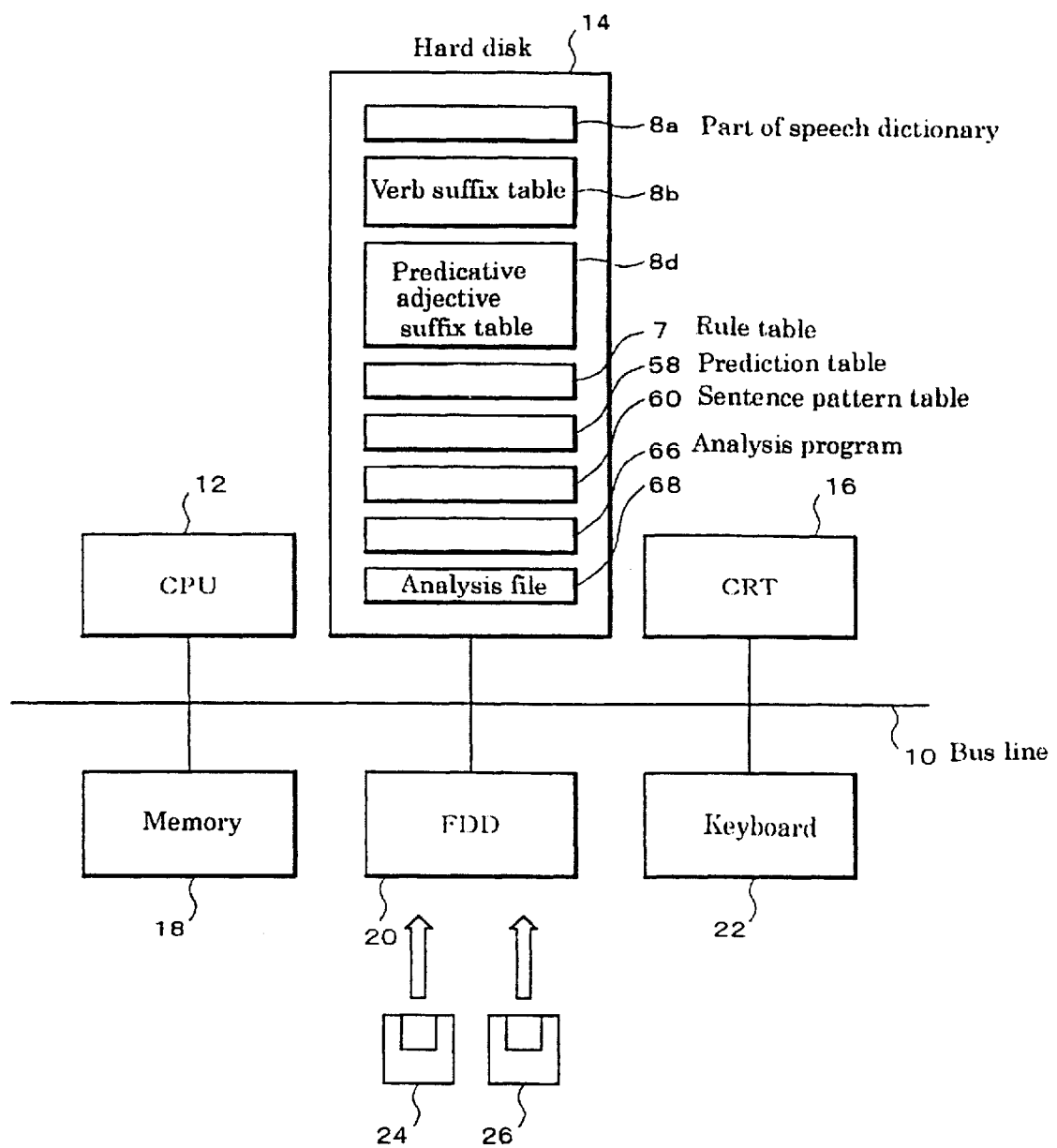
FIG. 5 shows the hard wear composition which realized the language analysis system of FIG. 1 and FIG. 4 using CPU.

The hardware composition of the case which was realized at the language analysis equipment of FIG. 4 using CPU is shown in FIG. 5. CPU12, hard disk 14, CRT16, memory 18, floppy disk drive (FDD)20, keyboard 22 are connected with bus line 10. The prediction table 58 which fixes the role of the token is stored at hard disk 14. Moreover, the part of speech dictionary 8a, the verb suffix table 8b, the predicative adjective suffix table 8d and the sentence pattern table 60 are stored. At the part of speech dictionary 8a, the token and the part of speech correspond. Also, the verb suffix table 8b combines the compound verb table 8c and makes the table of the idiomatic word an incorporation. In other words, the dictionary means 8 is composed by the part of speech dictionary 8a, the verb suffix table 8b and the predicative adjective suffix table 8d. Also, the rule table 7 to fix a part of speech is memorized. Moreover, the program 66 which analyzes a language is memorized at hard disk 14. This program is taken in from floppy disk 24 through FDD20. Of course, it is good even if it takes in from the other memory equipment of CD-ROM and so on. Also, it may load down through the communication circuit. Incidentally, in this implementation form, Windows 95 (the brand) which is operating system of the micro software company is stored at hard disk 14. The program of the language analysis executes processing with this operating system. The text sentences which are an analysis object are stored in floppy disk 26 and are read through FDD20. Of course, it is good even if it reads the medium of CD-ROM and so on It may receive text sentences by the communication. Also, it may be the text sentences which were inputted from keyboard 22. Taken text sentences are analyzed according to the program which was memorized at hard disk 14. An analysis result is memorized as analysis file 68 at hard disk 14 and is output by CRT16, floppy disk and the printer (not illustrating) according to the necessity. In some cases, it may forward through the communication circuit.

5. The Decision of the Part of Speech and the Analysis of the Attribute 5.1 The Classification of the Part of Speech The part of speech dictionary of this implementation example stores the part of speech which was classified like FIG. 6. Almost, a part of speech is divided into the part of speech except the predicate and the predicate. A predicate is divided into the verb and the predicative adjective. A part of speech except the predicate is divided into the part of speech except the noun and the noun. A noun is divided into name group A, name group B, name group C.

Figure 6:
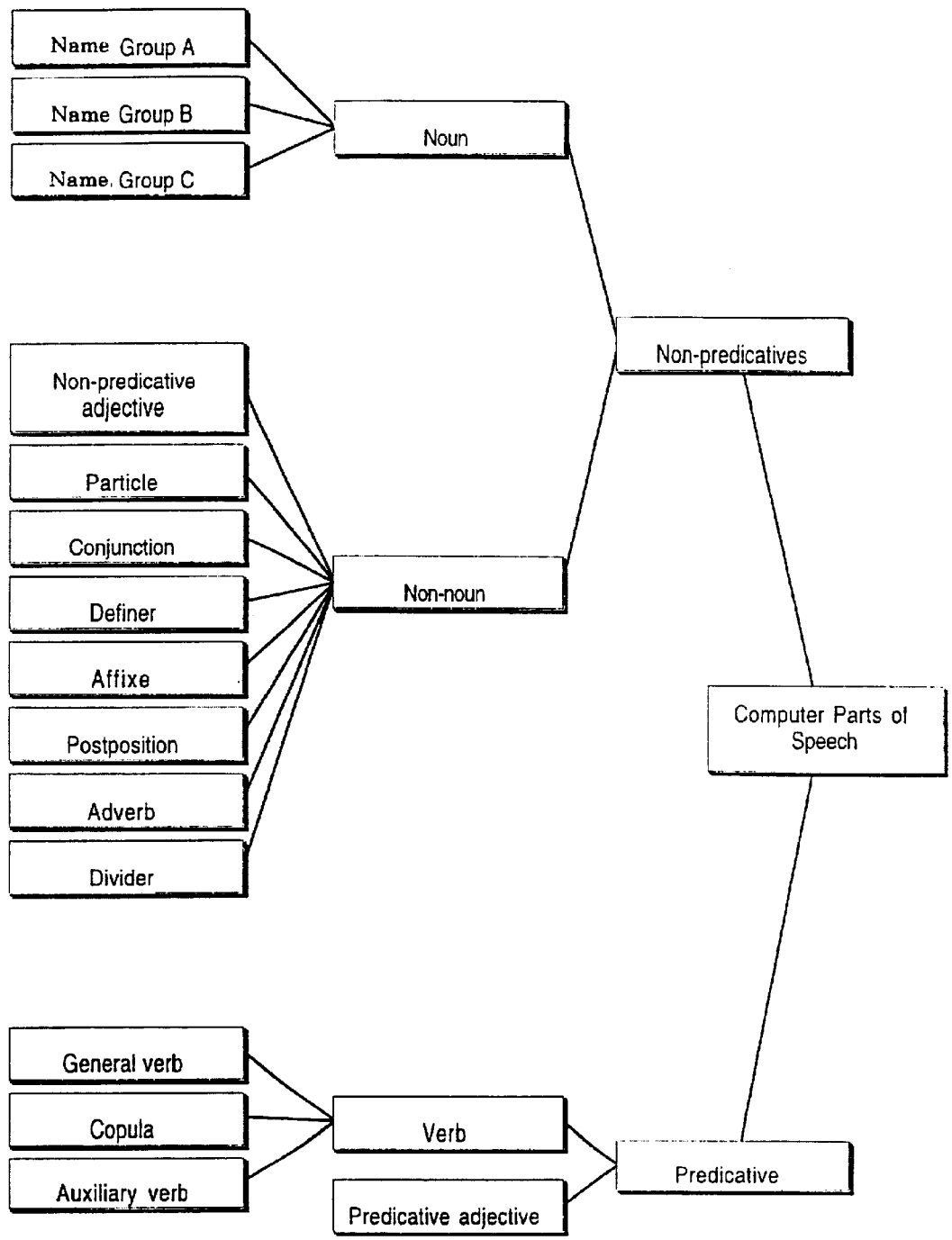
FIG. 6 is the figure which shows the classification of a part of speech.

Moreover, the classification of FIG. 6 is classified in detail. For example, name group A is made a general noun, the noun which is not a general noun, the noun of list A, pronoun and so on in the subdivision kind. The subdivision kind of FIG. 6 is shown in table 1.

The part of speech dictionary stores this subdivided part of speech about each token. Incidentally, hard disk 14 stores the classification hierarchy of FIG. 6 and the classification hierarchy of table 1 (following). Therefore, if understanding a subdivided part of speech, the classification of the higher rank can be easily acquired. For example, it is possible to acquire that "the general noun" belongs to "name group A" easily. Incidentally, it may memorize the classification of the higher rank all together with the subdivided part of speech.

A verb is divided into the verb root and the verb suffix in FIG. 6 and table 1. In the same way, the predicative adjective is divided into the predicative adjective root and the predicative adjective suffix. By this classification, the token of the dictionary is fixed. That is, the token of the dictionary doesn't change. Because the token of the dictionary becomes clear, the translation into the other language becomes simple and definite. Then, the more right translation result is gotten.

Moreover, it classified into the group with the word root and the group except it. By this, it became possible to divide into the processing which the suffix accompanies and the processing except it.

As for this implementation example, the verb suffix and the predicative adjective suffix are not memorized at the part of speech dictionary. The suffix is memorized at the table. It is possible for the dictionary capacity to decrease by this method. At the same time, a correct analysis result is gotten.

Incidentally, the suffix out of the verb and the predicative adjective exists. It is the suffix of the figure and so on. However, unless refusing especially below, the suffix means the verb suffix and the predicative adjective suffix.

If considering the efficiency of the reference, as for the part of speech dictionary, the way of memorizing a token beforehand in order of the letter code is desirable. Also, it may memorize by the order according to the use frequency of the token.

TABLE 1

(Computer part of speech)

| | |
|---|---|
| 1. | Name group A |
| 1.1 | General noun: ki; tree, kuruma; car |
| 1.2 | Non- general noun |
| 1.2.1 | Noun with adjective feature: juubun; enough, hituyou; need |
| 1.2.2 | Noun of list A: gennzai; the present, ima; now |
| 1.2.3 | Noun: kore; this, dore; which |
| 1.2.4 | Quality noun: mina; all, takusann; much |
| 1.2.5 | Specification word: teido; degree, kurai; about |
| 1.2.6 | Word "nado": nado; and so on |
| 1.2.7 | Cardinal numerals : itchi; one, hatch; eight |
| 1.2.8 | Non-text symbol |
| 2. | Name group B |
| 2.1 | Substantivator: koto; thing, mono; thing |
| 3. | Name group C |
| 3.1 | Counter: mai; a counter for plain things, satsu; a counter for books |
| 4. | Non- name |
| 4.1 | Non- predicative adjective: hon; this, ookina; big |
| 5. | Postposition |
| 5.1 | Real postposition: nai; inside; chu; in |

TABLE 1-continued (Computer part of speech)

| | |
|---|---|
| 5.2 | Verb postposition: niyoru; is upon, niokeru; is in |
| 5.3 | Middle postposition: niyoltute; by means of |
| 6. | Adverb |
| 6.1 | Adjective adverb: hikakutekini; comparatively |
| 6.2 | Simplified adverb: hikakuteki; comparatively |
| 6.3 | Degree adverb: sukosi; a little, hotondo; almost |
| 6.4 | Adverb from list 1: sarani; over again, musiro; if anything |
| 6.5 | Adverb from list C: yaku; about, |
| 6.6 | Adverb of manner: hetani; badly, jouzuni; well |
| 7. | Conjunction |
| 7.1 | Coordinate conjunction: ya; and, aruiwa; or |
| 7.2 | Subordinate conjunction: koki; time, to; if |
| 7.3 | Conjunction "kara": kara; because |
| 7.4 | Conjunction "sinaikara": not because |
| 7.5 | Conjunction "moshi" "tatoe": moshi; if, tatoe; even if |
| 7.6 | Conjunction introducing apposition: tatoeba; for example, |
| 8. | Particle |
| 8.1 | Nominative particle |
| 8.1.1 | Wa- particle |
| 8.1.2 | Ga- particle |
| 8.2 | Indirect particle |
| 8.2.1 | No- particle |
| 8.2.2 | Ni- particle |
| 8.3 | Direct particle: Wo-particle |
| 8.4 | Emphasizing, restricting, and interrogative particle |
| 8.4.1 | Emphasizing particle: mo; too |
| 8.5 | Underlying particle |
| 8.5.1 | Wa-particle |
| 8.5.2 | Nara-particle |
| 9. | Definer: nogotoki; which resembles, |
| 10. | Affixes |
| 10.1 | Numeral prefix: dai; forming ordinal number |
| 10.2 | Verb suffix and Predicative adjective suffix |
| 10.3 | Non-predicative adjective suffix |
| 10.4 | Noun semiaffix |
| 11. | Divider |
| 11.1 | Full stop |
| 11.2 | Comma |
| 11.3 | Colon |
| 11.4 | Special divider |
| 12. | Word root |
| 12.1 | General verb root |
| 12.2 | Non-general verb root |
| 12.2.1 | Copula root |
| 12.2.2 | Auxiliary root |
| 13. | Predicative adjective root |

Figure 7:
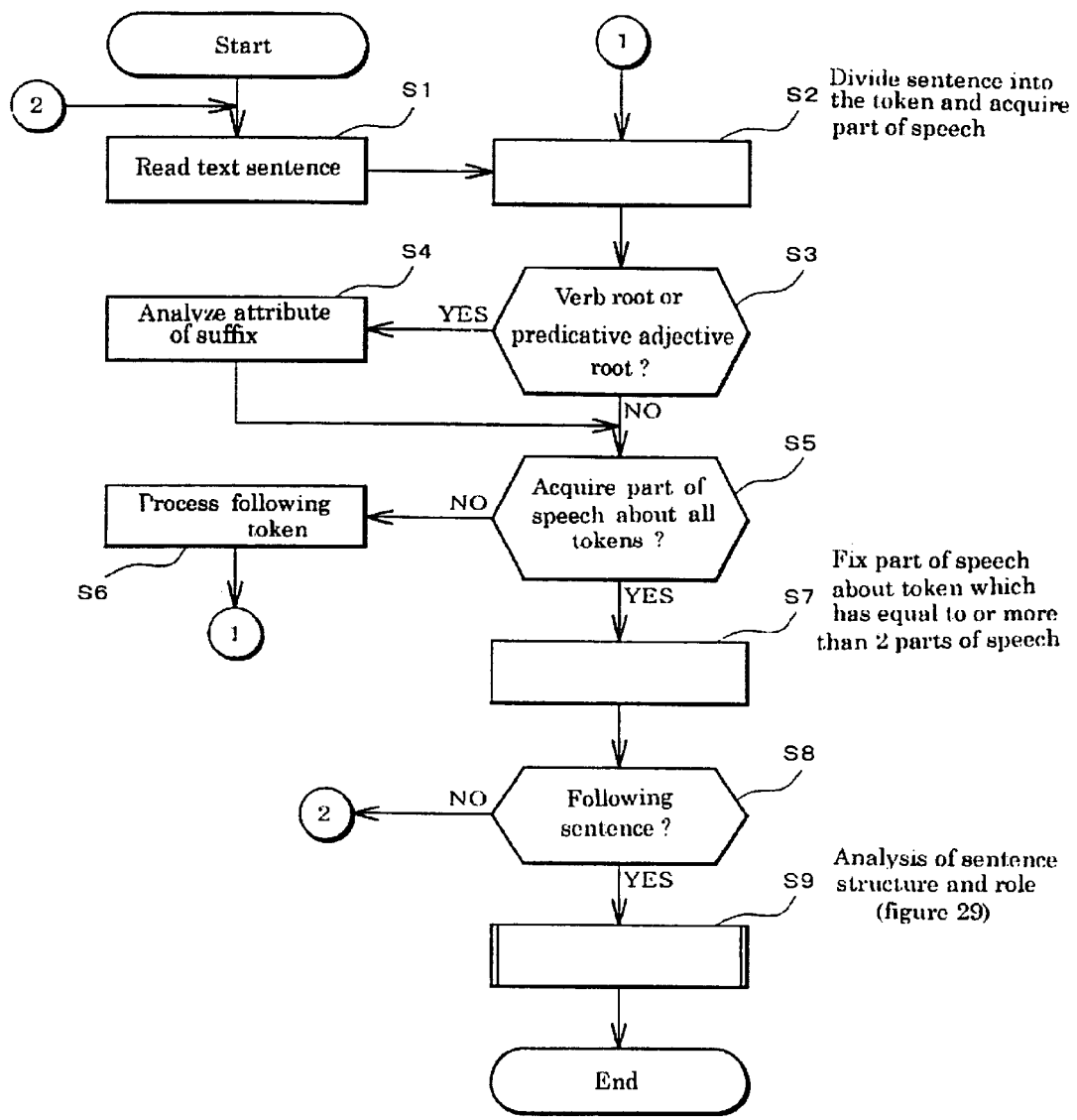
FIG. 7 is the flow chart which shows the division of the sentence, the acquisition of the part of speech and the analysis of the attribute.

The flow chart of FIG. 7 is the program of the language analysis which was memorized at the hard disk 14. The decision of part of speech and analysis of the attribute are described in this flow chart. First, it reads the text sentences which were memorized in the floppy disk 26 (step S1). Next, CPU12 divides one sentence of the read text sentences into the token and acquires the part of speech of the token (step S2). In this processing, CPU12 refers to the part of speech dictionary which was memorized at the hard disk 14.

Here, it makes "Bokuwa gakkoue ikimasu" (I go to school.) an illustrative sentence. Then, the division processing to the token, the acquisition processing of a part of speech and the decision processing of a grammatical attribute are explained. First, CPU12 refers to the part of speech dictionary about the first letter "boku". The part of the part of speech dictionary is shown in FIG. 8. As clear from the figure, the part of speech of "boku" is the general noun.

In the same way, CPU 12 refers to the part of speech dictionary about "bokuwa". The part of speech dictionary doesn't store "bokuwa". Moreover, "wa" is not a kanji (Chinese character). By this, it judges that "boku" is one token. At the same time, it memorizes the part of speech of token "boku" in the analysis file as the general noun of name group A (FIG. 9).

Next, it judges whether the acquired part of speech is the verb root or the predicative adjective root (step S3). Because it is the general noun here, it advances towards step S5. As for step S5, it judges whether or not it acquired a part of speech about all tokens of the concerned sentence. There is a token which isn't acquired. It advances towards step S6 and it processes the following token.

Next, it refers to "wa" with the part of speech dictionary. The part of speech dictionary doesn't store the part of speech of "wa". The part of speech dictionary stores the rule table number of "wa". This "wa" has equal to or more than 2 parts of speech. Moreover, it refers to the part of speech dictionary about the letter "wagaku". The part of speech dictionary doesn't store "wagaku". CPU12 judges that "wa" is one token. It memorizes the number B(45) of the rule table which is memorized at the part of speech dictionary (FIG. 9A). Incidentally, in above-mentioned implementation example, when equal to or more than 2 parts of speech exist, it memorizes only the number of the rule table at the part of speech dictionary. It may memorize these parts of speech all together at the part of speech dictionary.

Hereinafter, too, in the same way, it recognizes "gakkou" "e" as the token. Then, it memorizes each part of speech as shown in FIG. 9. Next, it recognizes "i" as the token and it memorizes the general verb root as the part of speech. It advances towards step S4 from step S3. As for step S4, it analyzes the attribute of the suffix. The use of this table made it possible to execute the decision of the suffix and the analysis of the attribute at the same time. If not pursuing such an advantage, it may memorize the suffix in the part of speech dictionary.

5.3 The Analysis of the Attribute

In this implementation example, it analyzes the basic attribute of the verb in table 2 and the basic attribute of the predicative adjective in table 3.

TABLE 2

The basic attribute of the verb suffix

1. Causativity (CAUS): To make or create a result or effect
   "kodomoni honwo yomaseru": to force a child to read a book
2. Passivity (PAS): Passive voice
   "setumeisareru": are explained.
3. Proceedingness(PROC): Past tense
   "kimasita": came.
4. Resultivity(RES): Past or future perfect
   "ireteokimasita": have put in.
5. Directedness(DIR):
       Directed into present: "seizousitekimasita": have made.
       Directed into future: "kurumawa masumasu yokunattuteiku":
           A car will become better.
6. Intermitteness(INT): Indicating alternative actions:
   "kikaiga migino houe mawattutari hidarino houe mawattutarisita":
       The machine was turning on right and on left.
7. Continuity(CON): Indicating continuous actions:
   "Watasiwa honwo yondeimasu": I am reading a book.
8. Perfection(PER): Indicating perfection; "honwo yondesimaimasita":
       At last have read a book.
9. Affirmativeness(AFF): Neration(NEG)
10. Accompaniment(ACCOM): Non- accompany means a top predicate.
        Accompany means a middle predicate.
11. Existence of additional meaning(ADDM): "yomasehajimeru"
        to begin to make to read
12. Modality(MOD): Show some condition.
        "seizousurukotogadekiru": can make
13. Neutralness(NEAT) - Politeness(POL): kuru: to come (neutral style)
        kuru: to come (polite style)

TABLE 3

The basic attribute of the predicative adjective suffix

1. Proceedingness(PROC): Past tense: "utukusikattuta": was beautiful
2. Accompaniment(ACCOM): Non- accompany means a top predicate.
   Accompany means a middle predicate.
3. Auxiliary verb(VERB): Existence of the auxiliary verb
4. Affirmativeness(AFF): Neration(NEG)
5. Neutralness(NEAT) - Politeness(POL): "utukusii": is beautiful
   (neutral style)
   "utukusiidesu": is beautiful (polite style)

Below, it refers to the flow chart of FIG. 18 and FIG. 19 and the analysis processing of the suffix is explained. It uses the table of the verb suffix for the analysis of the verb. The table of the verb suffix is shown in FIG. 20. This table is the table of the suffix which continues behind the the verb root (Hereinafter, it is called table D). This table D indicates the table of the suffix which continues later. The table for the verb suffix is composed of table D and table except table D.

The part of speech of "i" is the general verb root. Symbol "k" is acquired by CPU12 from the column "i" of the part of speech dictionary of FIG. 8. CPU12 refers to the suffix according to symbol "k" (step S20).

Table D is shown in FIG. 20. This table has the symbol of r, t, m, b, n, k, k', g, S, w. Now, the specified symbol is "k" and "k" is referred to. CPU 12 reads the following letter "ki". It refers to the letter which symbol "k" indicates. Here, "ki" exists in the 2nd line. It analyzes using the information with concerned line. In other words, "ki" has the attribute of "the same time". It memorizes this in attribute buffer (step S23). Next, it judges whether or not the indication of step S25, S28, S29 is in the table of the concerned suffix. There is not indication. It executes step S30.

As for step S30, it refers to whether or not letter "ma" "su" behind "ki" exists at the following tables C(2), S(v) which table D indicated (FIG. 21, FIG. 23 reference). In the table C(2), "masu" is referred to. It advances towards step S31.

Incidentally, it memorizes the reference result of "kimasu", too. It uses this for the processing behind step S20.

At step S31, it judges whether or not the table to be referring to at present is table D. Because it was referring to table D, it erases all contents of attribute buffer with step S35. The attribute of table D is applied only when the suffix doesn't continue later.

Therefore, it fixes only "ki" (The analysis file of FIG. 9A). In this case, because there is not an attribute of "ki", it doesn't memorize the attribute in the analysis file (step S36). Next, it executes since step S20 again. As for step S20, it uses the tables C(2), S(v) which "ki" of table D indicates. Then, it refers to the suffix which continues behind "ki". It refers in order of tables C(2), S(v).

Table C(2) is shown in FIG. 21. The following letter "ma" is acquired by CPU 12. Then, it judges whether or not "ma" exists at this table. Moreover, it includes the following letter "su". Then, it judges whether or not "masu" exists at the table. In this way, CPU12 finds out the one which agrees as the longest letter line from table C(2). Here, "masu" of No.22 is chosen. Temporarily, when it isn't possible to have found with table C(2), it refers to table S(v). Incidentally, when having ended a reference already about step S30, it uses a memorized reference result. In the reference to steps S20, S21, it increases one letter and it judges whether or not there is the corresponding suffix. In other words, it refers to the first letter (in other words, "ma"). If the first letter corresponds, it refers to the second letter (in other words, "masu"). It increases the number of the letters in this way and it refers to whether or not corresponding suffix is in the table. When equal to or more than two letters are referred to, it chooses the longest suffix.

Also, in case of above-mentioned processing, as longest suffix, the same suffix is sometimes chosen equal to or more than two. For example, "takuna" of NO.15 of FIG. 21 and "takuna" of NO.16 correspond. Which "takuna" in this case does it choose? It is fixed by whether or not the following suffix exists in the table (C and D) which "takuna" indicates.

By the way, there is a case which can not discover the suffix in the indicated table. Because there is possible-ness that the given text sentence is wrong in this case, it displays this effect in CRT16 (step S21, S22). If there is input to correct a mistake, it returns to step S21.

Here, "masu" is chosen from table C(2) (FIG. 21 reference). Table C(2) has the column of "Table address" "Independent suffix segment" "Finite/Non-finite" "Modality" "Accompaniment" "Other grammatical markers". The column of "Table adress" shows the table to refer to next. The column of "Independent suffix segment" shows whether or not concerned suffix is accompanied by the other suffix. If being "Yes", the concerned suffix is always accompanied by the other suffix. If this column is a blank, it shows that there is possible-ness of either. The column of "Finite/Non-finite" shows whether or not concerned suffix is accompanied by the other suffix. If being "finite", the concerned suffix isn't always accompanied by the other suffix. If being "non-finite", the concerned suffix is always accompanied by the other suffix. If being a blank, it shows that there is possible-ness of either. This "finite" plays an important role in case of analysis of the sentence pattern. "Modality" is one of above-mentioned basic attributes. If there is some description in this column, it shows that there is a modality. If being a blank, it shows that there is not a modality. "Accompaniment" is one of above-mentioned basic attributes. If there is a display of "definite" in this column, the concerned predicate isn't accompanied by the other predicate. If there is no display of "definite", the concerned predicate is accompanied by the other predicate. Incidentally, in this column, attributes such as "same time" "invitation" and so on are shown. The column of "Other grammatical markers" shows the basic attribute which the predicate has. In this implementation example, 11 kinds of grammatical attributes are described in this column. 11 kinds of attributes form the basic attribute of 13 kinds of verbs which contain "Accompaniment" and "Modality" (The table 2 reference).

Here, "masu" of table C(2) is referred to. It gets "definite" in the column of Accompaniment". It gets "non-proceedingness" "politeness" in the column of "Other grammatical markers". CPU12 memorizes these attributes in attribute buffer which is shown in FIG. 27A (step S23). 13 areas which maintain the basic attribute of the verb are provided for attribute buffer. Also, the area which stores the other attribute is provided. Because "non-proceedingness" is described in the table, it makes an area in "proceedingness" "–". Also, because "definite" is described, it makes the area of "Accompaniment" "–". At the same time, it memorizes "definite". Also, because "politeness" is described, it makes "politeness" "+". In this way, only the attribute which was specified to the table is memorized in attribute buffer. As for the attribute which isn't specified, it makes blank. But, at table D, the case where "definite" isn't memorized makes the column of "Accompaniment" blank.

Next, it judges whether or not the other suffix continues behind the concerned suffix. In other words, it judges whether or not the column of "Independent suffix segment" of "masu" gets "Yes" (step S25). If being "Yes", the other suffix continues behind the concerned suffix. At the same time, the concerned suffix is fixed. Then, it memorizes the contents of attribute buffer in the analysis file (step S26). The details of this memory processing are described behind. Next, it makes an attribute memory flag "1" with step S27. After that, it advances towards step S28.

Incidentally, the column of "Independent suffix segment" of "masu" is a blank. Without passing through steps S26, S27 from step S25, it advances towards step S28.

As for steps S28, S29, it judges whether or not the column of "Finite/Non-finite" of "masu" is "Non-finite". If being "Non-finite", there is possible-ness that the other suffix continues after this. It advances towards the processing of the following suffix via steps S31, S32. If being "Finite", the other suffix doesn't continue later. In "masu", the column of "Finite/Non-finite" is a blank. It advances towards step S30 via steps S28, S29.

As for step S30, it refers to the following indicated table. Then, it judges whether or not the following token exists at the concerned table. In other words, it judges whether or not the other suffix continues. Here, the following token is " ". It doesn't exist at indicated table C. Because the other suffix doesn't continue, it advances towards step S38. Incidentally, it is possible to judge whether or not the other suffix continues with the part of speech dictionary, too. That is, it is possible to judge that the following token is not the suffix if the following token exists at the part of speech dictionary.

As for step S38, it judges whether or not the attribute memory flag is "1". Because the attribute memory flag is "0", it advances towards step S39 and it stores the contents of attribute buffer in the analysis file as the grammatical attribute of the concerned suffix. As for the attribute of the blank, it memorizes "–" which is default in the analysis file. In this way, it sets the attribute which is often used as "–" which is default. With this, it is possible to diminish the number of the attributes to memorize at the table. The grammatical attribute of "masu" is memorized as shown in FIG. 27B. The attribute of "masu" is "non-causativity" "non-passivity" "non-proceedingness" "non-accompaniment" "non-modality" "politeness" "definite". In case of processing to memorize in the analysis file with step S26, too, like the above, default "–" is given to the attribute of the blank. Incidentally, when memorizing the contents of attribute buffer in the analysis file with step S26, it skips in step S39 (step S38). Also, in the above implementation example, when the other suffix continues in the suffix of table D, it doesn't memorize the attribute of the suffix of table D. However, it may give default "–" each attribute (excluding "accompaniment"). Like the above, it fixes "masu" as one suffix. The part of speech is the general verb suffix. The grammatical attribute, too, is already analyzed. In above-mentioned example, a general verb was explained. It is the same about the copula and the auxiliary verb.

Also, it is the same about the suffix of the predicative adjective. The predicative adjective suffix uses the table 8d. A flow chart is shown in FIG. 18, FIG. 19. This flow chart is the same as the flow chart of the verb suffix. The part of the table 8d is shown in FIG. 24. The predicative adjective suffix doesn't have the table which corresponds to the table D. It only has the table F which is shown in FIG. 24. Incidentally, the table F of FIG. 24 sometimes refers to table C and table D, too. Also, oppositely, the table C(2) of FIG. 21 sometimes refers to table D and table F, too. This is because the suffix which becomes the verb suffix and the predicative adjective suffix exists.

In this implementation example, it classifies the suffix and it makes tables. On the other hand, there is a way of registering each suffix in the part of speech dictionary.

The table of the suffix made it possible for the dictionary capacity to decrease substantially. Moreover, the suffix is quickly fixed and at the same time, an attribute is analyzed. Also, by finding the connection of the impossible suffix, the mistake of the sentences can be found, too.

In this implementation form, it refers to the suffix in order of 50 sound. However, it memorizes the use frequency beforehand and it may refer to the suffix in order of the use frequency. Moreover, it may renew a concerned use frequency by the learning. Also, it may arrange the suffix in order of the use frequency. Moreover, to improve reference speed, it may mention the suffix to more than one table. Also, when the following table is C, it refers to the suffix in order of tables C(0), C(1), C(2) However, it memorizes a use frequency beforehand every table and it may refer to the table in order of the use frequency. Moreover, it may renew a concerned use frequency by the learning.

Figure 18:
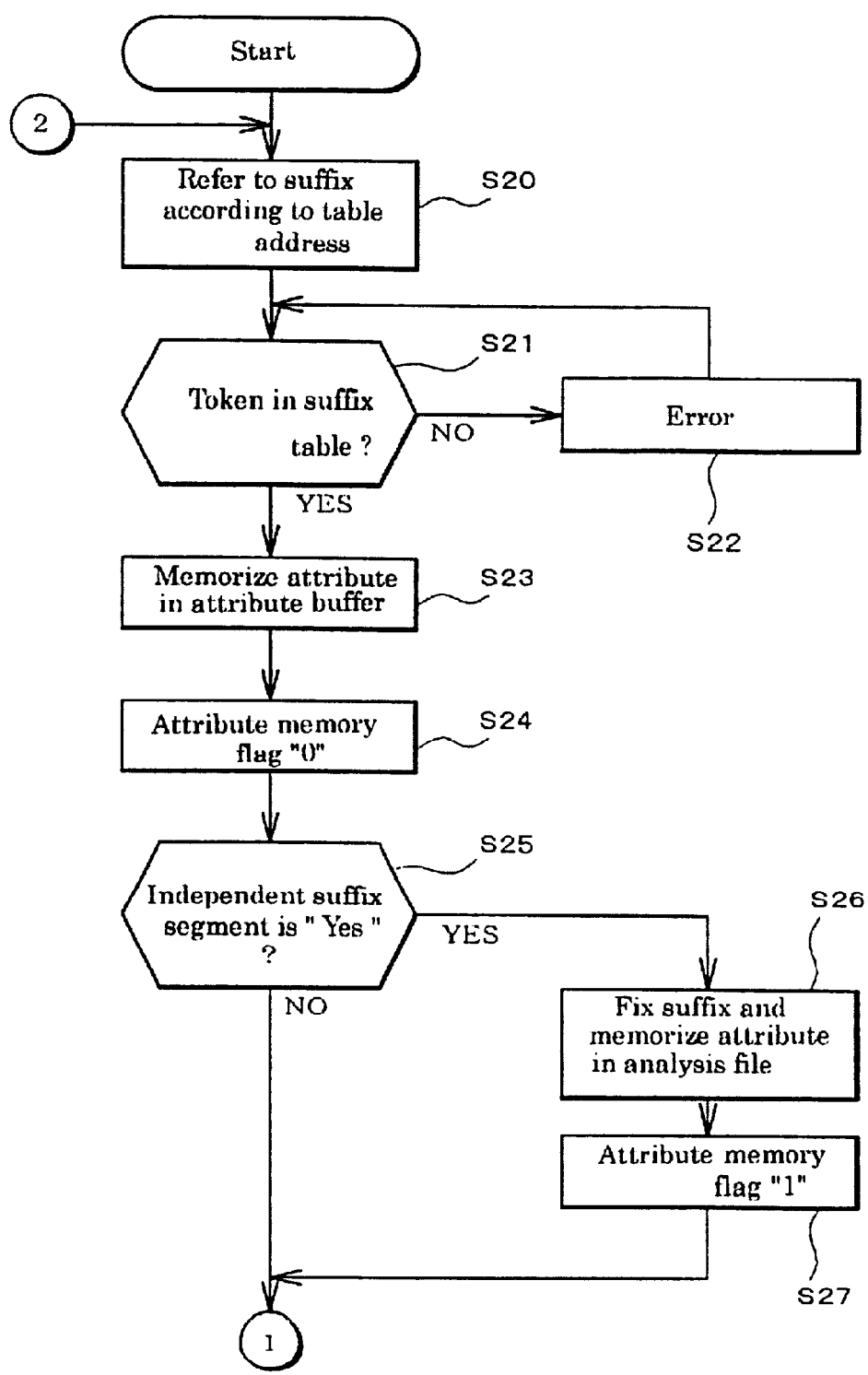
FIG. 18 is the flow chart which shows the analysis processing of a suffix.
Figure 19:
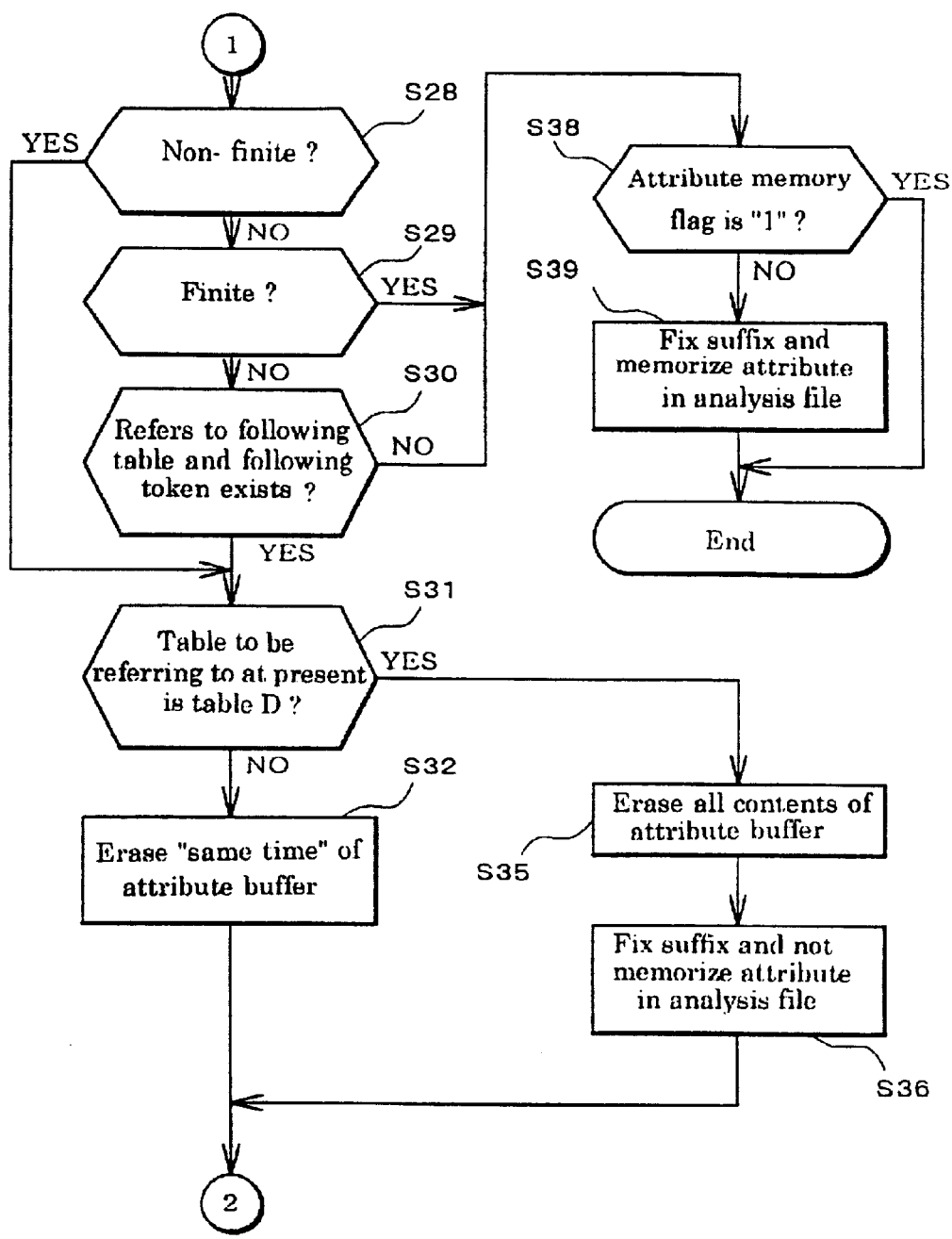
FIG. 19 is the flow chart which shows the analysis processing of a suffix.

When ending the suffix analysis processing of FIG. 18, FIG. 19, it advances towards step S5 of FIG. 7. Here, the processing about " " is left. It acquires a part of speech with step S2 via steps S5, S6. It acquires a part of speech "period" about " ". In this, it acquires a part of speech about all tokens.

Figure 10:
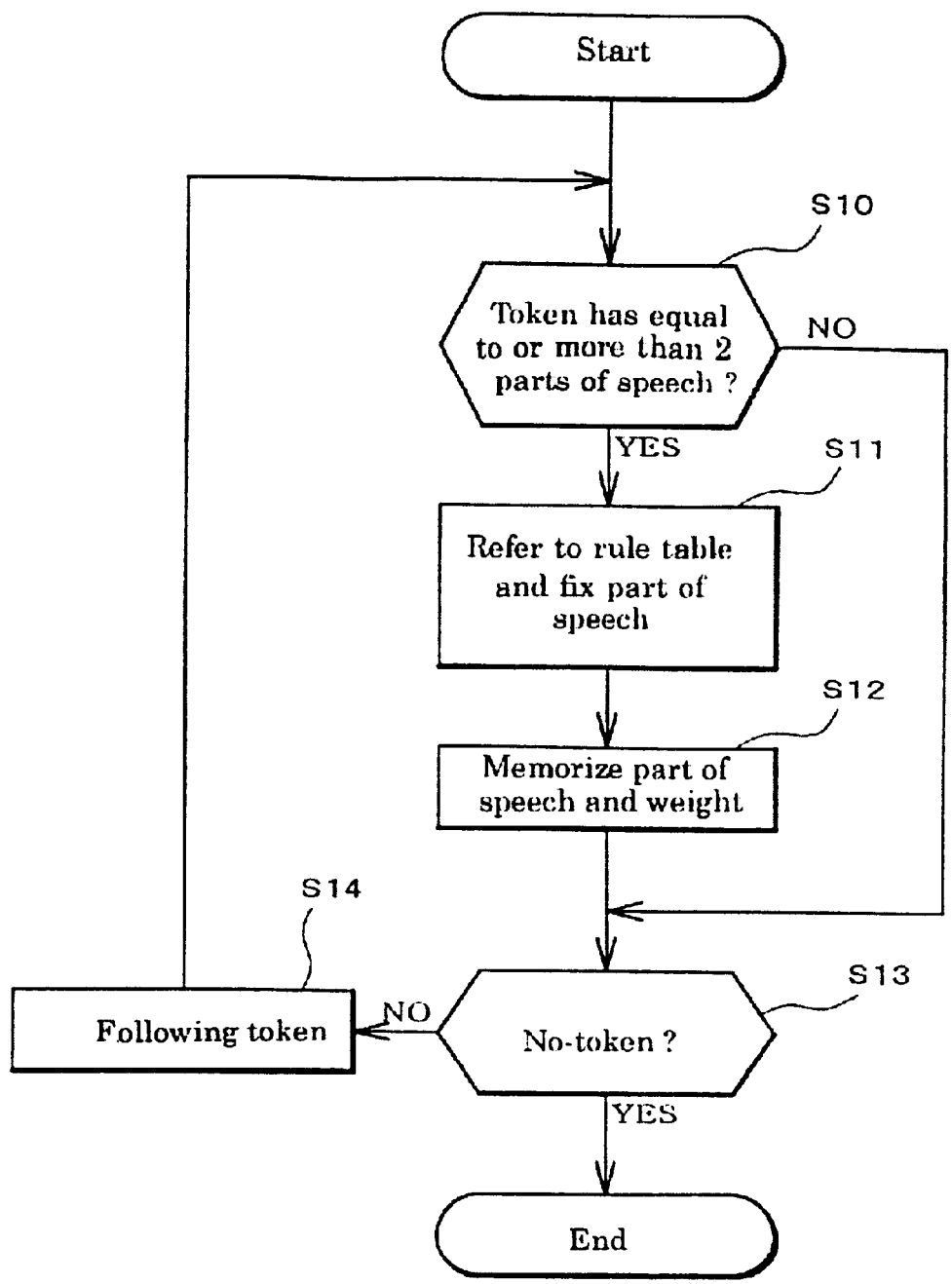
FIG. 10 is the flow chart which shows the program of the choice processing of part of speech.

5.4 The Decision of the Part of Speech Which Uses the Token Which is Situated Before and Behind Next, CPU 12 fixes a part of speech about the token which has equal to or more than 2 parts of speech (step S7). The detailed flow chart of the part of speech decision is shown in FIG. 10. First, it judges whether or not "boku" has equal to or more than 2 parts of speech with step S10. The part of speech of "boku" is already fixed as the general noun.

Next, it processes the following token "wa" via steps S13, S14. Token "wa" has equal to or more than 2 parts of speech. In other words, rule table B(45) is memorized. It advances towards step S11. It refers to rule table B(45) with step S11.

Rule table B(45) is memorized at hard disk 14. The details are shown in FIG. 11. Equal to or more than 2 rules (NO.1–NO.3) are memorized at this rule table. First, the rule of NO.1 is read. The rule of NO.1 shows the following. The case that the token on the left side corresponds to the following either "Nominative particle", "Indirect case particle", "Postposition", "Adverb". At this case, token "wa" is fixed as "Underlying particle".

Here, CPU12 reads the part of speech of token "boku" on the left side (FIG. 9A). The part of speech of "boku" is the general noun and is not above-mentioned part of speech. The rule of NO.1 doesn't correspond.

In the same way, CPU12 refers to the rule of NO.2, NO.3. Here, the rule of NO.3 corresponds. The part of speech of "wa" is the nominative particle. CPU12 memorizes a fixed part of speech at hard disk 14 (step S12). In other words, the nominative particle "wa" is memorized as shown in FIG. 9B.

Moreover, Weight "1" of rule NO.3 is acquired by CPU12 and it memorizes it (FIG. 9B). This weight shows the degree of part of speech decision's sureness.

In this implementation example, the information lack is "0", the correctness is "1", a little correctness is "2" and the non-correctness is "3". By giving such weight beforehand, the correctness can be secured to various processing after analysis(e.g. translation).

In the same way, it processes about all tokens (steps S13, S14). In this example, the token which has equal to or more than 2 parts of speech is only "wa". The last memory contents become like FIG. 9B.

This sentence, "Bokuwa gakkoue ikimasu" (I go to school), was divided into each token, and a part of speech was given to each token. The division into the token, the giving of a part of speech and the analysis of the attribute become the basis of the analysis of the structure of the sentence and the analysis of the role (step S9). When translating into the other language, too, the information of the part of speech and the information of the attribute are very important.

For example, it supposes that it translates into English based on these information. It puts the general verb root "i" to "go" in the correspondence. Moreover, it fixes an equivalent based on the attribute which is shown in FIG. 27B. In this case, because it has "non-proceedingness" "politeness" "definite" as attribute, an equivalent "go" is chosen.

For example, "proceedingness" is gotten to "ittuta". As the result, an equivalent "went" is gotten. Also, "continuation" is gotten to "ittuteimasu". As the result, an equivalent "be going" is gotten. In other words, when translating into each language, the analysis result of the above implementation example becomes common information. It is so-called pivot method. This way makes it possible to translate correctly among numerous languages.

Of course, to use an analysis result for the translation system is the example. Besides, too, it is possible to use for a language education system and so on, too.

The rule table which was illustrated by fixed a part of speech, referring only to the token on the left. However, the other rule table refers to the token on the right, too. Also, it sometimes refers only to the token on the right, too. To fix the part of speech of the concerned token, it refers to back and forth the token according to the necessity (It may contain the token which equal to or more than 1 left).

Also, it isn't sometimes possible to fix as one part of speech. In this case, it fixes a part of speech using the analysis result of the local composition and the whole composition.

5.5 The Analysis Example of the Part of Speech and the Attribute by the Other Illustrative Sentence Next, using a sentence "Fumotoni chikai kono murawa kesikiga utukusikattuta" (The scenery of this village which is near the foot was beautiful.), above-mentioned analysis is explained. First, it executes the steps S2, S5, S6 of FIG. 7 (It executes S3, S4 about the verb and the predicative adjective). It divides into the token as shown in FIG. 12A and it acquires a part of speech. Incidentally, "i" "kattuta" which is the suffix of the predicative adjective is analyzed using the table like the verb suffix. Incidentally, the attribute of "i" "kattuta" is linked together by the analysis file of FIG. 12A but it omits illustration.

It refers to the flow chart of FIG. 18, FIG. 19 and the analysis processing of the suffix is explained. First, after acquiring the predicative adjective root "chika", it analyzes the suffix (steps S3, S4 of FIG. 7). In this implementation example, the table of the predicative adjective suffix is table F (The part is shown in FIG. 24). It referred to "i" from table F. It is memorized as follows in attribute buffer. "Proceedingness" is "−". "Accompaniment" is "−". Also, "Definite", too, is memorized in attribute buffer (step S23).

There is not indication of "Beginning" "Finite" "Non-finite". It advances towards step S30 via steps S25, S28, S29. In step S30, it judges whether or not the following token is in the table C(C(1) C(2)) of the suffix. Here, the following token "ko" "kono" "kono murawa" is not in table C. It advances towards steps S38, S39.

It memorizes the contents of attribute buffer in the analysis file with step S39. Incidentally, it memorizes the attribute "−" of the default about the attribute that there is not indication in attribute buffer. At this point, it is the same as the case of the verb suffix. But, as for the predicative adjective suffix, only five basic attributes are set (above-mentioned table 3). The attribute of memorized "i" is shown in FIG. 28A. As above mentioned, the suffix "i" is fixed and the attribute is analyzed. Like the above, "kattuta" is fixed as the suffix. The attribute is memorized in the analysis file like FIG. 28B.

Next, as for the attribute of the predicative adjective suffix, the other word:

"tanosikunarimasu" (becoming delightful) is explained as the example. "Tanosi" is judged to be the predicative adjective root with the part of speech dictionary. Next, it refers to the table F of FIG. 24 and it refers to the suffix "kuna". The column of "Independent suffix" of "kuna" is "Yes (beginning)". Therefore, it is fixed as the suffix and it memorizes an attribute as shown in FIG. 29A. Also, "kuna" is "Non-finite" (FIG. 19, step S28). As for the following token, it refers to the column of table D "r".

It finds "ri" from table D. "Same time" once is memorized about "ri" in attribute buffer (step S23). However, the contents are erased in step S35 and as for "ri", an attribute isn't memorized in the analysis file (step S36).

Moreover, it refers to the following tables C(2), S(v). Then, it finds "masu" (step S21 reference). But, this case uses the result because it has referred already about step S30. Then, it memorizes an attribute as shown in FIG. 29B.

Incidentally, "kuna" analyzes five basic attributes because it is in the table of the predicative adjective suffix. "Masu" analyzes 13 basic attributes because it is in the table of the verb suffix.

Incidentally, in above-mentioned implementation example, it memorizes "ri" and "masu" respectively in the analysis file as one suffix. Then, if there is an attribute, it memorizes each attribute.

Moreover, there is the following way, too. It makes one suffix "rimasu". Then, it memorizes in the analysis file and it memorizes an attribute. In this case, it makes the contents of attribute buffer about "ri" and the contents of attribute buffer about "masu" one. Then, it makes this attribute buffer about "rimasu". Because "ri" doesn't have an attribute in this example, the attribute of "masu" becomes the attribute of "rimasu". Incidentally, equal to or more than 2 suffixes sometimes have an attribute respectively.

In this case, it memorizes the attribute which was memorized in attribute buffer of either one suffix in attribute buffer as the whole attribute. But, as for the attribute of "Accompaniment", it makes the attribute of the last suffix the whole attribute.

It memorizes the contents of attribute buffer of "rimasu" here in the analysis file. Now, it memorizes default "−" to the attribute of the blank.

Moreover, there is a way of making "kuna" "ri" "masu" one suffix "kunarimasu", too. In this case, "kuna" has five basic attributes and "rimasu" has 13 basic attributes.

Here, it returns to the illustrative sentence "Fumotoni chikai kono murawa kesikiga utukusikattuta" (The scenery of this village which is near the foot was beautiful.) and it carries forward an explanation. It acquires a part of speech about all tokens which contain the suffix like FIG. 12A.

Next, it fixes the part of speech of the token which has equal to or more than 2 parts of speech with step S7 of FIG. 7. First, it refers to the rule table B(43) about token "ni". The details of rule table B(43) are shown in FIG. 13. Next, it examines about rule 1. In rule 1, the token on the left is "Verb non-accom". This "Verb non-accom" is the verb which isn't accompanied by the other predicate. Here, "the verb root+the verb suffix" is "the verb". This shows to use two tokens "the verb root and the verb suffix" for the standard of the judgement. In other words, there is a case which uses equal to or more than 2 tokens for the standard of the judgement, too. Also, rule 1 shows the case which has the rule which added a element except the part of speech. The element except the part of speech in this case is "Verb non-accom".

Because the token on the left is the general noun here, rule 1 doesn't correspond. Rule 2 is applied. That is, a part of speech is fixed as "Ni-particle". Also, the weight is memorized as 2.

In the same way, as for "wa", it refers to the rule table B(45) of FIG. 11. Then, it is fixed as "Wa-particle". The weight is memorized as 1. Also, as for "ga", it refers to the rule table B(44) of FIG. 14. Then, it is fixed as "Ga-particle". The weight is memorized as 1.

A sentence, above mentioned "Fumotoni chikai kono murawa kesikiga utukusikattuta" (The scenery of this village which is near the foot was beautiful.) is analyzed. The division of the token and the part of speech of each token are memorized at hard disk 14 as the analysis file as shown in FIG. 12B.

Incidentally, there is a case which must not fix the part of speech of the concerned token by back and forth the token in the case that the same part of speech continues. For example, it is the following illustrative sentence.

"Kurumawa tuneni jinsoku kakujitu katu anzenni untensiyou" (Let us always drive a car quickly, surely and safely.) The part of speech which was acquired from a part of speech dictionary is shown in FIG. 17A. Here, as for the decision of the part of speech of "wa", it is same as the above. That is, it refers to the rule table B(45) and it fixes a part of speech. Next, to fix the part of speech of "jinsoku", it reads rule table B(6) (FIG. 25 reference). However, don't fix a part of speech based on the part of speech of token "kakujitu" on the right. It becomes wrong when fixed based on the part of speech of "kakujitu".

Figure 26:
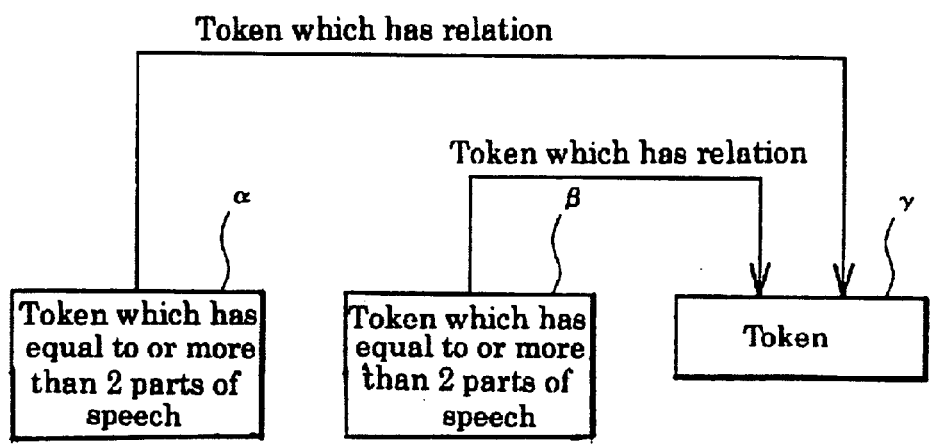
FIG. 26 is the figure which explains the processing to execute when the same part of speech continues.

This is explained with FIG. 26. When the tokens, of the same part of speech continue, tokens, are related with token respectively. Therefore, when applying the table B(6) of FIG. 25 about token, the token on the right becomes. In this way, when the token of the same part of speech continues, it uses the part of speech of the token which is situated on most the right. When fixing a part of speech about "jinsoku", it is not the part of speech of "kakujitu" and it decides by the part of speech of "anzenni". In the same way, "jinsoku", too, is fixed by the part of speech of "anzenni". A gotten part of speech is shown in FIG. 17B. Incidentally, after setting a part of speech like FIG. 17B, it may make "Kurumawa" one quasi word. Such processing is appropriately chosen by the contents of the analysis.

5.6 The Other Processing

FIG. 15 and FIG. 16 show the part of the other table. Tables B(1), B(2) are the table which is used by the sentences of so-called substantive stopping. These tables handle "a noun" immediately ahead of the period as the predicate.

A verb is divided into the verb root and the verb suffix. Then, each becomes one part of speech. Also, in the same way, the predicative adjective is divided into the predicative adjective root and the predicative adjective suffix. Then, each becomes one part of speech. With this, the processing which specifies the suffix with the table becomes possible.

Next, the processing of the idiomatic word of "ikukamosirenai" (it may go) and so on is explained. In this case, it is divided into the general verb root "i", the general verb suffix "ku" and idiomatic word "kamosirenai". Then, it handles idiomatic word "kamosirenai" like the suffix and it incorporates it into the table of the verb suffix. This is because the idiomatic word has the function which is the same as the verb suffix. The example of the table of the suffix to have incorporated an idiomatic word into is shown in FIG. 22. If being beforehand in this way, the analysis of the idiomatic word which continues in verb root or verb suffix becomes easy.

Incidentally, at this table, symbol "," are the meaning of OR and symbol "*" is the meaning of AND. It doesn't sometimes use a letter in the right of "*". For example, it supposes that it is written with (A B)*(C). In this case, the word which can be taken is four of AC, BC, A, B.

It may combine the table of the idiomatic word at the table of the verb suffix. Also, it may prepare the table of the compound verb. As for the compound verb, like "kakituzukeru" (be continuing to write), two verbs are the verb which was made one. In this case, "tuzukeru" is handled as the suffix of "kaki". That is, it handles as the suffix after the verb which ends at the "i" line. In the implementation example, it prepared the table of this compound verb as table S(V) (FIG. 23 reference). In other words, it is made an incorporation by the table of the verb suffix. However, it may separate. When the verb continues in the verb, it accesses the table S(V) of the compound verb of FIG. 23. By this, it realizes the high-speed-ization of the processing.

By the way, as for the verb of "suru" and "kuru" and so on, the word root has changed. If applying the point of view of this invention, the verb root doesn't exist. As for such a verb, it registers each verb root on the part of speech dictionary. At the same time, it memorizes the table number which continues next. FIG. 8 shows this ("ki" "kuru" "koi" "koyo").

Incidentally, in the above implementation example, it mentions the suffix which contains the auxiliary verb in the table of the predicative adjective suffix (Then, it gives "the existence of the auxiliary verb" as the attribute). By this, it gets the quickness of the reference. However, it may memorize the auxiliary verb at the part of speech dictionary.

Also, in the above implementation example, it receives sentences data, it divides this into the token and it executes the decision of the part of speech and an attribute analysis. However, it receives the sentence which was beforehand divided into the token and it may execute the decision of the part of speech and an attribute analysis.

6. The Analysis of the Structure and the Role of Sentence 6.1 The Explanation of the Terminology First, the terminology to use below is explained.

"Predicate": It means the token which corresponds to following a–e.
- a) "The general verb root" and "equal to or more than 1 suffix"
- b) "The copula root" and "equal to or more than 1 suffix"
- c) "The auxiliary verb root" and "equal to or more than 1 suffix"
- d) "The predicative adjective root" and "equal to or more than 1 suffix"
- e) "The noun which is immediately ahead of T-interval"

"Definite predicate": It is the predicate that the last suffix has "definite". It is the predicate which isn't accompanied by the other predicate too.

"Finite predicate": It is the predicate that the last suffix has "finite". It is the predicate which is accompanied by the other predicate too.

"Simultaneous predicate": It is the predicate that the last suffix has "same time". It is the predicate which is accompanied by the other predicate too.

"Quasi word": It is the token that equal to or more than 2 tokens continued.

"Syukakuga" or "Nounga": It is the mark which is given to the quasi word that the token that the part of speech is "a noun" and the token that the part of speech is "Ga-particle" is continued. In the sentence pattern analysis, it has role of "the subject" and "the topic". In the local structual analysis, it has the role of "the nominative".

"Syukakuwa" or "Nounwa": It is the mark which is given to the quasi word that the token that the part of speech is "a noun" and the token that the part of speech is "Wa-particle" is continued. In the sentence pattern analysis, it has role of "the subject" and "the topic". In the local structual analysis, it has the role of "the nominative".

"Main sentence": It is the sentence which has the central meaning of the whole sentence.

"Subordinate sentence": It is the sentence which explains a main sentence.

6.2 The Analysis of the Structure and the Role of Sentence (The Point of View)

In this implementation form, first, it analyzes the role which is fixed by the connection of each token and the connection of each quasi word. Since then, this token or this quasi word is called "token". Also, the role of the token is called a local structual role (sub-role). In case of this analysis, it predicts the sub-role of the token which a sub-role isn't fixed, as using the token which a sub-role was already fixed. It is called the token which the sub-role has fixed a fixed token since then. Then, the token which a sub-role isn't fixed are called an un-fixed token. Also, when equal to or more than two tokens have one role, it makes these tokens quasi word.

In the implementation form which is shown below, it predicts the role of the previous un-fixed token by the back fixed token. In case of analysis of this sub-role, it doesn't consider the structure of the whole sentence. It analyzes simply in order from the back token to the previous token.

First, it fixes a sub-role. After that, it analyzes the whole structure. The sentence which is shown in FIG. 30A is composed only of main sentence. In such a sentence, the role can be easily fixed with the appearance number of times and the position of the "syukakuga(wa)" "predicate". It is the sentence pattern table of FIG. 54, FIG. 55 that made this a pattern. Incidentally, in the figure, the part of" "shows to have omitted token. The token which can be inserted in the part of "+" are "non-predicative adjective" "nounno" "noun-deno" "nounna".

Figure 30B:
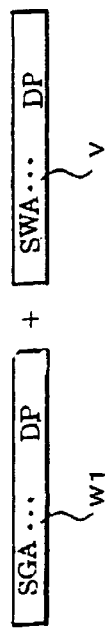

If being the sentence which is constructed by subordinate sentence WI and main sentence V like FIG. 30B, it analyzes as follows. The main sentence is always situated in the end of the sentence. Using this rule, it finds subordinate sentence W1. It analyzes by the sentence pattern table to this subordinate sentence W1. Next, it analyzes by the sentence pattern table to main sentence V. Incidentally, it is possible to analyze by repeating similar processing even if the number of the subordinate sentences increases.

Figure 31A:
FIG. 31A–FIG. 31C are the figure which explains the processing of a subordinate sentence.

Next, the analysis of the sentence which contains "a reading point" is explained. The reading point is ",". It uses in Japanese sentence. It corresponds to "comma" in English sentence. In this implementation form, at the case that "the reading point" exists among "syukakuga(SGA)" or "syukakuwa(SWA)" (represented as "syukakuga(wa)" SGA (WA)) and "the definite predicate (DP)" which is the nearest in this right, both isn't related. It supposes that "a reading point" is between "syukakuga(wa)" and "the definite predicate". In this case, as the arrow P of FIG. 31A shows, both doesn't have relation. It is related with "the definite predicate B(DP-B)" or "the definite predicate C (DP-C)" on the right. The arrow Q of FIG. 31B and the arrow T of FIG. 31C show this.

Figure 30C:

In this implementation form, the arrow P of FIG. 31A makes a mistake in the way of using the reading point. "The reading point" is used according to above-mentioned rule. The sentence of FIG. 30C is analyzed as follows. If there is "the reading point", the subordinate sentence always exists on just the right. First, it finds the subordinate sentence W1 which is behind "the reading point" and it extracts subordinate sentence W1. If there is "syukakuga(wa)" in subordinate sentence W1, it analyzes by the sentence pattern table. If there is "syukakuga(wa)" in main sentence V, it analyzes by the sentence pattern table.

Figure 30D:

Next, the case which has equal to or more than two "reading points" is shown in FIG. 30D. First, it finds the subordinate sentences W1, W2, W3 which are behind "the reading point" and analyzes about each. It analyzes main sentence V lastly. In this way, for the complicated sentence, too, it is possible to analyze efficiency well and moreover correctly.

Figure 30E:
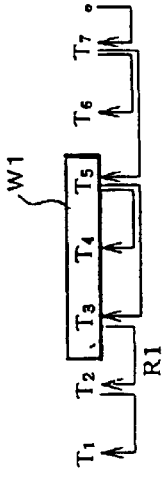
Figure 30F:

In case of analysis of the sub-role, it didn't consider the structure of the sentence. The sentence of FIG. 30E is composed of token T1–T7 and has subordinate sentence W1. The sub-role of this sentence is predicted like the arrow. Each token is set in the relation and a sub-role is gotten. However, the problem occurs. It is relation between T2 and T3 which arrow RI shows. Token T2 is predicted by token T3. Token T3 is the token of subordinate sentence W1. However, right relation is gotten in the condition which doesn't have a subordinate sentence. If there is a subordinate sentence, the relation of each token isn't reflected right. That is, if subordinate sentence W1 is extracted, T2 and T3 aren't related. Therefore, the arrow RI of FIG. 30E becomes not appropriate. Therefore, if un-appropriate processing like arrow RI is found by the analysis of the sentence structure, it deletes the sub-role of token T2. That is, it misses subordinate sentence W1 from the object. After that, again, it analyzes a sub-role. By this processing, the right relation of token T2 and a sub-role are gotten. An example is shown in FIG. 30F.

By the way, at the case which has "parentheses" in the sentence, the way of analyzing a sentence about the concerned "parentheses" as the independent sentence is sometimes right. If fixed condition exists, it analyzes particularly as the independent sentence. Incidentally, here, the parentheses mean ( ) " " { }[ ] and so on.

6.3 The Analysis of the Structure and the Role of Sentence (The Processing Contents)

Next, while referring to FIG. 32, this analysis processing is explained concretely.

"Bokuwa gakkoue ikimasu" (I go to school.)

It makes this sentence an illustrative sentence and it is explained. The result of the part of speech decision is shown in FIG. 9B. CPU12 makes this the tree form of FIG. 47A. Then, it memorizes at hard disk 14 as the analysis file. Incidentally, "T-interval" is the token which is situated in the end of the sentence. That is, if there is "T-interval", it means the end of the sentence. "The period", "?" and "!" and so on correspond. As the attribute of "masu", it memorizes the attribute of FIG. 27B.

Figure 48A:
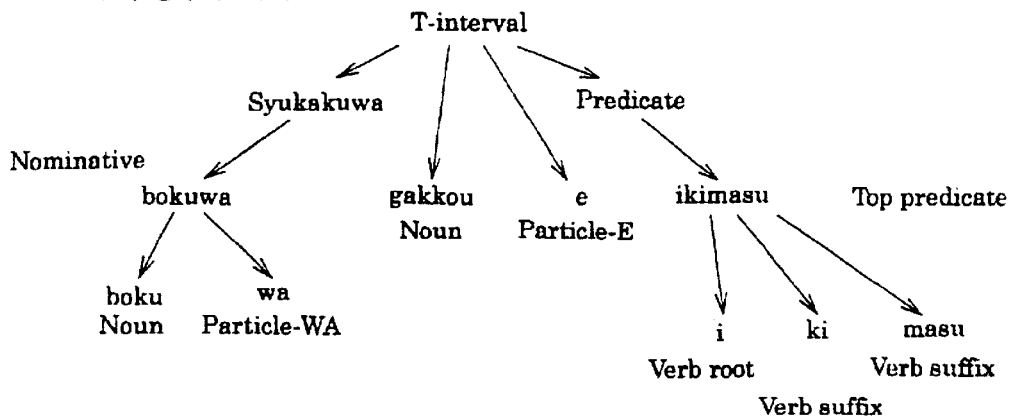
FIG. 48A–FIG. 48C are the figure which shows the progress situation about the analysis of the sentence structure and the analysis of the role.
Figure 48B:
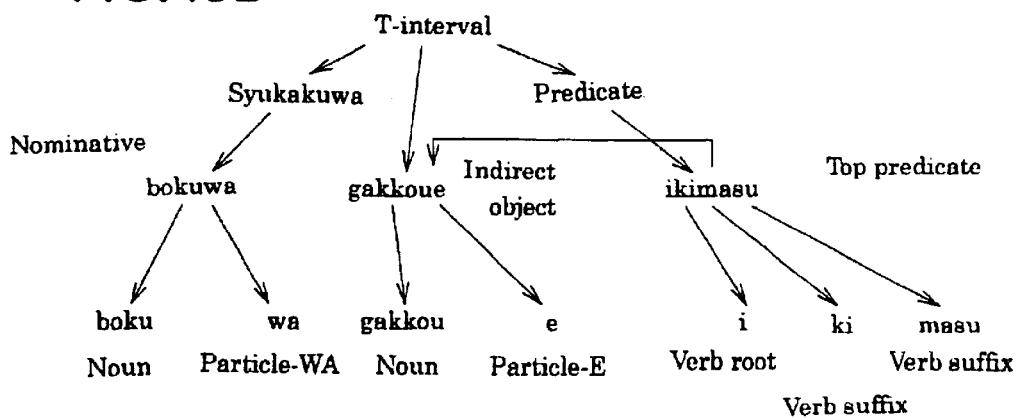

First, it analyzes a local structural role (sub-role) in step S40 of FIG. 32. In case of this analysis, it predicts the sub-role of the token which a sub-role isn't fixed by the token which a sub-role was already fixed. By this, it gets a sub-role about all token which compose a sentence. This is shown in FIG. 48B. "Nominative" is given to "Bokuwa". "General indirect object" is given to "gakkoue" and "Top predicate type II" is given to "ikimasu". Incidentally, as for the processing of a sub-role decision, it is in detail explained behind.

Next, it judges whether or not there is "a reading point" in the sentence (step S41). But, it removes "a reading point" in "the parentheses" from the object. In other words, when there are "parentheses", it judges whether or not there is a reading point out of "the parentheses". Here, "the parentheses" mean ( ) " " { }[ ] and so on.

There is a case which has multiple "parentheses". In this case, it makes "the parentheses" which are outside abovementioned "parentheses".

If there is "a reading point", there is always a subordinate sentence. First, it processes the subordinate sentence which is related with the reading point. It makes the reading point which is on most the right in step S42 the noticeable reading point (NRP). But, it doesn't deal with a reading point in the parentheses.

Next, it judges whether or not there is a sentence which has "parentheses" (step S43). If there is not such a sentence, it misses all "parentheses" which are on the right from the noticeable reading point from the object of the processing (step S44).

Next, it extracts "the definite predicate on the right of the noticeable reading point" (RDP) from the noticeable reading point as the subordinate sentence (step S45 and subordinate sentence W3 of FIG. 30D). Using the sentence pattern table of FIG. 54, FIG. 55, it gives the role (main role) of the sentence pattern to the extracted subordinate sentence (step S46).

Next, it misses an extracted subordinate sentence from the processing object (step S47). In this implementation form, it misses a subordinate sentence from the object and it leaves only a main sentence last. Next, it judges whether or not there is a token which predicted a sub-role in the part which was removed from the object (step S48). If being, it deletes the sub-role of the predicted token (step S49). Then, it returns to step S40 and it gets a sub-role. In other words, as the sentence which doesn't have the part which was removed from the object, it redoes the prediction of the sub-role. If there is a subordinate sentence, the right sub-role can not be gotten.

However, there is a simple way, too. This is explained with FIG. 30E. It doesn't change the role of token T2. Then, it makes be related with the predicate T7 which is situated behind W1. The same result is won in being so. Because, even if it re-executes, the role doesn't change. To change is only relation among the token. Therefore, in case of actual processing, it makes the role of the token just as it is.

Then, it makes be related with the nearest predicate. Right processing is won in this.

After that, as for the part which is dealt with for the processing, again, it executes the processing of step S41. Then, in order, it misses the subordinate sentence which is related with the reading point from the object. As a result, the sentence which doesn't have a reading point is gotten. Next, it advances towards step S50, step S51 from step S41. As for step S51, it analyzes the subordinate sentence (for example, the subordinate sentence W1 of FIG. 30B) which isn't related with a reading point. After that, it analyzes a left main sentence (step S52). The analysis processing of a sentence ends in this.

Incidentally, if there are "parentheses" which need independent processing (step S43), it processes "the parentheses" of step S53. In step S43, it judges whether or not there is a following row.

"the reading point" "the right parenthesis" "the definite predicate" "the left parenthesis" "predicat" "

Here, there may be equal to or more than 1 token in the part of and also there may are not a token.

Incidentally, in the multiple parentheses, "the parentheses" mean "parentheses" outside.

As for step S53, it extracts the sentence which has "parentheses" and it misses "parentheses" from the object. Next, as for this extracted part, it analyzes the structure and the role of the sentence (step S54). In other words, it executes the processing of FIG. 32 from the beginning. But, because it has executed step S40, it executes from step S41. When this analysis ends, it removes an extracted part from the processing object and it makes the part of the remainder a new object (step S55). Next, it judges whether or not there is a token that a sub-role was predicted by the token in the part which was removed from the object (step S48). If there is a predicted token, it deletes a sub-role (step S49). Then, it returns to step S40 and it gets a sub-role again. After that, it executes the processing of step S41 again about the object part. Incidentally, in the sentence which has "a reading point" only in "the parentheses", it advances towards step S50 from step S41. Then, it misses parentheses outside from the object (step S56) and it executes the processing of step S41. In other words, it processes the reading point which is in the parentheses.

Figure 48C:
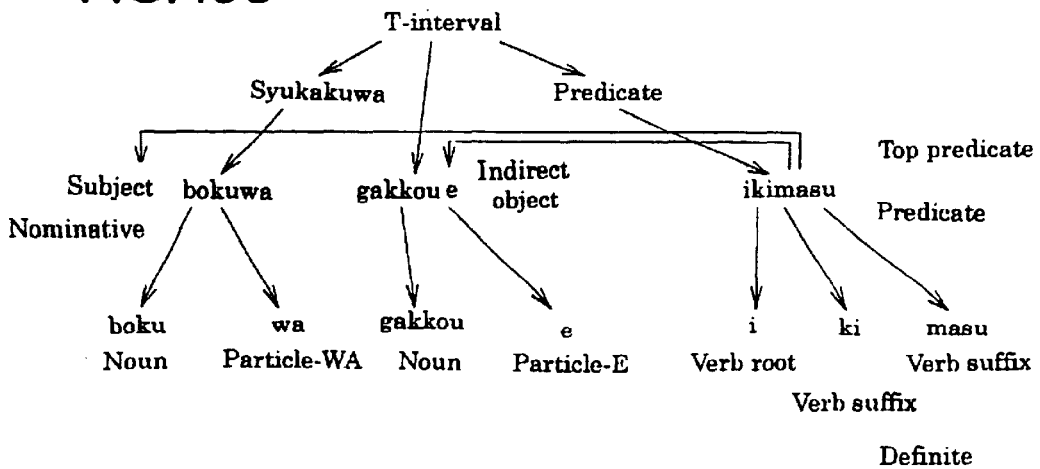

Incidentally, there are not the reading point and parentheses in "Bokuwa gakkoue ikimasu". At once, it executes steps S51, S52. The result is shown in FIG. 48C. "Subject" is given to "Bokuwa". "Predicate" is given to "ikimasu". The role of the sentence pattern (main role) is fixed in this way. Incidentally, as for the analysis of the role of the sentence pattern, later, it is in detail explained.

6.4 The Correct Extraction of the Subordinate Sentence

By the way, as for the above, it extracted a part from "the noticeable reading point" (NRP) to "the definite predicate on the right" (NDP) as the subordinate sentence (FIG. 32, step S45).

As follows, however, it may extract. If there is a following condition, it extracts a part from "the noticeable reading point" (NRP) to "the definite predicate on the right" (NDP).

1) "noticeable reading point"+"syukakuga(wa)"   "definite predicate"
   "syukakuga(wa)"
2) "noticeable reading point"+"syukakuga(wa)"   "definite predicate"
   "object"
3) "noticeable reading point"+"syukakuga(wa)"   "definite predicate"
   "noun"
4) "noticeable reading point"   "definite predicate"   "syukakuga(wa)"
5) "noticeable reading point"   "definite predicate"   "object"
6) "noticeable reading point"   "definite predicate"   "noun"
7) "noticeable reading point"   "definite predicate"++"modifier of the
   right end of subordinate sentence"
8) "noticeable reading point"   "definite predicate"   "postposition"
9) "noticeable reading point"   "definite predicate"   "definer"

Incidentally, there may are not a token in the part of. Also, there may be equal to or more than 1 token. But, there is not "definite predicate".

There may are not a token in the part of. Also, there may be equal to or more than 1 token. But, there is not "syukakuga(wa)".

There may are "non-predicative adjective" "nounno" "noundeno" "nounna" in the part of "+". The token must not exist in the part of "++". But, there may be "Ka-particle".

6.5 The Analysis of Local Structural Role (Sub-role)

Next, it is in detail explained about the Local Structural Analysis (LSA) of step S40. First, in this implementation form, the list of the role is shown below (incidentally, it was shown about the main role in addition to the sub-role for the explanation).

TABLE 4

(List of the role)

| | |
|---|---|
| 1. | T-interval: The role which shows the end of the sentence |
| 2. | Nominative: The role which shows to be main constituent |
| 2.1 | Subject: The role which shows the main constituent of the predicate |
| 2.2 | Topic: The role which provides the subject a topic |
| 2.3 | Object: The role which shows the purpose of the subject or the predicate |
| 2.3.1 | Indirect object: The role which shows an indirect purpose |
| 2.3.1.1 | General indirect object |
| 2.3.1.2 | Prosubstantive indirect object |
| 2.3.1.3 | Complicated indirect object |
| 2.3.2 | Direct object: The role which shows a direct |
| 2.3.2.1 | General direct object |
| 2.3.2.2 | Prosubstantive direct object |
| 2.3.2.3 | Complicated direct object |
| 2.4 | Pre-copula: The role which shows the main constituent of the pre-copula. |
| 3. | Predicate: The role which explains a subject or the object |
| 3.1 | Predicate type I: Copula, Auxiliary verb |
| 3.2 | Predicate type II: Verb |
| 3.3 | Predicate type III: Predicative adjective |
| 3.4 | Top predicate: The definite predicate which is situated in front of T-interval |
| 3.5 | Top predicate of the subordinate sentence: The definite predicate which is situated in front of Noun |
| 3.6 | Middle predicate: Predicate except the definite predicate |
| 4. | Attribute: The role which explains the attribute of "Noun" which is situated behind |
| 4.1 | Attribute 1: Definite predicative adjective which was predicted by the nominative table |
| 4.2 | Attribute 2: Non- predicative adjective |
| 4.3 | Attribute 3: Adverb which shows a degree |
| 4.4 | Attribute 4: Cardinal numeral |
| 4.5 | Attribute 5: Adverb which explains a Noun |
| 5. | Quasi attribute: The role which explains the attribute of "the Noun" which is situated behind |
| 5.1 | Quasi attribute 1: Subordinate conjunction and No-particle |
| 5.2 | Quasi attribute 2: Verb postposition |
| 5.3 | Quasi attribute 3: Definer |
| 5.4 | Quasi attribute 4: Non-text |
| 6. | Adverbial modifier: The role which modifies "a predicate" which is situated behind |
| 6.1 | Adverbial modifier I |
| 6.1.1 | Adjective adverb |
| 6.1.2 | Simplified adverb |
| 6.2 | Adverbial modifier 2 |
| 6.2.1 | Adverb of manner |
| 6.2.2 | Predicative adjective except Definite predicative adjective |
| 6.3 | Adverbial modifier 3 |
| 6.3.1 | Quality noun |
| 7. | Quasi adverbial modifier: The role which modifies the a predicate which is situated behind |
| 7.1 | Postposition |
| 8. | Modifier: The role which modifies the subordinate conjunction which is behind |
| 8.1 | Modifier of the right end of a subordinate sentence |
| 8.2 | Modifier of the left end of a subordinate sentence |

The analysis of the local structural role (sub-role) is in detail explained using the following illustrative sentence.

"Bokuwa gakkoue ikimasu" (I go to school.)

Figure 47A:
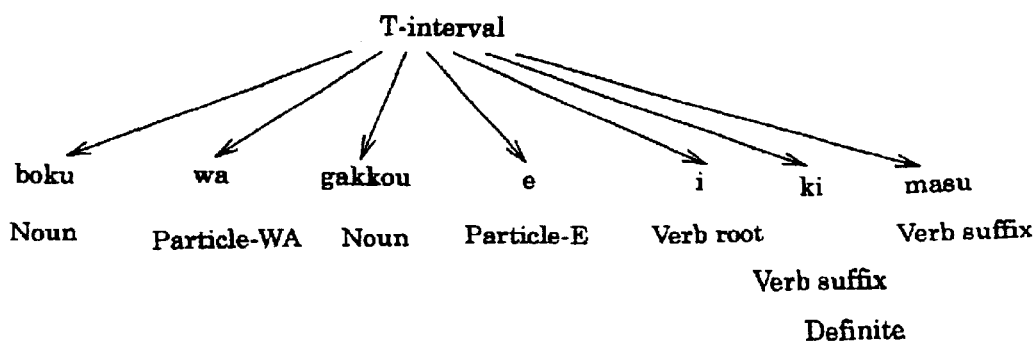
FIG. 47A and FIG. 47B are the figure which shows the progress situation about the analysis of the sentence structure and the analysis of the role.

It refers to FIG. 33. By the decision of the part of speech, the part of speech of each token is memorized at hard disk 14 as shown in FIG. 47A. Incidentally, in case of analysis of the sub-role, "reading point" "parentheses" "midpoint" and so on are removed from the object of the processing. In other words, it assumes that it is the sentence which doesn't have "the reading point and so on", it analyzes a sub-role.

First, in step S60, by the part of speech of each token, it finds the token which agrees with either following condition.

1) The case that "Wa-particle" continues after "Noun" (Nounwa)
2) The case that "Wa-particle" continues after "Defnite predicate"

Figure 47B:
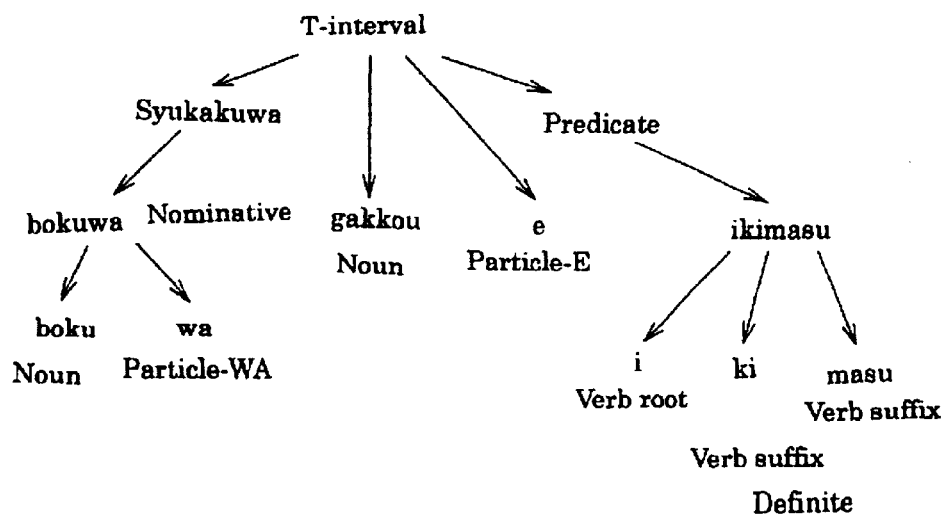

In the illustrative sentence, the first token "Boku" and the 2nd token "wa" correspond to the case that "the Wa-particle" continues after "the noun". Then, it makes "Bokuwa" as one quasi word. At the same time, it puts a mark, "syukakuwa" (FIG. 47B reference). Also, it gives "nominative" as the sub-role. Incidentally, the quasi word means equal to or more than 2 tokens which have one role. Here, it does the processing which makes the quasi word in addition to giving a role.

In the same way, it finds the token which agrees with the following condition (step S61).

3) The case that "Ga-particle" continues after "Noun" (Nounga)

When finding this condition, it gives a mark, "syukakuga". Also, it gives "nominative" as the sub-role.

As for this implementation form, steps S60, S61 correspond to the 1st token extraction means.

Next, it finds the token which agrees with either below condition(step S62).

4) "Verb root" and equal to or more than 1 "suffix"
5) "Copula root" and equal to or more than 1 "suffix"
6) "Auxiliary root" and equal to or more than 1 "suffix"
7) "Predicative adjective root" and equal to or more than 1 "suffix"
8) "General verb" (It is in case of substantive stopping)

When finding these conditions, it gives a mark "the predicate". Incidentally, even if it is the case which agrees with above-mentioned condition 4)–8), "the definite predicate" which was extracted as "syukakuwa" with step S60 doesn't become an object. In other words, it doesn't give "the definite predicate" which was extracted as "syukakuwa" by condition 2) the mark of "the predicate". It is because this definite predicate connects with the particle "wa" and becomes the subject.

In the illustrative sentence, "i" "ki" "masu" is a part of speech, "the verb root" "the verb suffix" "the verb suffix". It makes this "ikimasu". Then, it gives a mark, "the predicate" (FIG. 47B reference).

Next, it acquires the last token and it judges whether or not this is the T-interval (step S63). If not being the T-interval, it advances towards the special processing of a title and so on (step S64). In case of the illustrative sentence, because the last token is T-interval, it advances towards step S65. As for step S65, it judges whether or not the token on the left of the T-interval is "a predicate". When the token on the left of the T-interval is not "a predicate", the processing of substantive stopping is done (step S66). In case of the illustrative sentence, the token on the left of the T-interval is "a predicate" "ikimasu". Therefore, it processes with step S67.

First, it judges whether or not the token that a role isn't gotten exists (step S67). This judgement is done for the token in front from the last token (for the left from the right). In other words, in the illustrative sentence, it is referred to in order of " " "ikimasu" "e" "gakkou" "wa" "Boku". Then, it judges whether or not a role is gotten. Incidentally, because T-interval has the same role in all sentences, it handles as the one which has a role "T-interval". That is, T-interval is a fixed token. Therefore, as the un-fixed token "ikimasu" is gotten.

Figure 36:
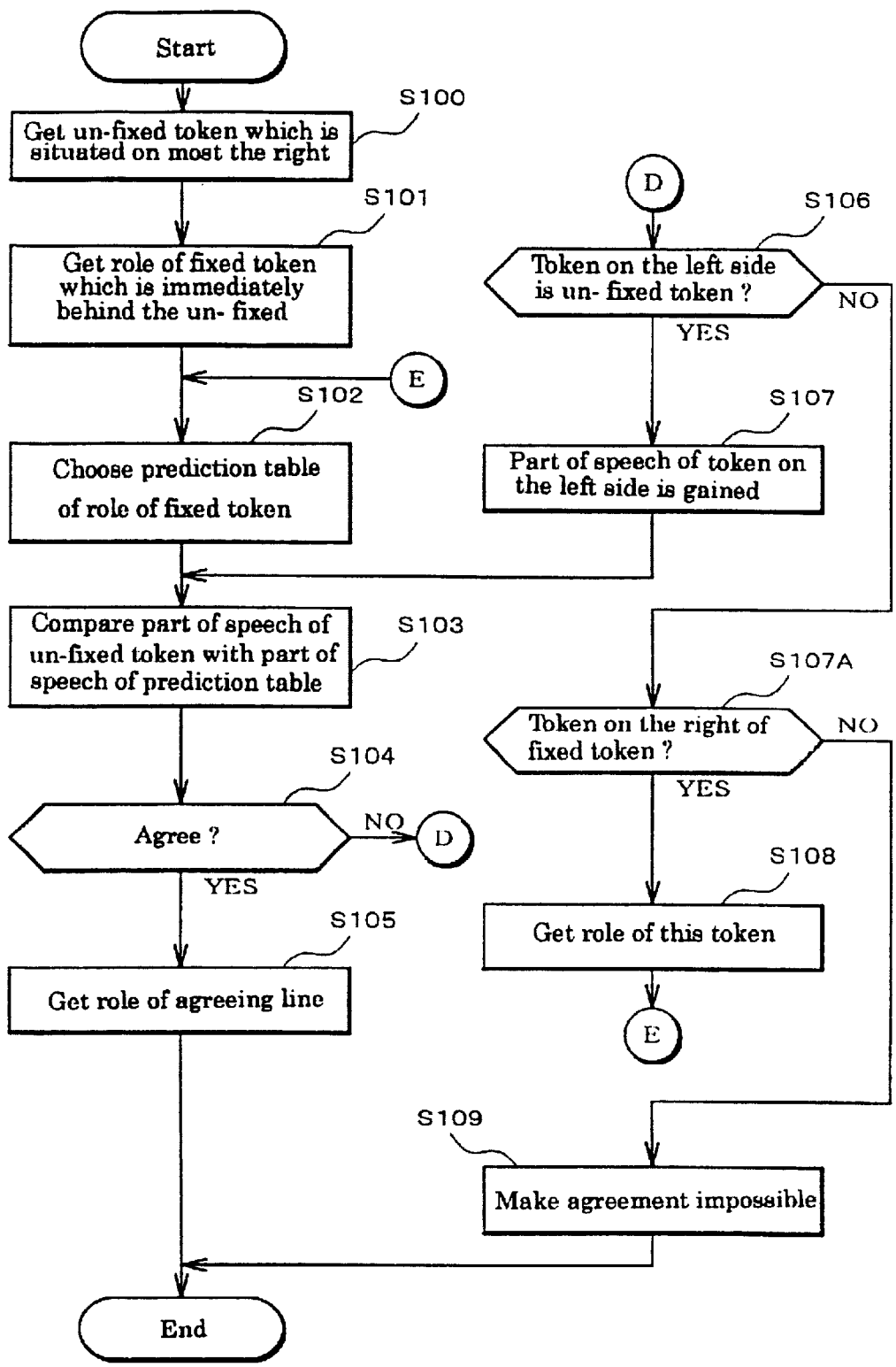
FIG. 36 is the flow chart which shows the prediction of a sub-role.

Next, it gets the sub-role of un-fixed token "ikimasu" (step S68). The processing to predicts a sub-role is shown in FIG. 36. The fixed token which is situated immediately behind un-fixed token "ikimasu" is period (" ") First, it acquires the sub-role of the period (step S101). Here, it acquires "T-interval" as the sub-role.

In this implementation form, using the sub-role of the fixed token, it refers to the part of speech of the un-fixed token. Then, it predictes the role of the un-fixed token. Therefore, the table (the prediction table) which predicts a role according to the sub-role of the fixed token and so on is prepared. In this implementation form, the prediction table which corresponded to the role which is shown in table 4 is prepared.

TABLE 5

(The list of the prediction table)

| | |
|---|---|
| 1. | The prediction table of T-interval |
| 2. | The prediction table of nominative |
| 3. | The prediction table of predicate |
| 4. | The prediction table of attribute |
| 5. | The prediction table of quasi word attribute |
| 6. | The prediction table of adverbial modifier |
| 7. | The prediction table of quasi word-adverbial modifier |
| 8. | The prediction table of modifier |

Based on the sub-role of the fixed token, it chooses the prediction table (step S 102). Here, it chooses the prediction table of "T-interval" (FIG. 49 reference). Next, it judges whether or not the part of speech of the prediction table and the part of speech of the un-fixed token agree. The part of speech of the prediction table is mentioned to the column of morphological feature sequence. A reference is executed in order of number 1, 2 (steps S103, S104). Because "ikimasu" is the general verb ("the definite predicate") which isn't accompanied by the other predicate next, the 2nd line agrees. By this, it acquires "the top predicate type II" from the column of predicted syntactic role (step S105). CPU12 memorizes this in the analysis file as shown in FIG. 48A. Incidentally, the column of "interval" in the prediction table shows the number of tokens which exist between the un-fixed token and the fixed token. In FIG. 49, the intrrval is "0". In this case, the token must not exist among both.

In this way, it gets the sub-role of the un-fixed token. Here, it returns to step S67 of FIG. 33. Then, it judges whether or not there is a token that a sub-role isn't gotten. It gets un-fixed token "e" in the illustrative sentence. Again, it predicts a role by the processing of FIG. 36.

First, it gets the role of the fixed token "ikimasu" which is situated immediately behind un-fixed token "e" (step S 101). "The top predicate type II" is got in this place. Therefore, it chooses the prediction table of predicate which is shown in FIG. 53 (step S102). Incidentally, there is a column of next table address as shown in FIG. 49. As a result, even if it doesn't acquire a role with step S101, the following table can be easily gotten.

Next, it refers to whether or not there is a part of speech of un-fixed token "e" at the column of morphological feature sequence in the prediction table of predicate (step S103).

That is, it refers to whether or not there is "E-particle which is used as the indirect object ". Here, it doesn't correspond. In this case, it advances towards step S106. As for step S106, it judges whether or not the token on the left side of un-fixed token "e" is an un-fixed token. Because "gakkou" is an un-fixed token, it advances towards step S107.

In step S107, the part of speech of the un-fixed token on the left side is gained as "the general noun". Again, it corresponds with the prediction table of predicate. In other words, it corresponds as "the general noun+E-particle which is used as the indirect object". It corresponds at the 24th. Incidentally, a general noun is contained in noun group A (The table 1 reference).

Here, it memorizes "the general indirect object" as the role of un-fixed token "gakkoue" (FIG. 48B reference). Also, it makes "gakkou" and "e" one and it makes them "gakkoue". Moreover, to make communicating relation between "ikimasu" and "gakkoue" clear, it draws an arrow from "ikimasu" to "gakkoue" (FIG. 48B reference).

The part of speech of the un-fixed token doesn't sometimes correspond. In this case, moreover, it includes the part of speech of the un-fixed token on the left. If not corresponding, it increases an un-fixed token. It gives the role which was gotten by the agreement to the whole token which was dealt with. In the role decision, the combination of each token doesn't receive an agreement each other. The combination of each token is free. As a result, it is possible to do correct processing.

Incidentally, there is a case that agreement isn't gotten. For example, there is a token which has been fixed on the left of the un-fixed token. Also, there is not an un-fixed token already. In these cases, it gets the role of the fixed token which is situated immediately behind the fixed token (step S108). Then, it chooses the prediction table with concerned role (step S102). After that, it processes like the above. In this case, too, it draws an arrow for the un-fixed token from the predicted fixed token . With this, the communicating relation becomes clear.

Incidentally, there may be a sentence that there is not a token on the right of the fixed token (step S107A). In this case, it makes agreement impossible and it ends the prediction processing (step S109). As for being general, the agreement never becomes impossible. However, in the missentence, it happens.

When getting "the general indirect object" as the role of "gakkoue" as shown in FIG. 48B, it executes step S67 of FIG. 33. Because a sub-role was gotten here about all tokens, it ends the analysis of the sub-role.

6.5.1 The Special Processing of a Title and so on

Incidentally, in case of the title and so on, there is not T-interval. In this case, before doing usual processing of steps S67, S68 of FIG. 33, it does special processing for the title and so on (step 64). The flow chart of the special processing of this title and so on is shown in FIG. 34.

First, it judges whether or not the part of speech of the last token is "a noun" in step S70. If the part of speech is "a noun", it judges whether or not all tokens are "a noun" (step S71). If all tokens are "a noun", it assumes that all concerned tokens got a role (step 78). When all tokens are "a noun", to analyze a role isn't necessary.

The illustrative sentence: Syushou Konsyun Houbei (The prime minister visits this spring United States of America.)

When all tokens are not "a noun", it makes the role of the last token "nominative" (step S72). Next, it executes sub-role prediction (FIG. 36) using the prediction table of nominative (FIG. 50, FIG. 51))(step S73). If a agreement is gotten gotten by this, it ends the special processing of a title and so on. Then, it does usual processing of the step S67 of FIG. 33.

For example, if being a title, "Hanano Syurui" (the kind of flower), the role can be analyzed by above-mentioned processing. Because the token "Syurui" (the kind) has the role of "the nominative", the role of "Hanano" (of flower) can be predicted.

If it uses the prediction table of nominative, the sub-role isn't sometimes gotten. In other words, when making agreement impossible and ending step S73, it executes step S75. In step S75, the role of the last token is "a predicate". Next, using the prediction table of predicate (FIG. 53), it executes the prediction of the sub-role in FIG. 36 (step S76). If the agreement is gotten by this, it ends the special processing of a title and so on and it does usual processing of step S67 of FIG. 33.

For example, if being a title, "Hanawo Bunrui" (classifying a flower), the role can be analyzed by above-mentioned processing. Because "Bunrui" (classifying) has the role of "the predicate", the role of "Hanawo" (a flower) is predicted.

When judging that the last token is not "a noun" in step S70, it judges whether or not the last token is "a postposition" (step S79). If being "a postposition", it makes the role of the concerned token the quasi word-adverbial modifier (step S80). After that, it does usual processing of step S67 in FIG. 33. In case of not being "a postposition", it makes the last token an un-fixed token. Then, it uses all prediction tables (step S81). If a role is gotten, it memorizes a gotten sub-role as the role of the last token and it ends special processing. After that, it does usual processing of step S67 of FIG. 33.

As above mentioned, it is possible to analyze a role about the title and so on, too.

6.5.2 The Special Processing of Substantive Stopping

Figure 35:
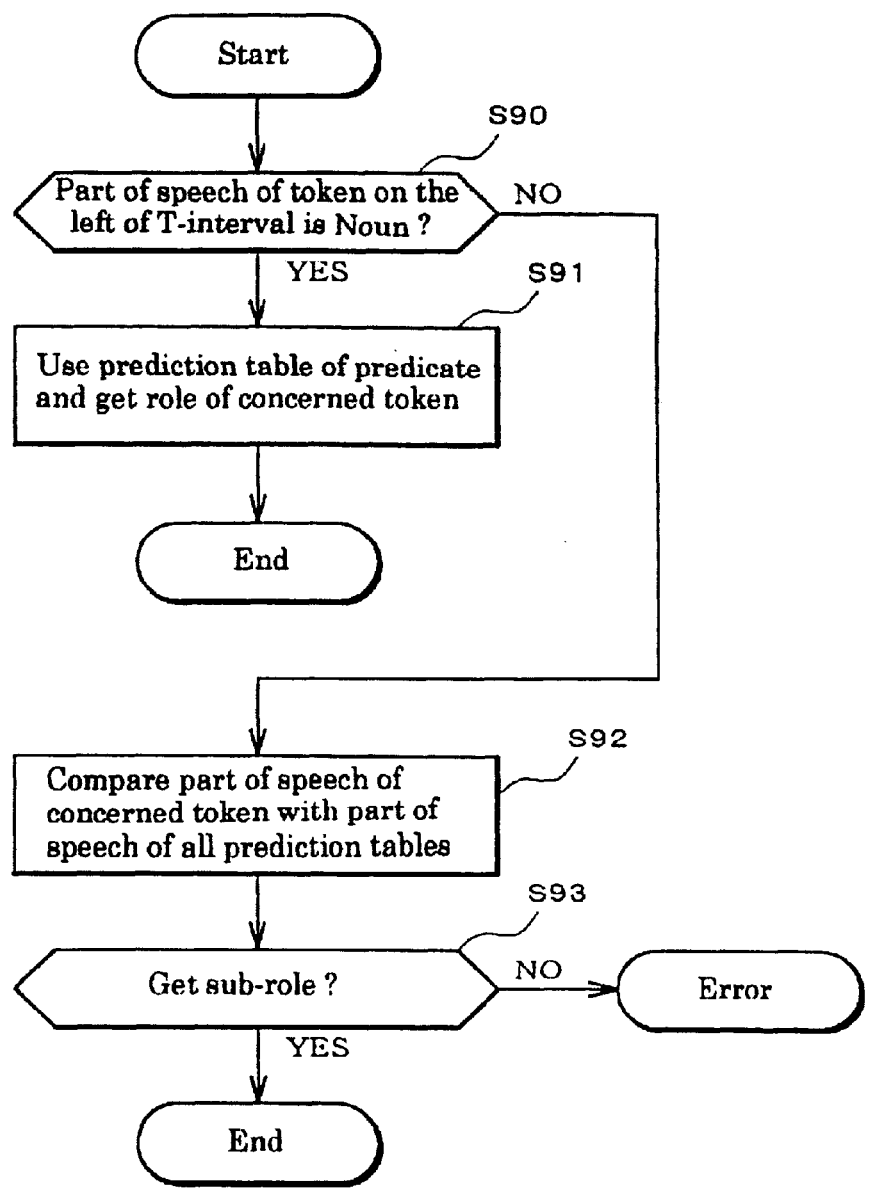
FIG. 35 is a flow chart of the special processing of a substantive stopping.

Next, the case that the token on the left of T-interval is not "a predicate" is explained in the step S65 of FIG. 33. In other words, special processing in the case such as the substantive stopping is explained (step S66). The details of the special processing such as the substantive stopping are shown in FIG. 35.

First, it judges in step S90 whether or not the part of speech of the token on the left of T-interval is "a Noun". If being "a Noun", it uses the prediction table of predicate (FIG. 53). Then, it gets the role of the concerned token (step S91). In case of substantive stopping, there is possible-ness that "a copula" is abbreviated to last.

For example, it is "Kikaino hatumei" (the invention of the machine)

If being this sentence of the substantive stopping, a role is gotten by the above processing. In other words, it is possible to judge that it omits a copula "dearu". When a sub-role is gotten, it does usual processing with step S67 of FIG. 33.

Also, when the part of speech of the token on the left of T-interval is not "a Noun", it makes a concerned token an un-fixed token. Then, it corresponds in the order using all prediction tables (step S92). If a sub-role is gotten, it memorizes a gotten sub-role as the role of the un-fixed token and it ends special processing. After that, it does usual processing of step S67 of FIG. 33.

6.6 The Sentence Pattern Analysis Processing

Figure 37:
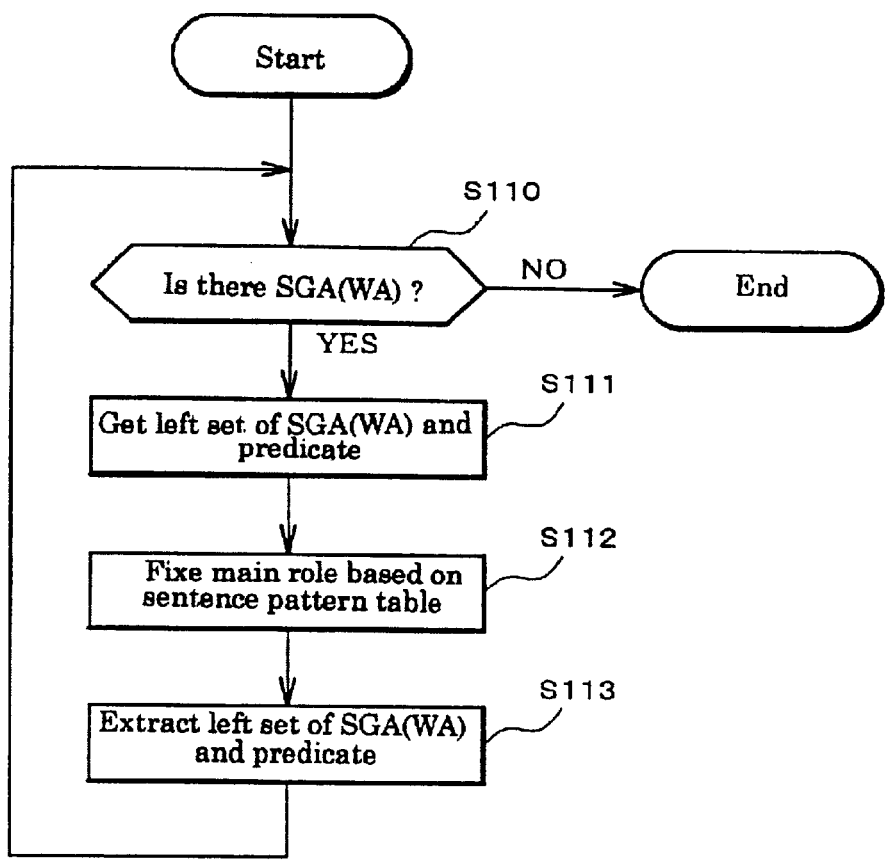
FIG. 37 is the flow chart which shows the sentence pattern analysis.

Next, it is in detail explained about the sentence pattern analysis processing of the step S46 of FIG. 32 (FIG. 37 reference). In case of sentence pattern analysis processing, first, it judges whether or not there is "syukakuga" or "syukakuwa" (hereinafter, write with "syukakuga(wa)") (step S110). Because aren't equipped with the element of the sentence pattern as the minimum unit if there is not "syukakuga(wa)", it doesn't analyze by the sentence pattern and it ends processing.

If there is "syukakuga(wa)", it gets the set of "syukakuga (wa)" and "the predicate" (saying the set of nominative-predicate) which is on most the left. The set of this nominative-predicate means the set of equal to or more than 1 "syukakuga(wa)" and equal to or more than 1 "predicate" which exists on the right of this "syukakuga(wa)".

The illustrative sentence: "syukakuwaa" "syukakugaB" "predicate C" "syukakugaD" "predicate E".

In this sentence, "syukakuwaA" "syukakugaB" "predicate C "becomes the set of the nominative-predicate which is on most the left.

As for the set of this gotten nominative-predicate, it fixes a main role based on the sentence pattern table (step S112). The sentence pattern table which fixes a main role is shown in FIG. 54, FIG. 55. It chooses the same sentence pattern from this sentence pattern table. Then, it gives a main role, the "subjective" "topic" "predicate". At the same time, it gives the arrow which shows relation.

If being "syukakuwaA" "syukakugaB" "predicate C", sentence pattern 4 corresponds. Incidentally, equal to or more than 2 "predicates" sometimes exist in one set of nominative-predicate. In this case, it assumes that "the predicate" is one. Therefore, it becomes sentence pattern 1 even if it is the set of the "syukakuwa" "predicate" "predicate". Then, the role of "the predicate" is given to each "predicate".

Incidentally, there is a sentence pattern which has equal to or more than 2 patterns (Sentence pattern 1(a)(b) and so on). In this implementation form, it chooses an oftenest used pattern. In sentence pattern 1, it chooses (a).

However, as another implementation form, all patterns are shown on the screen: and the work person may make choose. Also, it memorizes beforehand the number of times that each pattern was chosen and it may make a pattern with the highest frequency priority candidacy.

As for this implementation form, it gives "a subjective" "topic" and "predicate" as the main role (The sentence pattern table of FIG. 54, FIG. 55) (The table 4 reference).

It gives a main role with step S112. Next, it extracts a left token (step S113). Again, it executes to this left token. If being above-mentioned example, "syukakugaD" "predicate E" is gotten as the set of nominative-predicate (step S111). Then, the main role of sentence pattern 2 is given (step S112).

After that, it extracts a left token (step S113). There is not "syukakuga(wa)" in the extracted part. At this point, it ends sentence pattern analysis processing (step In this implementation form, it analyzes a role for the front from the back. It may analyze for the back from the front.

6.7 The Processing to Extract a Subordinate Sentence from the Object

Next, it is in detail explained about the processing of step S47 of FIG. 32. Here, it executes the processing to miss a subordinate sentence from the object. Almost, it judges the following condition.

It removes the part which contains "the reading point" (RP) from the processing object.

It removes the part which doesn't contain "the reading point" from the processing object.

Figure 38:
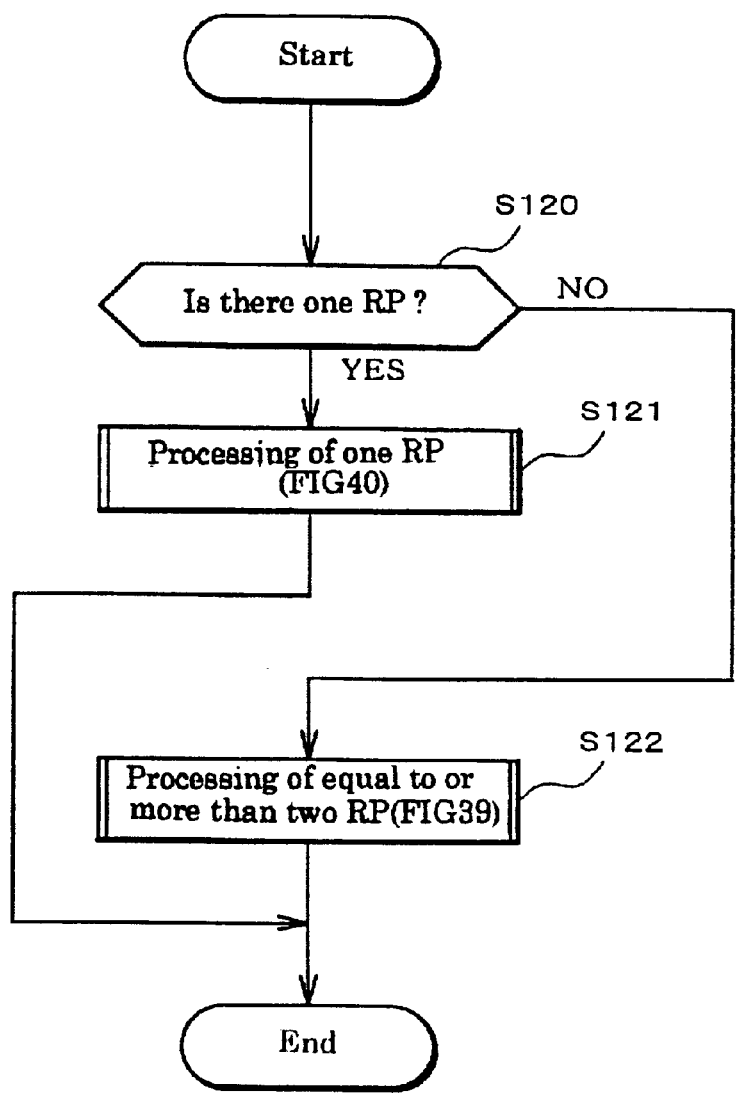
FIG. 38 is the flow chart of the processing to extract a subordinate sentence from the object.

The details of this processing are shown in FIG. 38. First, it judges whether or not there is one "reading point" in the whole sentence (step S120). But, it doesn't put "the reading point" in "the parentheses" in the number.

Figure 39:
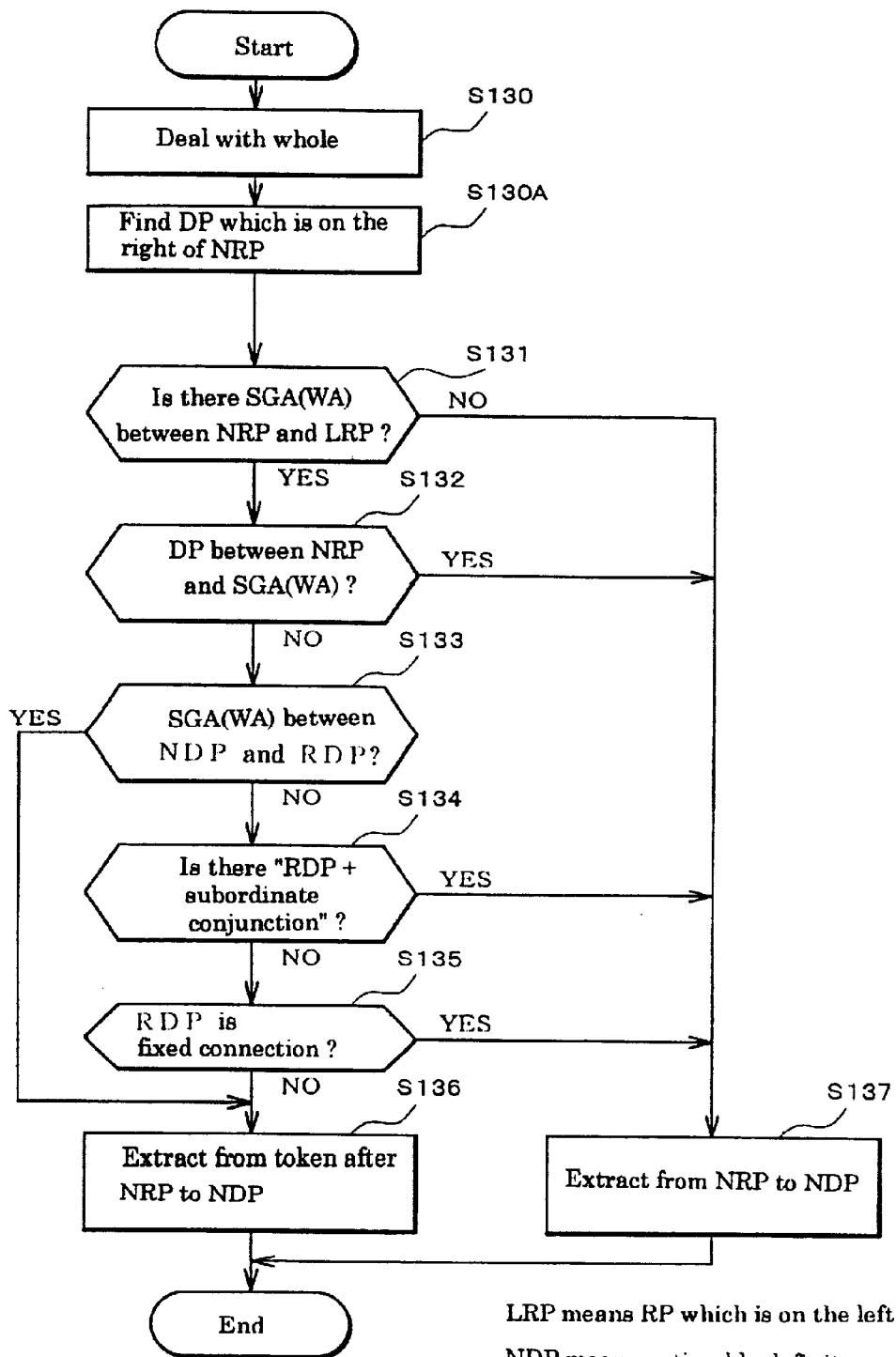
FIG. 39 is the flow chart which shows the processing to make the object-outside when there are equal to or more than two reading points.

First, the processing (step S122) which there are equal to or more than two "reading points" is explained while referring to FIG. 39. It finds "the definite predicate" (DP) which is on the right of "the noticeable reading point" (NRP). It makes this "the noticeable definite predicate" (NDP) (step S130A).

Next, it judges whether or not there is equal to or more than 1 "syukakuga(wa)" among "the reading point" on the left from "the noticeable reading point" (step S131). If not being, it extracts from the noticeable reading point to "the noticeable definite predicate" (step S137). If there is "syukakuga(wa)", it judges whether or not there is "a definite redicate" between the noticeable reading point and the concerned "syukakuga(wa)" (step S132). If being, it extracts from the noticeable reading point to "the noticeable finite predicate" (step S137). If there is not "the definite predicate", it judges whether or not there is "syukakuga(wa)" between "the finite predicate" and "the following definite predicate on the right" (called "the right definite predicate "(RDP)) (step S133). If being, it extracts from the token after "the noticeable reading point" to "the noticeable definite predicate" (step S136). If there is not such "syukakuga(wa)", it judges whether or not there is a row of "the right definite predicate"+"the subordinate conjunction (step S134). Incidentally, the token must not be stored in the part of "+". If there is the row of such a token, it extracts from "the noticeable reading point" to "the noticeable definite predicate" (step S137).

If there is not the row of such a token, it judges whether or not it agrees with the row of either following token about "the right definite fpredicate" (step S135).

| | | |
|---|---|---|
| 1) "right definite predicate" "T-interval" | "syukakuga(wa)" | "definite predicate" |
| 2) "right definite predicate" "T-interval" | "object" | "definite predicate" |
| 3) "right definite predicate" "T-interval" | "noun" | "definite predicate" |

Incidentally, "non-predicative adjective", "nounno" and "noundeno" "nounna" may be stored in the part of . "The definite predicate" can not enter the part of . "The Ka-particle" may enter the part of .

If agreeing with either of above-mentioned conditions 1)–3), it extracts from "the noticeable reading point" to "the noticeable definite predicate" (step S137). If not agreeing with the condition, it extracts from the token after "the noticeable reading point" to "the noticeable definite predicate" (step 136).

The relation between "the reading point" and "the subordinate sentence" is explained. It uses FIG. 31A, FIG. 31 Band FIG. 31C for this. In this implementation form, when there is "the reading point" just behind "syukakuga(wa)", this "syukakuga(wa)" and "the right definite predicate" don't have relation. In other words, when there is "the reading point" as shown in FIG. 3 1A, the relation like arrow P doesn't occur. When the sentence which doesn't agree with such a rule is given as the analysis object, the work person corrects beforehand. Therefore, when there is the reading point like FIG. 31A, either of "definite predicate B" or "definite predicate C" has relation with "syukakuga(wa)".

Figure 31B:
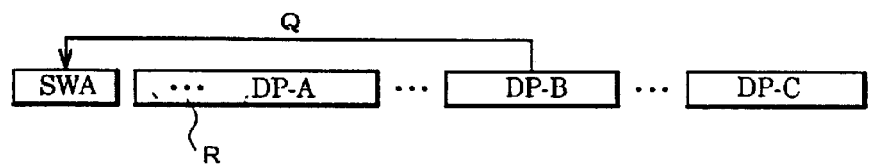
Figure 31C:
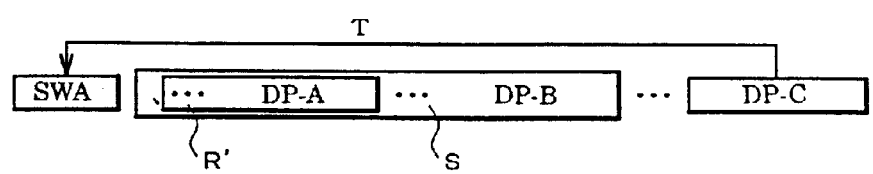

It supposes that "the definite predicate B" relates to "syukakuga(wa)" like FIG. 31B. If extracting subordinate sentence R including "the reading point", "syukakuga(wa)" and "the definite predicate B" can be set in the relation. This processing corresponds to above-mentioned step S137.

If "the definite predicate C" relates to "syukakuga(wa)" as shown in FIG. 31C, first, it extracts subordinate sentence R' without including "the reading point". This processing corresponds to step S136. Next, it extracts subordinate sentence S including "the reading point". "Syukakuga(wa)" and "the definite predicate C" are set; in the relation by this.

Figure 40:
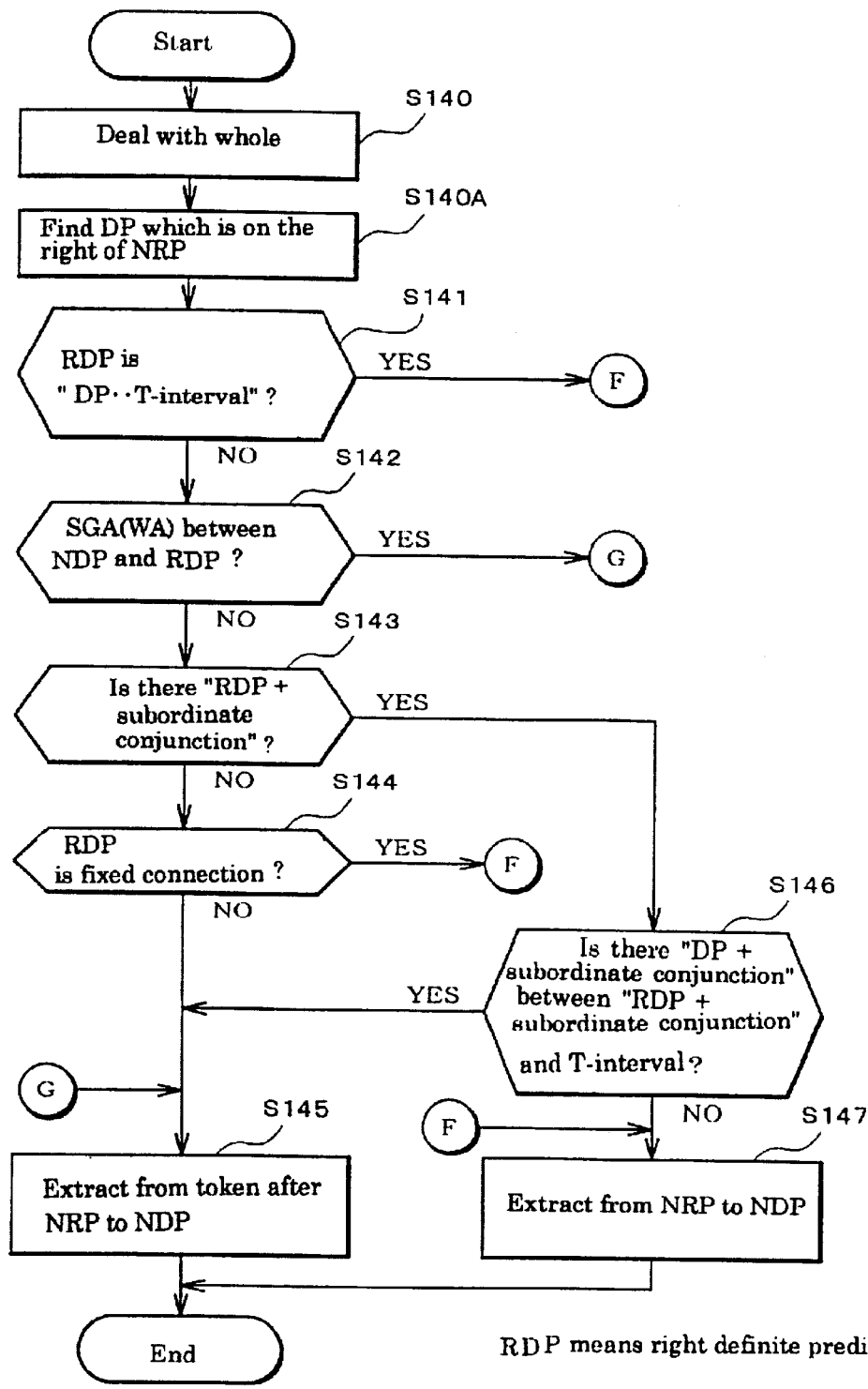
FIG. 40 is the flow chart which shows the processing to make the object outside when there is one reading point.

Next, the processing when "the reading point" is one (step S121 of FIG. 38) is in detail explained while referring to FIG. 40. Here, it deals with the whole (step S140). First, it finds "the definite predicate" (DP) which is the nearest on the right of the noticeable reading point(NRP) and it makes "the noticeable definite predicate" (NDP) (step S140A).

Next, it judges whether or not there is the row of the following token about "the right definite predicate" (RDP) (step S141).

4) "right definite predicate" "T-interval"

If agreeing with this condition, it extracts from "the noticeable reading point" to "the noticeable definite predicate" (step S147). If not agreeing with this condition, it judges whether or not there is "syukakuga(wa)" between "the noticeable definite predicate" and "the right definite predicate" (step S142).

If there is "syukakuga(wa)" which agrees with the condition, it extracts from the token after "the noticeable reading point" to "the noticeable definite predicate" (step S145). If there is not "syukakuga(wa)" which agrees with the condition, it judges whether or not there is the row of "the right definite predicate"+"the subordinate conjunction" (step S143).

If there is the row of this token, it judges whether or not there is the row of "the definite predicate"+"the subordinate conjunction" between concerned "subordinate conjunction" and "T-interval" (step S146). If there is not the row of these tokens, it extracts from "the noticeable reading point" to "the noticeable definite predicate" (step S147). If there is the row of such a token, it extracts from the token after "the noticeable reading point" to "the noticeable definite predicate" (step S145). If there is not the row of "the right definite predicate"+"the subordinate conjunction" in step S143, it judges whether or not it agrees with the row of either following token about "the right definite predicate" (step S144).

| | | |
|---|---|---|
| 5) "right definite predicate" "T-interval" | "syukakuga(wa)" | "definite predicate" |
| 6) "right definite predicate" "T-interval" | "object" | "definite predicate" |
| 7) "right definite predicate" "T-interval" | "noun" | "definite predicate" |

If either of above-mentioned conditions 5)–7) agrees, it extracts from "the noticeable reading point" to "the noticeable definite predicate" (step S147). If not agreeing with the condition, it extracts from the token after "the noticeable reading point" to "the noticeable definite predicate" (step S145).

6.8 The Processing of a Subordinate Sentence

Figure 41:
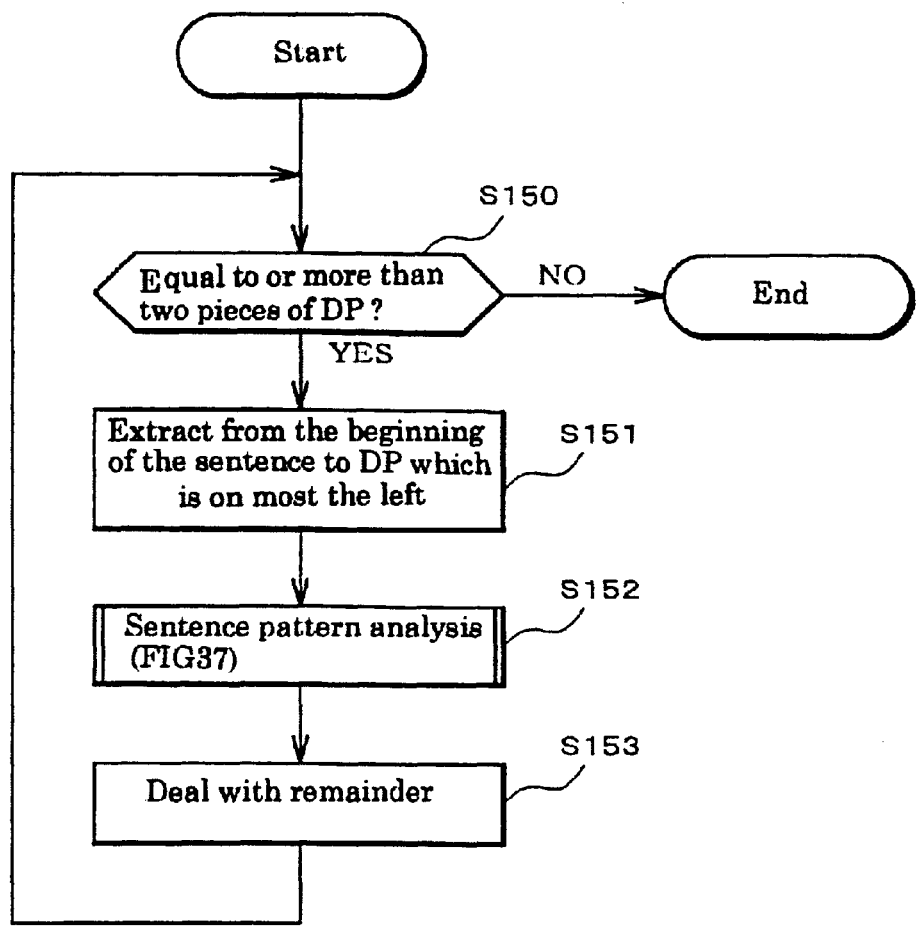
FIG. 41 is the flow chart which shows the processing of a subordinate sentence.

Next, the details of the processing of a subordinate sentence (step S51) of figure 32 are explained while referring to FIG. 41. First, it judges whether or not there are equal to or more than two pieces of "definite predicate" in step SI 50. If there are not equal to or more than two pieces of "definite predicate", because the subordinate sentence isn't contained, it ends the processing of a subordinate sentence. For example, it is the following illustrative sentence.

"Bokuwa gakkoue ikimasu" (I go to school.)

Because "the definite predicate" is one ("ikimasu"), the processing of a
subordinate sentence isn't done.

If there are equal to or more than two pieces of "definite predicate", it extracts as the subordinate sentence to "the definite predicate" which is on most the left from the beginning of the sentence (step S151). If there is "syukakuga (wa)" in the extracted subordinate sentence, it processes in the sentence pattern analysis (FIG. 37) with step S152. By this, it gets a main role.

After that, it deals with the part of the remainder (step S153). Then, it executes step S150 again.

It executes this processing repeatedly. If "the definite predicate" becomes one, it ends the processing of a subordinate sentence.

6.9 The Processing of a Main Sentence

Figure 42:
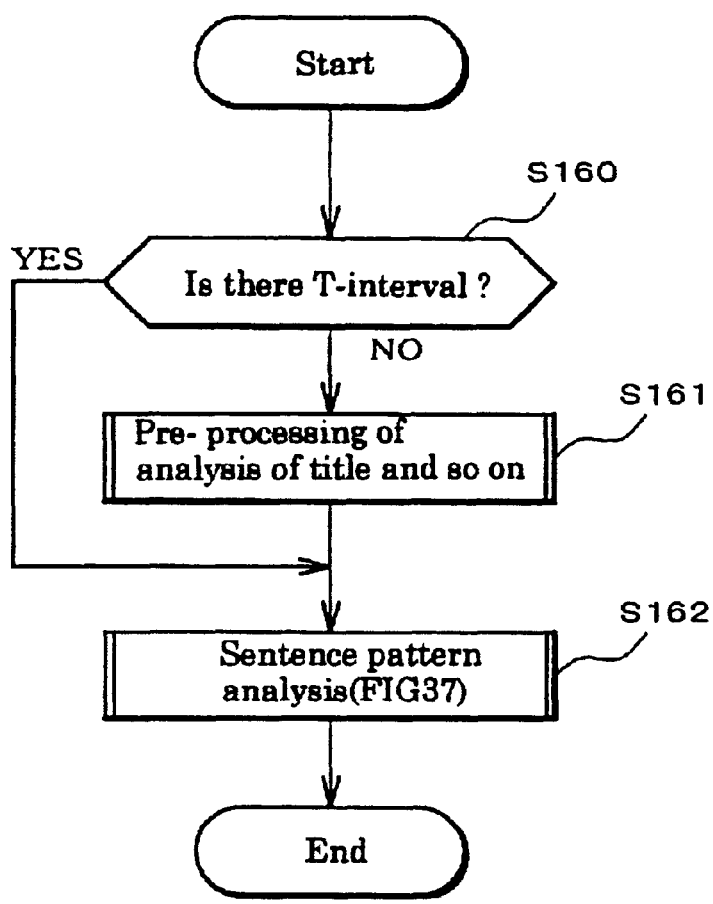
FIG. 42 is the flow chart which shows the processing of a main sentence.

Next, the details of the processing of the main sentence of step S52 in FIG. 32 are explained while referring to FIG. 42. First, it judges whether or not there is "T-interval" in step S160. If being usual sentence, there is "T-interval". Using the sentence pattern table (FIG. 54, FIG. 55 reference), it processes the sentence pattern analysis of FIG. 37 (step S162). By this, it gets a main role.

Figure 43:
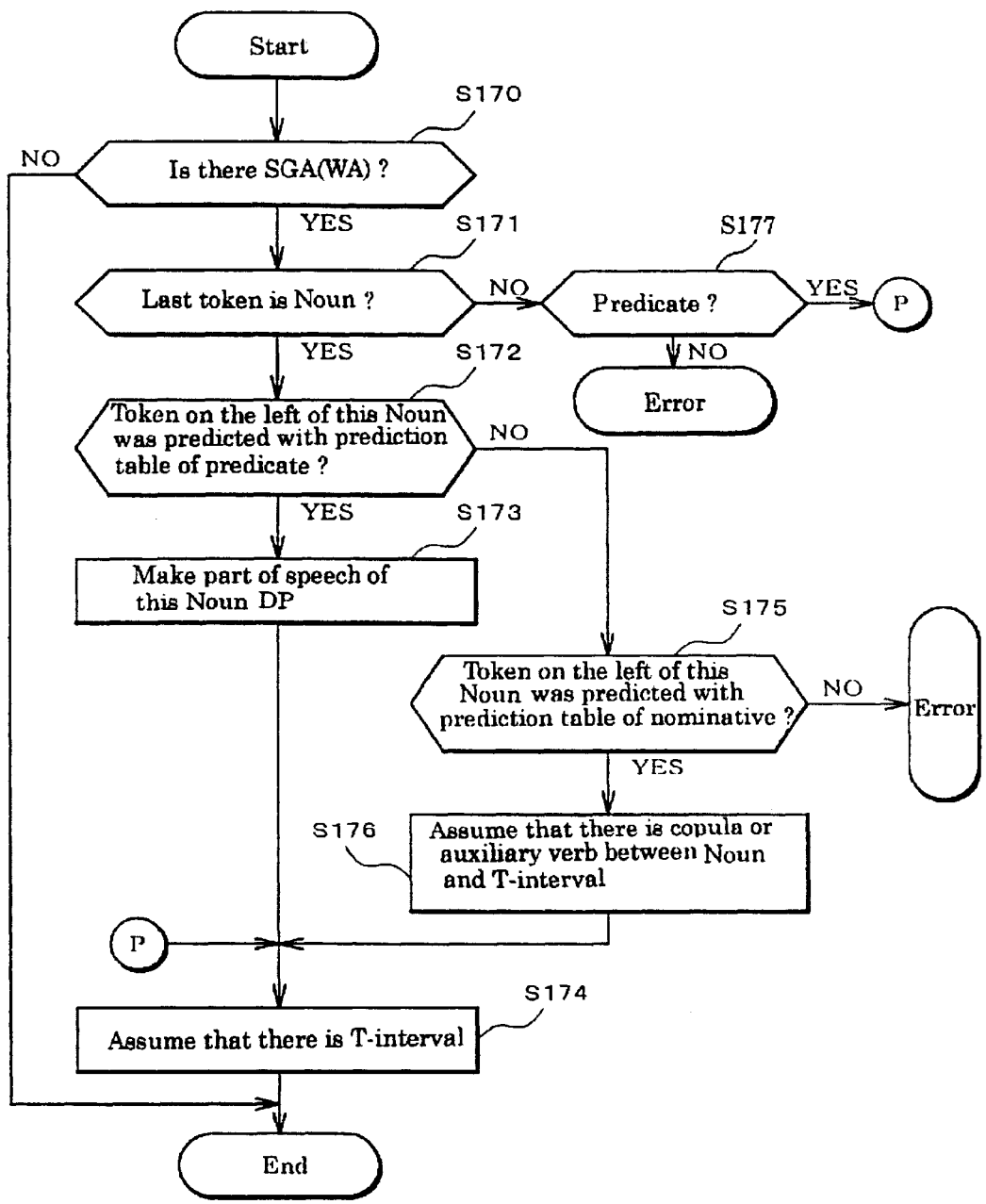
FIG. 43 is the flow chart which shows the pre-processing of an analysis of the sentence patterns such as a title.

If being the above illustrative sentence, it gives "Bokuwa" "subject" and it gives "ikimasu" "predicate". Then, it memorizes in the analysis file (FIG. 48C reference). Also, the arrow which was pictured for "Bokuwa" from "ikimasu", too, is memorized. Incidentally, when there is not T-interval (in case of the title and so on), after pre-processing with step S161, it processes in the sentence pattern analysis. The pre-processing of a title and so on is shown in FIG. 43. It judges whether or not there is "syukakuga(wa)" (step S170). If not being, it ends. If being, it judges whether or not the last token is "noun" (step S171). If being "noun", it judges whether or not a token on the left of the concerned "noun" was predicted with the prediction table of predicate (step S172). If predicted, the token of "this noun" has the role of the predicate. It makes the part of speech of the concerned token "the definite predicate" (step S173). After that, it assumes that there is T-interval and it ends (step S174).

Also, if a token on the left of "the noun" is predicted with the prediction table of nominative, it advances towards step S176. In this case, it assumes that there is "a copula" (or "a auxiliary verb") which is on the right of "the noun" in front of T-interval (step S176). After that, it assumes that there is T-interval and it ends (step S174).

When the last token is not "a noun" in step S171, it judges whether or not there is a predicate (step S177). If being, it assumes that there is T-interval and it ends (step S174). If there is not a predicate, it displays an error.

By doing above pre-processing, it is possible to analyze a sentence pattern about the title and so on, too.

6.10 The Processing to Extract a Parenthesis Part

Figure 44:
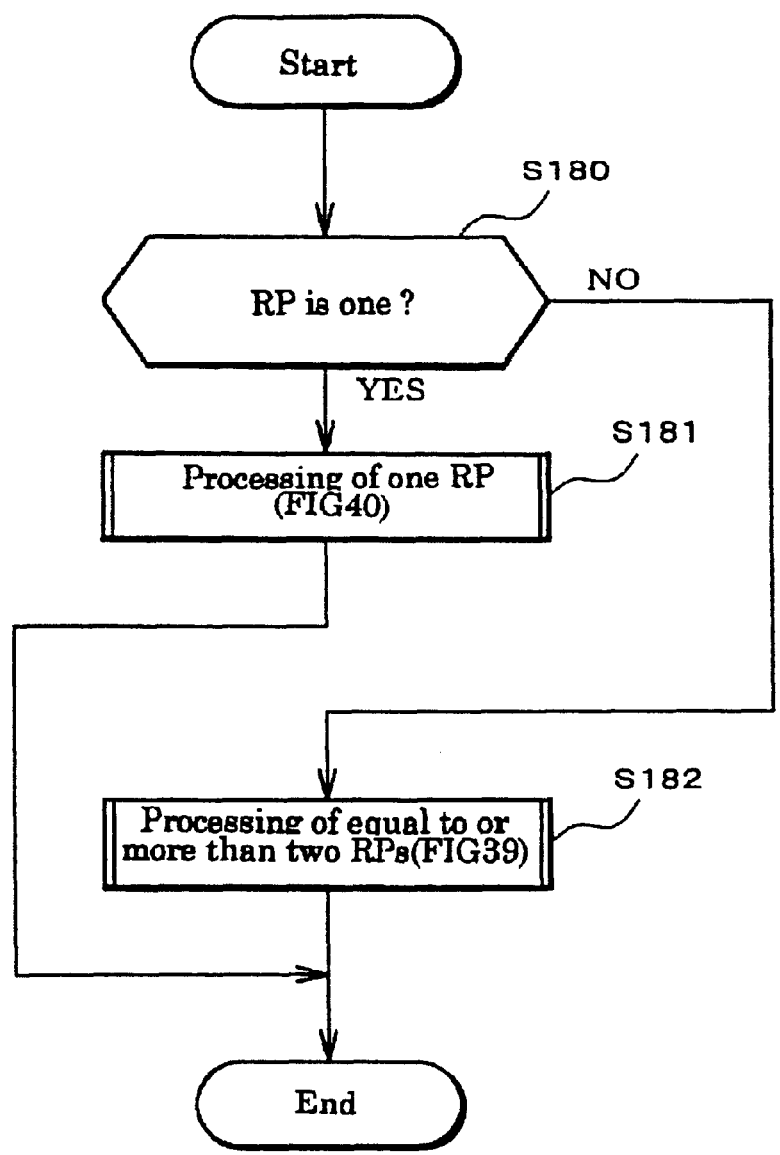
FIG. 44 is the flow chart which shows the processing to extract a parenthesis part.

Next, the processing to extract the parenthesis part (step S53 of FIG. 32) is shown in FIG. 44–FIG. 46. As for the extraction of the parenthesis part, too, it judges whether or not to extract including "the reading point". The basic point of view of this judgement is the same as the step S47 of FIG. 32 (Details are shown in FIG. 38–FIG. 40). But, it makes "the definite predicate" which is on most the right in "the parentheses" "the noticeable definite predicate" (steps S190A, S200 A). As for the part of "the parentheses", "the definite predicate" which is on most the right in "the parentheses" is related with the other part. To process after that, it extracts "parentheses" on the right of "the noticeable reading point" with steps S190B, S200B. In the case of equal to or more than 2 parentheses, it extracts "the parentheses" which are outside.

6.10 The Example Which Analyzes the Structure and the Role About Illustrative Sentence 1

Illustrative sentence 1

"Fumotoni chikai kono murawa kesikiga utukusikatta" (The scenery of this village which is near the foot was beautiful.)

The analysis example of illustrative sentence 1 is shown. First, it gets the part of speech and the attribute which is shown in FIG. 12, FIG. 28.

Figure 56A:
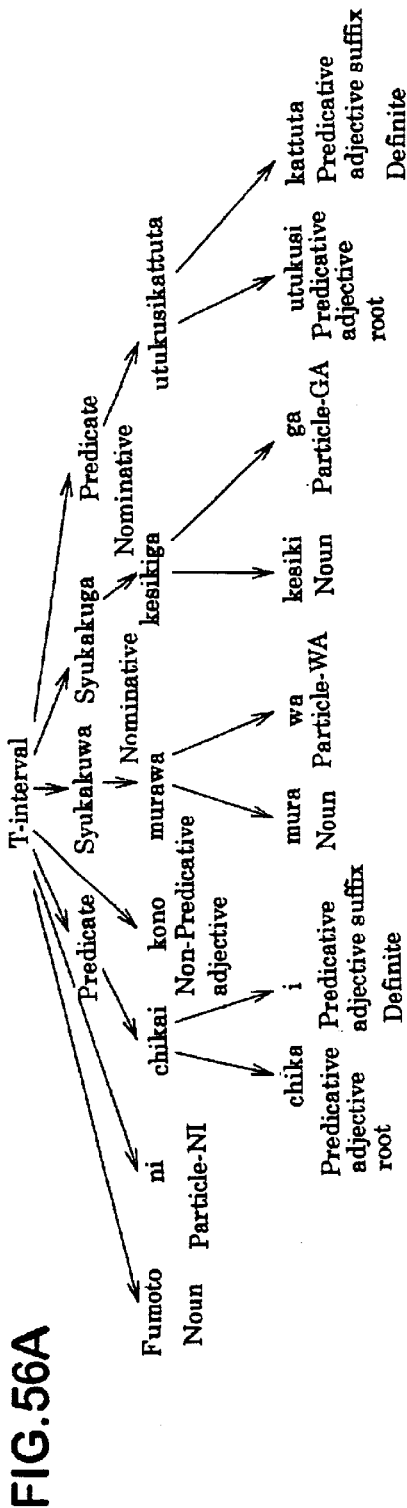
FIG. 56A and FIG. 56B are the figure which shows a progress situation of the analysis of the sentence structure and the role about the illustrative sentence.

Next, it executes the analysis of the local structural role (sub-role) in FIG. 33. It gives the mark of the "syukakuga (wa)" "predicate" with step S60–S62 and it gives "nominative" as the sub-role. The result is shown in FIG. 56A.

Next, it predicts a sub-role (step S63–S68). First, it refers to the token which the sub-role can not be given to. It finds "utukusikatta" which is on the right (step S67 of FIG. 33, step S100 of FIG. 36). Next, it gets the token immediately behind "utukusikatta". Here, it gets T-interval. It uses the prediction table of T-interval which is shown in FIG. 49 (FIG. 36, step S102). It refers to whether or not there is "predicative adjective" which is the part of speech of "utukusikatta" at this prediction table. The 3rd corresponds. The sub-role of "utukusikatta" is "the top predicate type III" (FIG. 36, step S105).

Next, "kono" is found (step S67 of FIG. 33, step S100 of FIG. 36). It gets the sub-role of token "murawa" immediately behind. "Nominative" is gotten in this place. It uses the prediction table of nominative which is shown in FIG. 50, FIG. 51 (FIG. 36, step S102). It refers to whether or not there is "non-predicative adjective" which is the part of speech of "kono" in this prediction table. The 2nd corresponds. The sub-role of "kono" is "attribute 2" (FIG. 36, step S105). An arrow is drawn from "murawa" to "kono" and the communicating relation is memorized.

Again, it refers to the un-fixed token. Here, "chikai" is found. For "chikai", it uses the prediction table of attribute (steps S101, S102). "Predicative adjective" which is the part of speech of "chikai" doesn't correspond. Moreover, it increases part of speech of token "ni" on the left side. It corresponds in the row of "Ni-particle which is used as the indirect object"+"predicative adjective" (step S107). However, it doesn't correspond here. Moreover, it increases the part of speech of token "Fumoto" on the left side "the general noun". It corresponds in the row of "General noun+ Ni-particle+predicative adjective". With this, too, it doesn't correspond. However, there is not a token on the left. It advances towards step S107A from step S106. Because there is a token on the right of fixed token "kono", it advances towards step S108. It gets "nominative" of the sub-role of "murawa" in step S108. Next, using the prediction table of nominative (FIG. 50, FIG. 51), it predicts the sub-role of un-fixed token "chikai". The 15th corresponds. The sub-role of "chikai" is "the top predicate type III of subordinate sentence". Moreover, the arrow is drawn from "murawa" to "chikai" and the communicating relation is memorized. "Chikai" isn't related with "kono". "Chikai" is related with "murawa". In the same way, the sub-role of "Fumotoni" is "the general indirect object".

Figure 56B:
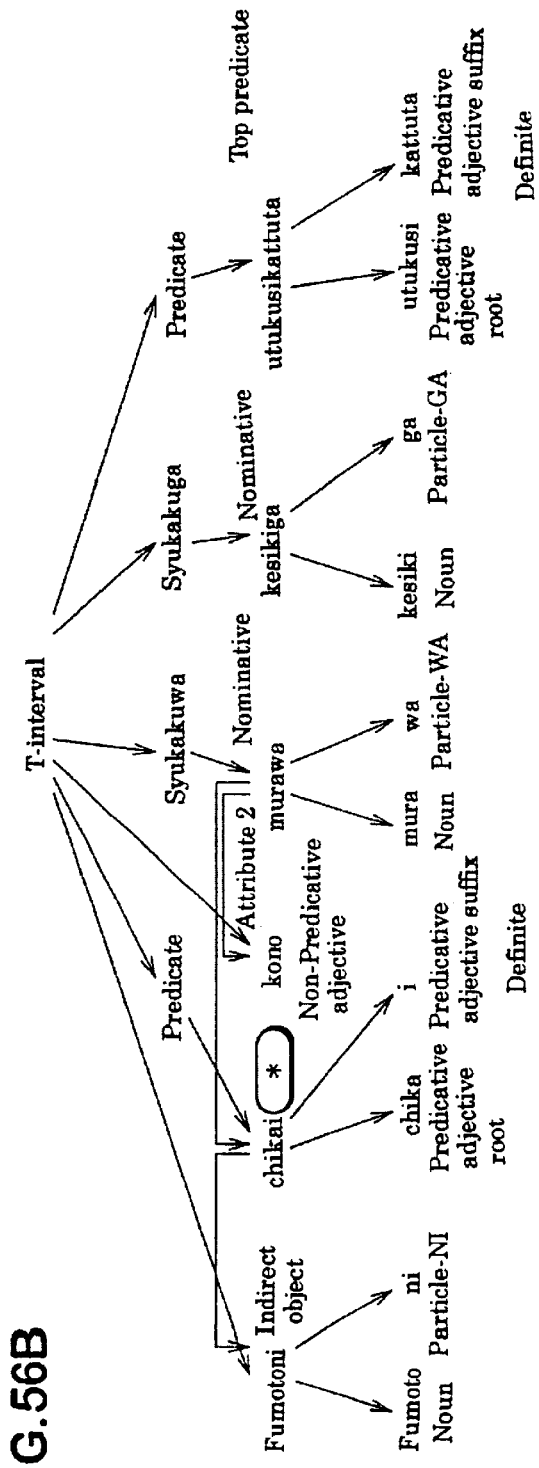
Figure 58A:
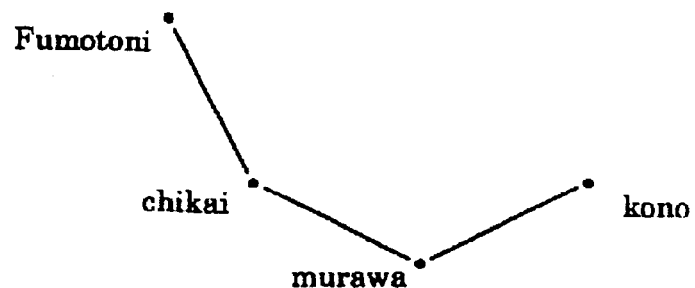
FIG. 58A–FIG. 58C are the figure which shows a progress situation by the tree structure about the analysis of the sentence structure.

The analysis result is shown in FIG. 56B. Incidentally, when showing only the relation of the token, it becomes FIG. 58A. "Kesikiga" and "utukusikatta" aren't yet related.

When ending the analysis of the sub-role like the above, next, it executes the step S41 of FIG. 32. There are not "a reading point" and "parentheses" in the illustrative sentence. It advances towards step S51 via step S41, step S50.

Figure 58B:
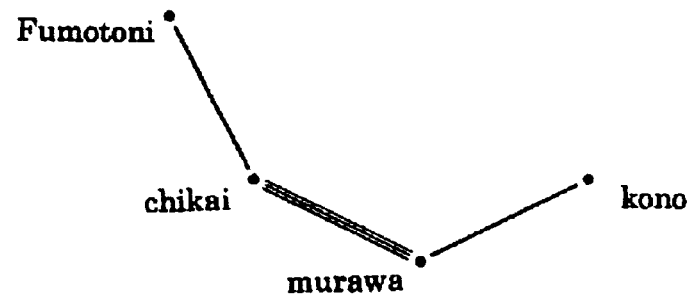

In step S51, a subordinate sentence is processed (FIG. 41). First, it judges whether or not there are equal to or more than 2 pieces of "definite predicate" in step S150. Here are two pieces of "definite predicate" ("chikai" and "utukusikatta"). It advances towards step S151. In step S151, it is extracted to "the definite predicate" which is on most the left from the beginning of the sentence. In other words, it is extracted from "Fumotoni" to "chikai". Moreover, it memorizes that this extraction part is a subordinate sentence. In other words, it memorizes relation between "chikai" and "murawa" as the subordinate relation. This is shown in FIG. 58B. The relation between "chikai" and "murawa" is displayed by 3 lines which show subordinate relation.

"Fumotoni chikai" was extracted. Next, it analyzes the sentence pattern of this extraction part (step S152). The details of the sentence pattern analysis processing are shown in FIG. 37. First, it judges whether or not there is "syukakuga(wa)" in the extraction part (step S11O). "Syukakuga(wa)" is not here. It ends sentence pattern analysis processing and it executes step S153 of FIG. 41.

In step S153, it removes "Fumotoni chikai" from the analysis object. Therefore, "kono murawa kesikiga utukusikatta" is left as the analysis object. As for this part, again, it executes step S150. Because "the definite predicate" is one, it ends processing . With this, it advances towards the step S52 of FIG. 32 and it processes a main sentence.

As for the processing of a main sentence, details are shown in FIG. 42. Because there is T-intervl in the part which is dealt with, it analyzes a sentence pattern with step S162. The details of this sentence pattern analysis processing are shown in FIG. 37. First, it judges whether or not there is "syukakuga(wa)" in step S110. There are "murawa" and "kesikiga". It advances towards step S111. In step S111, it obtains the set of the "nominative" "predicate" which is on most the left. Here, it obtains the set of the "syukakuwa" "syukakuga" "predicate".

Figure 57:
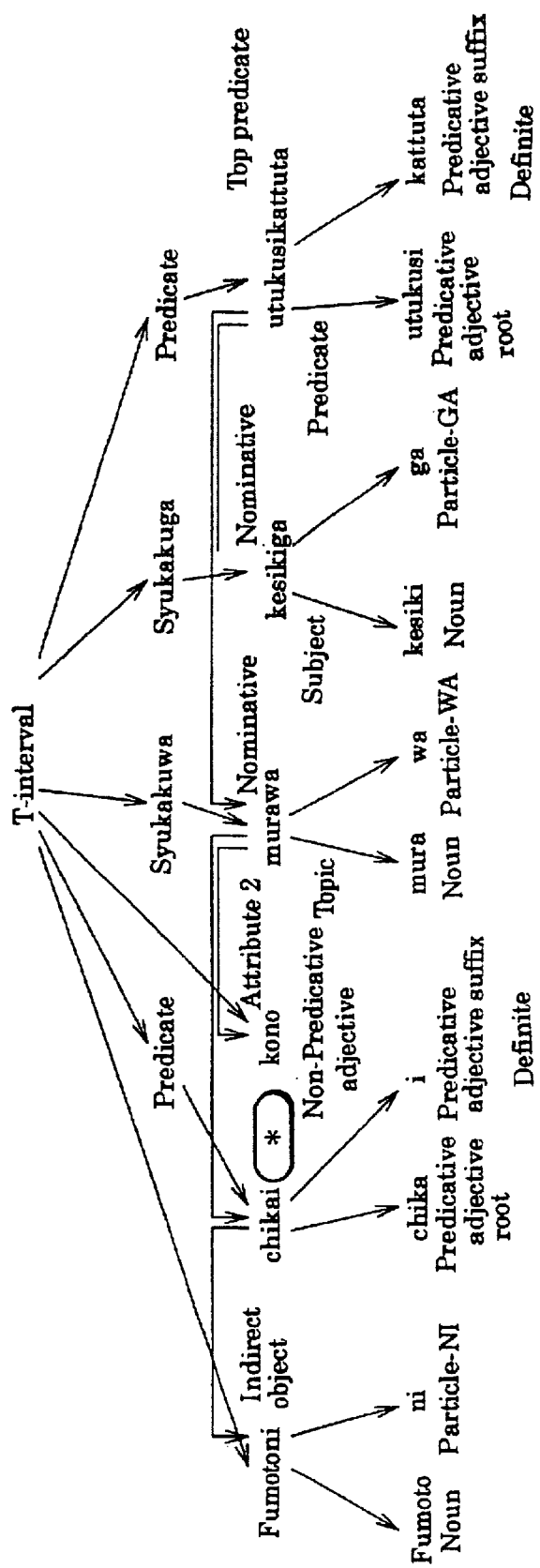
FIG. 57 is the figure which shows a progress situation of the analysis of the sentence structure and the analysis of the role.
Figure 58C:
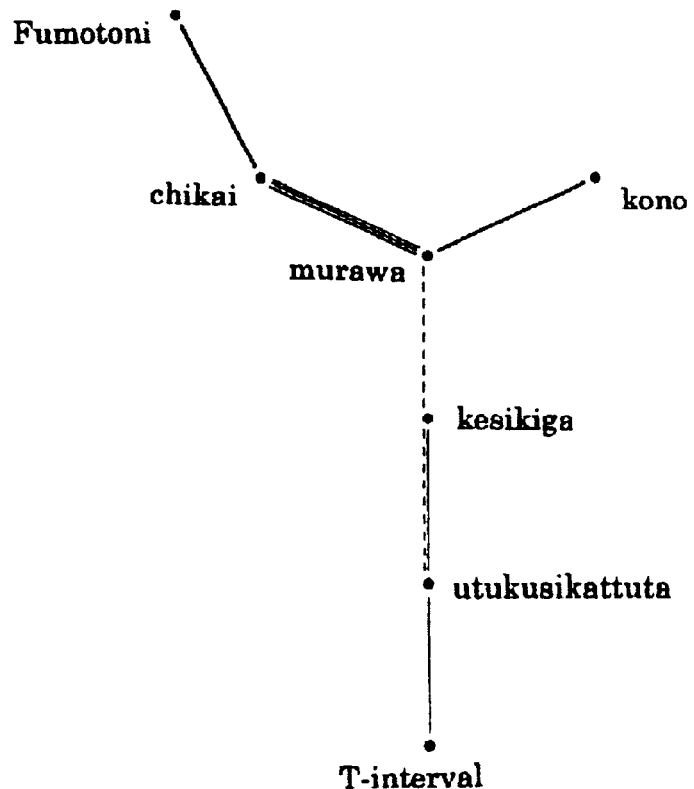

Next, it uses a sentence pattern table (FIG. 54, FIG. 55) and it gives the "nominative" "predicate" a main role and it gives each relation. Here, sentence pattern 4 is obtained. "A topic" is given to "murawa", "a subject" is given to "kesikiga" and "a predicate" is given to "utukusikatta". Also, relation is given to "murawa" and "utukusikatta" and relation is given to "kesikiga " and "utukusikatta". The result is shown in FIG. 57. Also, the tree which shows only relation is shown in FIG. 58C. In this tree, the perpendicular solid line shows relation between "the subject" and "the predicate" and the perpendicular broken line shows relation between "the topic" and "the predicate".

6.12 The Example Which Analyzes the Structure and the Role about Illustrative Sentence 2

Next, the analysis of illustrative sentence 2 is shown.

Wa-purono kouzaiwo ronjiru tumoriwa nai ga koremade kakinikui to sare sengoniwa kindaitekibunkano hattenwo sogaisuru gankyou dearu tomade iware kotoga aru gotoni meno katakini saretekita kanjiga kono kikaino hatumei niyotte kantanni kakeruyouninatta kotowa hiteidekinai (There is not intention of arguing about the merits and demerits of the word processor. It was supposed to be difficult up to this to write a kanji. After the war, it was said to that it was the main culprit which obstructs the development of the modem culture and it was made an enemy every time there was a thing. However, the kanji can not be denied to have become able to write simply by the invention of this machine.) (Tetuji Atuji "The elephant and the pelican", The number of November, 1993 of "Gendai". It is the sentence of the mention in page 354. That it is possible to analyze by this system, it does Prix edit. It omitted a little because of the simple-ization of the explanation.

Figure 59:
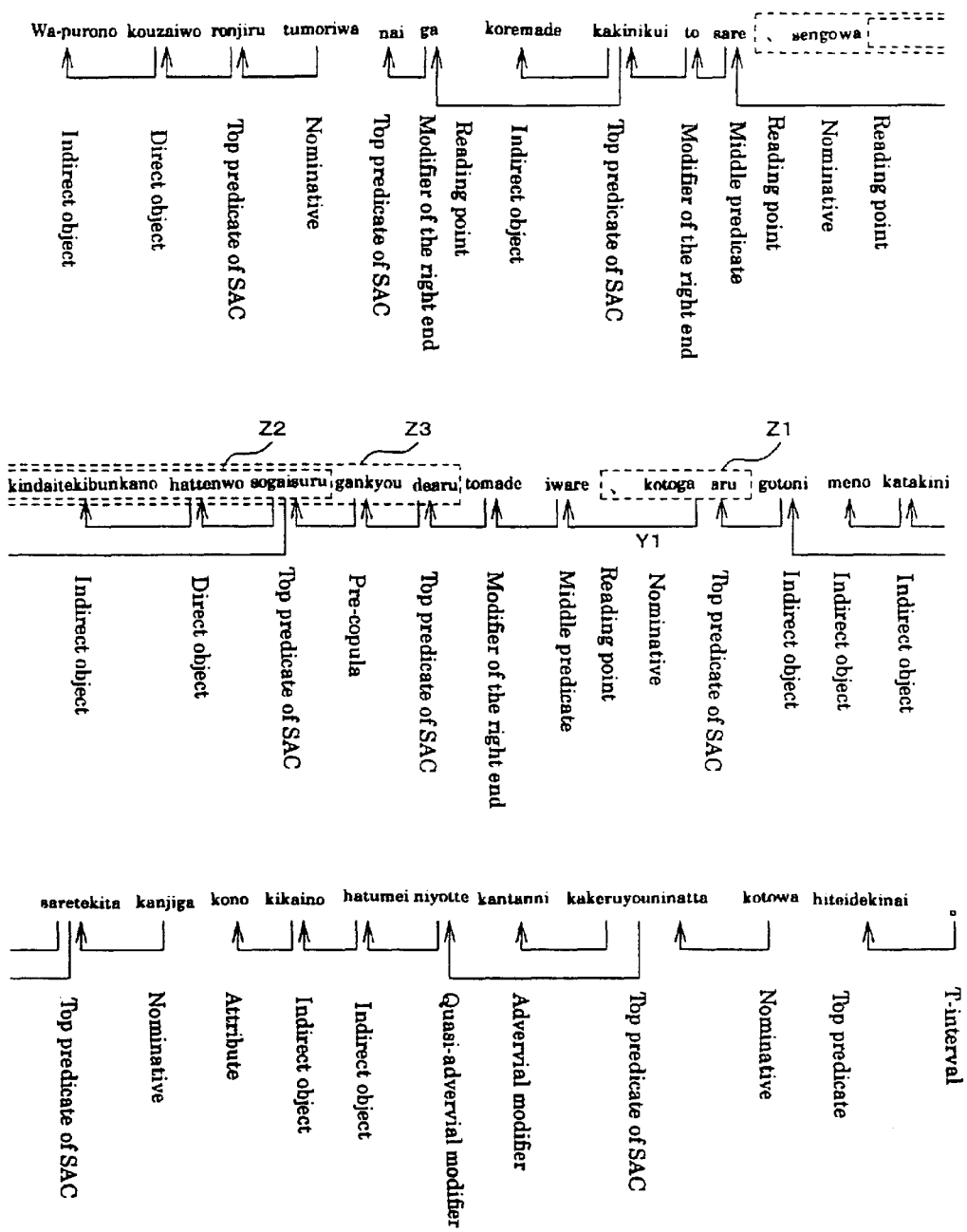
FIG. 59 is the figure which shows the result which analyzed a sub role about the other illustrative sentence.
Figure 60:
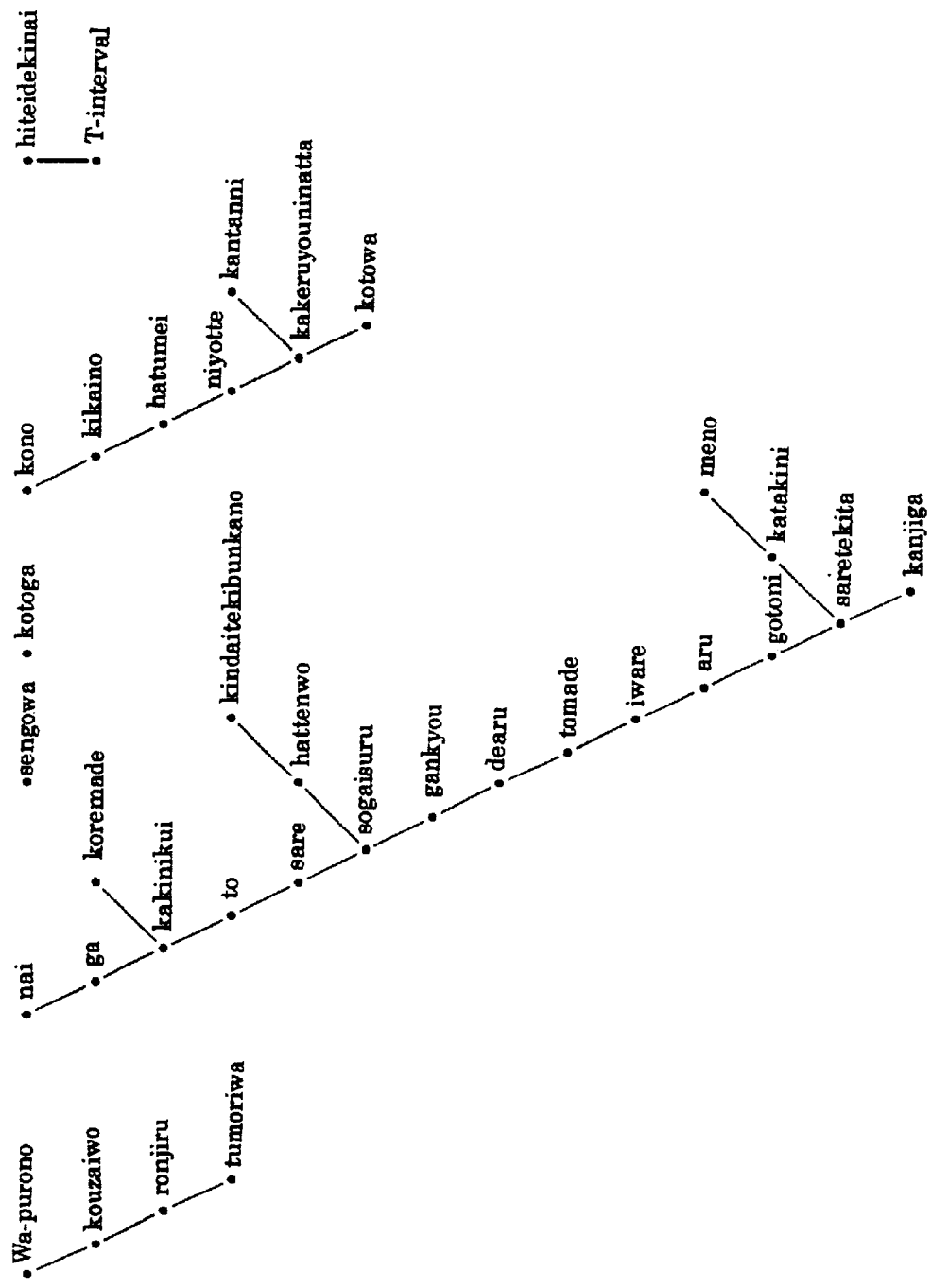
FIG. 60 is the figure which shows a progress situation by the tree structure about the analysis of the sentence structure of the above illustrative sentence.

The result which analyzed a sub-role (step S40 of FIG. 32) is shown in FIG. 59. But, it omits the analysis result of the part of speech. Also, it displays the relation of each token which is drawn by the arrow of FIG. 59 in the tree form in FIG. 60.

It judges whether or not there is a reading point in step S41 of FIG. 32. Because there is a reading point in the illustrative sentence, it advances towards step S42. As for step S42, it makes "a reading point" (RP) in most and on the right the noticeable reading point(NRP). In the illustrative sentence, "the reading point" which is between "iware" and "kotoga" is "the noticeable reading point".

Next, it judges whether or not there are "parentheses" which are processed independent (step S43). Because there are not concerned "parentheses" in the illustrative sentence, it advances towards step S44. Moreover, it skips in step S44. Next, it extracts as the subordinate sentence from the noticeable reading point to "the definite predicate" which is the nearest (step S45). In the illustrative sentence, it extracts "kotoga aru". Also, it memorizes "aru" and "gotoni" as the subordinate relation. This is shown in FIG. 61A. Subordinate relation is shown by 3 lines.

Next, it analyzes a sentence pattern about "kotoga aru" (step S46). Because it is "syukakuga" "predicate", sentence pattern 2 is chosen. Then, "a subject" is given to "kotoga" and "a predicate" is given to "aru". This subjective predicate relation is shown in FIG. 61A. Subjective predicate relation is shown by the perpendicular line. After this, it misses a subordinate sentence from the object (step S47).

The details of this processing are shown in FIG. 38. First, it judges whether or not "a reading point" is only one in the whole sentence with step S120. There are five "reading points" in the illustrative sentence. It executes the extraction processing which has equal to or more than 2 reading points (step S122).

The details of this processing are shown in FIG. 39. First, it pays attention on the right of "the noticeable reading point". "The definite predicate" which is on the right of the noticeable reading point" is "the noticeable definite predicate" (NDP) (step S130A). Here, "aru" is "the noticeable definite predicate". Next, it judges whether or not there is "syukakuga(wa)" from "the noticeable definite predicate" until "the definite predicate" on the left (step S131). Because there is not "syukakuga(wa)" in the illustrative sentence, it advances towards step S137. It missed from "the noticeable reading point" to "the noticeable definite predicate" with step S137 (Z1 of FIG. 59).

Therefore, the processing object part becomes as follows.

Wa-purono kouzaiwo ronjiru tumoriwa nai ga koremade kakinikui to sare sengoniwa kindaitekibunkano hattenwo sogaisuru gankyou dearu tomade iware gotoni meno katakini saretekita kanjiga kono kikaino hatumei niyotte kantanni kakeruyouninatta kotowa hiteidekinai Next, it advances towards step S48 of FIG. 32. In step S48, it judges whether or not there is a token that a role was predicted by the part to have removed from the object in the token which is made an object at present. In case of the illustrative sentence, "iware" is predicted by "aru" (Arrow Y1 of FIG. 59). If there is an predicted token, it deletes the sub-role of the predicted token. That is, it deletes "the middle predicate type II" which is the sub-role of "iware". Also, it deletes the relation of both (Aarrow Y1). In the tree structure, it removes relation between "iware" and "aru" (FIG. 61A).

After that, it returns to step S40 and once again, it analyzes the sub-role of "iware". It predicts with the prediction table of "object" which is the role of "gotoni" first. But it doesn't correspond. Moreover, because "meno" and "katakini" have the role of "the general object", they don't correspond. After all, it corresponds with "the prediction table of predicate which is the role of "saretekita". "The middle predicate type II" is gotten and stores this. Also, the arrow is drawn for "iware" from "saretekita". In other words, it sets "iware" and "saretekita" in the relation as shown in FIG. 61A. Above processing is shown in FIG. 61A and FIG. 61B.

As above mentioned, after re-analyzing a sub-role, it executes step S41 again.

In the same way, subordinate sentence Z2 "kindaiteki-bunkano hattenwo sogaisuru" (FIG. 59 reference) are extracted (step S45). Then, the sentence pattern analysis makes (step S46) and subordinate sentence Z2 is missed from the object with step S132 via step S131 (step S47). Here is "sare" which was pridicted by the token "sogaisuru" of subordinate sentence Z2. The sub-role of "sare" is analyzed once again (step S40). This tree structure is shown in FIG. 61C. There is not "syukakuga(wa)" in subordinate sentence Z2. Therefore, as for subordinate sentence Z2, it is shown by the slanted line, not being a perpendicular line.

After that, it executes step S41 for the following part.

Wa-purono kouzaiwo ronjiru tumoriwa nai ga koremade kakinikui to sare sengoniwa gankyou dearu tomade iware gotoni meno katakini saretekita kanjiga kono kikaino hatumei niyotte kantanni kakeruyouninatta kotowa hiteidekinai Next, subordinate sentence Z3 "sengoniwa gankyou dearu" (FIG. 59 reference) are extracted (step S45). Then, the sentence pattern analysis dose not make (step S46) and subordinate sentence Z3 is missed from the object with step S132 via step S131 (step S47). Here is "sare" which was predicted by the token "dearu" of subordinate sentence Z3. The sub-role of "sare" is analyzed once again (step S40). This tree structure is shown in FIG. 62A.

After that, it executes step S41 for the following part.

Wa-purono kouzaiwo ronjiru tumoriwa nai ga koremade kakinikui to sare tomade iware gotoni meno katakini saretekita kanjiga kono kikaino hatumei niyotte kantanni kakeruyouninatta kotowa hiteidekinai Next, "kakinikui " is missed with step S132 via step step S131.

After that, it executes step S41 for the following part.

Wa-purono kouzaiwo ronjiru tumoriwa nai ga koremade to sare tomade iware gotoni meno katakini saretekita kanjiga kono kikaino hatumei niyotte kantanni kakeruyouninatta kotowa hiteidekinai There is only one reading point in the whole sentence. It executes step S121 of FIG. 38. The details of step S121 are shown in FIG. 40. First, it makes "the definite predicate" on the right of "he noticeable reading point" "the noticeable definite predicate" (step S140A). Here, "saretekita " becomes "the noticeable definite. predicate". Next, it judges whether or not there is "T-interval" immediately behind "the right definite predicate" ("kakeruyouninatta") (step S141). Because there is not "T-interval", it advances towards step S142. In step S142, it judges whether or not there is "syukakuga(wa)" between "the noticeable definite predicate" ("saretekita") and "the right definite predicate" ("kakeruyouninatta"). Because there is "syukakuga" ("kanjiga"), it advances towards step S145. It removes from the token after "the noticeable reading point" to "the noticeable definite predicate" with step S145. In other words, it removes from "koremade" to "saretekita". Because here is a token "ga" which was predicted by "sare", it analyzes a sub-role once again (steps S48, S49, S40). By this, "ga" is related with "sare".

As a result of above processing, the tree structure of the corresponding part is corrected like FIG. 62B.

Also, the sentence which was left as the object is as the following.

Figure 63B:
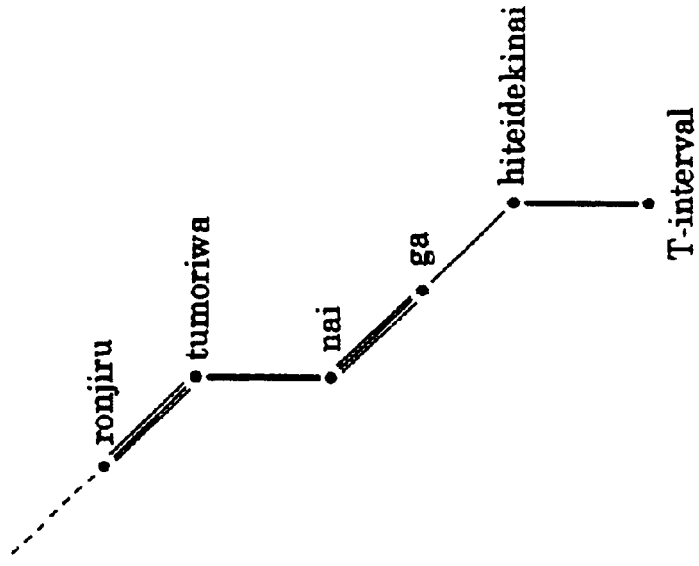
FIG. 63A and FIG. 63B are the figure which shows a progress situation by the tree structure about the analysis of the sentence structure of the above illustrative sentence.
Figure 63A:
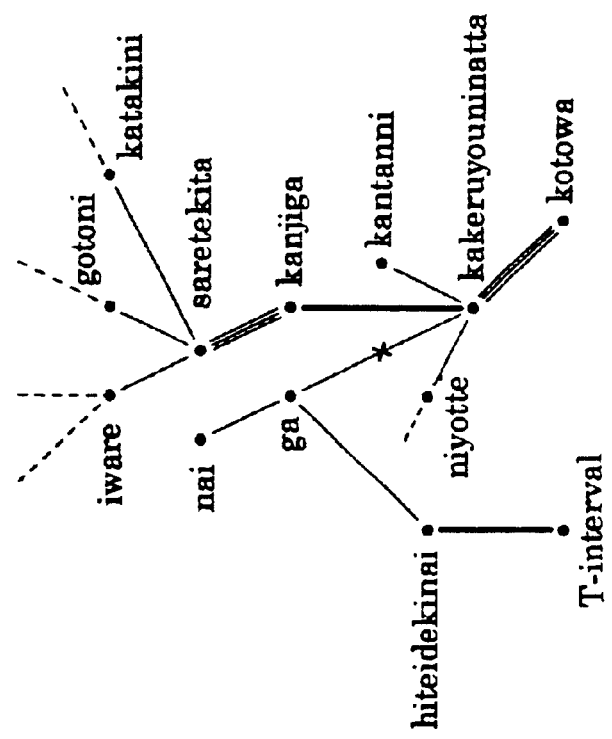

Wa-purono kouzaiwo ronjiru tumoriwa nai ga kanjiga kono kikaino hatumei niyotte kantanni kakeruyouninatta kotowa hiteidekinai Next, ", kanjiga kono kikaino hatumei niyotte kantanni kakeruyouninatta" are extracted as the subordinate sentence and a sentence pattern is analyzed (steps S45, S46). Because immediately the back of "the right definite predicate" ("hiteidekinai") is "T-interval" here, it is removed from the object part including "the reading point" (FIG. 40, steps S141, S147). Also, because there is a token "ga" which was predicted by "kakeruyouninatta", the analysis of the sub-role is re-executed. By this, the sub-role of "ga" is predicted by "hiteidekinai". As a result of above processing, the tree structure of the corresponding part is corrected like FIG. 63A.

Also, the sentence which was left as the object is as the following.

"Wa-purono kouzaiwo ronjiru tumoriwa nai ga kotowa hiteidekinai

Because there is not a "reading point" and "parentheses" in this sentence, it executes the processing of a subordinate sentence with step S51. First, it extracts "Wa-purono kouzaiwo ronjiru" as the subordinate sentence and it analyzes a sentence pattern (steps S150, S151, S152). Because there is not "syukakuga(wa)", a main role isn't given. Next, it extracts "tumoriwa nai" as the subordinate sentence and it analyzes a sentence pattern (steps S150, S151, S152). It corresponds to sentence pattern 2. "Subject" is given to "tumoriwa". "Predicate" is given to "nai". As a result of above processing, the tree structure of the corresponding part is corrected like FIG. 63B.

The sentence which was left last is "kotowa hiteidekinai". "The definite predicate" is only one. It processes a main sentence with FIG. 42. "Subject" is given to "kotowa". "Predicate" is given to "hiteidekinai".

Figure 64:
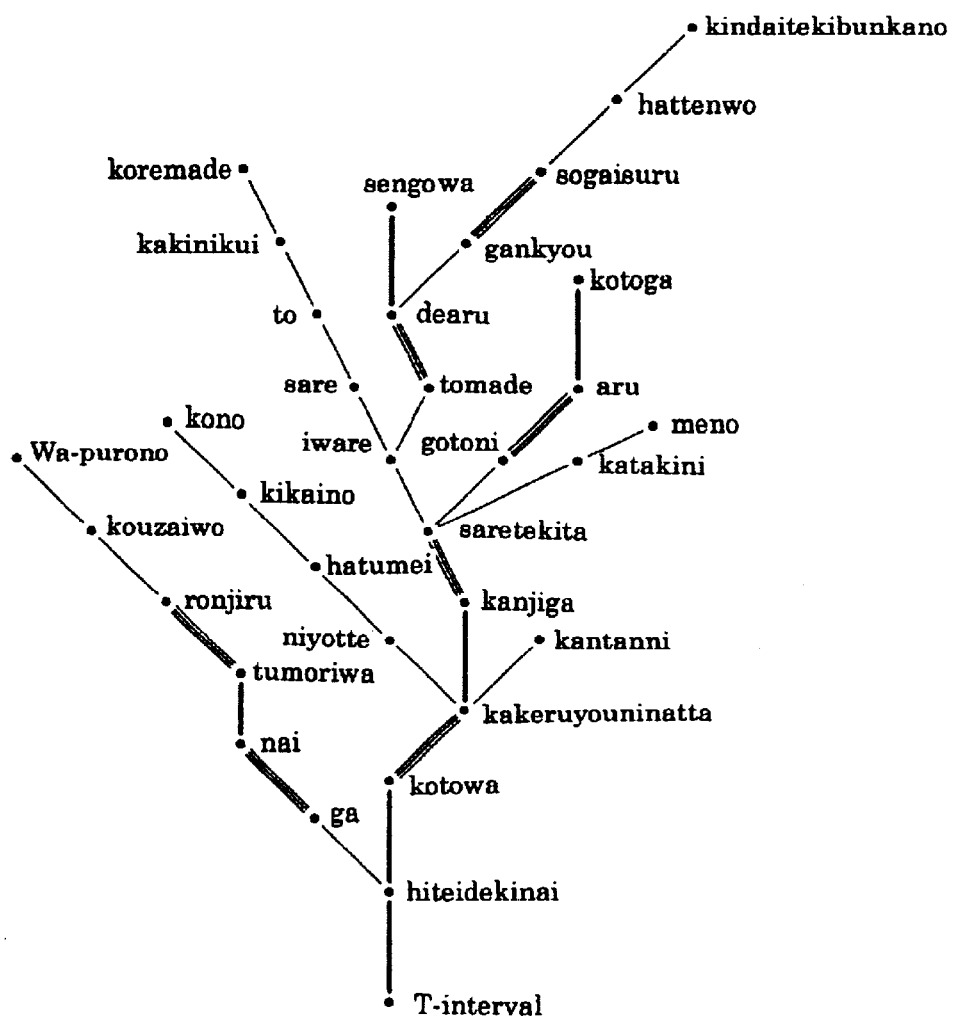
FIG. 64 is the figure which shows the completion of the tree structure about the analysis of the sentence structure of the above illustrative sentence.

Then, it ends all analyses. The result of above analysis is shown in FIG. 64. In this way, the structure of the correct sentence is gotten. Also, the role and the relation of each token are gotten right.

7. The Processing Example Which Analyzes the Structure and the Role of the Sentence in the Other Implementation Form

7.1 The Explanation of the Processing Contents

The processing to analyze the structure and the role of the sentence in the other implementation form is shown in the flow chart of FIG. 67–FIG. 89. In the processing about this implementation form, the basic point of view is the same as the implementation form which is shown in FIG. 32–FIG. 46. But, it processes a subordinate sentence in detail in the extraction and it realizes the correct analysis.

Here, one sentence to deal with for the processing is explained (This point of view corresponds to the already described implementation form, too). The processing object is one sentence. Next, it prescribes one sentence. One sentence is from the beginning of the sentence to T-interval. Next, it prescribes the kind of the sentence. A sentence is composed of main sentence and subordinate sentence. A main sentence is composed of the definite predicate which is on the left of T-interval and the token which is related with this definite predicate. The subordinate sentence is the part which excludes a main sentence. As for the composition of the sentence, there is a sentence which is composed only of main sentence. However, there is not a sentence which is composed only of subordinate sentence.

Now, as for one sentence, it defined as "being from the beginning of the sentence to T-interval". It supposes that there is one T-interval in the key brackets temporarily. When following this definition, one sentence is from the beginning of the sentence to T-interval in the key brackets. However, in this case, the part of the key brackets is a subordinate sentence. That is, T-interval in the key brackets is T-interval of the subordinate sentence. T-interval in the key brackets and T-interval out of the key brackets are different. That is, the processing object in this place is from the beginning of the sentence to T-interval which is out of the key brackets. T-interval which is in the key brackets is a different processing object.

First, the analysis of the sub-role of step S501 is the same as the step S40 of FIG. 32 completely. It judges whether or not there is equal to or more than one reading point in the sentence of the analysis object in step S502. If there is not a reading point, to process the subordinate sentence which is related with the reading point isn't necessary. It executes step S548, S549 of FIG. 71. Then, it ends an analysis.

When there is equal to or more than one reading point, it extracts a subordinate sentence about each reading point. First, it pays attention to a reading point on the left of T-interval with step S503. Then, it makes this reading point(RP)) the noticeable reading point(NRP). Next, it pays attention to the token (or quasi word) which is situated on just the left of the noticeable reading point with step S504. Then, it judges whether or not it corresponds to the condition of following 1)–4) with step S505–S508.

Figure 76:
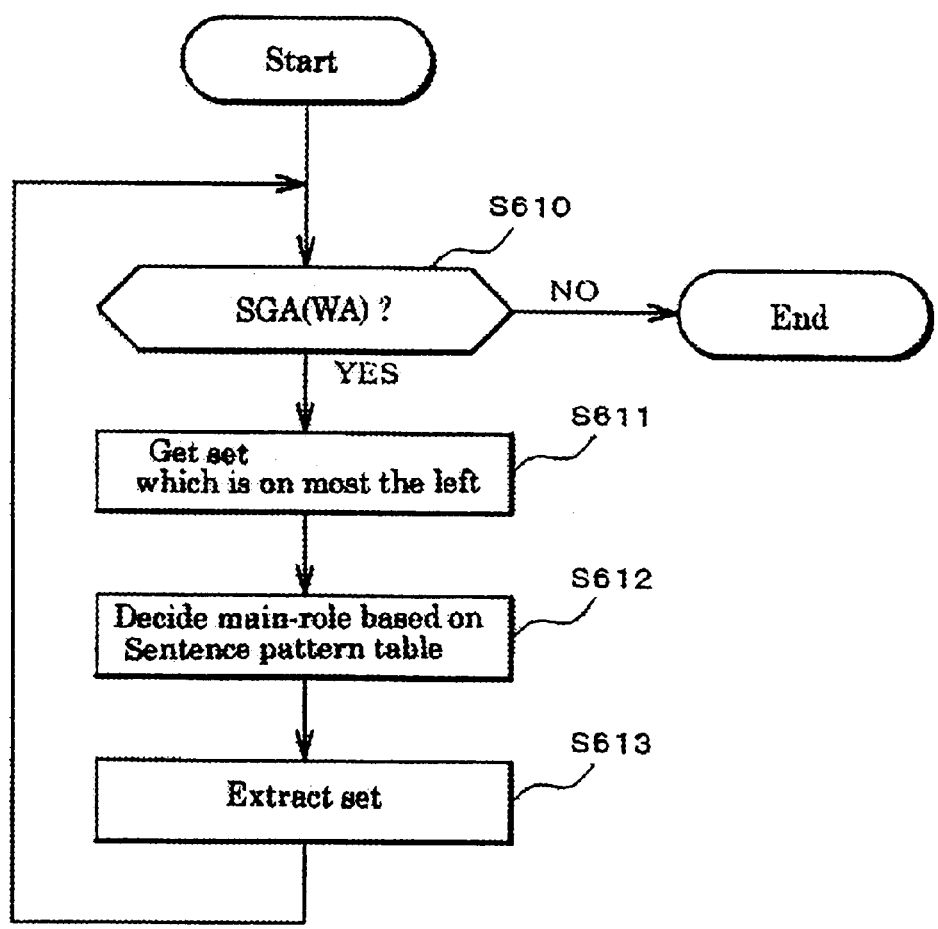
FIG. 76 is the flow chart of the sentence pattern analysis processing.
Figure 77:
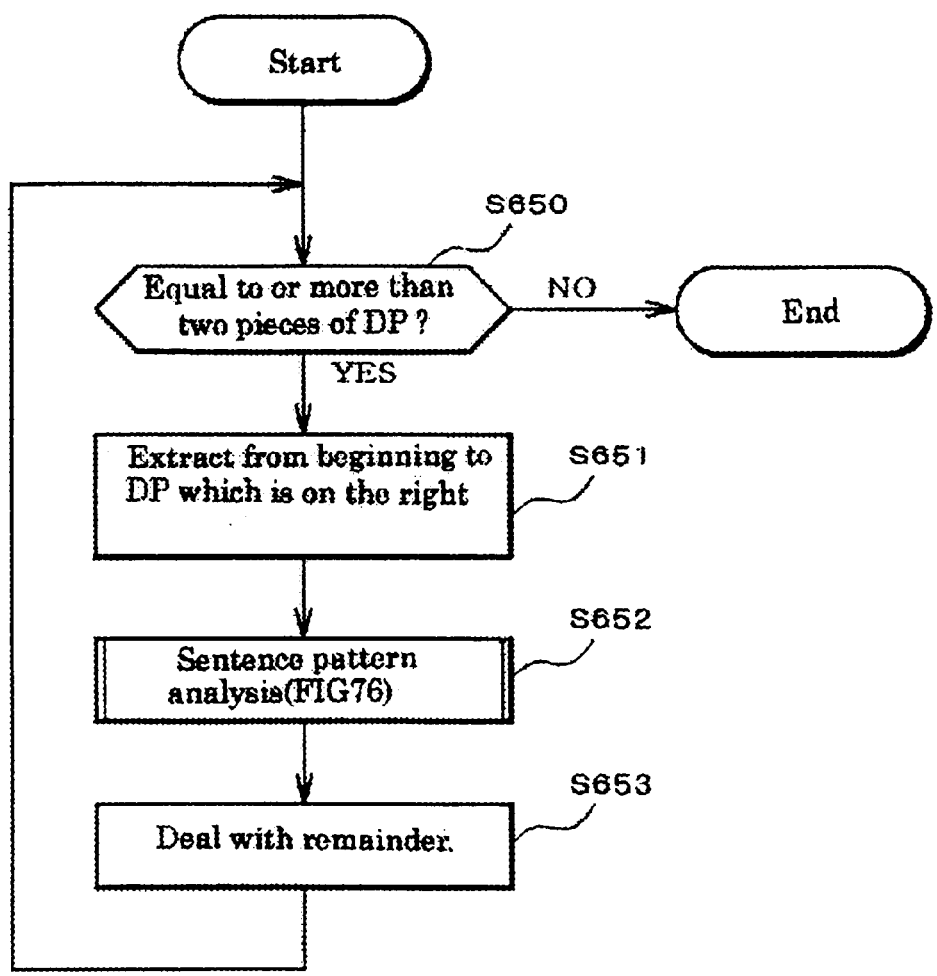
FIG. 77 is the flow chart of the processing of a subordinate sentence.

1) "Noun+No" or "Noun+Deno"
2) "Noun+Na"
3) Non-predicative adjective
4) Definite predicate If corresponding to the condition of 1)–4), it extracts from the noticeable reading point to the definite predicate (step S512) and it executes the processing of a concerned extraction part (step S512A). In case of processing of FIG. 89, as for the extracted subordinate sentence, it executes sentence pattern analysis processing (FIG. 76). Then, it misses an extracted subordinate sentence from the processing object (step S815). After that, it redoes the analysis of the sub-role (step S816–S818). It repeats above-mentioned processing about all reading point.

Incidentally, there is a case which is "Noun" in the part of speech of the token which is situated on just the left and just the right of a reading point. At this case, concerned reading point is not a reading point which is related with the subordinate sentence. Therefore, it deletes the noticeable reading point (step S513). It judges whether or not there is a reading point on the left of the noticeable reading point in step S510. If being, it makes this reading point the noticeable reading point with step S511. If not being, it advances towards step S514.

When ending the processing of FIG. 67, it does the processing to extract the subordinate sentence which is related with "Kara" (or "Yori") and "Made" (FIG. 68). First, it judges whether there is "Noun+"Kara" particle (or "Yori" particle") on the left of the noticeable reading point (step S515) and whether or not there is "Noun+"Made" particle" on the right of the noticeable reading point (step S516). If not being, it judges whether or not there is a reading point on the left of the noticeable reading point (step S519). If not being, it advances towards step S531 of FIG. 69. If being, it makes the reading point the noticeable reading point and it repeats above-mentioned processing (step S520).

If there are "Kara" (or "Yori") and "Made", it judges whether or not there is "the definite predicate" between the noticeable reading point and "Made" (step S517). If being, it extracts from the noticeable reading point to the definite predicate on the left of "Made" as the subordinate sentence (step S521A). Then, it processes about the extracted part (step S521B). In step S518, it judges whether or not there is a reading point on the left of "Kara" (or "Yori"). If not being, it advances towards step S519. If being, it extracts from the reading point which is on the left of the noticeable reading point to the definite predicate on the left of "Kara" (or "Yori") (step S522A). Then, it processes about the extracted part (step S522B).

It repeats above-mentioned processing about all reading point.

When ending the processing of FIG. 68, it processes FIG. 69. FIG. 69 shows the pre-processing to extract the subordinate sentence which is related with a reading point.

First, it judges whether or not there are parentheses ( )[ ]{ } "except the key parentheses (step S531). Incidentally, here, the parentheses mean parentheses except the key parentheses. If being, it extracts the part of ( )[ ]{ } " (step S531A). A sentence in the parentheses is only inserted into the sentence. Next, it judges whether or not there are equal to or more than 2 parentheses in the extraction part (step S53 1 B). If not being, it assumes that there is T-interval on the right of the extracted part (step S531D). Then, it returns to step S531. If being, it extracts the parentheses which are most outside (step S531C). Then, it advances towards step S531D.

In step S531, when there are not parentheses except the key parentheses, it advances towards step S532.

As for a reading point, too, the processing object must be fixed like T-interval. In the processing of a reading point, it judges whether or not there is equal to or more than one reading point in the whole sentence which contains key parentheses (step S532). At this point, it is different from the treatment of T-interval.

There are two reasons in this difference. One is because there are key parentheses which are used only to emphasize. In this case, when ignoring a reading point in the key parentheses, it becomes not possible to do the extraction processing of the subordinate sentence which is related with this reading point. Another is because it shows that there is always a subordinate sentence if there is a reading point irrespective of the key parentheses. Therefore, as for a reading point, it judges whether or not there is equal to or more than one reading point irrespective of the key parentheses (step S532).

If there is not a reading point, it judges whether or not there are key parentheses (step S533E). If there are not key brackets, the extraction processing of the subordinate sentence which is related with a reading point ends and it advances towards the step S548 of FIG. 71. If there are key parentheses, it judges whether or not there is T-interval in the key parentheses (step S533F). If there is not T-interval, it advances towards the step S548 of FIG. 71. If there is not T-interval in the key parentheses, the sentence of the processing object is only one sentence. However, if there is T-interval in the key parentheses, there are equal to or more than two sentences. This case must process equal to or more than 2 sentences. That is, it assumes that there are not key parentheses if there is T-interval in the key parentheses (step S533G). In this case, it deals from the beginning of the sentence to T-interval on immediately the right (step S533D). Then, it executes step S531.

If there is equal to or more than one reading point in step S532, it judges whether or not there are key parentheses (step S533). If there are not key parentheses, it makes the reading point which is on the left of T-interval the noticeable reading point (step S534). Then, it makes the nearest definite predicate on the right of the noticeable reading point the noticeable definite predicate (step S535).

Next, it judges whether or not the definite noticeable predicate is fixed connection (step S536). If not being fixed connection, it advances towards the processing of the noticeable definite predicate (step S537). If being fixed connection, it advances towards the processing of fixed connection (step S538).

This fixed connection means the connection of two definite predicates which connected by subject, object or noun. Fixed connection is either of 1)–5) connection.

1) definite predicate +++ subject ++ definite predicate
2) definite predicate +++ object ++ definite predicate
3) definite predicate +++ subject +++ Noun * definite predicate
4) definite predicate +++ object +++ Noun* definite predicate
5) definite predicate +++ noun * definite predicate Nounno Noundeno Nounna" "Non-predicative adjective" and so on may be stored in this +++".

"Adverb" "simultaneous predicate" "finite predicate" and so on may be stored in ++".

No kind of token must not be stored in *".

The subject is the concept to contain "Nounga", "Nounwa" and "Nounmo".

It extracts the subordinate sentence which is related with a reading point with step S537 and step S538. Details are explained behind.

If there are equal to or more than one reading point and key parentheses, it judges whether or not there is a reading point out of the key parentheses (step S533A). If there is not a reading point out of the key parentheses, a reading point is only in the key parentheses. At this case, a reading point in the key parentheses isn't related with the token out of the key parentheses. Key parentheses are used only to emphasize.

Next, it judges whether or not there is T-interval in the key parentheses (step S533B). If there is not T-interval in the key parentheses, it assumes that there are not key parentheses (step S533C). Then, it advances towards step 534. If there is T-interval in the key parentheses, it assumes that there are not key parentheses (step S533G). Next, it separates in equal to or more than 2 sentences and it deals with the first sentence for the processing (step S533D). Then, it advances towards step S531.

If there are not key parentheses, it makes a reading point on the left of T-interval the noticeable reading point (step S534). It makes a definite predicate on the right of the noticeable reading point the noticeable definite predicate (step S535).

If there is a reading point out of the key parentheses, the token in the key parentheses has the possible-ness which is related with the token out of the key parentheses. If a reading point is out of the key parentheses (step S533A), it makes a reading point which is on the left of T-interval the noticeable reading point (step S539).

Next, it judges whether there are key parentheses between the noticeable reading point and T-interval (step S540). If not being, it makes a definite predicate on the right of the noticeable reading point the noticeable definite predicate (step S547). After that, it advances towards step S536. If there are key parentheses between the noticeable reading point and T-interval, it judges whether or not there is a definite predicate in the key parentheses (step S541). If there is not a definite predicate, it assumes that there are not key parentheses (step S546). Then, it advances towards step S 547. If there is a definite predicate in the key parentheses, the definite predicate which is on the left of the right key parenthesis judges whether or not it is "definite predicate+right key parenthesis+T-interval" (step S542). If being "definite predicate+right key parenthesis+T-interval", it assumes that there are not key parentheses" (step S546). In this case, the definite predicate is not the definite predicate of the subordinate sentence and is the definite predicate of the main sentence. Therefore, it doesn't correspond to the processing of the subordinate sentence which is related with the reading point.

If the definite predicate on the left of the key parenthesis is not "definite predicate+right key parenthesis+T-interval", it judges whether or not there is "definite predicate+right key parenthesis+toiu and so on" (step S543). This connection is divided into the definite predicate and the auxiliary verb by the right key parenthesis but does the function of one definite predicate. Therefore, it makes "definite predicate+right key parenthesis+toiu and so on" the definite predicate on the left of the right key parenthesis (step S544).

If the definite predicate on the left of the right key parenthesis is not "definite predicate+right key parenthesis+toiu and so on", it assumes that the definite predicate which is on the left of the right key parenthesis from the token on the right of the noticeable reading point is the noticeable definite predicate (step S545). Only the definite predicate which is on the left of the right key parenthesis is related with the token out of the key brackets.

The pre-processing of the extraction processing of the subordinate sentence which is related with a reading point ends here.

7.2 About the Processing to Extract the Subordinate Sentence Which is Related with a Reading Point in the Concrete The processing to extract the subordinate sentence which is related with a reading point in the concrete is divided into the processing of the noticeable definite predicate (step S537) and fixed connection (step S538).

Figure 80:
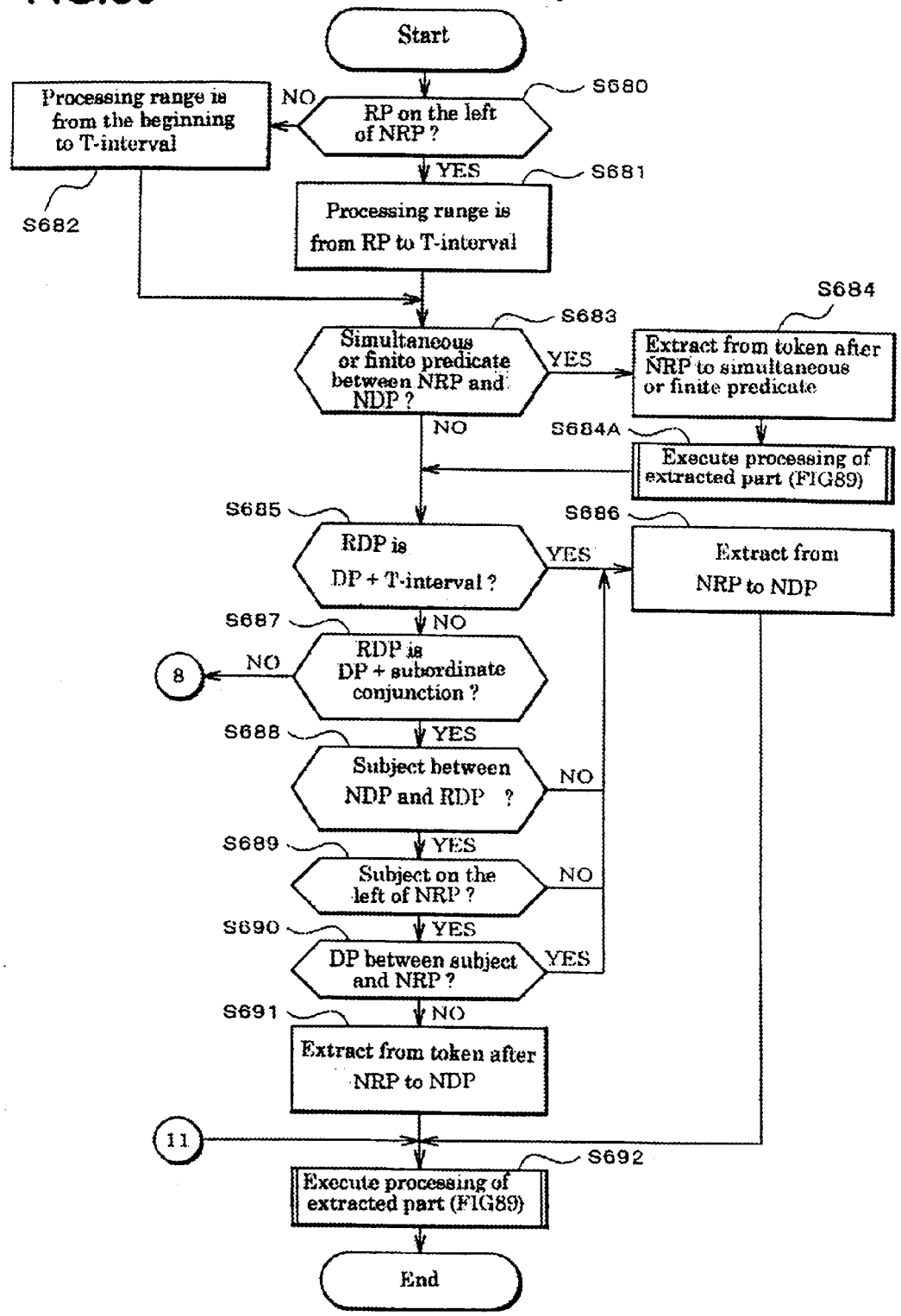
FIG. 80 is the flow chart of the processing of the noticeable definite predicate.

The details of the processing of the noticeable definite predicate are shown in FIG. 80. First, it decides a processing range. It judges whether or not there is a reading point on the left of the noticeable reading point (step S680). If there is a reading point, it makes a processing range from this reading point to T-interval (step S681). If there is not a reading point, it makes a processing range from the beginning of the sentence to T-interval (step S682).

When fixing a processing range, it judges whether or not there is "a simultaneous predicate" or "a finite predicate" between the noticeable reading point and the noticeable definite predicate (step S683). If there is "a simultaneous predicate" or "a finite predicate", it extracts from the token after the noticeable reading point to "the simultaneous predicate" or "the finite predicate" (step S684). Then, it executes the processing of an extraction part (step S684A). When ending processing with step S684A, it advances towards step 685.

If there is not "a simultaneous predicate" or "a finite predicate", it advances towards step 685. In step 685, it judges whether or not the definite predicate on the right of the noticeable definite predicate is "definite predicate+T-interval". If being "definite predicate+T-interval", it extracts from the noticeable reading point to the noticeable definite predicate" (step S686). Then, it executes the processing of an extraction part (step S684A).

When the right definite predicate is not "definite predicate+T-interval", it judges whether or not the right definite predicate is "definite predicate+subordinate conjunction" (step S687). If not being, it advances towards step S700. If being, it judges whether or not there is a subject between the noticeable definite predicate and the right definite predicate (step S688).

If there is not a subject, it extracts from the noticeable reading point to the noticeable definite predicate (step S686). If there is a subject, it judges whether or not there is a subject on the left of the noticeable reading point (step S689).

If there is not a subject, it extracts from the noticeable reading point to the noticeable definite predicate (step S686). If there is a subject, it judges whether or not there is a definite predicate between the subject and the noticeable reading point (step S689). If there is a the noticeable predicate, it extracts from the noticeable reading point to the noticeable definite predicate (step S686). In this case, the subject connects with the definite predicate and has become a subordinate sentence. If there is not a definite predicate, it extracts from the token after the noticeable reading point to the noticeable definite predicate (step S691).

If the right definite predicate is "definite predicate+subordination conjunction" and there is not a subject between the noticeable definite predicate and the right definite predicate, a token on the left of the noticeable reading point is always related with the right definite predicate.

Figure 81:
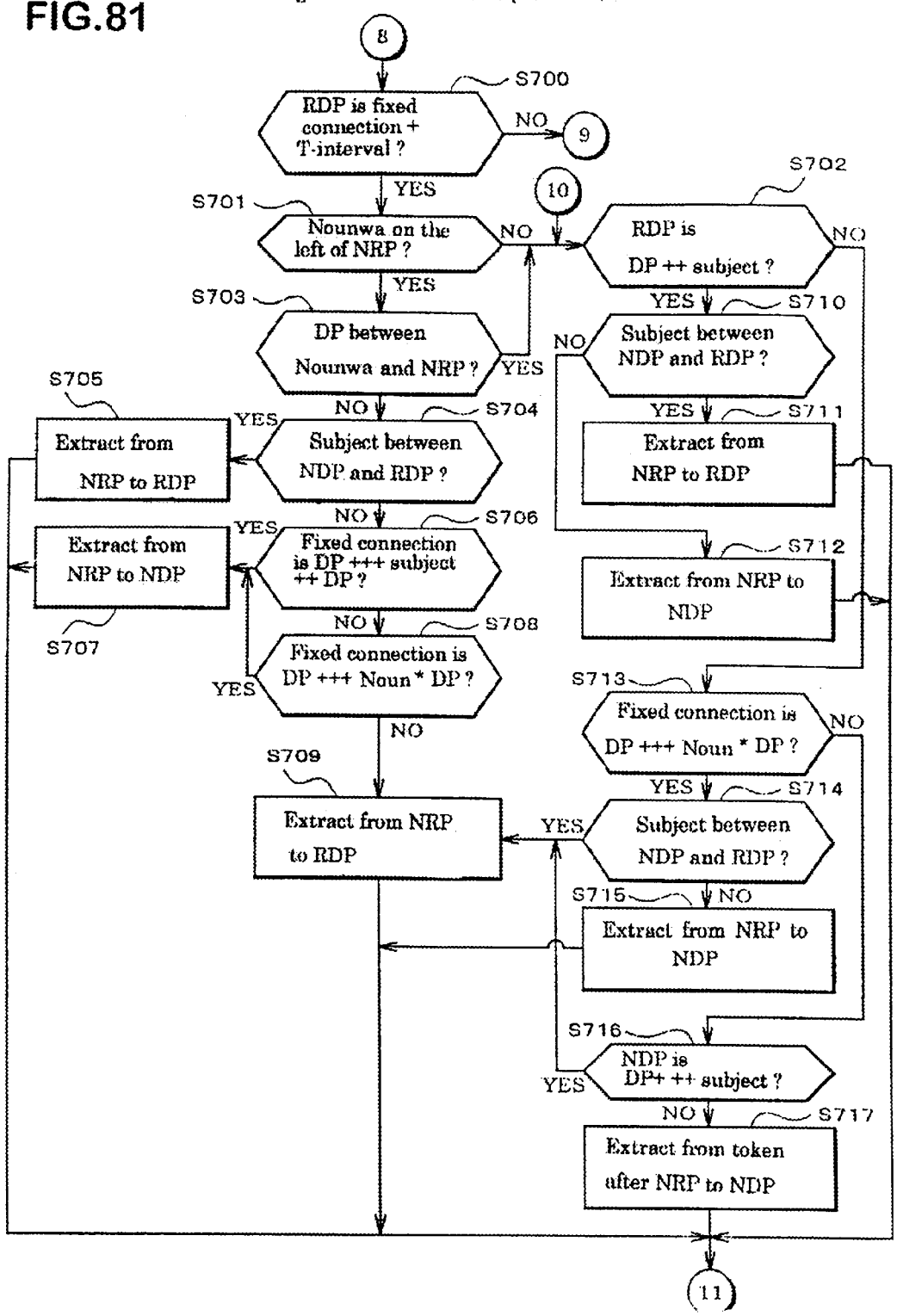
FIG. 81 is the flow chart of the processing of the noticeable definite predicate.

If the right definite predicate is not "definite predicate+T-interval" or "definite predicate+subordination conjunction", it advances towards step S700. FIG. 81 shows continuing processing in FIG. 80.

It judges whether or not the definite predicate is "fixed connection+T-interval" step S700. If not being "fixed connection+T-interval", it advances towards step S720. If being, it judges whether or not there is Nounwa" on the left of the noticeable reading point (step S701). If there is not Nounwa", it advances towards step 702. If there is Nounwa", it judges whether or not there is a definite predicate between Nounwa" and the noticeable reading point (step S703). If there is a definite predicate, it advances towards step 702. If there is not a definite predicate, it judges whether or not there is a subject between the noticeable definite predicate and the right definite predicate (step S704). If there is a subject, it extracts from the noticeable reading point to the right definite predicate (step S705).

If there is not a subject, it judges whether or not the fixed connection is "definite predicate+++subject++definite predicate" (step S706). If being, it extracts from the noticeable reading point to the noticeable definite predicate (step 707).

In the connection of Japanese, "definite predicate+++subject++definite predicate+T-interval" is the strongest connection.

If the fixed connection is not "definite predicate+++subject++definite predicate", it judges whether or not the fixed connection is "definite predicate+++Noun*definite predicate" (step S706). If being, it extracts from the noticeable reading point to the noticeable definite predicate (step S707). If not being, it extracts from the noticeable reading point to the right definite predicate (step S709).

This "definite predicate+++Noun*definite predicate+T-interval" is strong connection following "definite predicate+++subject++definite predicate+T-interval".

If there is not "Nounwa" (step S701) on the left of the noticeable reading point, it judges whether or not the right definite predicate is "definite predicate++subject" (step S702).

Only Nounwa" jumps over "the right definite predicate++subject" and is related with the definite predicate which is on the right. That is, the possible-ness that "Nounwa" is related with the definite predicate of the main sentence is the highest.

If there is not "Nounnwa", it judges whether or not the right definite predicate is "definite predicate+++subject" (step S702). If there is this condition, all tokens except "Nounwa" are related with the right definite predicate. If the right definite predicate is "the definite predicate+++subject", it judges whether or not there is a subject between the noticeable definite predicate and the right definite predicate (step S710). If there is a subject, it extracts from the noticeable reading point to the right definite predicate (step S711). If there is not a subject, it extracts from the noticeable reading point to the noticeable definite predicate (step S712).

If the right definite predicate is not "definite predicate+++subject", it judges whether or not the fixed connection is "definite predicate+++Noun*definite predicate" (step S713). If being, it judges whether or not there is a subject between the noticeable definite predicate and the right definite predicate (step S714). If there is a subject, it extracts from the noticeable reading point to the right definite predicate (step S709). This subject combines the noticeable definite predicate and the right definite predicate. If there is not a subject, it extracts from the noticeable reading point to the noticeable definite predicate (step S715). If there is not this subject, the connection of "noticeable definite predicate+++Noun*definite predicate" is strong.

If the fixed connection is not "noticeable definite predicate+++Noun*definite predicate", it judges whether or not the noticeable definite predicate is "definite predicate++subject" (step S716). If being, it extracts from the noticeable reading point to the right definite predicate (step S709). This subject combines the noticeable definite predicate and the right definite predicate. If not being, it extracts from the token after the noticeable reading point to the noticeable definite predicate (step S717).

If the right definite predicate is not "fixed connection+T-interval" in step S700, it advances towards step S720.

Then, it judges whether or not the right definite predicate is "fixed connection+subordination conjunction" (step S720). If being, it judges whether or not there is "Nounwa" on the left of the noticeable reading point (step S721). If there is not "Nounwa" on the left of the noticeable reading point, it advances towards step S702. If there is "Nounwa", it judges whether or not there is a definite predicate between "Noun" and the noticeable reading point (step S722). If there is a definite predicate, it advances towards step S702. If there is not a definite predicate, it judges whether or not there is a subject between the noticeable definite predicate and the right definite predicate (step S723). If there is a subject, it extracts from the noticeable reading point to the right definite predicate (step S724). If there is not a subject, it judges whether or not fixed connection is "definite predicate+++subject++definite predicate" (step S725).

If being, it extracts from the token after the noticeable reading point to the right definite predicate (step S726). If not being, it judges whether or not fixed connection is "definite predicate+++Noun*definite predicate" (step S727).

If being, it extracts from the noticeable reading point to the noticeable definite predicate (step S728). If not being, it extracts from the noticeable reading point to the right definite predicate (step S729).

If the right definite predicate is not "fixed connection+ subordinate conjunction", it judges whether or not there is "Nounwa" on the left of the noticeable reading point (step S730).

If there is not "Nounwa", it judges whether or not the right definite predicate is "definite predicate+++subject" (step S733). If there is "Nounwa", it judges whether or not there is a definite predicate between "Nounwa" and the noticeable reading point (step S731).

If being, it advances towards step 733. If not being, it extracts from the token after the noticeable reading point to the noticeable definite predicate (step S732).

If there is not "Nounwa" on the left of the noticeable reading point, it judges whether or not the right definite predicate is "definite predicate+++subject" (step S733).

If being, it judges whether or not the noticeable definite predicate is "definite predicate+++subject" (step S734).

If being, it extracts from the token after the noticeable reading point to the right definite predicate (step S729). If not being, it extracts from the noticeable reading point to the noticeable definite predicate (step S735).

If the right definite predicate is not "definite predicate+++ subject" (step S733), it extracts from the token after the noticeable reading point to the noticeable definite predicate (step S738).

Figure 83:
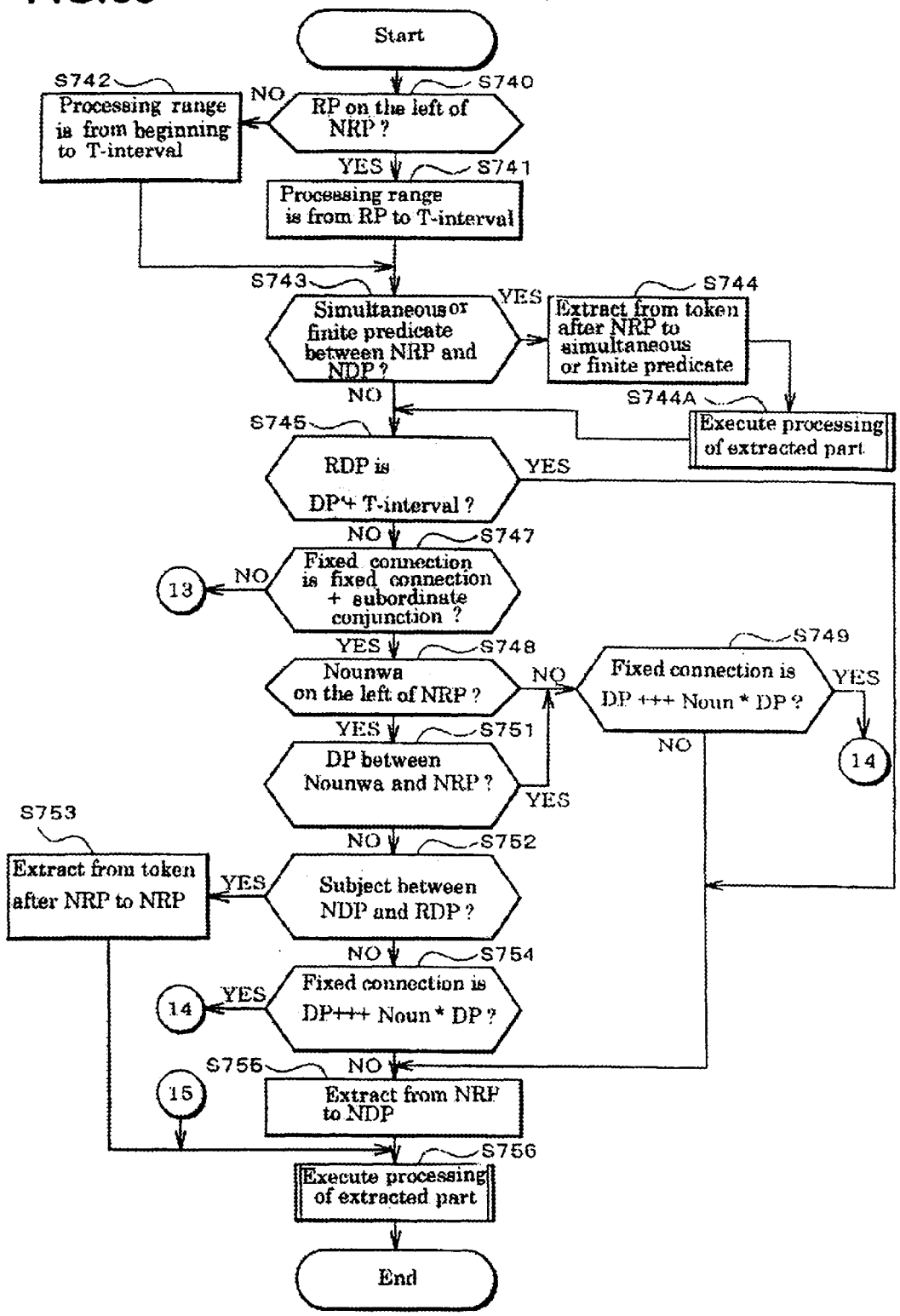
FIG. 83 is the flow chart of the processing of the fixed connection.

The details of the processing of fixed connection are shown in FIG. 83. First, it fixes a processing range. It judges whether or not there is a reading point on the left of the noticeable reading point (step S740).

If being, it makes a processing range from the reading point on the left to T-interval (step S741). If not being, it makes a processing range from the beginning of the sentence to T-interval (step S742).

It judges whether or not there is a simultaneous predicate or a finite predicate between the noticeable reading point and the noticeable definite predicate (step S743).

If being, it extracts from the token after the noticeable reading point to the simultaneous predicate or the finite predicate (step S744). If not being, it advances towards step S745.

It judges whether or not the right definite predicate is "definite predicate+T-interval" (step S745).

If being, it extracts from the noticeable reading point to the noticeable definite predicate (step S755). Then, it executes the processing of the extraction part (step S756). If not being, it judges whether or not fixed connection is "fixed connection+subordinate conjunction" (step S747). If not being, it advances towards step S760. If being, it judges whether or not there is "Nounwa" on the left of the noticeable reading point (step S748).

If not being, it judges whether or not fixed connection is "definite predicate+++Noun*definite predicate" (step S749). If being, it advances towards step S761. If not being, it extracts from the noticeable reading point to the noticeable definite predicate (step S755).

If there is "Nounwa" on the left of the noticeable reading point (step S748), it judges whether or not there is a definite predicate between "Nounwa" and the noticeable reading point (step S751).

If being, it advances towards step 749. If not being, it judges whether or not there is a subject between the noticeable definite predicate and the right definite predicate (step S752).

If being, it extracts from the token after the noticeable reading point to the noticeable definite predicate (step S753). If not being, it judges whether or not fixed connection is "definite predicate+++Noun*definite predicate" (step S754).

If being, it advances towards step S761. If not being, it extracts from the noticeable reading point to the noticeable definite predicate (step S755).

If fixed connection is not "fixed connection+subordinate conjunction" with step S747, it advances towards step S760. Then, it judges whether or not the right definite predicate is fixed connection (step S760).

Figure 86:
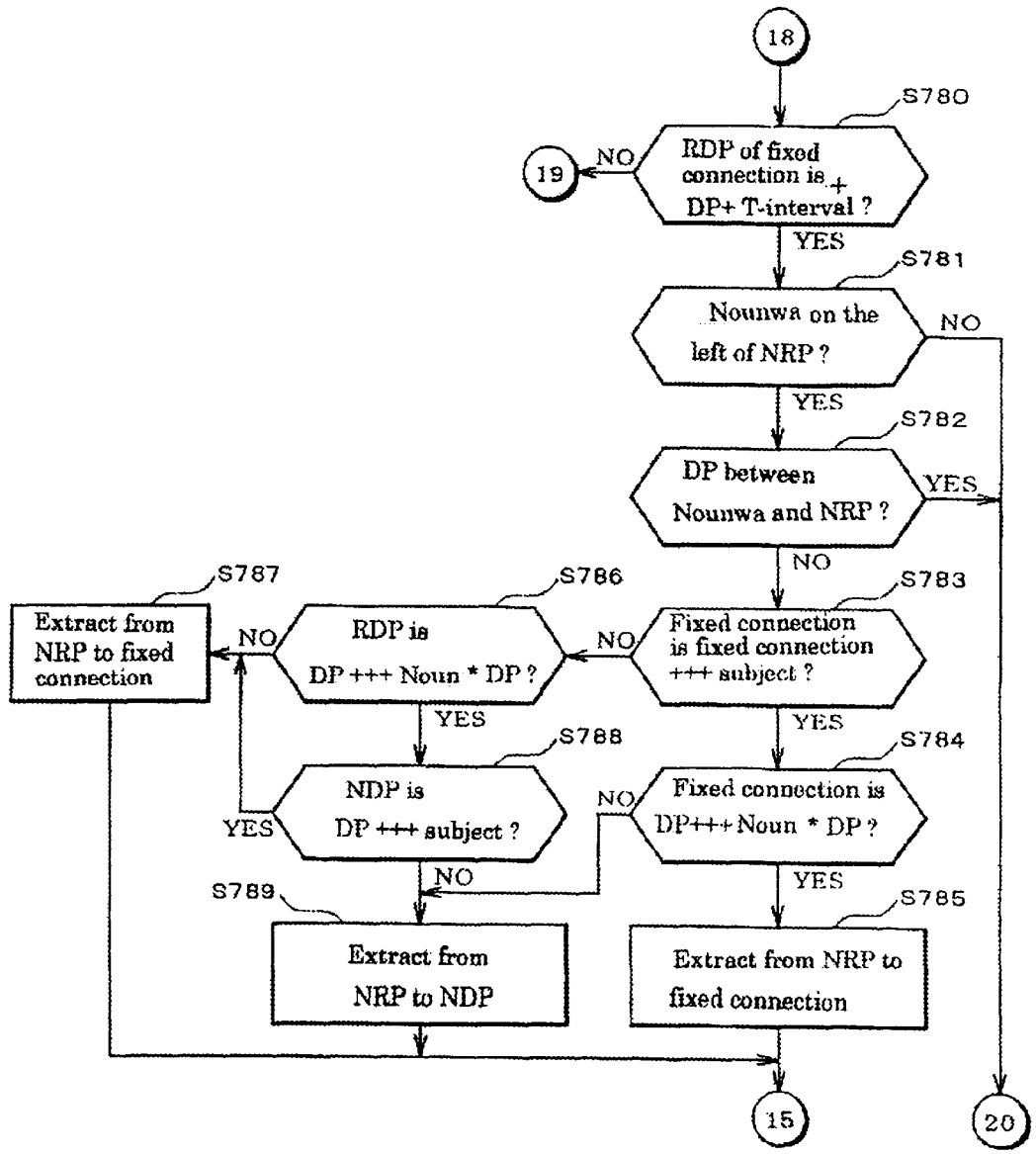
FIG. 86 is the flow chart of the processing of the fixed connection.

If being, it advances towards the step S780 of FIG. 86. If not being, it judges whether or not the right definite predicate of fixed connection is "definite predicate+T-interval" (step S761).

Figure 85:
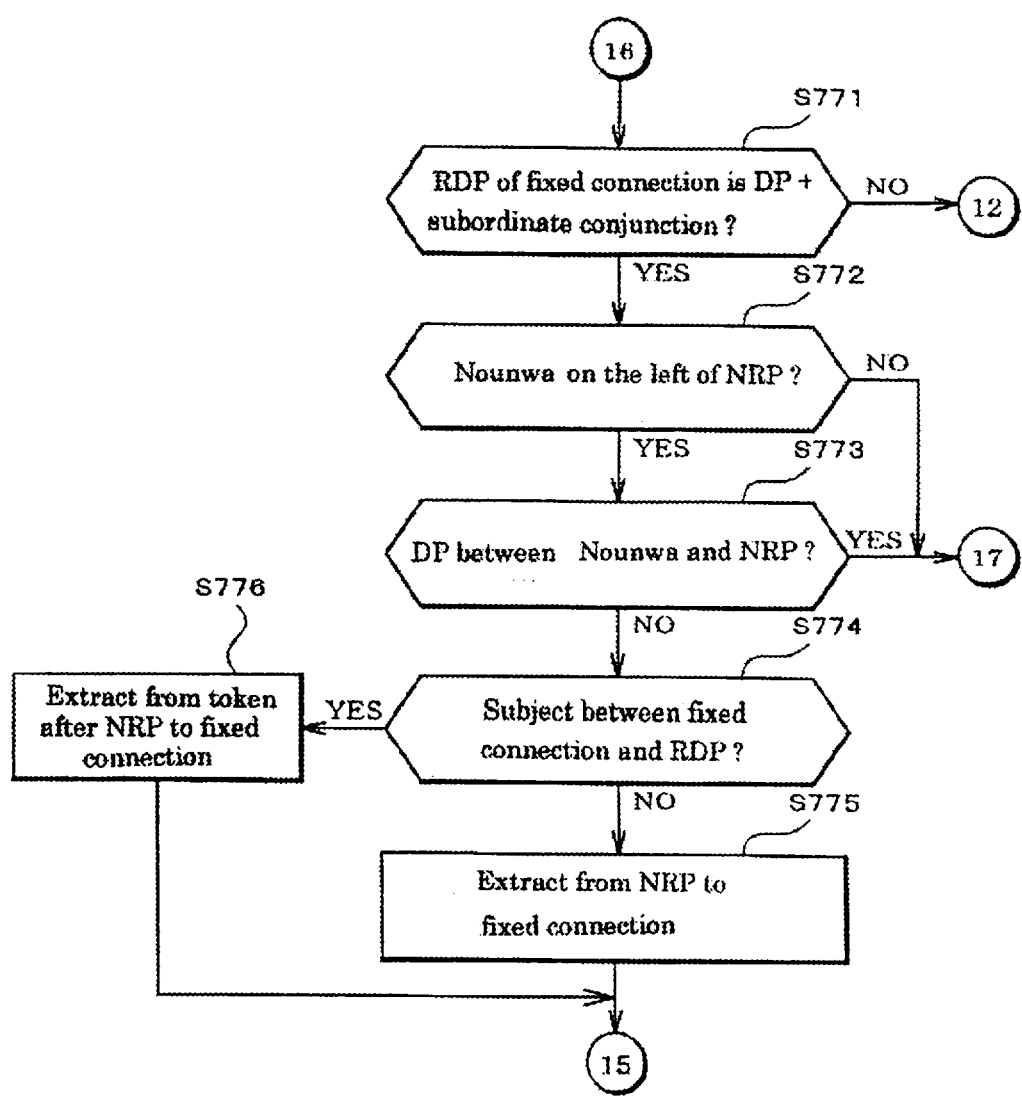
FIG. 85 is the flow chart of the processing of the fixed connection.

If not being, it advances towards the step S771 of FIG. 85. If being, it judges whether or not there is "Nounwa" on the left of the noticeable reading point (step S762).

If there is "Nounwa", it judges whether or not there is a definite predicate between "Nounwa" and the noticeable reading point (step S763). If there is a definite predicate, it advances towards step 767. If there is not a definite predicate, it judges whether or not fixed connection is "fixed connection+++subject" (step S764).

If being, it extracts from the noticeable reading point to the noticeable definite predicate (step S765). If not being, it extracts from the noticeable reading point to fixed connection (step S766).

If there is not "Nounwa" on the left of the noticeable reading point (step S762), it judges whether or not the right definite predicate is "definite predicate+++subject" (step S767).

If not being, it extracts from the noticeable reading point to fixed connection (step S768). If being, it judges whether or not the noticeable definite predicate is "definite predicate+++subject" (step S769).

If being, it extracts from the noticeable reading point to fixed connection (step S768). If not being, it extracts from the noticeable reading point to the noticeable definite predicate (step S770).

If the right definite predicate of fixed connection is not "definite predicate+T-interval" with step S761, it advances towards step S771 of FIG. 85. Here, it judges whether or not the right definite predicate of fixed connection is "definite predicate+subordinate conjunction" (step S771).

Figure 82:
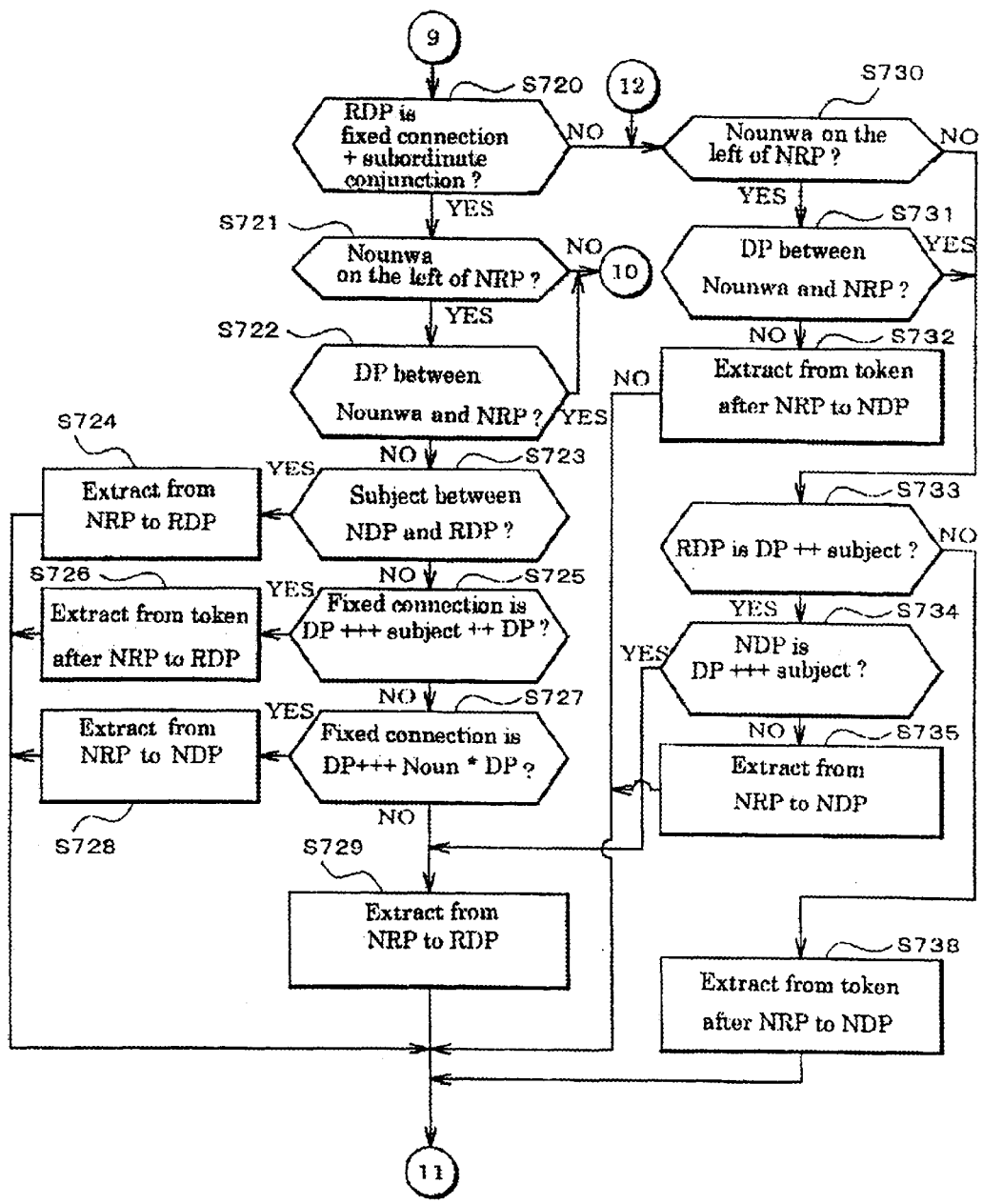
FIG. 82 is the flow chart of the processing of the noticeable definite predicate.

If not being, it advances towards the step S730 of FIG. 82. If being, it judges whether or not there is "Nounwa" on the left of the noticeable reading point (step S772).

If not being, it advances towards step S767. If being, it judges whether or not there is a definite predicate between "Nounwa" and the noticeable reading point (step S773).

If being, it advances towards step S767. If not being, it judges whether or not there is a subject between fixed connection and the right definite predicate (step S774).

If not being, it extracts from the noticeable reading point to fixed connection (step S775). If being, it extracts from the token after the noticeable reading point to fixed connection (step S776).

At this point, the extraction processing that fixed connection is not fixed connection with the right definite predicate ends.

If the right definite predicate of the noticeable definite predicate is fixed connection with step S760, it advances towards the step S780 of FIG. 86.

First, it judges whether or not the right definite predicate of fixed connection is "definite predicate+T-interval" (step S780).

Figure 88:
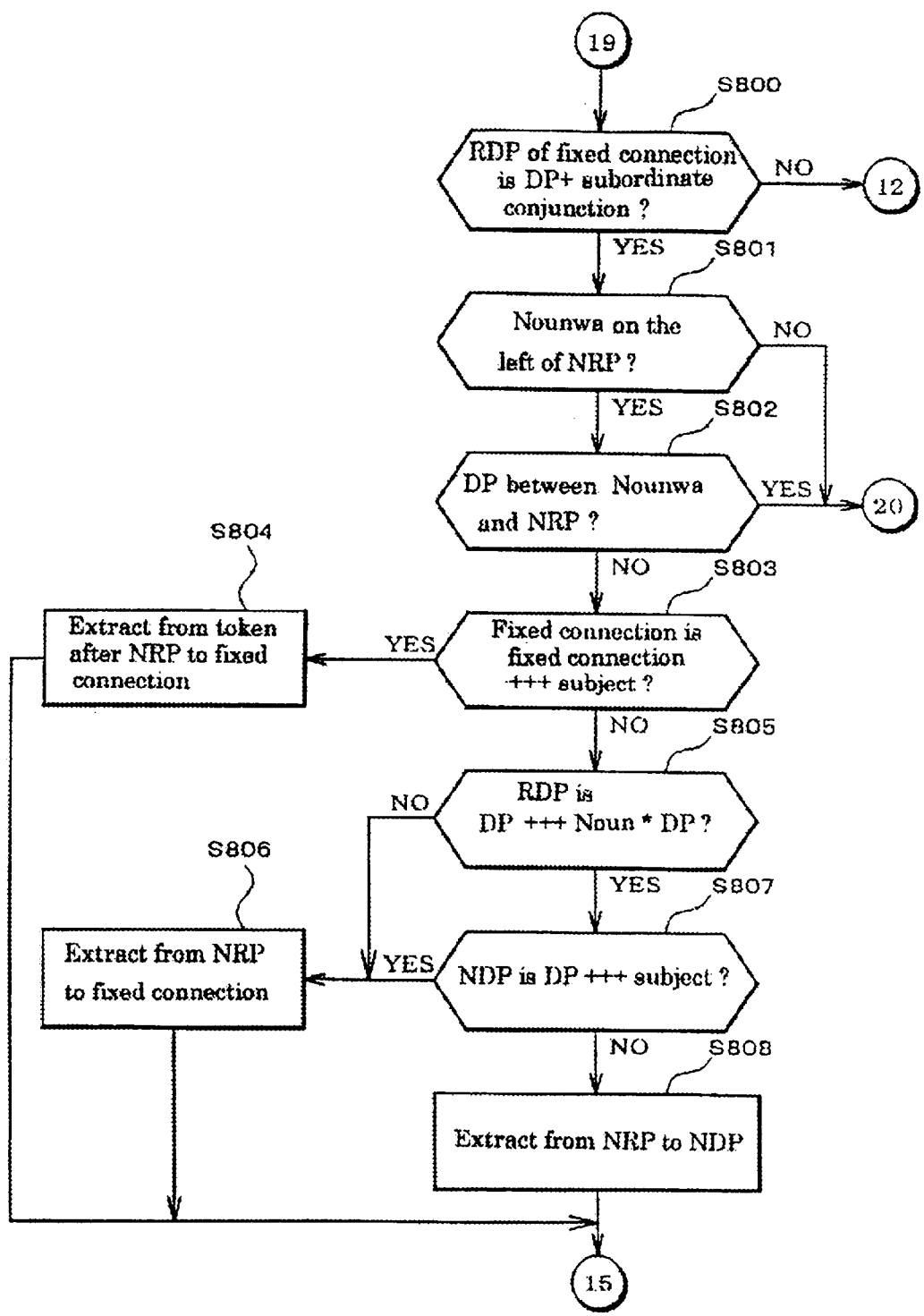
FIG. 88 is the flow chart of the processing of the fixed connection.

If not being, it advances towards the step S800 of FIG. 88. If being, it judges whether or not there is "Nounwa" on the left of the noticeable reading point (step S781).

Figure 87:
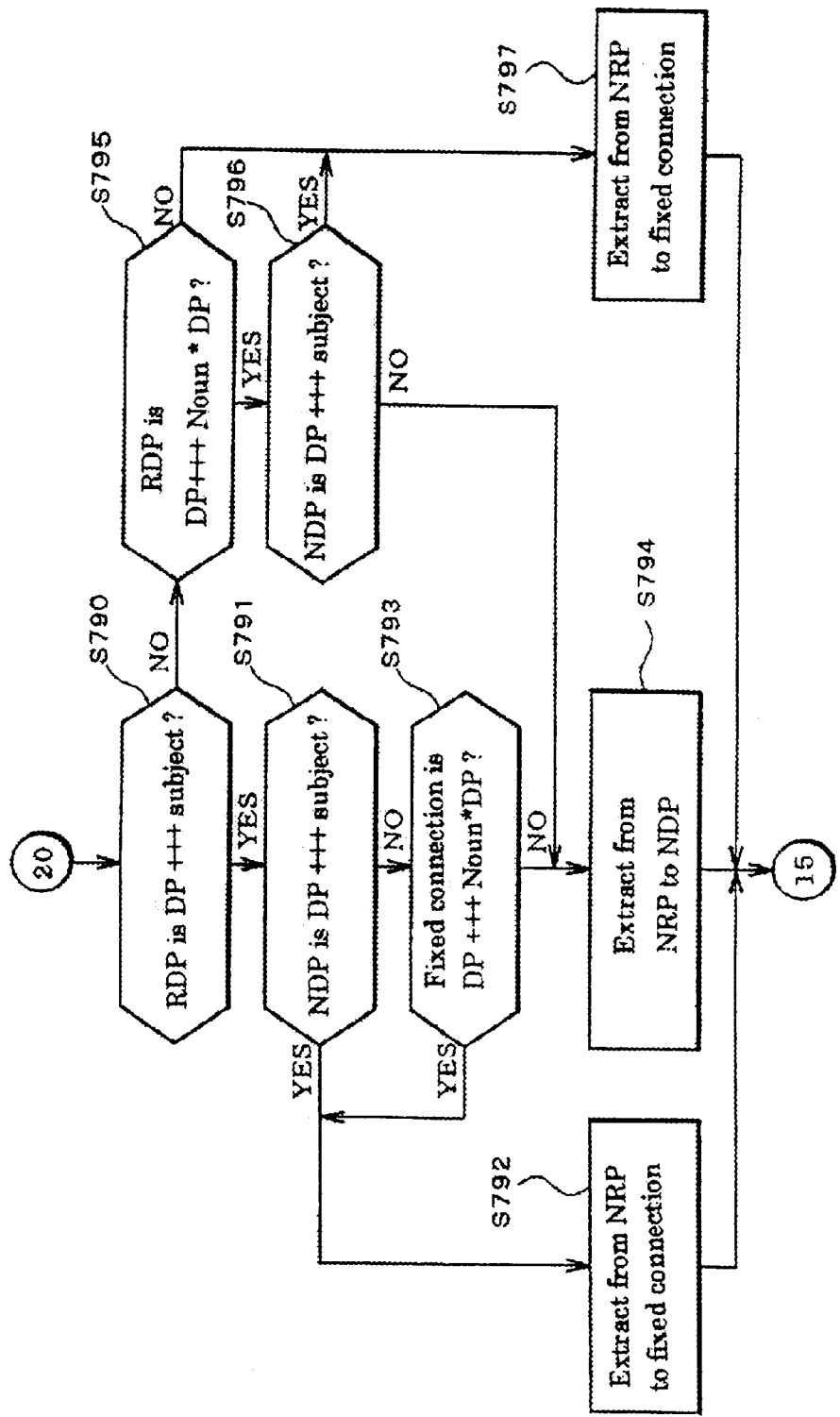
FIG. 87 is the flow chart of the processing of the fixed connection.

If not being, it advances towards step 790 of FIG. 87. If being, it judges whether or not there is a definite predicate between "Nounwa" and the noticeable reading point (step S782).

If being, it advances towards step 790. If not being, it judges whether or not fixed connection is "fixed connection+++subject" (step S783).

If being, it judges whether or not fixed connection is "noticeable definite predicate+++Noun*definite predicate" (step S784).

If being, it extracts from the noticeable reading point to fixed connection (step S785). If not being, it extracts from the noticeable reading point to the noticeable definite predicate (step S789).

If not being "fixed connection+++subject" (step S783), it judges whether or not the right definite predicate is "definite predicate+++Noun*definite predicate" (step S786).

If not being, it extracts from the noticeable reading point to fixed connection (step S787). If being, it judges whether or not the noticeable definite predicate is "definite predicate+++subject" (step S788).

If being, it extracts from the noticeable reading point to fixed connection (step S787). If not being, it extracts from the noticeable reading point to the noticeable definite predicate (step S789).

If there is not "Nounwa" on the left of the noticeable reading point in step S781, it judges whether or not the right definite predicate is "definite predicate+++subject" (step S790).

If being, it judges whether or not the noticeable definite predicate is "definite predicate+++subject" (step S791).

If being, it extracts from the noticeable reading point to fixed connection (step S792). If not being, it judges whether or not fixed connection is "definite predicate+++ Noun*definite predicate" (step S793).

If being, it extracts from the noticeable reading point to fixed connection (step S792). If not being, it extracts from the noticeable reading point to the noticeable definite predicate (step S794).

If the right definite predicate is not "definite predicate+++ subject" (step S790), it judges whether or not the right definite predicate is "definite predicate+++Noun*definite predicate" (step S795).

If being, it judges whether or not the noticeable definite predicate is "definite predicate+++subject" (step S796).

If being, it extracts from the noticeable reading point to fixed connection (step S797). If not being, it extracts from the noticeable reading point to the noticeable definite predicate (step S794).

If the right definite predicate is not "definite predicate+++ Noun*definite predicate" (step S795), it extracts from the noticeable reading point to fixed connection (step S797).

At this point, it ends the extraction processing that the right definite predicate of fixed connection is "definite predicate+T-interval".

If the right definite predicate of fixed connection is not "definite predicate+T-interval" with step S780, it advances towards the step S800 of FIG. 88.

First, it judges whether or not the right definite predicate of fixed connection is "definite predicate+subordinate conjunction" (step S800).

If not being, it advances towards the step S730 of FIG. 82. If being, it judges whether or not there is "Nounwa" on the left of the noticeable reading point (step S801).

If not being, it advances towards the step S790 of FIG. 87. If being, it judges whether or not there is a definite predicate between "Nounwa" and the noticeable reading point (step S802).

If being, it advances towards step S790. If not being, it judges whether or not fixed connection is "fixed connection+++subject" (step S803).

If being, it extracts from the token after the noticeable reading point to fixed connection (step S804). If not being,It judges whether or not the right definite predicate of the noticeable definite predicate is "noticeable definite predicate+++Noun*definite predicate" (step S805).

If not being, it extracts from the noticeable reading point to fixed connection (step S806). If being, it judges whether or not the noticeable definite predicate is "definite predicate+++subject" (step S807).

If being, it extracts from the noticeable reading point to fixed connection (step S806). If not being, it extracts from the noticeable reading point to the noticeable definite predicate (step S808).

Here, it ends all extraction processing of the subordinate sentence which is related with a reading point.

Figure 89:
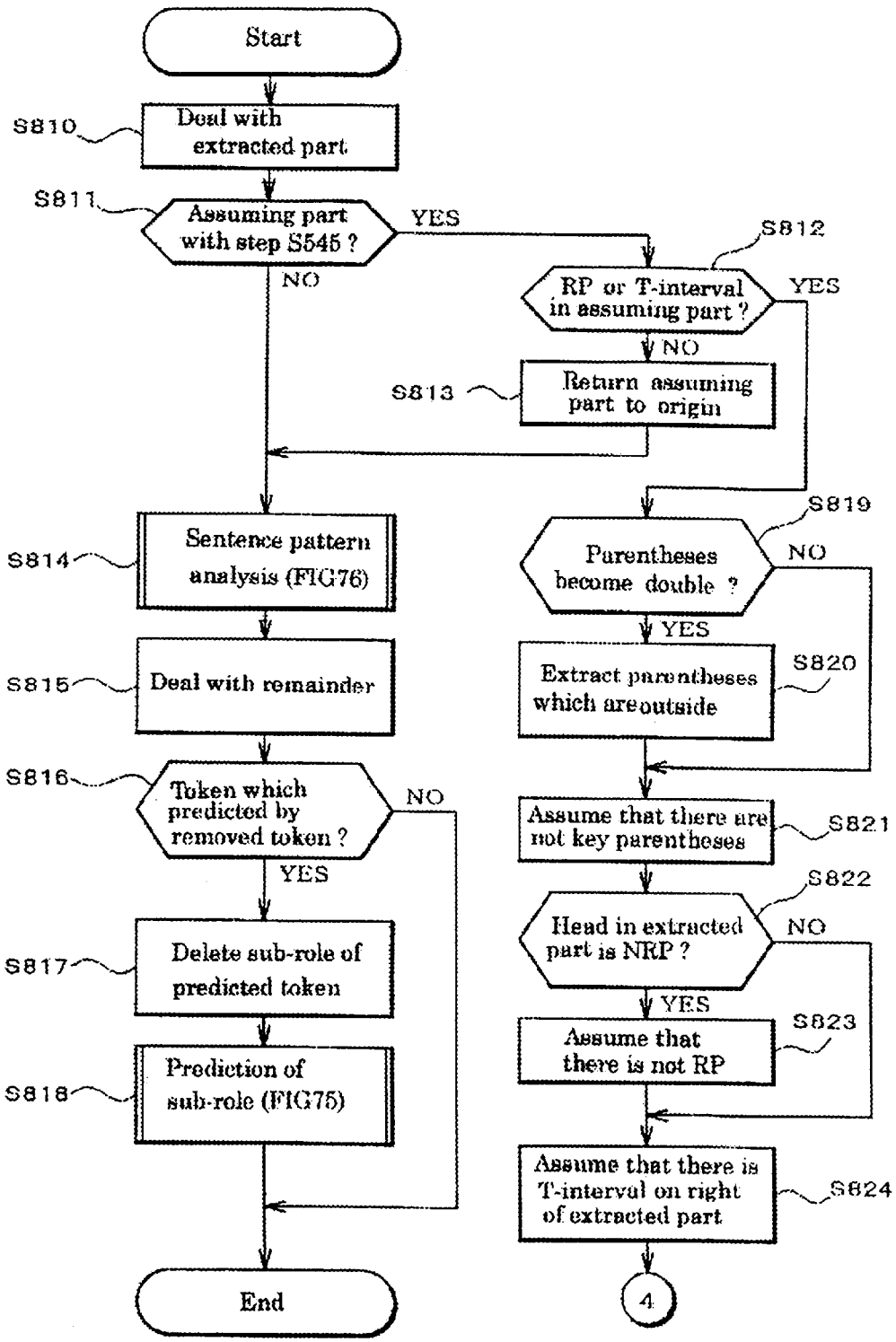
FIG. 89 is the flow chart of the processing of an extraction part.

Next, it refers to the flow chart of FIG. 89 and the processing of an extraction part is explained. First, it deals with the extracted part for the processing (step S810).

Next, it judges whether or not there is an assuming part which was processed with step S545 (step S811).

If there is not an assuming part, it analyzes a sentence pattern with step S814.

Next, it removes the extracted part and it deals with the remainder for the processing (step S815).

Moreover, when necessary, it redoes the analysis of the local structural role (step S816–S818).

If there is an assuming part with step S811, it judges whether or not there are the reading point and T-interval in the concerned assuming part (step S812).

If not being, it returns an assuming part to the origin (step S813). If being, it judges whether or not the parentheses become double (step S819).

If becoming double, it leaves parentheses inside and it assumes that there are not other parentheses (step S820). If not becoming double, it assumes that there are not concerned key parentheses.

Next, it judges whether or not the head in the extracted part is the noticeable reading point (step S822).

If being, it assumes that there is not the reading point (step S823). Then, it advances towards step S824. If not being, it advances towards step S824.

As for step S824, it assumes that there is T-interval on the right of the extracted part and it deals with this for the processing.

Then, it executes the step S531 of FIG. 69.

7.2 The Example Which Analyzes the Structure and the Role of the Sentence About Illustrative Sentence 3

An analysis is shown about the illustrative sentence 3 which is shown below.

Obuza-ba-sini yoruto supeinno kyoudosikaga kirokuwo sirabe sensisita heisino shinzokunimo syasinwo misete kakuninsitatoiu (According to the Observer, the hometown historian in Spain examined a record. Then, he showed the relative of the soldier who was killed in war, too, the photograph. Then, he seems to have confirmed.)

Figure 91:
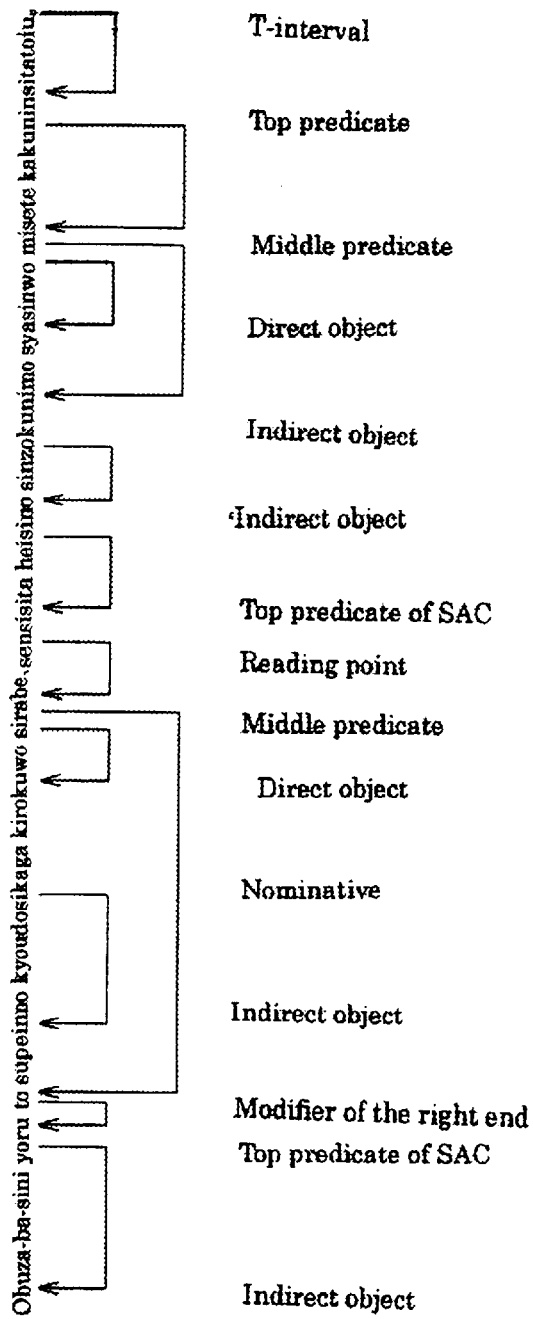
FIG. 91 is the figure which shows the first relation which was given to each token of the illustrative sentence 3.
Figure 92:
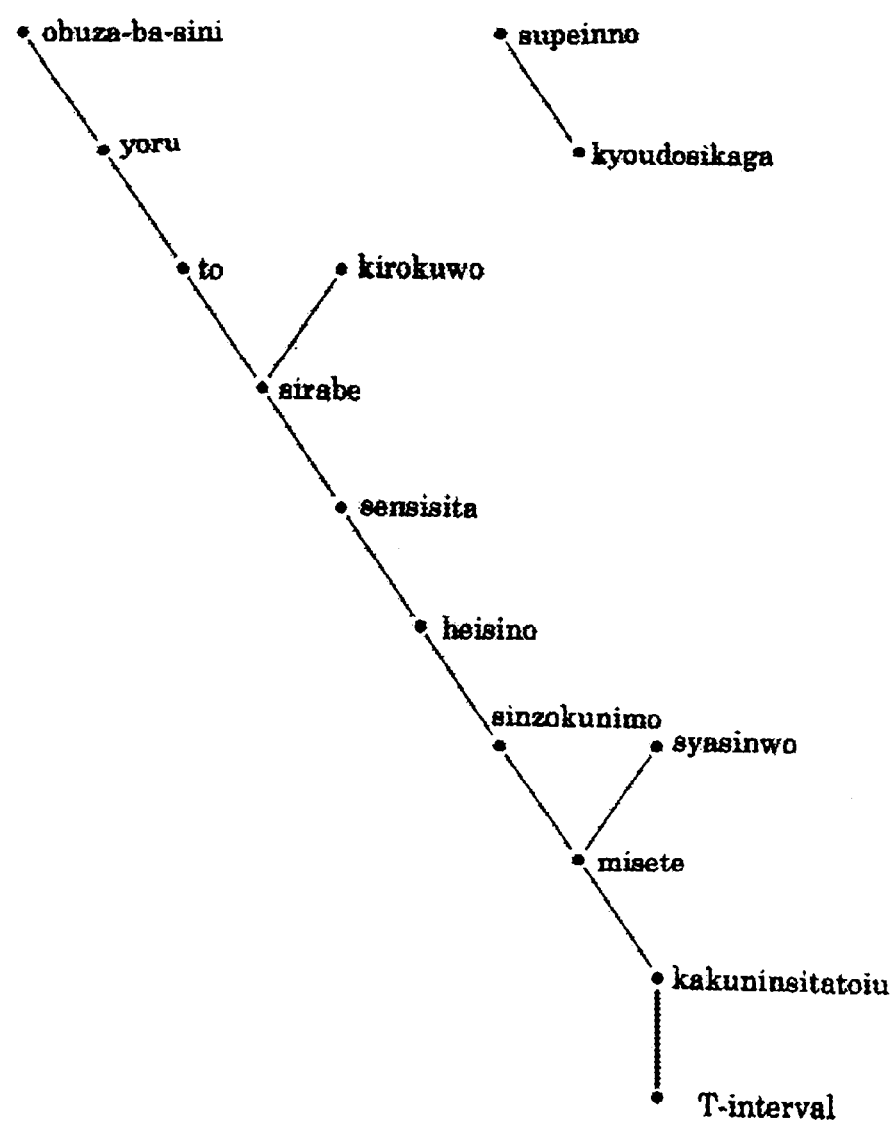
FIG. 92 is the figure which showed the relation of FIG. 91 by the tree structure.

The result which analyzed a local structural role (step S501 of FIG. 67) is shown in FIG. 90. Also, the relation of each token of FIG. 90 is shown by the arrow (FIG. 91). Then, it displays the relation of each token in the tree form (FIG. 92). Hereinafter, the analysis of the sentence structure of is explained.

When ending the analysis of the sub-role with step S501 of FIG. 67, it judges whether or not there is equal to or more than one reading point in step S502. Because there is one reading point between sirabe" and sensisita", it pays attention to this reading point (step S503). It pays attention to the token or the quasi word on just the left of the noticeable reading point with step S504. That is, it pays attention to sirabe". As for sirabe", it doesn't correspond from step S505 to step S509. Moreover, there is not other reading point in the concerned sentence. With step S510, it advances towards step S514 of FIG. 68.

It makes the reading point between sirabe "and sensisita" the noticeable reading point with step S514. It doesn't correspond from step S515 to step S518. With step S519, it judges whether or not there is a reading point on the left of the noticeable reading point.

Because there is not a reading point, it advances towards the step S531 of FIG. 69. It judges whether or not there are parentheses except the key brackets and so on with step S531. There are not parentheses except the key parentheses. It advances towards step S532. Then, it judges whether or not there is equal to or more than one reading point.

Because there is equal to or more than one reading point, it advances towards step S533. Then, it judges whether or not there are key parentheses. There are not key parentheses. It advances towards step S534. Then, it makes the reading point which is between sirabe "and sensisita" the noticeable reading point. It makes sensisita" the noticeable definite predicate with step 535.

Next, it judges whether or not sensisita" is fixed connection with step 536. It is not fixed connection. It advances towards the processing of the noticeable definite predicate (step 537).

It judges whether or not there is a reading point on the left of the noticeable reading point with step S680 of FIG. 80. There is not a reading point. It deals for the processing from the beginning of the sentence to T-interval with step S682. In the illustrative sentence, it deals for the processing from Obuza-ba-sini" to T-interval. In the illustrative sentence, the noticeable definite predicate is sensisita" and the right definite predicate is kakuninsitatoiu".

It judges whether or not kakuninsitatoiu" is "definite predicate+T-interval" with step S685. This kakuninsitatoiu" corresponds. It extracts from the noticeable reading point to "sensisita" with step S686.

Next, it processes this extraction part (step S692). That is, it deals with the extracted part for the processing (step S810 of FIG. 89). It judges whether or not there is an assuming part in the extraction part (step S811). Because here is not an assuming part, it advances towards step S814 and it analyzes a sentence pattern. It judges whether or not there is "syukakuga(wa)" with step S610 of FIG. 76. There is not "syukakuga(wa)". It ends the sentence pattern analysis processing.

It removes the part which was extracted with step S815 of FIG. 89 and it deals with the remainder for the processing. That is, it removes sensisita".

A processing object is shown below.

Obuza-ba-sini yoruto supeinno kyoudosikaga kirokuwo sirabe heisino shinzokunimo syasinwo misete kakuninsitatoiu Next, it judge whether or not there is the token or quasi word which was predicted by the part which was removed from the object (step S816). That is, it judges whether or not there is the token or quasi word which was predicted by sensisita". This sensisita" predicted sirabe". It erases the sub-role of sirabe" with step S817. Then, it analyzes a sub-role again about sirabe" with step S818. As a result, the role of sirabe" is predicted by m isete".

Figure 93:
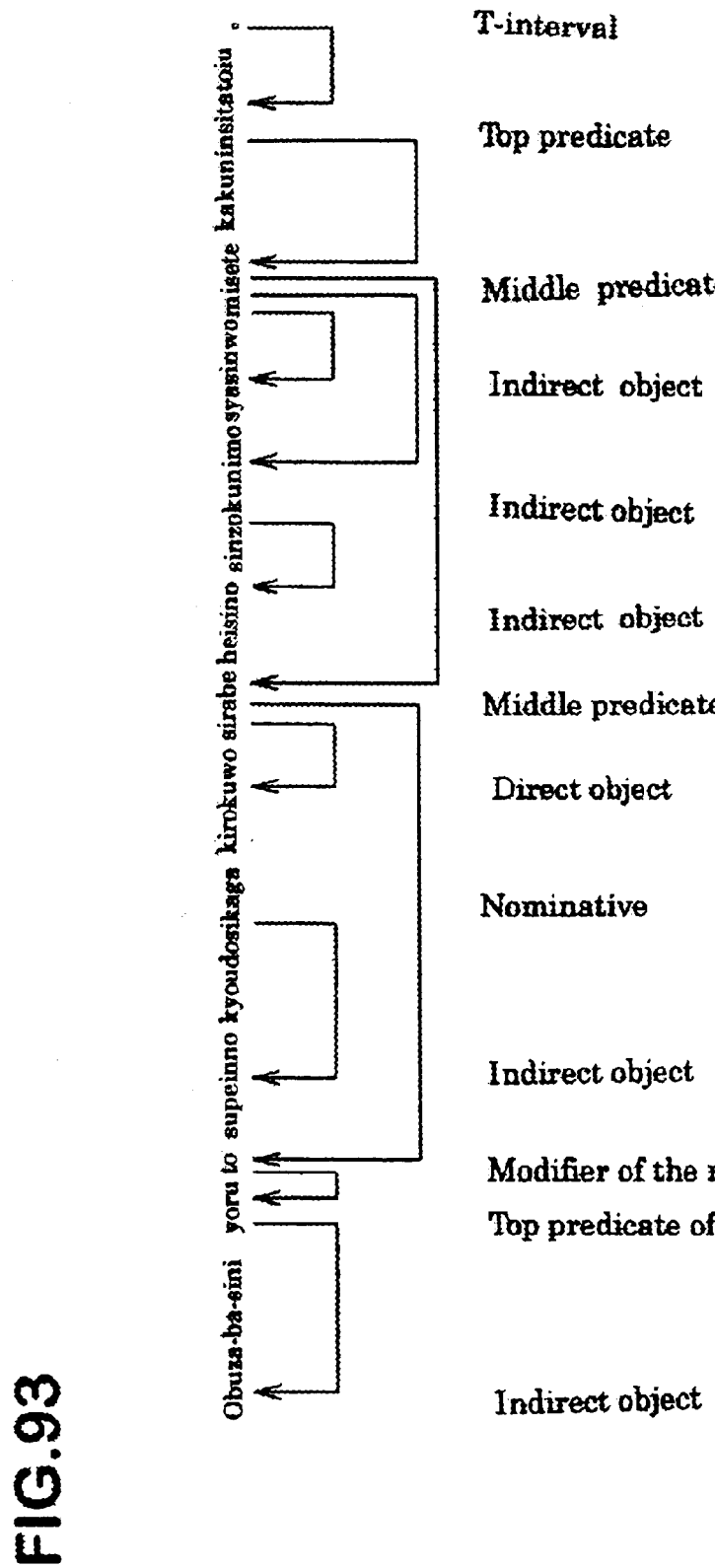
FIG. 93 is the figure which shows the last relation of FIG. 91.
Figure 94A:
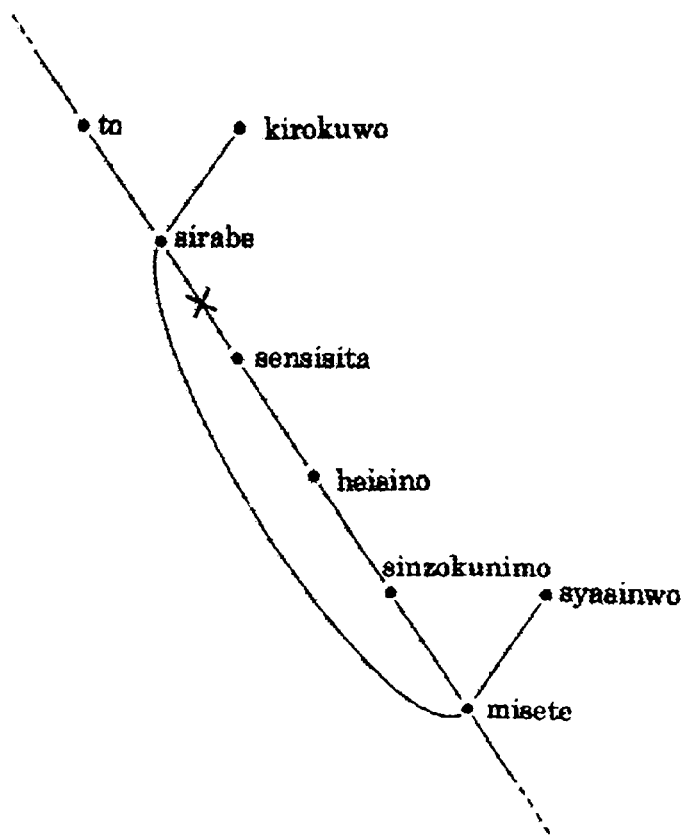
FIG. 94A and FIG. 94B are the figure which corrected the relation of FIG. 92.
Figure 94B:
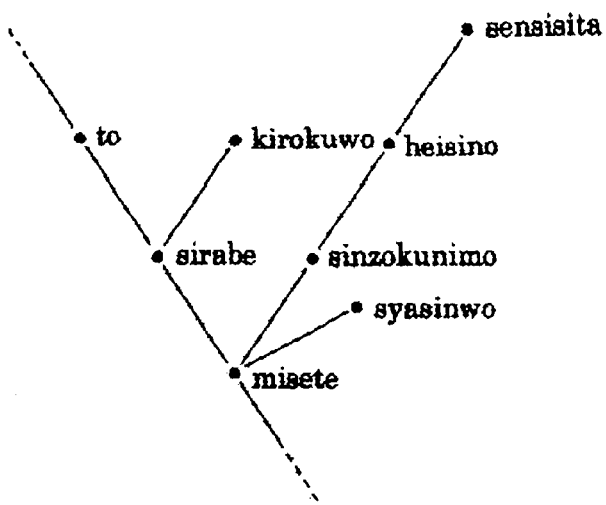

A result by above-mentioned processing is shown in FIG. 93 and FIG. 94. Relation between "sirabe" and "sensisita" is broken off. Then, "sirabe" and "misete" have relation. This is shown in FIG. 94A. Then, the result is shown in FIG. 94B.

Here, the processing of an extraction part ends.

Again, it returns to the start of FIG. 67. It judges whether or not there is equal to or more than one reading point (step S502 of FIG. 67). There is not a reading point in the part of the remainder. It advances towards step S548 of FIG. 71.

Then, it processes a subordinate sentence. It judges whether or not there are equal to or more than two pieces of "definite predicate" with step S650 of FIG. 77. Here are two definite predicates ("yoru" and "kakuninsitatoiu"). It advances towards step S651. It extracts "Obuza-ba-sini yoru" as the subordinate sentence with step S651.

It processes in the sentence pattern analysis about "Obuza-ba-sini yoru" with step S652. It judges whether or not there is syukakuga(wa)" in step S610 of FIG. 76. There is not syukakuga(wa)". It ends the sentence pattern analysis processing.

Next, it removes an extraction part from the processing object with step S653. The left sentence is as the following.

"to supeinno kyoudosikaga kirokuwo sirabe heisino kazokunimo syasinwo misete kakuninsitatoiu."

"The definite predicate" which is contained in this sentence has only one ("kuninsitatoiu"). Here, it ends the processing of a subordinate sentence.

Figure 71:
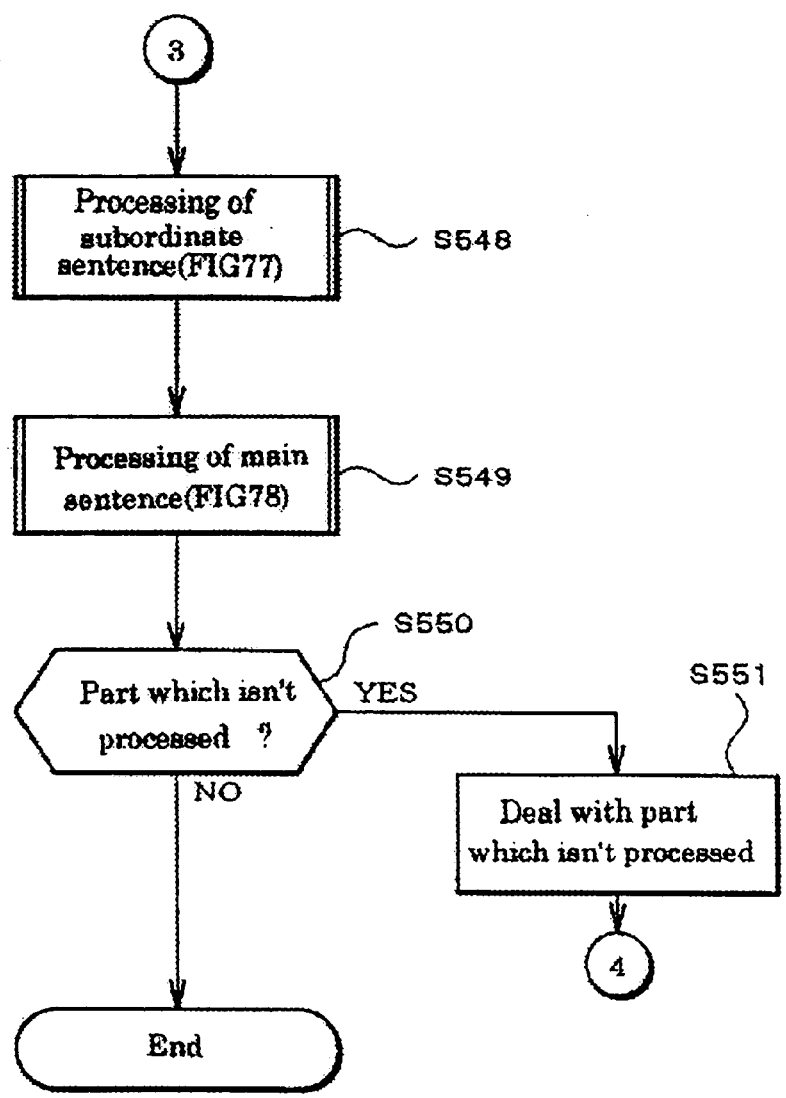
FIG. 71 is the figure which shows the flow chart of the other implementation form about the analysis of the sentence structure and the analysis of the role.
Figure 72:
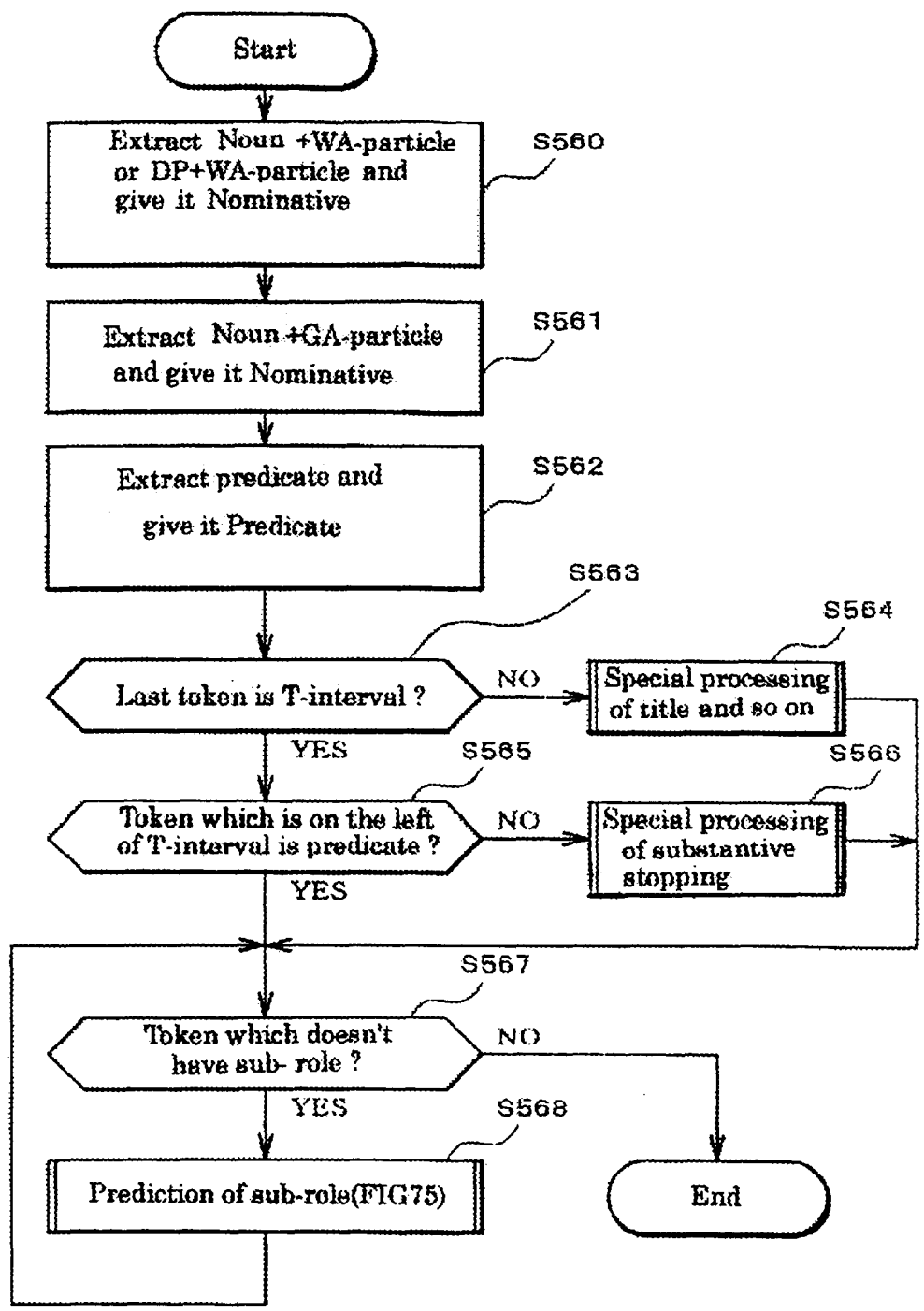
FIG. 72 is the flow chart of the analysis of a local structural role.
Figure 73:
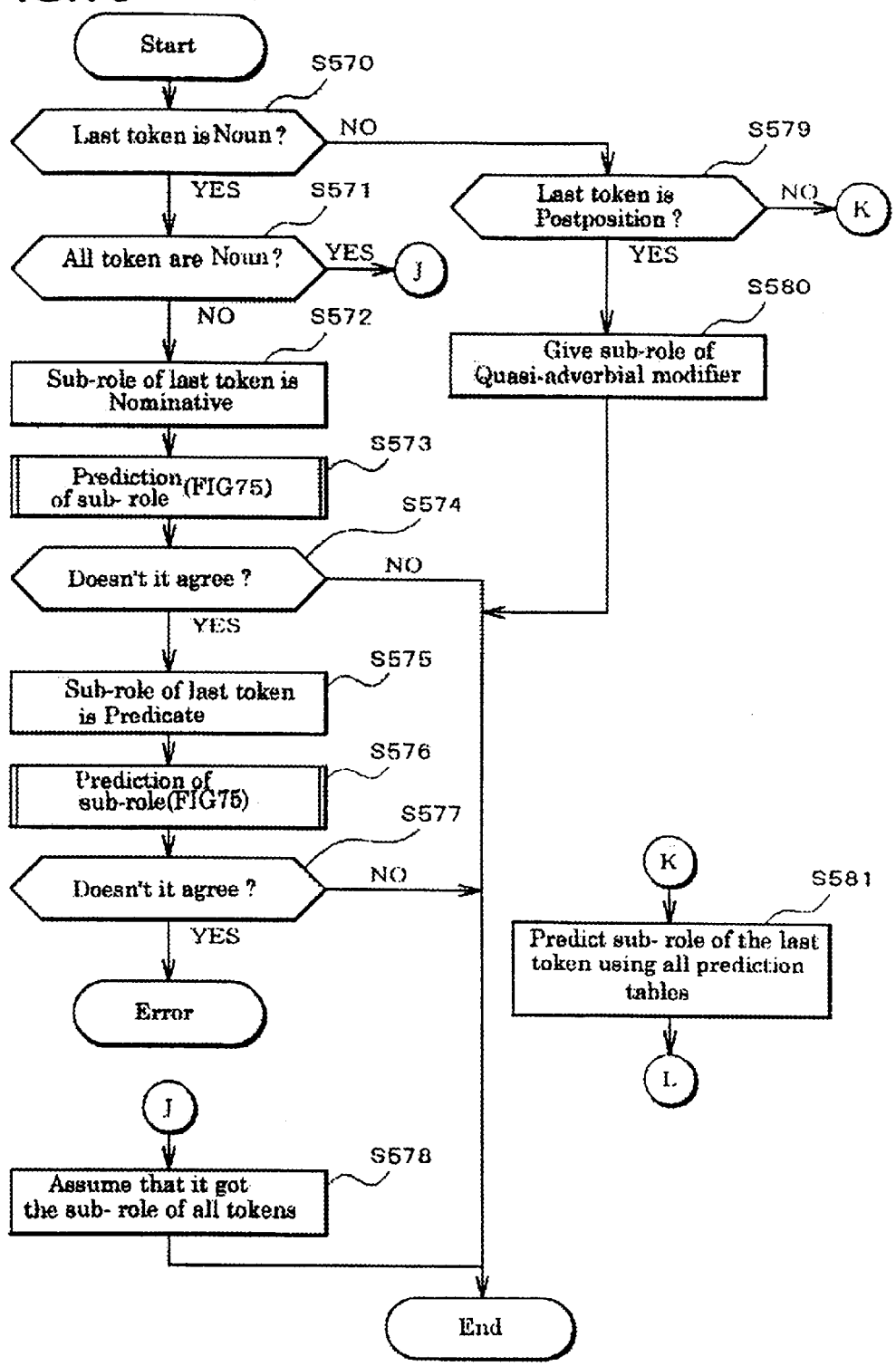
Figure 74:
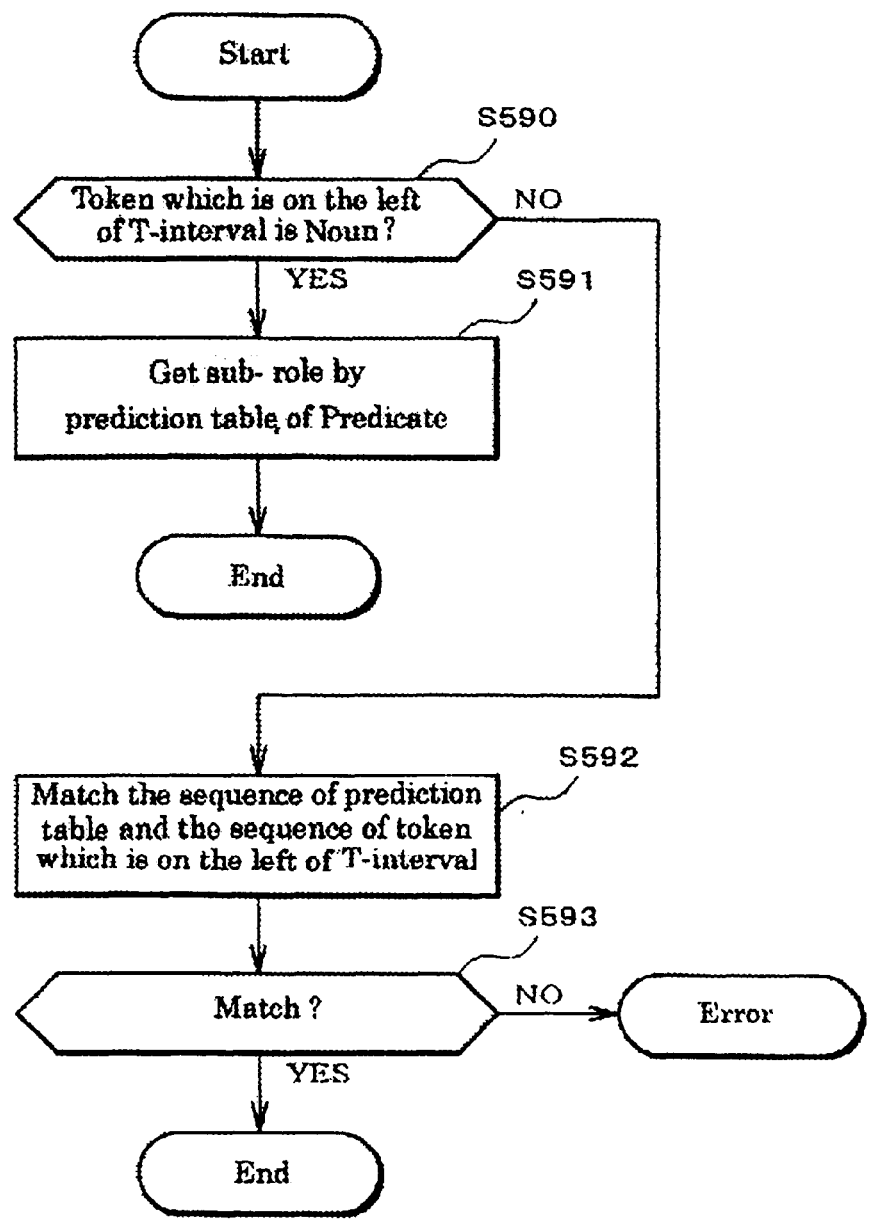
FIG. 74 is a flow chart of the special processing of a substantive stopping.
Figure 75:
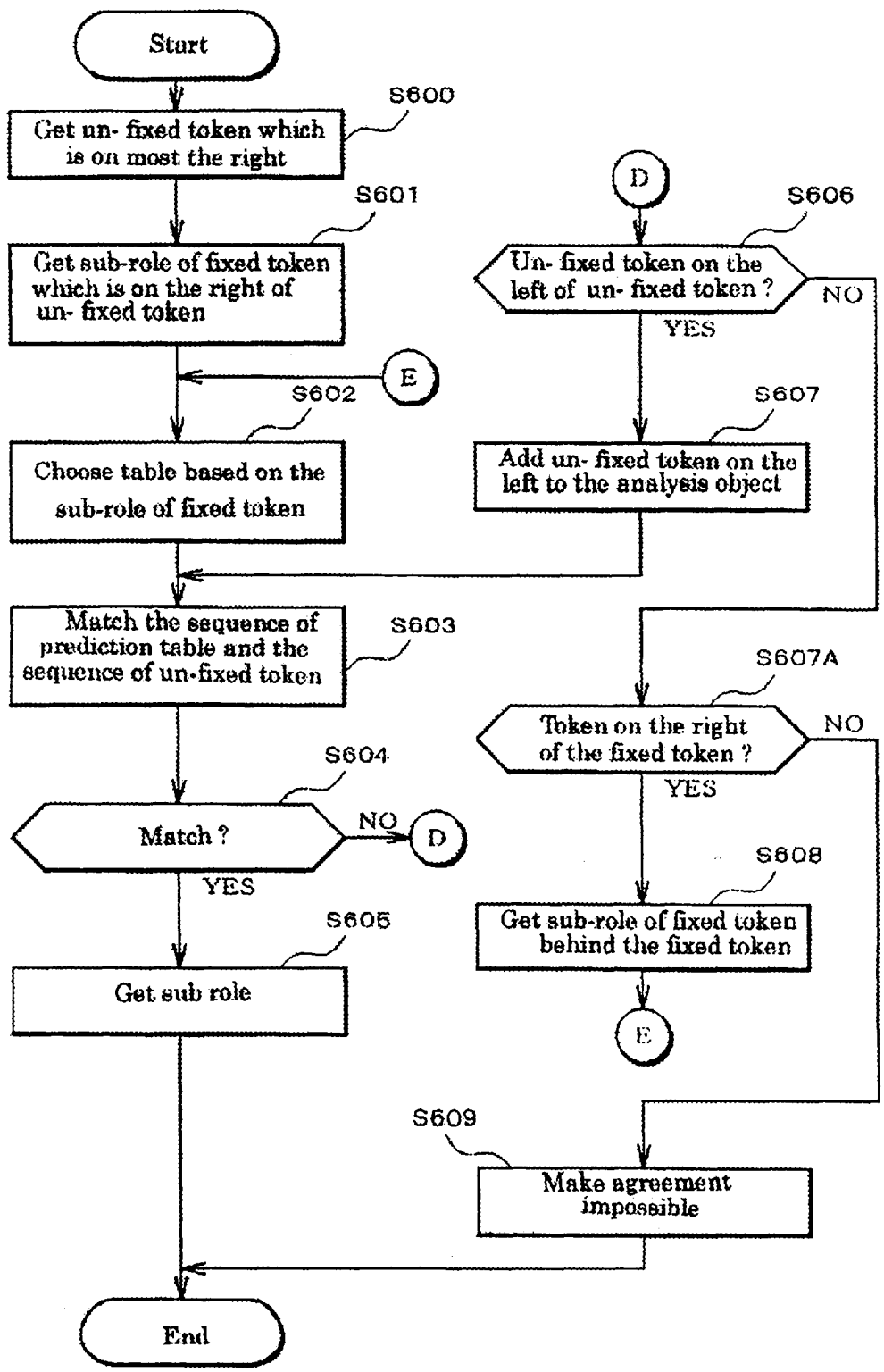
FIG. 75 is the flow chart of the prediction of a sub-role.
Figure 78:
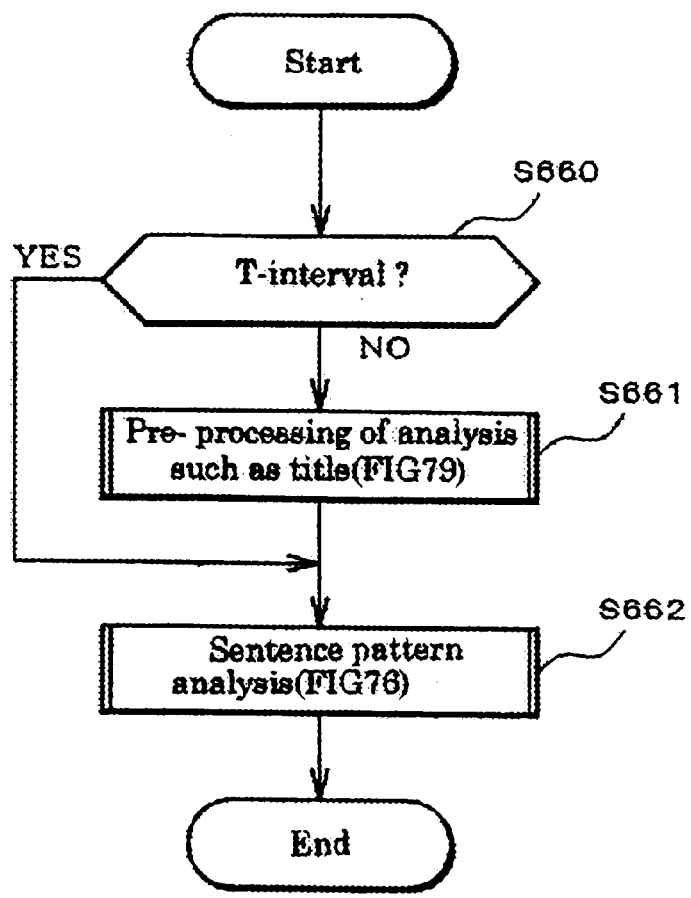
FIG. 78 is the flow chart of the processing of a main sentence.
Figure 79:
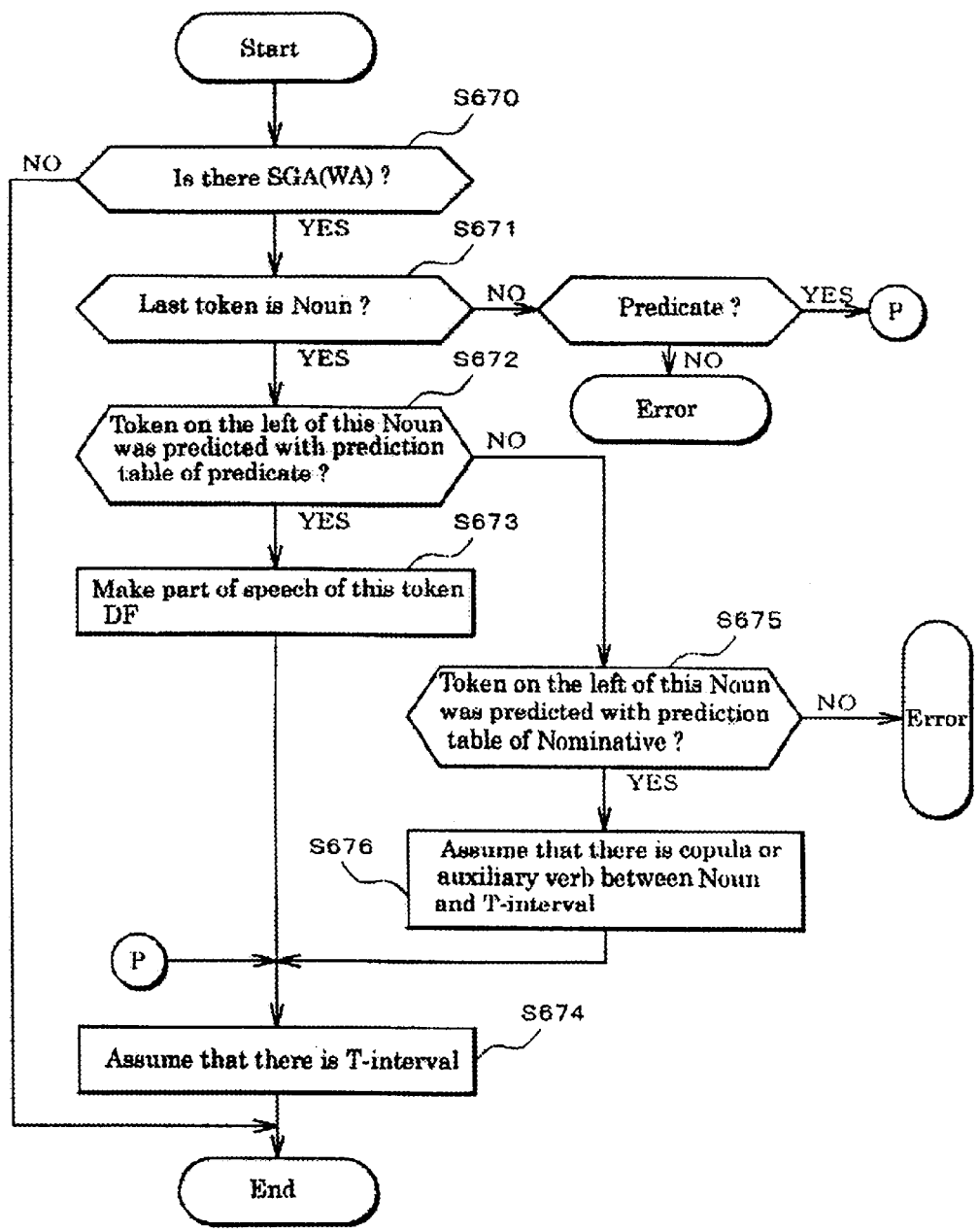
FIG. 79 is the flow chart of the pre-processing of an analysis of the sentence patterns such as a title.

Next, it executes the processing of a main sentence with step S549 of FIG. 71. In the processing of a main sentence, it analyzes a sentence pattern (FIG. 78).

Figure 95:
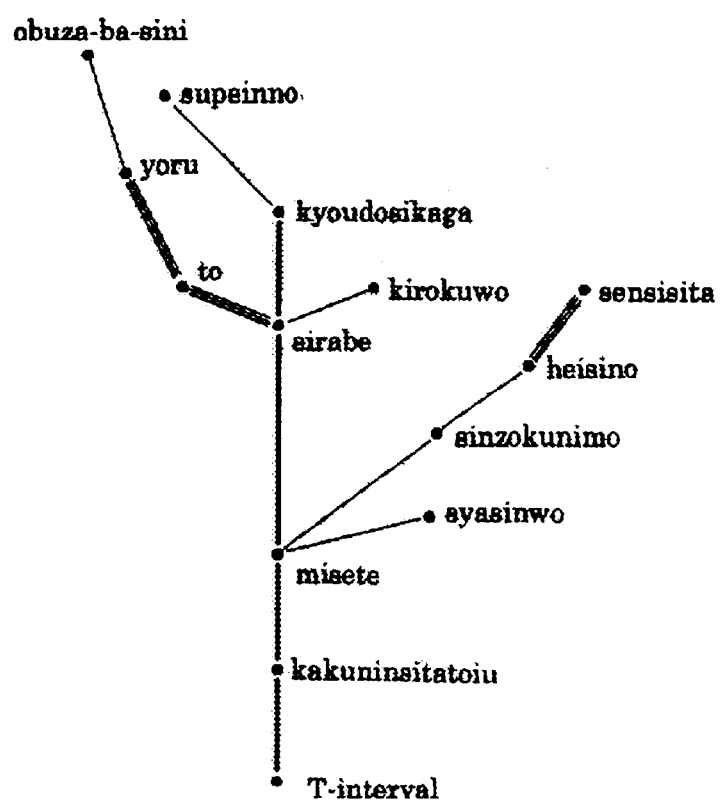
FIG. 95 is the figure which shows the last tree structure.

The tree which is shown in FIG. 95 as a result of above-mentioned processing is gotten. Also, FIG. 90 is shown about the part of speech and the role of each token.

7.4 The Example Which Analyzes Structure and a Role About Illustrative Sentence 4

An analysis is shown about the illustrative sentence 4 which is shown below.

Watasiwa jyuurokusaino wakasade wuinburudonde yuushousi imamo ittusende katuyakusituzukeru bettuka-ga sodattuta haideruberukuni chikai nimanninno hitobitoga kurasiteiru chiisai machini aru buraubaisutenisukurabude rakettoto kawaranai kuraino setakeno osanai kodomotachiga jiyuuni ge-muo tanosindeiru sugatao mite nihondewa sekaini tuuyousuru subarasii pureiya-o sodaterarenai to kakusinsita keikenga aru The relation which analyzed a sub-role is shown in FIG. 96. Also, it displays the relation of each token which the arrow of FIG. 96 shows in FIG. 97 in the tree form. Hereinafter, the analysis of the structure of the sentence is explained.

First, it pays attention to the reading point between "tuuyousuru" and "subarasii" (step S503). It pays attention to "tuuyousuru" on just the left of the noticeable reading point (step S504). This "tuuyousuru" is a definite predicate. Step S508 corresponds. It advances towards step S512 and it extracts "subarasii". Then, it processes an extraction prt (step S512A). It removes an extraction part from the processing object via steps S810, S811, S814 and it deals with the remainder for the processing (step S815). There are not a token which was predicted by the part which was removed from the object and so on. It ends the processing of an extraction part. The tree doesn't have a change.

It returns to the step S502 of FIG. 67 again and it processes. It makes the reading point which is between "nihondewa" and "sekaini" the noticeable reading point in step S503. Here, it corresponds to neither of step S509 from step S504.

Next, it makes the reading point between "mite" and "nihondewa" the noticeable reading point (step S510, S511). It corresponds to neither of step S509 from step S504.

Next, it makes the reading point between "setakeno" and "osanai" the noticeable reading point. This "setakeno" corresponds to "Noun+No" of step S505. It advances towards step S512, S512A. In step S512, "osanai" is extracted. Incidentally, there is not a token which was predicted by "osanai". The tree doesn't have a change.

Figure 97:
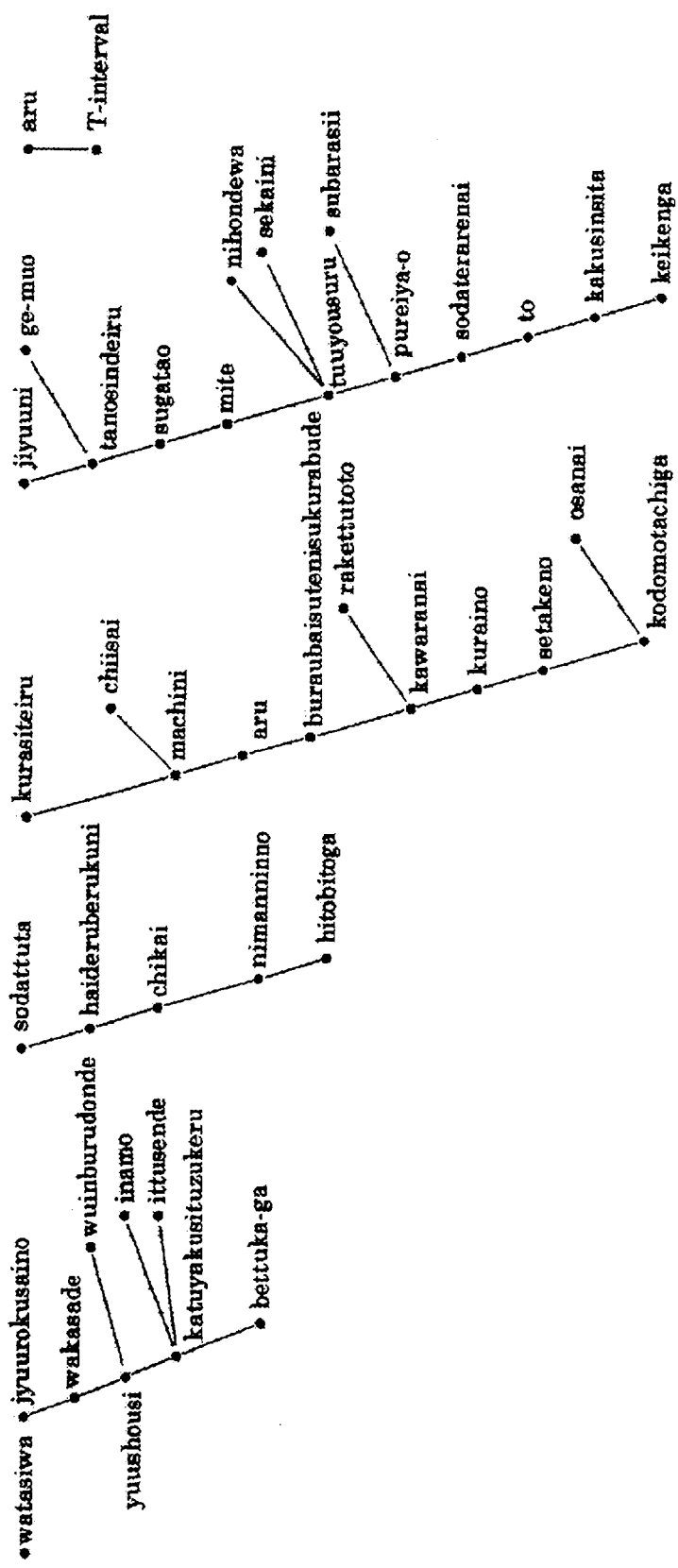
FIG. 97 is the figure which shows the first tree structure.
Figure 98:
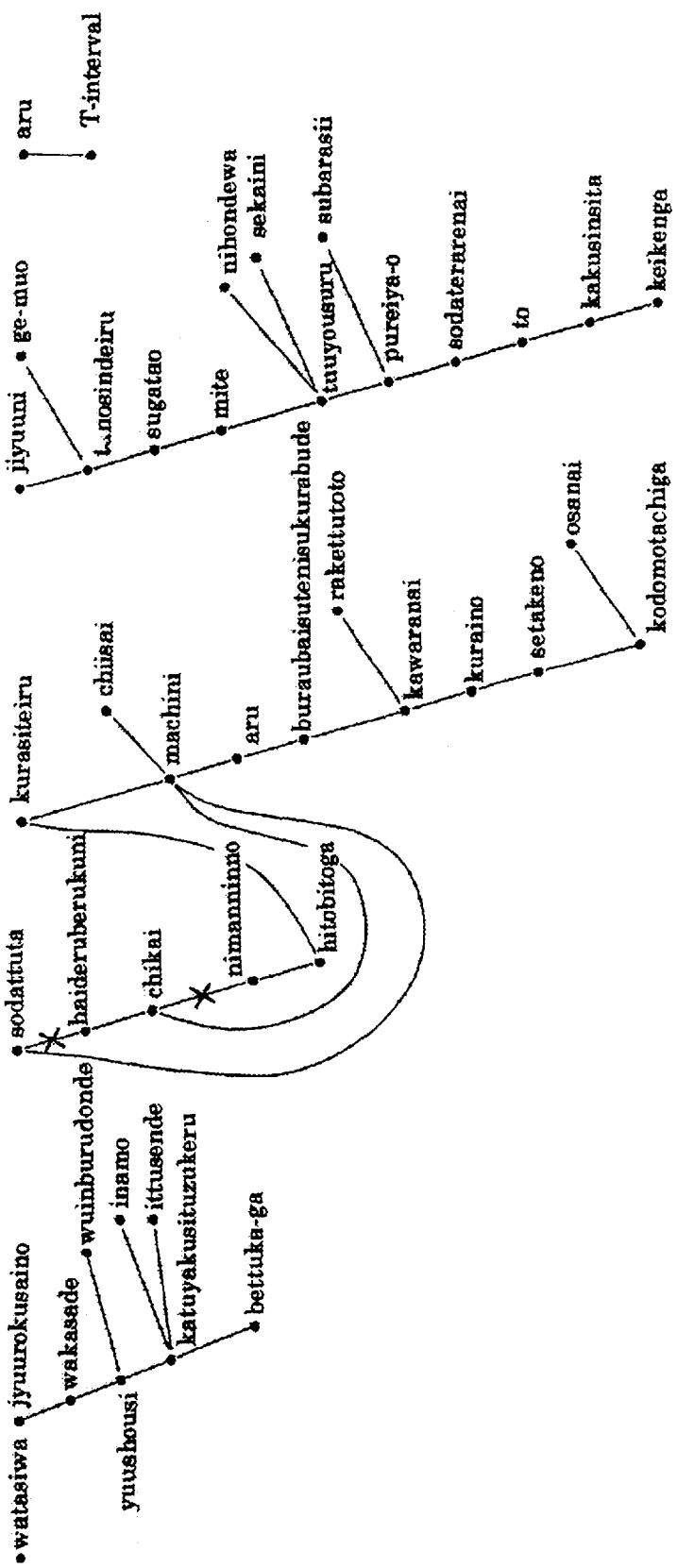
FIG. 98 is the figure which shows the tree structure to be analyzing.

Moreover, it makes the reading point between "kurasiteiru" and "chiisai" the noticeable reading point. Then, it extracts "chiisai" (FIG. 6 7, step S508, S512). There is not a token which was predicted by "chiisai". The tree doesn't have a change. In the same way, it makes the reading point between "chikai" and "nimanninno" the noticeable reading point. Then, it extracts "nimanninno hit obitoga kurasiteiru" (FIG. 67, step S508, S512). It analyzes a sentence pattern of the extraction part with the step S814 of FIG. 89. By this, "hitobitoga" and "kurasiteiru" are set in the relation. After that, it removes an extraction part from the object with step S815. Here, "nimanninno" predicts "chikai". It executes steps S817, S818. As a result, "chikai" and "machini" are put by the relation (FIG. 97 reference).

Next, it makes the reading point between "sodattuta" and "haideruberukuni" the noticeable reading point. This "sodattuta" corresponds to step S508. It, extracts "haideruberukuni chikai" as the subordinate sentence (step S512). Then, it executes the processing of an extraction part (step S512A). This "haideruberukuni" predicts "sodattuta". With step S818, relation is set to "machini" by "sodattuta".

Next, it makes the reading point between "Watasiwa" and "jyuurokusaino" the noticeable reading point. Here, it corresponds to neither of S509 from step S505.

There is not the reading point on the left of the noticeable reading point. It advances towards the step S514 of FIG. 68.

It ends the processing of FIG. 67 here.

The sentence of the remainder is shown below.

Figure 99:
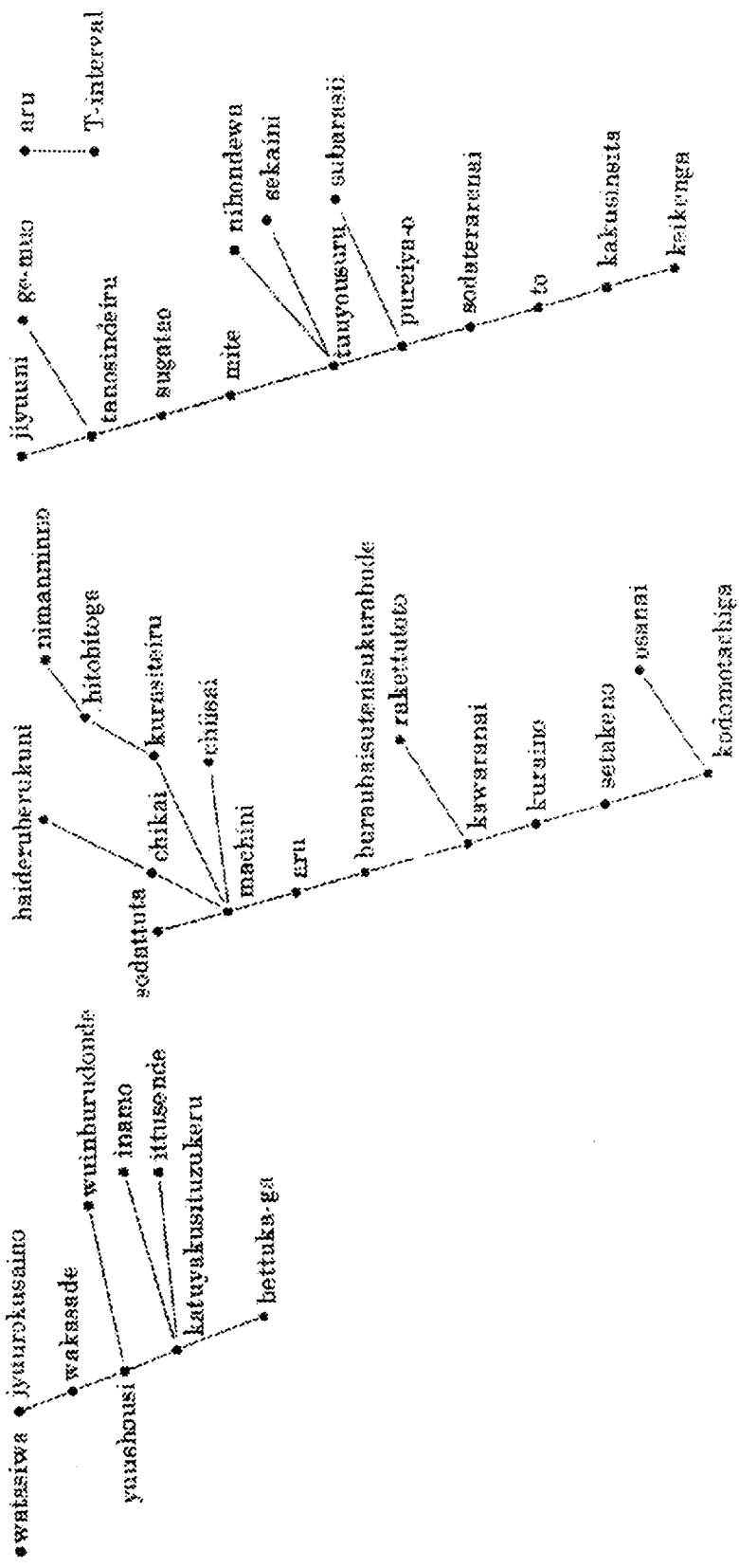
FIG. 99 is the figure which shows the tree structure to be analyzing.

Watasiwa jyuurokusaino wakasade wuinburudonde yuushousi imamo ittusende katuyakusituzukeru bettuka-ga sodattuta machini aru buraubaisutenisukurabude rakettoto kawaranai kuraino setakeno kodomotachiga jiyuuni ge-muo tanosindeiru sugatao mite nihondewa sekaini tuuyousuru pureiya-o sodaterarenai to kakusinsita keikenga aru The tree of the sentence of the remainder is shown in FIG. 99.

Figure 100:
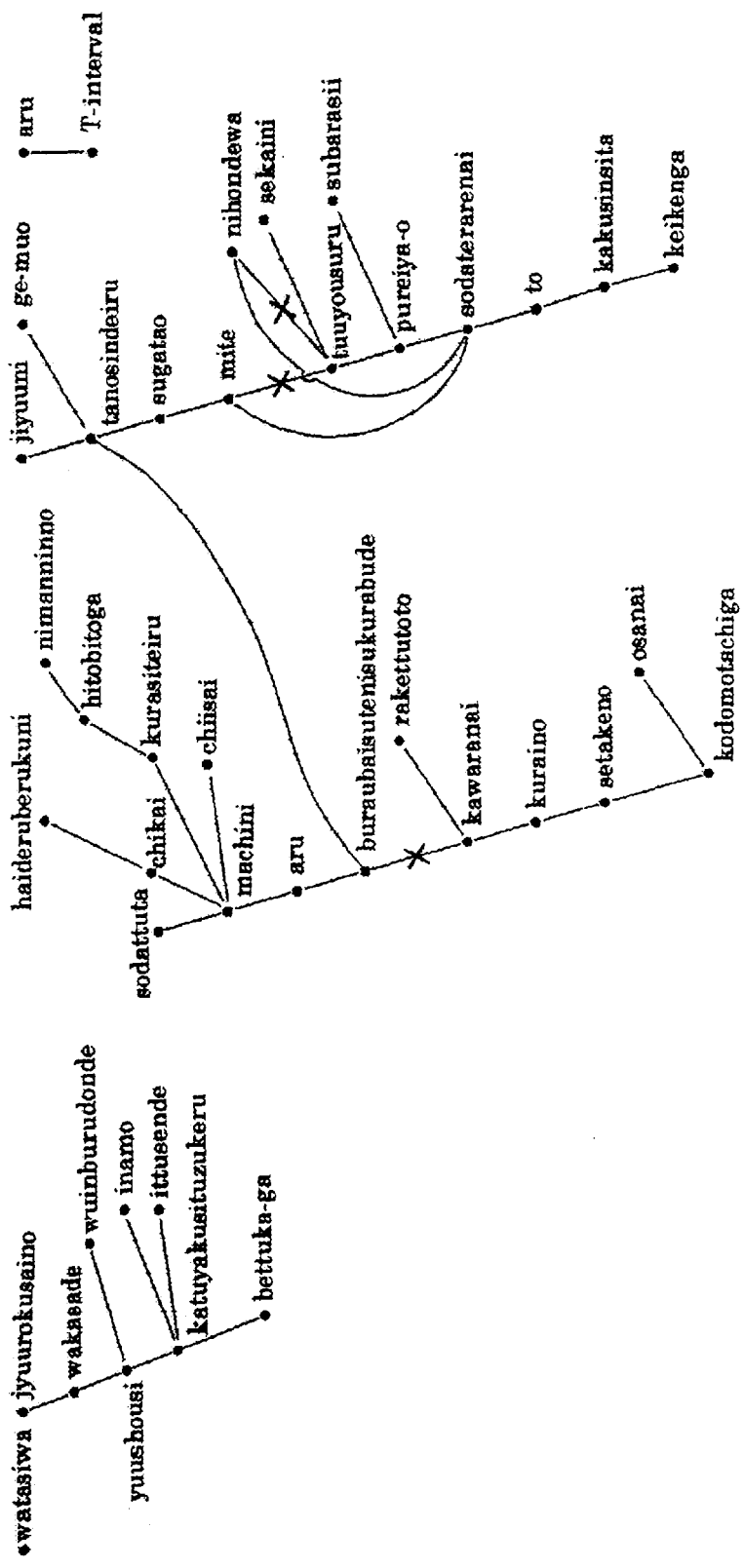
FIG. 100 is the figure which shows the tree structure to be analyzing.

Next, it advances towards FIG. 69. First, it makes the reading point which is between "nihondewa" and "sekaini" the noticeable reading point (step S534). It makes "tuuyousuru" the noticeable definite predicate (step S535).This "tuuyousuru pureiya-o sodaterarenai" is fixed connection. It advances towards step S538 from step S536. It judges whether or not there is the reading point on the left of the noticeable reading point in the step S740 of FIG. 83. There is the reading point between "mite" and "nihondewa". It deals with "nihondewa, sekaini tuuyousuru pureiya-o sodaterarenai to kakusinsita keikenga aru" for the processing with step S741. There is "sodaterarenai to" behind "tuuyousuru". This "sodaterarenai to" is connection with "definite predicate+subordinate conjunction" and corresponds to step S747. It. advances towards step S748. There is not "Nounwa" on the left of the noticeable reading point. It advances towards step S749. It doesn't correspond to step S749. It extracts from the noticeable reading point to the definite predicate with step S755. In other words, it extracts "sekaini tuuyousuru". It processes an extraction part with step S756. This "tuuyousuru" predicts "mite" and "nihondewa". Relation is set with "sodaterarenai" by "mite" and "nihondewa" (FIG. 100 reference).

Again, it returns to the step S531 of FIG. 69.

The sentence of the remainder is shown in the following.

Watasiwa jyuurokusaino wakasade wuinburudonde yuushousi imamo ittusende katuyakusituzukeru bettuka-ga sodattuta machini aru buraubaisutenisukurabude rakettoto kawaranai kuraino setakeno kodomotachiga jiyuuni ge-muo tanosindeiru sugatao mite nihondewa pureiya-o sodaterarenai to kakusinsita keikenga aru Next, it makes the reading point between "mite" and "nihondewa" the noticeable reading point. It makes "sodaterarenai" the definite predicate. This "sodaterarenai" is not fixed connection. It advances towards step S537. A processing object in this place is shown in the following.

rakettoto kawaranai kuraino setakeno kodomotachiga jiyuuni ge-muo tanosindeiru sugatao mite nihondewa pu reiya-o sodaterarenai to kakusinsita keikenga aru The right definite predicate of "sodaterarenai" is "kakusinsita". This "kakusinsita" is fixed connection. It corresponds to the step S700 of FIG. 81. It extracts "nihondewa pureiya-o sodaterarenai" with step S712 via step S701, step S702, step S710. "sodaterarenai" predicts "mite". Here, relation is put to "kakusinsita" by "mite".

The sentence of the remainder is shown below.

Watasiwa jyuurokusaino wakasade wuinburudonde yuushousi imamo ittusende katuyakusituzukeru bettuka-ga sodattuta machini aru buraubaisutenisukurabude rakettoto kawaranai kuraino setakeno kodomotachiga jiyuuni ge-muo tanosindeiru sugatao mite to kakusinsita keikenga aru Next, it makes the reading point between "buraubaisutenisukurabude" and "rakettoto" the noticeable reading point. A processing object is shown in the following.

jyuurokusaino wakasade wuinburudonde yuushousi imamo ittusende katuyakusituzukeru bettuka-ga sodattuta machini aru buraubaisutenisukurabude rakettoto kawarani kuraino setakeno kodomotachiga jiyuuni ge-muo tanosindeiru sugatao mite to kakusinsita keikenga aru It corresponds to neither of steps S685 (FIG. 80), S687 (FIG. 80), S700 (FIG. 81), S720 (FIG. 82) via step S534. It advances towards step S730 (FIG. 82). It corresponds to neither of steps S730, S733. It extracts from token after the noticeable reading point to the definite predicate with step S738. That is, it extracts "rakettoto kawarani". By this, relation is set to "tanosindeiru" by "buraubaisutenisukurabude".

Figure 101:
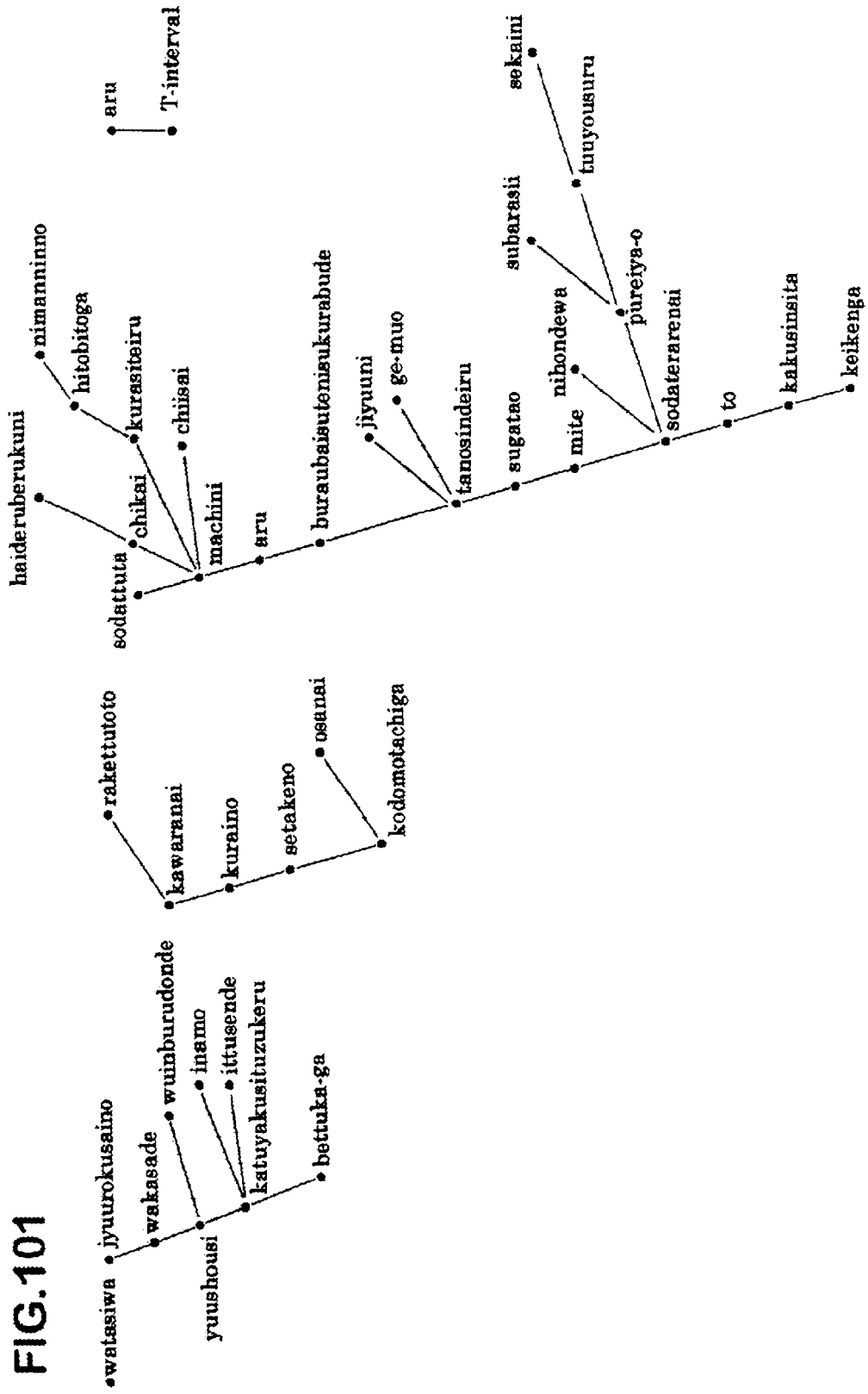
FIG. 101 is the figure which shows the tree structure to be analyzing.

It returns to the step S531 of FIG. 69 again. A tree in this place is shown in FIG. 101.

The sentence of the remainder is shown in the following.

Figure 102:
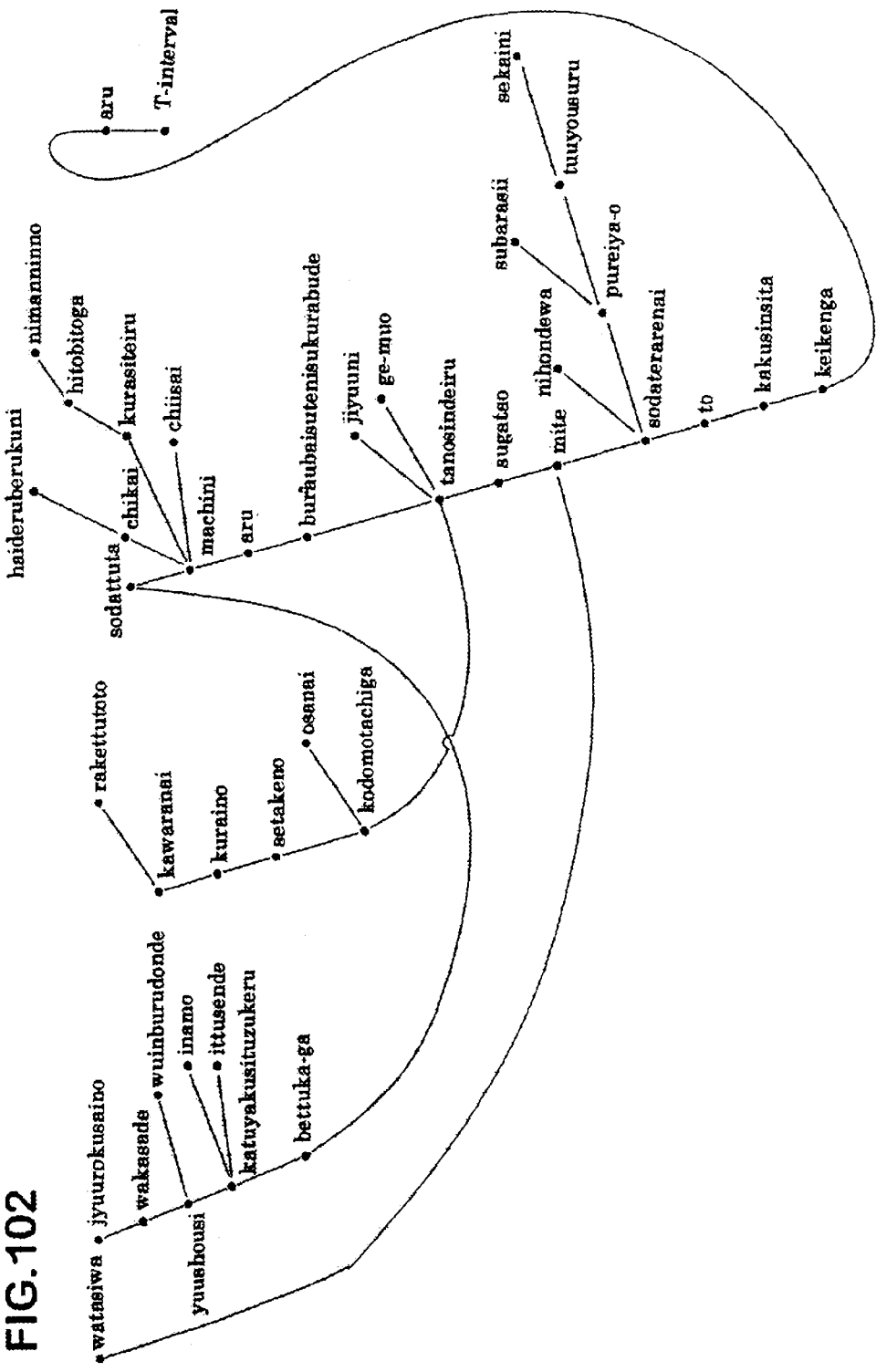
FIG. 102 is the figure which shows the tree structure to be analyzing.

Watasiwa jyuurokusaino wakasade wuinburudonde yuushousi imamo ittusende katuyakusituzukeru bettuka-ga sodattuta machini aru buraubaisutenisukurabude kuraino setakeno kodomotachiga jiyuuni ge-muo tanosindeiru sugatao mite to kakusinsita keikenga aru The processing object in this place is the same as the above. The definite predicate is "tanosindeiru". The right definite predicate is "kakusinsita" and is fixed connection. The step S700 of FIG. 81 corresponds. It extracts "kuraino setakeno kodomotachiga jiyuuni ge-muwo tanosindeiru" with step S712 via step S701, step S702, step S710. Then, "kodomotachiga" and "tanosindeiru" are set in the relation by the sentence pattern analysis processing (FIG. 102 reference). Also, "tanosindeiru" predicts "buraubaisutenisukurabude". It puts "buraubaisutenisukurabude" to "mite" in the relation.

The sentence of the remainder is shown below.

Watasiwa jyuurokusaino wakasade wuinburudonde yuushousi imamo ittusende katuyakusituzukeru bettuka-ga sodattuta machini aru buraubaisutenisukurabude sugatao mite to kakusinsita keikenga aru Next, it makes the reading point between "Watasiwa" and "jyuurokusaino" the noticeable reading point (step S534 of FIG. 69). It makes "katuyakusituzukeru" noticeable definite predicate (step S535). This "katuyakusituzukeru" is fixed connection. It advances towards the processing of fixed connection (step S538). In the processing of fixed connection of FIG. 83, it deals with the whole sentence of the remainder for the processing (step S742). There is predicate "yuushousi" which is simultaneous between the noticeable reading point and the noticeable definite predicate. It extracts from token after the noticeable noticeable reading point to the simultaneous predicate (step S744). In other words, it extracts "jyuurokusaino wakasade wuinburudonde yuushousi". Then, it processes an extraction part (step S744A). There are not a token which was predicted by the part which was removed from the object. The 'tree doesn't have a change.

Next, it advances towards step S745. It corresponds to neither of step S747, step S760 (FIG. 84), step S780 (FIG. 86), step S800 (FIG. 88). It advances towards step S730 (FIG. 82). It advances towards step S731 because there is "Watasiwa". There is not a definite predicate between "Watasiwa" and the noticeable reading point. It advances towards step S732. It extracts "imamo ittusende katuyakusituzukeru with step S732. It processes an extraction part with step S692. There are not a token which was predicted by the part which was removed from the object. The tree doesn't have a change.

The sentence of the remainder is shown in the following.

Watasiwa bettuka-ga sodattuta machini aru buraubaisutenisukurabude sugatao mite to kakusinsita keikenga aru Again, it executes the step S531 of FIG. 69. The noticeable reading point is the same. The noticeable definite predicate is "sodattuta". This "sodattuta" is fixed connection. It advances towards steps S740, S747, S760, S771. Next, it extracts "bettuka-ga sodattuta" with step S738 via S730, S773. Then, it processes an extraction part (step S692). This "bettuka-ga" and "sodattuta" are set in the relation by the sentence pattern analysis (FIG. 102 reference).

The sentence of the remainder is shown in the following.

Watasiwa machini aru buraubaisutenisukurabude sugatao mite to kakusinsita keikenga aru Again, it executes the step S531 of FIG. 69. The noticeable reading point doesn't change. The noticeable definite predicate is "aru" (step S535). It advances towards the processing of a definite predicate (step S537). It advances towards the step S700 of FIG. 81 via steps S685, S687. It advances towards step S704 via steps S701, S703. There is not a subject between the noticeable definite predicate and the right definite predicate. Step S706 corresponds. It extracts "machini aru" with step S707. Then, it processes an extraction part (step S692).

The sentence of the remainder is shown in the following.

Watasiwa buraubaisutenisukurabude sugatao mite to kakusinsita keikenga aru

Again, it executes the step S531 of FIG. 69. There is not a reading point. It processes a subordinate sentence with FIG. 77. There are two definite predicates of "kakusinsita" and "aru". It advances towards step S651. It extracts "Watasiwa buraubaisutenisukurabude sugatao mite to kakusinsita" as the subordinate sentence with step S651. Then, it processes in the sentence pattern analysis (step S652). With this, "Watasiwa" and "mite" is set by the relation (FIG. 102 reference).

The sentence of the remainder is shown in the following.

keikenga aru

Here is only one definite predicate. It processes a main clause with FIG. 78. This "keikenga" and "aru" are set in the relation by the sentence pattern analysis processing (FIG. 102 reference).

Figure 103:
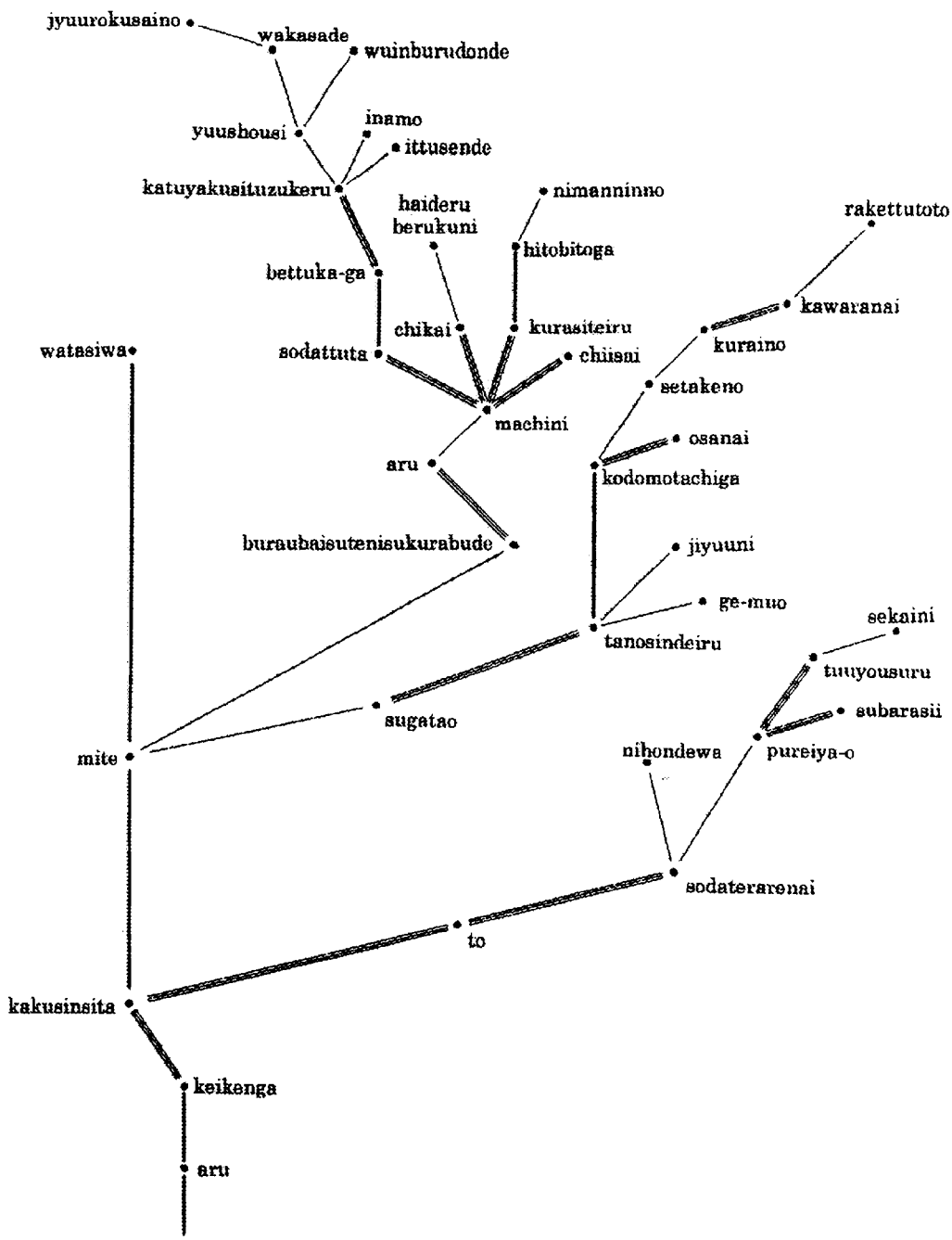
FIG. 103 is the figure which shows the last tree structure.

As a result, a gotten analysis tree is shown in FIG. 103.

A role is shown in FIG. 94. Incidentally, it omitted the display of the analysis items such as the part of speech, the attribute.

7.5 Reference

The flow chart of this implementation form is explained using the illustrative sentence.

Figure 70:
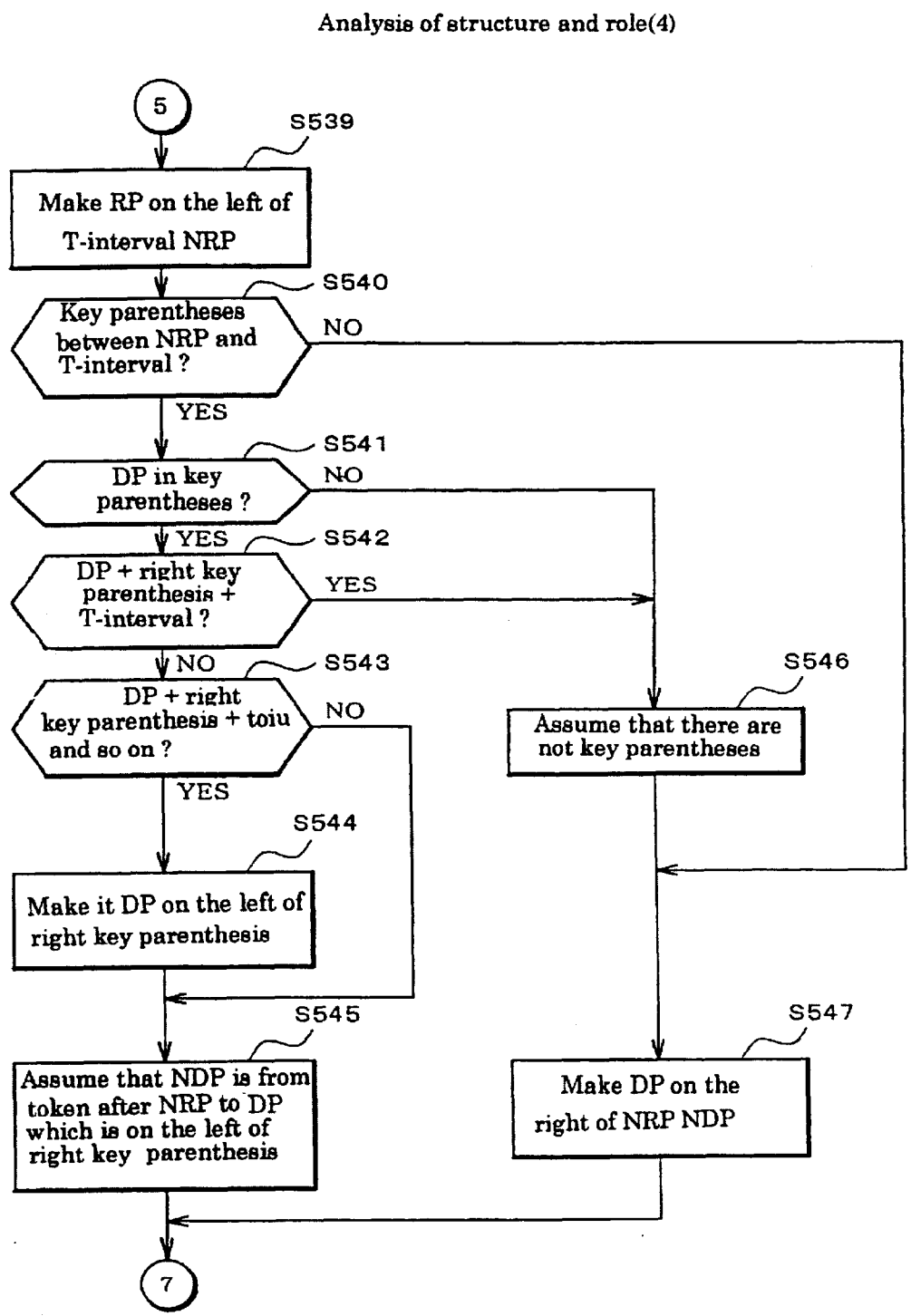
FIG. 70 is the figure which shows the flow chart of the other implementation form about the analysis of the sentence structure and the analysis of the role.

(1) About FIG. 69, FIG. 70

The illustrative sentence: Watasiwa Ro-mae ittuta keikenga aru
It advances towards FIG. 71 via step 532, 533E, 533 F.
The illustrative sentence:
  Watasiwa Ro-mae ittuta keikenga aru Ro-mawa subarasii
It makes the following sentence at 533 D via step 532, 533E, 533 F, 533 G.
  Watasiwa Ro-mae ittuta keikenga aru Ro-mawa ubarasii
The illustrative sentence:
  Watasiwa Ro-mae iki ookii sittupaiwo sita keikenga aru
It advances towards steps 532, 533, 533 A, 533B and it removes key parentheses at 533 C.
  Watasiwa Ro-mae iki ookii sittupaiwo sita keikenga aru
The illustrative sentence:
  Watasiwa Ro-mae iki ookii sittupaiwo sita keikenga aru Ro-mawa kiraida
It advances towards steps 532, 533, 533 A, 533B. Because there is T-interval in the key parentheses, it removes key parentheses and deals for the processing from the beginning of the sentence to first T-interval (step 533D).
  Watasiwa Ro-mae iki ookii sittupaiwo sita keikenga aru
The illustrative sentence: Watasiwa Ro-mae ittuta keikenga aru to itta
It advances towards steps 532, 533, 534. It makes the reading point which is between Watasiwa" and Ro-mae" with step 534 the noticeable reading point. It makes ittuta" the noticeable definite predicate with step 535. Because ittuta" is fixed connection, it advances towards step 538.
The illustrative sentence:
  Watasiwa Ro-mae iki ookii sittupaiwo sita keikenga aru Ro-mawa kiraida to itta
It advances towards 539 from steps 532, 533, 533A. It makes the reading point between Watasiwa" and Ro-mae" the noticeable reading point. Next, it advances towards 540, 541, 542, 543. At 545, it assumes that "Ro-mae iki, ookii sittupaiwo sita keikenga aru. Ro-mawa kiraida" is "the noticeable definite predicate". Then, it advances towards step 536.
The illustrative sentence:
  Watasiwa Ro-mae iki ookii sittupaiwo sita toiu keikenga siti to itta
It makes sita"toiu" "the definite predicate on the left of the right key parenthesis at 544 via steps 532, 533, 533 A, 539, 540, 541, 542, 543.
The illustrative sentence:
  Watasiwa Ro-mae iki ookii sittupaiwo sita keikenga aru
It corresponds to step 542. At 546, it assumes that there are not key parentheses.
  Watasiwa Ro-mae iki ookii sittupaiwo sita keikenga aru (2) About FIG. 80

The illustrative sentence:
  Watasiwa Ro-mae iki Parie ikukeredomo Berurinewa ikanai hitowo mukasikara sittuteiru
It extracts Ro-mae iki Parie ikukeredomo" with steps 683, 684.
The illustrative sentence: Watasiwaberurinewa ikanai hitowo mukasikara sittuteiru
It extracts berurinewa ikanai" with steps 685, 686.

The illustrative sentence: Karewa Ro-mani iku hitowo Koubede sittuta to ittuteiru
It extracts Ro-mani iku" at 686 via steps 687, 688.
The illustrative sentence:
  Karega ikiteiru kotowo ikiwakareta hahawa maekara sittuteiru to ittuta
It extracts ikiwakareta" at 686 via steps 687, 688, 689, 690.
The illustrative sentence: Karewa ikiwakareta hahaga maekara sittuteiru to ittuta
It extracts ikiwakareta" at 691 via steps 687, 688, 689, 690.

(3) About FIG. 81

The illustrative sentence:
  Konkaino jikende omou kotowa syounenno kazokuni kyoukansuru kotoga naniyorimo taisetudearutoiu kotodesu
It extracts syounenno kazokuni kyoukansuru kotoga naniyorimo taiset udearutoiu" at 705 via steps 700, 701, 703, 704.
The illustrative sentence:
  Sisyunkino younenwa akuwo okonau kotode kotositeno sonzaiwo kakuninsitagaru jikiga aru
It extracts akuwo" at 707 via steps 700, 701, 703, 704, 706.
The illustrative sentence:
  Sisyunkino syounenwa akuwo okonau kotode kotositeno sonzaiwo kakuninsitagaru mono da
It extracts akuwo okonau" at 707 via steps 700, 701, 703, 704, 706, 708.
The illustrative sentence:
  Sisyunkino syounenwa akuwo okonau kotode kotositeno sonzaiwo kakuninsuru kotowo nozondeiru
It extracts akuwo okonau kotode kotositeno sonzaiwo kakuninsuru" at 709 via steps 700, 701, 703, 704, 706, 708.
The illustrative sentence:
  Taiwanno ieya gaikoukandeattuta titiga taisyokugoni sunda Ro-mano iedeno kiokuga mazaru
It extracts gaikoukandeattuta titiga taisyokugoni sunda" at 711 via steps 700, 701, 702, 710.
The illustrative sentence:
  Osanaikoro titiga taisyokusita otoni kazokude sunda Ro-mano kiokuga mazaru
It extracts titiga taisyokusita" at 712 via steps 700, 701, 702, 710.
The illustrative sentence:
  Tyuubouni tennaiga utuka monita-wo youisite taiminguwo hakattuteiru souda
It extracts tennaiga uturu" at 715 via steps 702, 713, 714.

(4) About FIG. 82

The illustrative sentence:
  Shisyawa Robaniemisikara sorini nottuta santano ewo kitaini egaita ryokakukide yattutekita to ittuta
It extracts sorini nottuta santano ewo kitaini egaita" at 729 via steps 720, 721, 722, 723, 725, 727.
The illustrative sentence:
  Shisyawa sorini Shisyawa sorini nottuta santano ewo kitaini egaita ryokakukide yattutekita to ittuta
It extracts sorini nottuta santano ewo kitaini egaita" at 726 via steps 720, 721, 723, 725.
The illustrative sentence:
  Amiwo kuwani motikae katute gyojyoudattuta kantakutiwo fuufude tagayasutoiu yumega attuta jidaimo attuta It extracts katute gyojyoudattuta" at 735 via steps 720, 730, 733, 734.

(5) About FIG. 83

The illustrative sentence: Konkaino jikenwa degutiga nai sinkokuna mondaidearu
It extracts degutiga nai" at 755 via step 745.
The illustrative sentence:
Konkaino jikenwa kaiketudekinai mondaiga aru to haakusarerubekidesu
It extracts kaiketudekinai" at 753 via steps 745, 747, 748, 751, 752.
The illustrative sentence:
Konkaino jikenwa kaiketudekinai mondaiwo teikisita to danteidekiru
It extracts kaiketudekinai" at 755 via 747, 748, 751, 752, 754.
The illustrative sentence:
Konkaino jikenniwa kaiketudekinai mondaiga aru to haakusarerubekidesu
It extracts kaiketudekinai" at 750 via steps 747, 748, 749.

Figure 84:
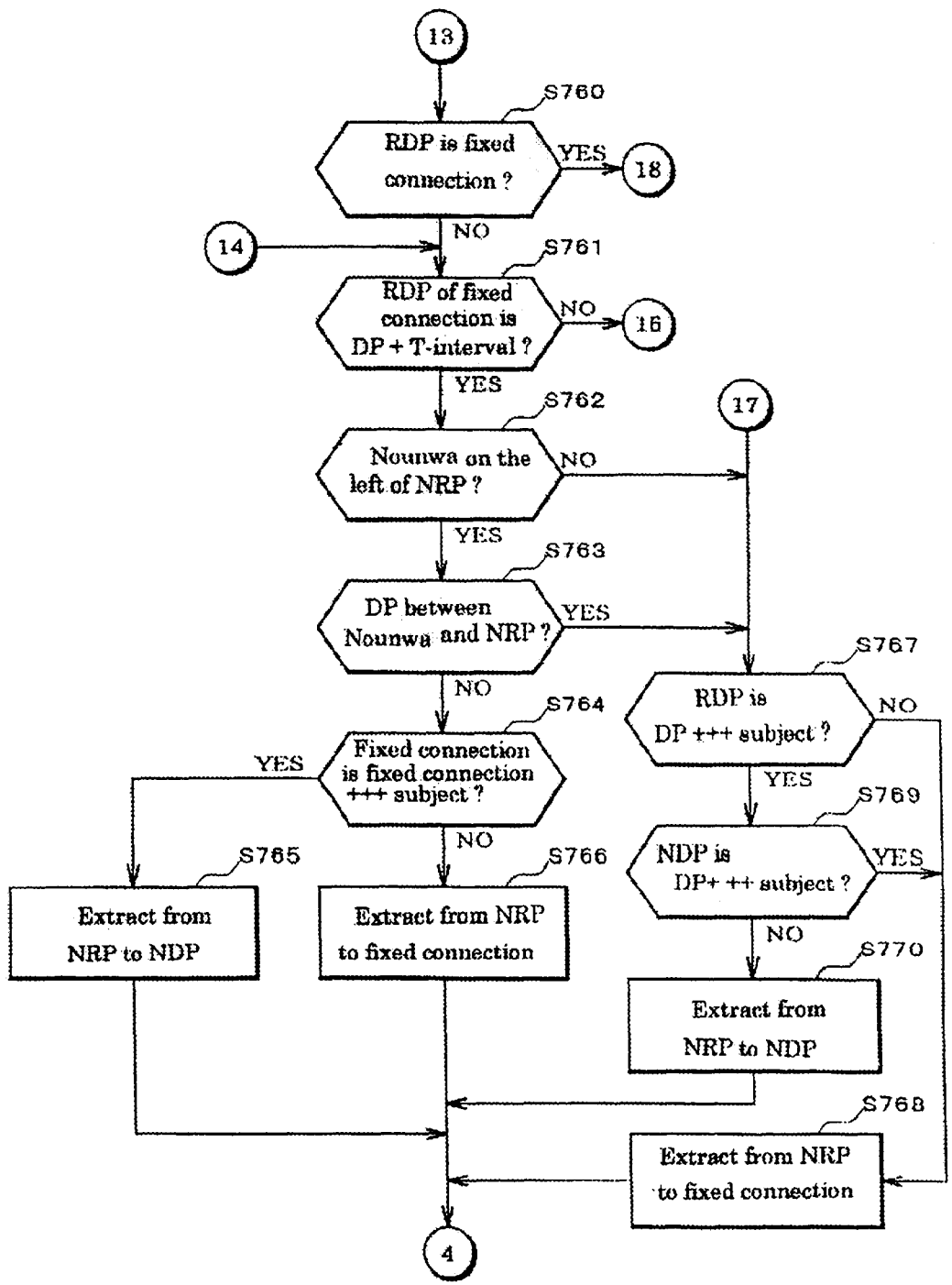
FIG. 84 is the flow chart of the processing of the fixed connection.

(6) About FIG. 84

The illustrative sentence:
Sousahonbuwa seitono jitakukara jikennituite kisita memowo ousyuusiteita kotoga tuitati akirakaninattuta
It extracts jikennituite kisita" at 765 via steps 760, 761, 762, 763, 764.
The illustrative sentence:
Itimaino ewo gookutoiu kakakude rakusatusita syatyouga danwawo dasiteita
It extracts gookutoiu" at 770 via steps 760, 761, 762, 767, 769.

(7) About FIG. 85

The illustrative sentence:
Syatyouwa gookutoiu kakakude rakusatusita hanasini haraga tatu to nobeta
It extracts gookutoiu kakakude rakusatusita" at 776 via steps 771, 772, 773, 774.

(8) About FIG. 86, FIG. 87

The illustrative sentence:
Konkaino jikende omou kotowa syounenno kazokuni kyoukansuru kotoga taisetudatoiu kotodesu
It extracts syounenno kazokuni kyoukansuru kotoga taisetudatoiu" at 787 via step 760, step 780, 781, 782, 783, 786, 786, 788.
The illustrative sentence:
Hingisuwa kotosi okonawareru nijuutaikaini syutujyousuru keikakuwo tateteiru
It extracts kotosi okonawareru nijuutaikaini syutujyousuru" at 787 via steps 780, 781,782, 783, 786.
The illustrative sentence:
Tuduite dasaretanoga gurirusita kakmonikuga nottuta saradadearu
It extracts", gurirusita kakmonikuga nottuta" at 797 via steps 780, 781, 790, 795, 796.
The illustrative sentence:
Titiga kininsita atode sunda ba-jiniano iedeno kiokuga majiru It extracts kininsita" at 794 via steps 780, 781, 790, 791, 793.

(9) About FIG. 88

The illustrative sentence:
Watasiwa kyuujyoudeiu senryokuwo moteru jyoukyouga nai to omottuta
It extracts kyuujyoudeiu senryokuwo moteru" at 804 via steps 800, 801, 802, 803.
The illustrative sentence:
Nihonwa kyuujyoudeiu senryokuga moteru jyoukyoudenai to omottuta
It extracts kyuujyoudeiu senryokuga moteru" at 806 via steps 800, 801, 802, 803, 805, 807.
The illustrative sentence:
Nihonwa kyuujyoudeiu senryokuwo motu houkoude hatarakikaketeini to ittuta
It extracts kyuujyoudeiu senryokuwo motu" at 806 via steps 800, 801, 802, 803, 805.

8. The Other Implementation Form
8.1 The Method of Using the Analysis of the Role for the Decision of the Part of Speech In the above implementation form, it analyzes a part of speech before analysis of the role. In case of analysis of this part of speech, the part of speech sometimes can not be fixed to one. In such a case, it maintains the candidacy of more than one part of speech beforehand. Then, using the result of the role analysis, the part of speech can be fixed.

For example: "watasino hatumei" and "watasiga hatumei

As for "hatumei", only in the part of speech of back and forth the token, the part of speech can not be fixed. In other words, it isn't possible to fix whether or not it is "a verb" or whether or not it is "a noun".

As for "watasino hatumei", "watasino" is predicted by the nominative table. By this, it finds that "hatumei" has the role of the nominative. It is possible to fix that the role of the part of speech of "hatumei" is "the general pre-copula". Therefore, the part of speech of "hatumei" is fixed to "Noun".

On the other hand, it is "watasiga hatumei". In this case, "watasiga" has either of "the subject" or "the topic". Also, "the subject" or "the topic" has always "the predicate". Moreover, the concerned "predicate" is always situated immediately ahead of T-interval. Therefore, it is possible to fix that "hatumei" immediately ahead of T-interval has the part of speech of "the predicate".

8.2 The Method of Executing LSA After Analyzing the Sentence Structure

In the above implementation form, it analyzes sentence structure after executing LSA. Then, based on the analysis result of the sentence structure, it executes LSA again and it corrects the result of LSA. The advantage of such a method of analyzing lies in the point that it is possible to do a correct analysis even if it is a complicated sentence.

Figure 104:
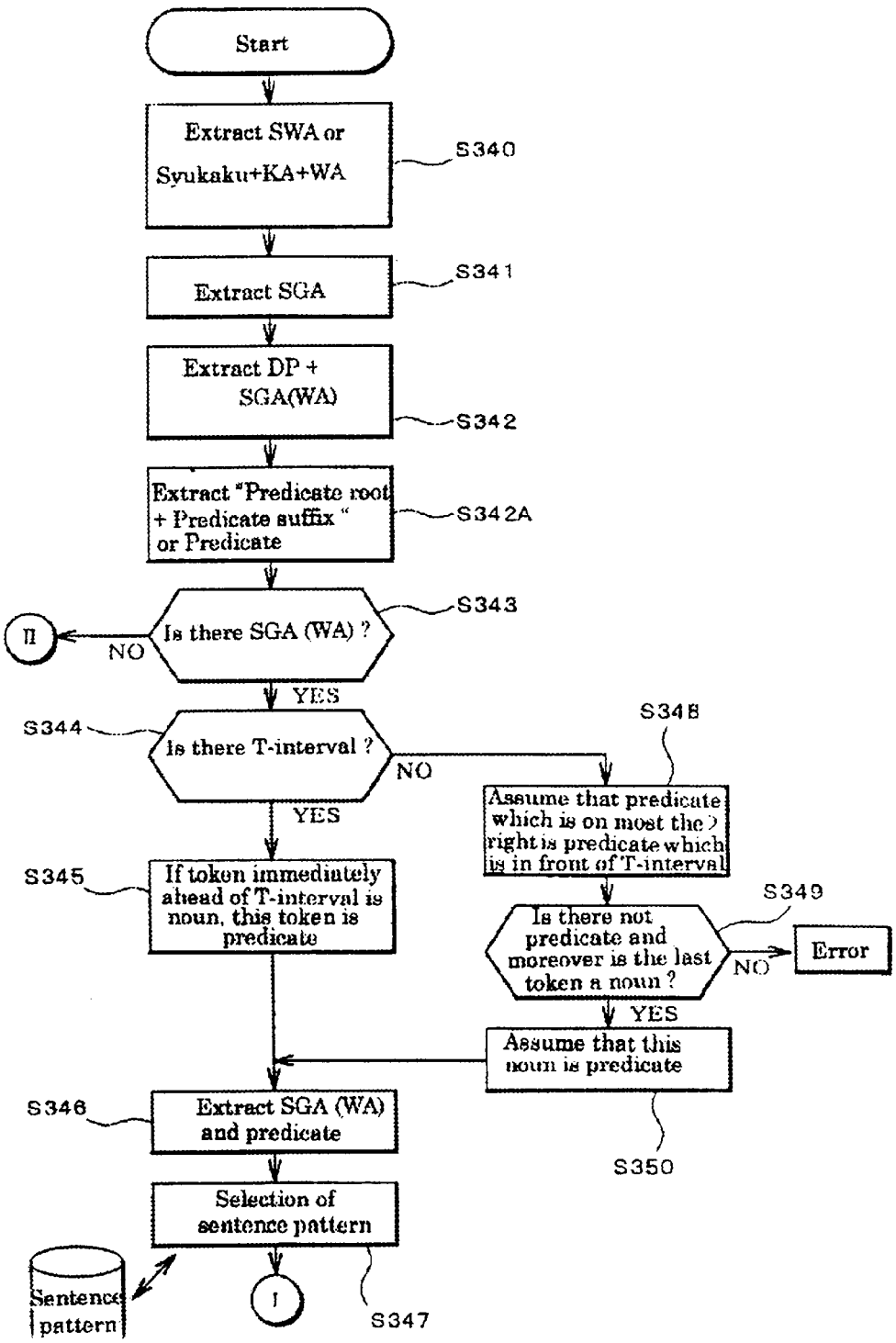
FIG. 104 is the flow chart of the case which does LSA after analysis of the sentence structure.

However, if being a sentence with simple structure, after analyzing sentence structure, it may execute LSA only about the un-fixed t oken. If the modification relation and the subordinate relation are simple, such an analysis is sometimes more desirable from the point in the processing time if being a daily used sentence. The flow chart which executes LSA after analyzing sentence structure is shown in FIG. 104. First, it extracts "syukakuga(wa)" about step S340–S342. But, in this point, it doesn't give a role.

Also, if there is connection of "definite predicate"+"noun"+"wa" (or "ga"), it extracts as "predicate+syukakuga (wa)".

Next, it judges whether or not there is "syukakuga(wa)" in the sentence (step S343). If not being, it advances towards LSA at once without analyzing a sentence pattern. If there is "syukakuga(wa)", it judges whether or not there is "T-interval" (step S344). If not being, it executes the special processing of a title and so on (step S348–S350). If being, it judges whether or not the token immediately ahead of T-interval is "a noun". If being "a noun", it gives the mark of "predicate" (step S345). In other words, it processes substantive stopping.

Next, it extracts "syukakuga(wa)" "predicate" about step S346. It finds the sentence pattern which agrees from the sentence pattern table about the extracted combination of the "syukakuga(wa)" "predicate" (step S347).

The part of the sentence pattern table which was used about this implementation form is shown in FIG. 106, FIG. 107. This sentence pattern table made the combination of the "syukakuga(wa)" "predicate" a type. Therefore, as for the subordinate sentence, too, it decides in the combination of the "syukakuga(wa)" "predicate".

In the implementation form of FIG. 32, it extracts a subordinate sentence and it fixes a sentence pattern. However, in this implementation form, it defines the sentence pattern which contained a subordinate sentence. Therefore, in this implementation form, the sentence pattern table cannot help becoming complicated. Moreover, there is a fear that the analysis becomes non-correctness.

On the other hand, if referring to the sentence pattern table, there is an advantage which can do the processing which contains a subordinate sentence. The quick processing becomes possible. Therefore, it is effective in the sentence which isn't complicated and the sentence with the same structure.

Figure 105:
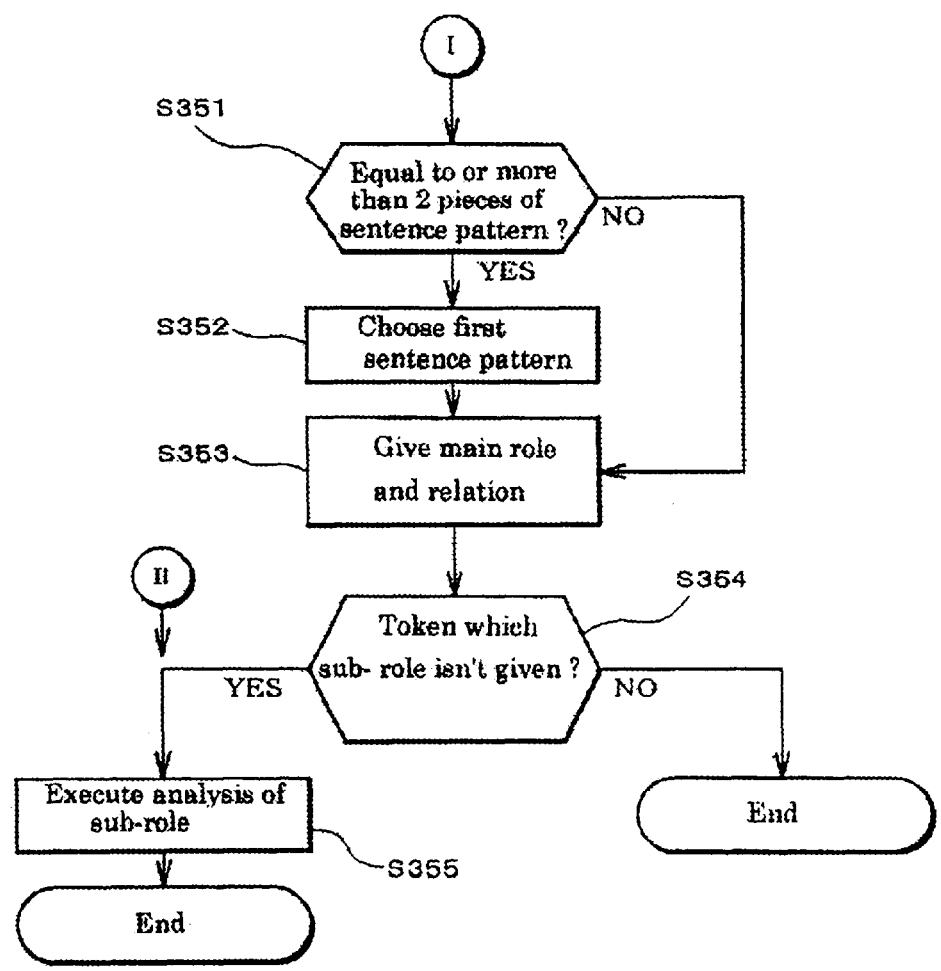
FIG. 105 is the flow chart of the case which does LSA after analysis of the sentence structure.

When choosing a sentence pattern, it judges whether or not equal to or more than 2 pieces of interpretation are memorized about the concerned sentence pattern (step S351 of FIG. 105). For example, if being sentence pattern 7, the interpretation is one. According to the indication, it memorizes a main role and relation (step S353).

When equal to or more than 2 pieces of interpretation are memorized, it chooses a and it memorizes a main role and relation (step S352, S353). In this case, it displays equal to or more than 2 pieces of candidacy on the screen of the CRT and it may make a work person choose. Also, it may decide in the use frequency.

Incidentally, like the implementation form of FIG. 32, it takes out one subordinate sentence and it may analyze a sentence pattern.

It gives a main role and relation with step S353. Next, it judges whether or not there is a token which a sub-role isn't given to with step S354. If not being, it ends an analysis. If being, it executes LSA and as for the token which a role isn't given to, it fixes a sub-role (step S355). Incidentally, the processing contents of LSA are the same as FIG. 33. But, because it extracted "syukakuga(wa)" "predicate" already in this implementation form, step S60–S62 is unnecessary.

In above-mentioned implementation form, in case of local structural analysis, it fixes the role of the un-fixed token based on the role of the after token. However, it may decide based on the token in front. Also, it may refer from the beginning of the sentence to the end.

Incidentally, as for the above implementation example, it realizes each function of FIG. 2 using CPU but it may compose the part or all by the hard wear logic.

9. The Application to the Translation

The example to translate into the other language using above-mentioned analysis result is shown. Here, the case to translate into English after analyzing Japanese is explained. Of course, it is possible to translate into the other language, too.

First, a change from Japanese into English is explained by the token level. "A part of speech" is given to each token of Japanese. According to this part of speech, it chooses the token of English which corresponds to Japanese.

For example, about the case change, the part of speech which corresponds to the particle is not in English. However, by the information which was gotten by the analysis of the particle, it is possible to correspond to English.

Nominative particle : In English, it is shown as nominative's change. (Ex.)

"watasiwa" "I", "watasino" "my", "watasini" "me"

Direct case particle: In English, it is shown by the position of the token which is situated behind the verb.

Because relation between the token or quasi word is gotten, it arranges a token or quasi word according to the English rule.

The subject is the position which is the same as Japanese.

The predicate makes be situated after subjective.

The object makes be situated behind the predicate.

The indirect object makes be situated behind the direct object.

In the above, a translation into English was explained. Of course, the translation into this English is an example.

This invention is the system which corresponds to the translation of all languages.

It executes a translation by the following procedure.

It makes a word correspond.

It makes the structure and the role of the analyzed sentence correspond.

It makes word order correspond.

This is a translation.

What is claimed is:

1. A method of analyzing language, comprising:
   grouping characters in a string of characters of the language into tokens;
   identifying one or more parts of speech represented by each of the tokens;
   generating quasi-words from two or more tokens;
   assigning a role to each token and to each quasi-word;
   assigning a relation to each token and to each quasi-word;
   identifying a reading point; and
   identifying a subordinate sentence and a main sentence based upon the identified reading point.

2. The method of claim 1, wherein the characters are grouped into tokens based upon references to a dictionary.

3. The method of claim 1, further comprising selecting a part of speech represented by a token with more than one identified part of speech based upon a reference to parts of speech identified for one or more nearby tokens.

4. The method of claim 1, further comprising identifying a predicate token representing a predicate part of speech.

5. The method of claim 1, further comprising assigning an attribute to the predicate token based upon an analysis of a suffix token associated with the predicate token.

6. The method of claim 4, further comprising grouping the tokens into a predicate group and a non-predicate group.

7. The method of claim 6, further comprising dividing the predicate group into a verb group and an adjective group.

8. The method of claim 6, further comprising dividing the non-predicate group into a noun group and a non-noun group.

9. The method of claim 1, wherein assigning a role to each token comprises predicting a role of a token based upon a role assigned to a preceding token.

10. The method of claim 1, further comprising identifying one or more pieces of definite predicate in the subordinate sentence.

11. The method of claim 1, further comprising identifying a definite predicate in the main sentence.

12. The method of claim 1, further comprising determining whether the subordinate sentence is bounded by parentheses.

13. The method of claim 1, further comprising transmitting the tokens, the quasi-words, the assigned roles and the assigned relations along with the character string over a computer network.

14. The method of claim 1, further comprising translating the character string into another language based upon the tokens, the quasi-words, the assigned roles, the assigned relations and the character string.

15. A system of analyzing language, comprising:
a dictionary including a part of speech dictionary, a verb suffix table and a predicative adjective suffix table; and
a processor coupled to the dictionary, wherein the processor is configured to:
group characters in a string of characters of the language into tokens;
identify one or more parts of speech represented by each of the tokens;
generate quasi-words from two or more tokens;
assign a role to each token and to each quasi-word;
assign a relation to each token and to each quasi-word;
identify a reading point; and
identify a subordinate sentence and a main sentence based on an identified reading point.

16. The system of claim 15, wherein the processor is configured to identify a predicate token representing a predicate part of speech.

17. The system of claim 16, wherein the processor is configured to assign an attribute to the predicate token based upon an analysis of a suffix token associated with the predicate token.

18. The system of claim 15, wherein the processor is configured to translate the character string into another language based upon the tokens, the quasi-words, the assigned roles, the assigned relations and the character string.

19. A computer-implemented method comprising:
receiving a document written in a first language prepared in accordance with one or more predefined rules for use of a reading point, the document including one or more sentences;
identifying a reading point in a sentence in the document;
identifying a subordinate portion and a main portion of the sentence based on the identified reading point;
analyzing a sentence pattern of the subordinate portion and a sentence pattern of the main portion; and
translating the sentence from the first language into a second language based at least in part on the analysis of the sentence patterns of the subordinate and main portions of the sentence.

20. The method of claim 19, wherein analyzing a sentence pattern includes using sentence pattern tables.

* * * * *

UNITED STATES PATENT AND TRADEMARK OFFICE
CERTIFICATE OF CORRECTION

PATENT NO. : 6,823,301 B1
DATED : November 23, 2004
INVENTOR(S) : Hiroshi Ishikura It is certified that error appears in the above-identified patent and that said Letters Patent is hereby corrected as shown below:

Column 62,
Line 55, replace "The method of claim 1, further comprising assigning an" with
-- The method of claim 4, further comprising assigning an --.

Signed and Sealed this

Sixth Day of September, 2005

JON W. DUDAS
*Director of the United States Patent and Trademark Office*